(12) United States Patent
Chang et al.

(10) Patent No.: US 10,659,405 B1
(45) Date of Patent: May 19, 2020

(54) AVATAR INTEGRATION WITH MULTIPLE APPLICATIONS

(71) Applicant: Apple Inc., Cupertino, CA (US)

(72) Inventors: Jae Woo Chang, San Jose, CA (US); Marcel Van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/582,570

(22) Filed: Sep. 25, 2019

Related U.S. Application Data

(60) Provisional application No. 62/843,967, filed on May 6, 2019, provisional application No. 62/855,891, filed on May 31, 2019.

(51) Int. Cl.
  G06F 15/16 (2006.01)
  H04L 12/58 (2006.01)
  G06T 13/80 (2011.01)

(52) U.S. Cl.
  CPC ............ *H04L 51/046* (2013.01); *G06T 13/80* (2013.01); *H04L 51/10* (2013.01); *H04L 51/26* (2013.01)

(58) Field of Classification Search
  USPC ....... 709/203, 206, 217, 219, 223, 224, 226, 709/228, 230, 232, 238; 707/626; 726/29; 370/259
  See application file for complete search history.

(56) References Cited

U.S. PATENT DOCUMENTS

| | | | |
|---|---|---|---|
| 5,917,913 A | 6/1999 | Wang | |
| 6,088,040 A | 7/2000 | Oda et al. | |
| 6,145,083 A | 11/2000 | Shaffer et al. | |
| 6,173,402 B1 | 1/2001 | Chapman | |
| 6,256,008 B1 | 7/2001 | Sparks et al. | |
| 6,282,656 B1 | 8/2001 | Wang | |
| 6,629,793 B1 | 10/2003 | Miller | |
| 6,700,612 B1 | 3/2004 | Anderson et al. | |
| 6,727,916 B1 | 4/2004 | Ballard | |
| 6,987,991 B2 | 1/2006 | Nelson | |

(Continued)

FOREIGN PATENT DOCUMENTS

| | | |
|---|---|---|
| AU | 2015100705 A4 | 6/2015 |
| CN | 1728856 A | 2/2006 |

(Continued)

OTHER PUBLICATIONS

Applicant Initiated Interview Summary received for U.S. Appl. No. 15/940,017, dated Dec. 26, 2019, 5 pages.

(Continued)

*Primary Examiner* — Quang N Nguyen
(74) *Attorney, Agent, or Firm* — Dentons US LLP

(57) ABSTRACT

The present disclosure generally relates to user interfaces for displaying and using avatars. In some embodiments, avatars are used to generate stickers for sending in a content-creation user interface. In some embodiments, avatars are used to generate a representation of a contactable user in a contactable user editing user interface. In some embodiments, a user interface can be used to create and edit an avatar. In some embodiments, a user interface can be used to display an avatar that is responsive to detected changes in pose of a face of a user. In some embodiments, contact information is transmitted or received.

33 Claims, 130 Drawing Sheets

(56) References Cited

U.S. PATENT DOCUMENTS

| | | |
|---|---|---|
| 6,990,452 B1 | 1/2006 | Ostermann et al. |
| 7,019,737 B1 | 3/2006 | Asai et al. |
| 7,155,411 B1 | 12/2006 | Blinn et al. |
| 7,167,731 B2 | 1/2007 | Nelson |
| 7,180,524 B1 | 2/2007 | Axelrod |
| 7,221,933 B2 | 5/2007 | Sauer et al. |
| 7,227,976 B1 | 6/2007 | Jung et al. |
| 7,419,469 B2 | 9/2008 | Vacca |
| 7,603,105 B2 | 10/2009 | Bocking et al. |
| 7,657,252 B2 | 2/2010 | Futami |
| 7,669,135 B2 | 2/2010 | Cunningham et al. |
| 7,689,939 B1 | 3/2010 | Becker |
| 7,720,893 B2 | 5/2010 | Boudreau et al. |
| 7,908,554 B1 | 3/2011 | Blattner |
| 8,074,172 B2 | 12/2011 | Kocienda et al. |
| 8,169,438 B1 | 5/2012 | Baraff et al. |
| 8,200,962 B1 | 6/2012 | Boodman et al. |
| 8,232,973 B2 | 7/2012 | Kocienda et al. |
| 8,254,647 B1 | 8/2012 | Nechyba et al. |
| 8,255,810 B2 | 8/2012 | Moore et al. |
| 8,369,843 B2 | 2/2013 | Fux et al. |
| 8,539,050 B2 | 9/2013 | Tow et al. |
| 8,543,927 B1 | 9/2013 | McKinley et al. |
| 8,584,031 B2 | 11/2013 | Moore et al. |
| 8,848,879 B1 | 9/2014 | Coughlan et al. |
| 8,863,112 B2 | 10/2014 | Kumagai |
| 8,867,849 B1 | 10/2014 | Kirkham et al. |
| 8,924,292 B1 | 12/2014 | Ellis et al. |
| 8,935,755 B1 | 1/2015 | Kay |
| 8,949,618 B1 | 2/2015 | Lee et al. |
| 9,104,908 B1 | 8/2015 | Rogers et al. |
| 9,317,870 B2 | 4/2016 | Tew et al. |
| 9,497,606 B1 | 11/2016 | Brewer |
| 9,639,974 B2 | 5/2017 | Smith et al. |
| 10,013,601 B2 | 7/2018 | Ebersman et al. |
| 10,169,897 B1 | 1/2019 | Geiger et al. |
| 10,171,985 B1 * | 1/2019 | Czajka, II .......... H04M 1/72572 |
| 10,237,276 B2 * | 3/2019 | Gupta .................... G06Q 10/10 |
| 10,262,327 B1 * | 4/2019 | Hardebeck ............. G06Q 30/02 |
| 10,325,416 B1 | 6/2019 | Scapel et al. |
| 10,325,417 B1 | 6/2019 | Scapel et al. |
| 10,397,391 B1 * | 8/2019 | Czajka .................... H04W 4/21 |
| 10,410,434 B1 | 9/2019 | Scapel et al. |
| 2001/0033675 A1 | 10/2001 | Maurer et al. |
| 2001/0039552 A1 | 11/2001 | Killi et al. |
| 2001/0047365 A1 | 11/2001 | Yonaitis |
| 2002/0023215 A1 | 2/2002 | Wang et al. |
| 2002/0188948 A1 | 12/2002 | Florence |
| 2003/0061157 A1 | 3/2003 | Hirka et al. |
| 2004/0041849 A1 | 3/2004 | Mock et al. |
| 2004/0049539 A1 | 3/2004 | Reynolds et al. |
| 2004/0093582 A1 | 5/2004 | Segura |
| 2004/0164973 A1 | 8/2004 | Nakano et al. |
| 2005/0081150 A1 | 4/2005 | Beardow |
| 2005/0156873 A1 | 7/2005 | Walter et al. |
| 2005/0169527 A1 | 8/2005 | Longe et al. |
| 2005/0198171 A1 | 9/2005 | Landsman et al. |
| 2005/0248582 A1 | 11/2005 | Scheepers et al. |
| 2005/0289173 A1 | 12/2005 | Vacca |
| 2006/0000900 A1 | 1/2006 | Fernandes et al. |
| 2006/0025091 A1 | 2/2006 | Buford |
| 2006/0026170 A1 | 2/2006 | Kreitler et al. |
| 2006/0047747 A1 | 3/2006 | Erickson et al. |
| 2006/0053386 A1 | 3/2006 | Kuhl et al. |
| 2006/0064372 A1 | 3/2006 | Gupta |
| 2006/0105814 A1 | 5/2006 | Monden et al. |
| 2006/0117197 A1 | 6/2006 | Nurmi |
| 2006/0135142 A1 | 6/2006 | Repka |
| 2006/0143569 A1 | 6/2006 | Kinsella et al. |
| 2006/0148526 A1 | 7/2006 | Kamiya et al. |
| 2006/0188144 A1 | 8/2006 | Sasaki et al. |
| 2006/0294465 A1 | 12/2006 | Ronen et al. |
| 2007/0002077 A1 | 1/2007 | Gopalakrishnan |
| 2007/0072602 A1 | 3/2007 | Iyer et al. |
| 2007/0100948 A1 | 5/2007 | Adams et al. |
| 2007/0130327 A1 | 6/2007 | Kuo et al. |
| 2007/0132789 A1 | 6/2007 | Ording et al. |
| 2007/0157089 A1 | 7/2007 | Van os et al. |
| 2007/0200713 A1 | 8/2007 | Weber et al. |
| 2007/0204218 A1 | 8/2007 | Weber et al. |
| 2007/0233695 A1 | 10/2007 | Boudreau et al. |
| 2007/0254712 A1 | 11/2007 | Chitti |
| 2008/0052242 A1 | 2/2008 | Merritt et al. |
| 2008/0055269 A1 | 3/2008 | Lemay et al. |
| 2008/0078831 A1 | 4/2008 | Johnson et al. |
| 2008/0122796 A1 | 5/2008 | Jobs et al. |
| 2008/0132252 A1 | 6/2008 | Altman et al. |
| 2008/0133580 A1 * | 6/2008 | Wanless ................. H04L 67/18 |
| 2008/0139176 A1 | 6/2008 | Kim |
| 2008/0168075 A1 | 7/2008 | Kamiyabu |
| 2008/0168290 A1 | 7/2008 | Jobs et al. |
| 2008/0171555 A1 | 7/2008 | Oh et al. |
| 2008/0182598 A1 | 7/2008 | Bowman |
| 2008/0184052 A1 | 7/2008 | Itoh et al. |
| 2008/0189108 A1 | 8/2008 | Atar |
| 2008/0216022 A1 | 9/2008 | Lorch et al. |
| 2008/0242423 A1 | 10/2008 | Kerr et al. |
| 2008/0267459 A1 | 10/2008 | Nakada et al. |
| 2008/0268882 A1 | 10/2008 | Moloney |
| 2008/0300572 A1 | 12/2008 | Rankers et al. |
| 2008/0310602 A1 | 12/2008 | Bhupati |
| 2009/0027337 A1 | 1/2009 | Hildreth |
| 2009/0030793 A1 | 1/2009 | Fordyce, III |
| 2009/0055484 A1 | 2/2009 | Vuong et al. |
| 2009/0132371 A1 | 5/2009 | Strietzel et al. |
| 2009/0144173 A1 | 6/2009 | Mo et al. |
| 2009/0168756 A1 | 7/2009 | Kurapati et al. |
| 2009/0170480 A1 | 7/2009 | Lee |
| 2009/0175509 A1 | 7/2009 | Gonion et al. |
| 2009/0182674 A1 | 7/2009 | Patel et al. |
| 2009/0195469 A1 | 8/2009 | Lim et al. |
| 2009/0195545 A1 | 8/2009 | Debevec et al. |
| 2009/0202114 A1 | 8/2009 | Morin et al. |
| 2009/0222765 A1 | 9/2009 | Ekstrand |
| 2009/0249252 A1 | 10/2009 | Lundy et al. |
| 2009/0254799 A1 | 10/2009 | Unger |
| 2009/0288032 A1 | 11/2009 | Chang et al. |
| 2009/0297022 A1 | 12/2009 | Pettigrew et al. |
| 2009/0298489 A1 | 12/2009 | Chitturi et al. |
| 2009/0300513 A1 | 12/2009 | Nims et al. |
| 2009/0319288 A1 | 12/2009 | Slaney et al. |
| 2010/0026640 A1 | 2/2010 | Kim et al. |
| 2010/0042517 A1 | 2/2010 | Paintin et al. |
| 2010/0123724 A1 | 5/2010 | Moore et al. |
| 2010/0125785 A1 | 5/2010 | Moore et al. |
| 2010/0125811 A1 | 5/2010 | Moore et al. |
| 2010/0153847 A1 | 6/2010 | Fama |
| 2010/0161434 A1 | 6/2010 | Herwig et al. |
| 2010/0164684 A1 | 7/2010 | Sasa et al. |
| 2010/0167809 A1 | 7/2010 | Perlman et al. |
| 2010/0179991 A1 | 7/2010 | Lorch et al. |
| 2010/0185677 A1 | 7/2010 | Gupta et al. |
| 2010/0203968 A1 | 8/2010 | Gill et al. |
| 2010/0207721 A1 | 8/2010 | Nakajima et al. |
| 2010/0211917 A1 | 8/2010 | Tsuei |
| 2010/0285775 A1 | 11/2010 | Klein et al. |
| 2010/0306185 A1 | 12/2010 | Smith et al. |
| 2011/0007174 A1 | 1/2011 | Bacivarov et al. |
| 2011/0009109 A1 | 1/2011 | Hyon |
| 2011/0080356 A1 | 4/2011 | Kang et al. |
| 2011/0119596 A1 | 5/2011 | Nesladek et al. |
| 2011/0131521 A1 | 6/2011 | Cho et al. |
| 2011/0184820 A1 | 7/2011 | Mon et al. |
| 2011/0197163 A1 | 8/2011 | Jegal et al. |
| 2011/0202417 A1 | 8/2011 | Dewakar et al. |
| 2011/0218849 A1 | 9/2011 | Rutigliano et al. |
| 2011/0244796 A1 | 10/2011 | Khan et al. |
| 2011/0248992 A1 | 10/2011 | van os et al. |
| 2011/0251892 A1 | 10/2011 | Laracey |
| 2011/0252344 A1 | 10/2011 | Van Os |
| 2011/0252381 A1 | 10/2011 | Chaudhri |
| 2011/0262103 A1 | 10/2011 | Ramachandran et al. |
| 2011/0294525 A1 | 12/2011 | Jonsson |
| 2012/0069028 A1 | 3/2012 | Bouguerra |

(56) References Cited

U.S. PATENT DOCUMENTS

| | | |
|---|---|---|
| 2012/0075328 A1 | 3/2012 | Goossens |
| 2012/0079377 A1 | 3/2012 | Goossens |
| 2012/0079378 A1 | 3/2012 | Goossens |
| 2012/0081282 A1 | 4/2012 | Chin |
| 2012/0101881 A1 | 4/2012 | Taylor et al. |
| 2012/0101887 A1 | 4/2012 | Harvey et al. |
| 2012/0109764 A1 | 5/2012 | Martin et al. |
| 2012/0131089 A1 | 5/2012 | Berkowitz et al. |
| 2012/0135718 A1 | 5/2012 | Amidon et al. |
| 2012/0149408 A1 | 6/2012 | Steer et al. |
| 2012/0191603 A1 | 7/2012 | Nuzzi |
| 2012/0215647 A1 | 8/2012 | Powell et al. |
| 2012/0232968 A1 | 9/2012 | Calman et al. |
| 2012/0233120 A1* | 9/2012 | Nijim ................ H04N 21/4627 707/626 |
| 2012/0260189 A1 | 10/2012 | Howard et al. |
| 2012/0289290 A1 | 11/2012 | Chae et al. |
| 2012/0293619 A1 | 11/2012 | Newton et al. |
| 2012/0299945 A1 | 11/2012 | Aarabi |
| 2012/0309520 A1 | 12/2012 | Evertt et al. |
| 2012/0310760 A1 | 12/2012 | Phillips et al. |
| 2012/0317023 A1 | 12/2012 | Moon et al. |
| 2012/0319985 A1 | 12/2012 | Moore et al. |
| 2012/0324359 A1 | 12/2012 | Lee et al. |
| 2013/0006746 A1 | 1/2013 | Moore |
| 2013/0013954 A1 | 1/2013 | Benedek et al. |
| 2013/0015946 A1 | 1/2013 | Lau et al. |
| 2013/0090098 A1 | 4/2013 | Gidwani |
| 2013/0102290 A1 | 4/2013 | Akhtar et al. |
| 2013/0124319 A1 | 5/2013 | Hodge et al. |
| 2013/0143521 A1 | 6/2013 | Hernandez et al. |
| 2013/0147933 A1 | 6/2013 | Kulas |
| 2013/0148867 A1 | 6/2013 | Wang |
| 2013/0159919 A1 | 6/2013 | Leydon |
| 2013/0179304 A1 | 7/2013 | Swist |
| 2013/0238455 A1 | 9/2013 | Laracey |
| 2013/0275923 A1 | 10/2013 | Griffin et al. |
| 2013/0282533 A1 | 10/2013 | Foran-owens et al. |
| 2013/0282813 A1 | 10/2013 | Lessin et al. |
| 2013/0318347 A1* | 11/2013 | Moffat ................ H04L 63/0435 726/29 |
| 2013/0318476 A1 | 11/2013 | Sauve et al. |
| 2013/0326367 A1 | 12/2013 | Nakamura et al. |
| 2013/0342672 A1 | 12/2013 | Gray et al. |
| 2014/0013422 A1 | 1/2014 | Janus et al. |
| 2014/0047560 A1 | 2/2014 | Meyer et al. |
| 2014/0064465 A1 | 3/2014 | Banta et al. |
| 2014/0073298 A1 | 3/2014 | Rossmann |
| 2014/0074569 A1 | 3/2014 | Francis et al. |
| 2014/0085293 A1 | 3/2014 | Konoplev et al. |
| 2014/0085460 A1 | 3/2014 | Park et al. |
| 2014/0085487 A1 | 3/2014 | Park et al. |
| 2014/0092130 A1 | 4/2014 | Anderson et al. |
| 2014/0129435 A1 | 5/2014 | Pardo et al. |
| 2014/0137013 A1 | 5/2014 | Matas |
| 2014/0143693 A1 | 5/2014 | Goossens et al. |
| 2014/0149198 A1 | 5/2014 | Kim et al. |
| 2014/0157153 A1 | 6/2014 | Yuen et al. |
| 2014/0165000 A1 | 6/2014 | Fleizach et al. |
| 2014/0169225 A1 | 6/2014 | Citron et al. |
| 2014/0172533 A1 | 6/2014 | Andrews et al. |
| 2014/0173466 A1 | 6/2014 | Suri et al. |
| 2014/0179428 A1 | 6/2014 | Miura et al. |
| 2014/0198121 A1 | 7/2014 | Tong et al. |
| 2014/0205259 A1 | 7/2014 | Kamity et al. |
| 2014/0213318 A1 | 7/2014 | Leem et al. |
| 2014/0244495 A1 | 8/2014 | Davis et al. |
| 2014/0254434 A1* | 9/2014 | Jain ................ H04L 67/306 370/259 |
| 2014/0279474 A1 | 9/2014 | Evans et al. |
| 2014/0282211 A1 | 9/2014 | Ady et al. |
| 2014/0283128 A1 | 9/2014 | Shepherd et al. |
| 2014/0292641 A1 | 10/2014 | Cho et al. |
| 2014/0297385 A1 | 10/2014 | Ryan |
| 2014/0310606 A1 | 10/2014 | Liu et al. |
| 2014/0313307 A1 | 10/2014 | Oh et al. |
| 2014/0317520 A1 | 10/2014 | Sherrard et al. |
| 2014/0343703 A1 | 11/2014 | Topchy et al. |
| 2014/0359766 A1 | 12/2014 | Klein et al. |
| 2014/0361974 A1 | 12/2014 | Li et al. |
| 2014/0362091 A1 | 12/2014 | Bouaziz et al. |
| 2014/0366159 A1 | 12/2014 | Cohen |
| 2015/0012425 A1 | 1/2015 | Mathew |
| 2015/0033364 A1 | 1/2015 | Wong |
| 2015/0084950 A1 | 3/2015 | Li et al. |
| 2015/0087414 A1 | 3/2015 | Chen et al. |
| 2015/0100537 A1 | 4/2015 | Grieves et al. |
| 2015/0128021 A1 | 5/2015 | Hewett et al. |
| 2015/0134603 A1 | 5/2015 | Melamed et al. |
| 2015/0135108 A1 | 5/2015 | Pope et al. |
| 2015/0150128 A1 | 5/2015 | Li |
| 2015/0172238 A1 | 6/2015 | Ahmed et al. |
| 2015/0172584 A1 | 6/2015 | Park et al. |
| 2015/0186871 A1 | 7/2015 | Laracey |
| 2015/0201062 A1 | 7/2015 | Shih et al. |
| 2015/0205842 A1 | 7/2015 | Jain et al. |
| 2015/0208244 A1 | 7/2015 | Nakao |
| 2015/0213307 A1 | 7/2015 | Beeler et al. |
| 2015/0220774 A1 | 8/2015 | Ebersman et al. |
| 2015/0222586 A1 | 8/2015 | Ebersman et al. |
| 2015/0251093 A1 | 9/2015 | Trombetta et al. |
| 2015/0310259 A1 | 10/2015 | Lau et al. |
| 2015/0312185 A1 | 10/2015 | Langholz et al. |
| 2015/0325029 A1 | 11/2015 | Li et al. |
| 2015/0346912 A1 | 12/2015 | Yang et al. |
| 2015/0347618 A1 | 12/2015 | Ogita |
| 2015/0381896 A1 | 12/2015 | Park et al. |
| 2016/0005206 A1 | 1/2016 | Li et al. |
| 2016/0006987 A1 | 1/2016 | Li et al. |
| 2016/0030844 A1 | 2/2016 | Nair et al. |
| 2016/0042548 A1 | 2/2016 | Du et al. |
| 2016/0050169 A1 | 2/2016 | Ben atar et al. |
| 2016/0055370 A1 | 2/2016 | Garcia |
| 2016/0057087 A1* | 2/2016 | Gomba ................ H04L 51/10 709/206 |
| 2016/0092043 A1 | 3/2016 | Missig et al. |
| 2016/0104034 A1 | 4/2016 | Wilder et al. |
| 2016/0105388 A1 | 4/2016 | Bin mahfooz et al. |
| 2016/0134840 A1 | 5/2016 | Mcculloch |
| 2016/0163084 A1 | 6/2016 | Corazza et al. |
| 2016/0182661 A1* | 6/2016 | Brezina ................ H04L 51/36 709/206 |
| 2016/0191958 A1 | 6/2016 | Nauseef et al. |
| 2016/0217601 A1 | 7/2016 | Tsuda et al. |
| 2016/0227115 A1 | 8/2016 | Bin mahfooz et al. |
| 2016/0231878 A1 | 8/2016 | Tsuda et al. |
| 2016/0247308 A1 | 8/2016 | Jiao et al. |
| 2016/0247309 A1 | 8/2016 | Li et al. |
| 2016/0267699 A1 | 9/2016 | Borke et al. |
| 2016/0277386 A1 | 9/2016 | Boss et al. |
| 2016/0291822 A1 | 10/2016 | Ahuja et al. |
| 2016/0292901 A1 | 10/2016 | Li et al. |
| 2016/0292903 A1 | 10/2016 | Li et al. |
| 2016/0328874 A1 | 11/2016 | Tong et al. |
| 2016/0328875 A1 | 11/2016 | Fang et al. |
| 2016/0328876 A1 | 11/2016 | Tong et al. |
| 2016/0350957 A1 | 12/2016 | Woods et al. |
| 2016/0357583 A1 | 12/2016 | Decker et al. |
| 2016/0358167 A1 | 12/2016 | Van os et al. |
| 2016/0358168 A1 | 12/2016 | Van os et al. |
| 2016/0358199 A1 | 12/2016 | Van os et al. |
| 2016/0360256 A1 | 12/2016 | Van os et al. |
| 2017/0018289 A1 | 1/2017 | Morgenstern |
| 2017/0046045 A1 | 2/2017 | Tung et al. |
| 2017/0046065 A1 | 2/2017 | Zeng et al. |
| 2017/0046426 A1* | 2/2017 | Pearce ................ G06F 16/355 |
| 2017/0046507 A1 | 2/2017 | Archer et al. |
| 2017/0069124 A1 | 3/2017 | Tong et al. |
| 2017/0075878 A1 | 3/2017 | Jon et al. |
| 2017/0080346 A1 | 3/2017 | Abbas |
| 2017/0083086 A1 | 3/2017 | Mazur et al. |
| 2017/0083524 A1 | 3/2017 | Huang et al. |
| 2017/0083586 A1 | 3/2017 | Huang et al. |
| 2017/0098122 A1 | 4/2017 | el kaliouby et al. |

(56) References Cited

U.S. PATENT DOCUMENTS

| | | |
|---|---|---|
| 2017/0132828 A1 | 5/2017 | Zelenin et al. |
| 2017/0140214 A1 | 5/2017 | Matas et al. |
| 2017/0164888 A1 | 6/2017 | Matsuda et al. |
| 2017/0206095 A1 | 7/2017 | Gibbs et al. |
| 2017/0285764 A1 | 10/2017 | Kim et al. |
| 2017/0286423 A1 | 10/2017 | Shorman et al. |
| 2017/0289073 A1 | 10/2017 | Crusson et al. |
| 2017/0323266 A1 | 11/2017 | Seo |
| 2017/0359302 A1 | 12/2017 | Van os et al. |
| 2017/0359462 A1 | 12/2017 | Harris et al. |
| 2018/0004404 A1 | 1/2018 | Delfino et al. |
| 2018/0025219 A1 | 1/2018 | Baldwin et al. |
| 2018/0047200 A1 | 2/2018 | O'hara et al. |
| 2018/0063603 A1 | 3/2018 | Tang et al. |
| 2018/0088787 A1 | 3/2018 | Bereza et al. |
| 2018/0091732 A1 | 3/2018 | Wilson et al. |
| 2018/0130094 A1 | 5/2018 | Tung et al. |
| 2018/0157901 A1 | 6/2018 | Arbatman et al. |
| 2018/0165862 A1 | 6/2018 | Sawaki |
| 2018/0189549 A1 | 7/2018 | Inomata |
| 2018/0225263 A1 | 8/2018 | Zhong et al. |
| 2018/0268589 A1 | 9/2018 | Grant |
| 2018/0316775 A1 | 11/2018 | Kwon et al. |
| 2018/0321826 A1 | 11/2018 | Bereza et al. |
| 2018/0335927 A1 | 11/2018 | Anzures et al. |
| 2018/0335929 A1 | 11/2018 | Scapel et al. |
| 2018/0335930 A1 | 11/2018 | Scapel et al. |
| 2018/0336715 A1 | 11/2018 | Rickwald et al. |
| 2019/0087082 A1 | 3/2019 | Chaudhri et al. |
| 2019/0199848 A1 | 6/2019 | Moore et al. |
| 2019/0230400 A1 | 7/2019 | Van Os et al. |
| 2019/0266775 A1 | 8/2019 | Lee et al. |
| 2019/0266807 A1 | 8/2019 | Lee et al. |
| 2019/0295056 A1 | 9/2019 | Wright |
| 2019/0339847 A1 | 11/2019 | Scapel et al. |
| 2019/0347868 A1 | 11/2019 | Scapel et al. |
| 2019/0370492 A1 | 12/2019 | Falchuk et al. |

FOREIGN PATENT DOCUMENTS

| | | |
|---|---|---|
| CN | 101390039 A | 3/2009 |
| CN | 103945275 A | 7/2014 |
| CN | 104159177 A | 11/2014 |
| CN | 104461894 A | 3/2015 |
| CN | 105051651 A | 11/2015 |
| EP | 1035536 A2 | 9/2000 |
| EP | 1977312 A2 | 10/2008 |
| EP | 2172833 A1 | 4/2010 |
| EP | 2416563 A2 | 2/2012 |
| EP | 2701107 A1 | 2/2014 |
| EP | 2713298 A1 | 4/2014 |
| EP | 2784672 A1 | 10/2014 |
| EP | 2960822 A1 | 12/2015 |
| JP | 11-154899 A | 6/1999 |
| JP | 2000-3316 A | 1/2000 |
| JP | 2001-339509 A | 12/2001 |
| JP | 2004-29801 A | 1/2004 |
| JP | 2004-38310 A | 2/2004 |
| JP | 2004-159180 A | 6/2004 |
| JP | 2006-221468 A | 8/2006 |
| JP | 2007-274240 A | 10/2007 |
| JP | 2008-123553 A | 5/2008 |
| JP | 2008-527563 A | 7/2008 |
| JP | 2009-134521 A | 6/2009 |
| JP | 2010-28404 A | 2/2010 |
| JP | 2012-114676 A | 6/2012 |
| JP | 2012-198625 A | 10/2012 |
| JP | 2013-218663 A | 10/2013 |
| JP | 2014-41616 A | 3/2014 |
| JP | 6240301 B1 | 11/2017 |
| JP | 6266736 B1 | 1/2018 |
| JP | 2018-106365 A | 7/2018 |
| KR | 10-2006-0098024 A | 9/2006 |
| KR | 10-1184865 B1 | 9/2012 |
| KR | 10-2014-0018019 A | 2/2014 |
| KR | 10-2014-0027029 A | 3/2014 |
| WO | 2007/076210 A1 | 7/2007 |
| WO | 2007/080559 A2 | 7/2007 |
| WO | 2008/030776 A2 | 3/2008 |
| WO | 2013/097139 A1 | 7/2013 |
| WO | 2013/152453 A1 | 10/2013 |
| WO | 2013/152454 A1 | 10/2013 |
| WO | 2014/012456 A1 | 1/2014 |
| WO | 2014/094199 A1 | 6/2014 |
| WO | 2015/009581 A1 | 1/2015 |
| WO | 2015/027912 A1 | 3/2015 |
| WO | 2015/030912 A1 | 3/2015 |
| WO | 2015/033333 A1 | 3/2015 |
| WO | 2015/051361 A1 | 4/2015 |
| WO | 2015/065928 A1 | 5/2015 |
| WO | 2015/069153 A1 | 5/2015 |
| WO | 2015/087084 A1 | 6/2015 |
| WO | 2015/195216 A1 | 12/2015 |
| WO | 2015/196448 A1 | 12/2015 |
| WO | 2016/045005 A1 | 3/2016 |
| WO | 2016/101124 A1 | 6/2016 |
| WO | 2016/101131 A1 | 6/2016 |
| WO | 2016/101132 A1 | 6/2016 |
| WO | 2016/161556 A1 | 10/2016 |
| WO | 2017/015949 A1 | 2/2017 |

OTHER PUBLICATIONS

European Search Report received for European Patent Application No. 19181242.9, dated Nov. 27, 2019, 4 pages.
Notice of Acceptance received for Australian Patent Application No. 2017330208, dated Nov. 28, 2019, 3 pages.
Office Action received for Australian Patent Application No. 2016270775, dated Nov. 26, 2019, 3 pages.
Office Action received for European Patent Application No. 19181242.9, dated Dec. 6, 2019, 9 pages.
Akg Technical, "Mojipop app//Mozipop gif maker app//How to use mojipop app; Akg Technical", Available online at: https://www.youtube.com/watch?v=_9pdQ3CpWA4, Feb. 4, 2019, 4 pages.
Bomen Xyz, "Cara membuat stiker di android, WhatsApp, Fb Messenger dll || Work 100%", Available online at: https://www.youtube.com/watch?v=cafBfzD1Bbo, Feb. 21, 2019, 3 pages.
Corrected Notice of Allowance received for U.S. Appl. No. 15/981,754, dated Oct. 24, 2019, 2 pages.
Decision to Grant received for Danish Patent Application No. PA201770418, dated Oct. 25, 2019, 3 pages.
Decision to Grant received for Danish Patent Application No. PA201870381, dated Oct. 14, 2019, 2 pages.
Flyme Global, "Flyme 6—Setup Contact Avatar", Available online at: https://www.youtube.com/watch?v=HvmyZdovhEk, May 15, 2017, 3 pages.
Gardener, Ricardo, "How to Create and Use AR Emoji Galaxy S10,S10 Plus", Available online at: https://www.youtube.com/watch?v=wNjgUQzFYto, May 9, 2019, 3 pages.
IT Jungles, "Samsung Galaxy S8: How to Assign a Photo to a Contact", Available online at: https://www.youtube.com/watch?v=2ZdwxijxDzE, Feb. 13, 2018, 3 pages.
IT Jungles, "Samsung Galaxy S9: How to Add Stickers to Text Messages", Available online at: https://www.youtube.com/watch?v=ojGC_UMQds0, Jan. 22, 2019, 3 pages.
Jabbari, Ibrahim, "How to set up Google Gboard's 'Mini' stickers", Available online at: https://www.youtube.com/watch?v=z_sWkctRr8Q, Aug. 30, 2018, 3 pages.
Latest Technology, "How to Create Personalized Emojis on Gboard Using Your Selfies II Personal Ennojis", Available online at: https://www.youtube.com/watch?v=udyom84oqqA, Nov. 1, 2018, 3 pages.
Office Action received for Chinese Patent Application No. 201680031372.8, dated Sep. 29, 2019, 6 pages (3 pages of English Translation and 3 pages of Official Copy).
Office Action received for European Patent Application No. 19172407.9, dated Oct. 18, 2019, 7 pages.
Office Action received for European Patent Application No. 18703184.4, dated Oct. 29, 2019, 6 pages.

(56) References Cited

OTHER PUBLICATIONS

Office Action received for Japanese Patent Application No. 2017-562050, dated Sep. 30, 2019, 5 pages (2 pages of English Translation and 3 pages of Official Copy).
Search Report and Opinion received for Danish Patent Application No. PA201970530, dated Oct. 11, 2019, 8 pages.
Search Report and Opinion received for Danish Patent Application No. PA201970531, dated Oct. 11, 2019, 9 pages.
Tech With Brett, "How to Create Your AR Emoji on the Galaxy S9 and S9+", Available online at: https://www.youtube.com/watch?v=HHMdcBpC8MQ, Mar. 16, 2018, 5 pages.
Gavin, Brady, "How to Remove Old User Account Pictures in Windows 10", Available online at: https://www.howtogeek.com/369601/how-to-remove-old-user-account-pictures-in-windows-10/, Oct. 16, 2018, 5 pages.
Non-Final Office Action received for U.S. Appl. No. 16/583,706, dated Jan. 10, 2020, 27 pages.
Notice of Allowance received for U.S. Appl. No. 14/871,635, dated Jan. 15, 2020, 3 pages.
Office Action received for Chinese Patent Application No. 201610371856.9, dated Dec. 18, 2019, 6 pages (3 pages of English Translation and 3 pages of Official Copy).
Certificate of Examination received for Australian Patent Application No. 2019101019, dated Nov. 12, 2019, 2 pages.
Final Office Action received for U.S. Appl. No. 15/714,887, dated Nov. 15, 2019, 55 pages.
International Preliminary Report on Patentability received for PCT Patent Application No. PCT/US2018/014658, dated Nov. 28, 2019, 14 pages.
International Preliminary Report on Patentability received for PCT Patent Application No. PCT/US2018/014892, dated Nov. 28, 2019, 8 pages.
International Preliminary Report on Patentability received for PCT Patent Application No. PCT/US2018/033044, dated Nov. 28, 2019, 8 pages.
Non-Final Office Action received for U.S. Appl. No. 15/291,829, dated Nov. 8, 2019, 23 pages.
Notice of Allowance received for Korean Patent Application No. 10-2019-7025322, dated Nov. 20, 2019, 5 pages (2 pages of English Translation and 3 pages of Official Copy).
Notice of Allowance Received for U.S. Appl. No. 14/871,635, dated Nov. 14, 2019, 14 pages.
Notice of Allowance received for U.S. Appl. No. 16/116,221, dated Nov. 22, 2019, 13 pages.
Supplemental Notice of Allowance received for U.S. Appl. No. 15/870,195, dated Nov. 14, 2019, 9 pages.
Smart Card Alliance, "Security of Proximity Mobile Payments", Online Available at: https://www.securetechalliance.org/resources/pdf/Security_of_Proximity_Mobile_Payments.pdf, May 2009, pp. 1-39.
Wikihow, "How to Change the Default Text Messaging App on an Android Phone", Available online at: https://www.wikihow.com/Change-the-Default-Text-Messaging-App-on-an-Android-Phone, May 18, 2015, 2 pages.
Applicant-Initiated Interview Summary received for U.S. Appl. No. 15/291,829, dated Feb. 4, 2020, 5 pages.
Applicant-Initiated Interview Summary received for U.S. Appl. No. 16/289,346, dated Jan. 17, 2020, 5 pages.
Final Office Action received for U.S. Appl. No. 16/289,346, dated Feb. 3, 2020, 14 pages.
Notice of Allowance received for U.S. Appl. No. 14/871,635, dated Feb. 3, 2020, 3 pages.
Office Action received for Chinese Patent Application No. 201910278273.5, dated Jan. 3, 2020, 17 pages (10 pages of English Translation and 7 pages of Official Copy).
Advisory Action received for U.S. Appl. No. 14/869,715, dated Feb. 8, 2017, 3 pages.
Advisory Action received for U.S. Appl. No. 14/869,715, dated May 18, 2017, 6 pages.

Androidslide, "Camera Zoom FX", Available at: <https://www.youtube.com/watch?v=AHmPn8y74wY>, Nov. 5, 2011, 3 pages.
AZ Screen Recorder, "Full features—AZ Screen Recorder", Online Available at <https://www.youtube.com/watch?v=L6tAMO_Bu34>, Published on Feb. 13, 2015, 3 pages.
AZ Screen Recorder, "GIF converter—AZ Screen Recorder", Online Available at <https://www.youtube.com/watch?v=gA19pr1QOFM>, Published on May 29, 2015, 3 pages.
AZ Screen Recorder, "AZ Screen Recorder", Online Available at <https://www.youtube.com/watch?v=llc9nKoL9JY>, Published on Jan. 15, 2015, 3 pages.
Beyouravatar, "Faceshift studio tutorial part 4.8: tracking—fbx export", Available online at: https://www.youtube.com/watch?v=_yqmc9yzKLM, Nov. 19, 2012, 3 pages.
Certificate of Examination received for Australian Patent Application No. 2019100497, dated Jul. 29, 2019, 2 pages.
Corrected Notice of Allowance received for U.S. Appl. No. 15/981,754, dated Oct. 15, 2019, 2 pages.
Corrected Notice of Allowance received for U.S. Appl. No. 16/142,288, dated Jul. 30, 2019, 5 pages.
Decision on Appeal received for U.S. Appl. No. 13/596,666, dated Mar. 27, 2019, 13 pages.
Decision to Grant received for Danish Patent Application No. PA201770419, dated Oct. 25, 2018, 2 pages.
Decision to Grant received for Danish Patent Application No. PA201770720, dated Aug. 8, 2019, 2 pages.
Decision to Grant received for Danish Patent Application No. PA201770721, dated Jun. 17, 2019, 2 pages.
Decision to Grant received for Danish Patent Application No. PA201870375, dated Jul. 24, 2019, 2 pages.
Decision to Grant received for Danish Patent Application No. PA201870377, dated May 14, 2019, 2 pages.
Decision to Refuse received for European Patent Application No. 18154163.2, dated May 17, 2019, 22 pages.
European Search Report received for European Patent Application No. 19172407.9, dated Oct. 9, 2019, 4 pages.
European Search Report received for European Patent Application No. 19186042.8, dated Sep. 12, 2019, 4 pages.
Extended European Search Report received for European Patent Application No. 16803996.4, dated Feb. 7, 2018, 8 pages.
Extended European Search Report received for European Patent Application No. 16808015.8, dated May 2, 2018, 13 pages.
Extended European Search Report received for European Patent Application No. 16844879.3, dated Mar. 1, 2019, 6 pages.
Extended European Search Report received for European Patent Application No. 17853654.6, dated Jul. 8, 2019, 9 pages.
Extended European Search Report received for European Patent Application No. 18154163.2, dated Mar. 2, 2018, 4 pages.
Facerig, "FaceRig Mobile Selfie Tip", Available online at: https://www.youtube.com/watch?v=x3DZHnXWZ3U, Oct. 18, 2016, 3 pages.
Facerig, "FaceRig Mobile Tip: How to record with and without the camera feed", Available Online at: https://www.youtube.com/watch?v=Iwk9FIWGvVM, Nov. 8, 2016, 3 pages.
Final Office Action received for U.S. Appl. No. 14/871,654, dated Nov. 16, 2017, 32 pages.
Final Office Action received for U.S. Appl. No. 14/863,616, dated Apr. 24, 2017, 18 pages.
Final Office Action received for U.S. Appl. No. 14/863,616, dated Aug. 10, 2018, 16 pages.
Final Office Action received for U.S. Appl. No. 12/274,346, dated Mar. 14, 2012, 39 pages.
Final Office Action received for U.S. Appl. No. 12/365,887, dated Feb. 29, 2012, 15 pages.
Final Office Action received for U.S. Appl. No. 13/596,666, dated Aug. 26, 2015, 23 pages.
Final Office Action received for U.S. Appl. No. 14/869,715, dated Jun. 17, 2016, 35 pages.
Final Office Action received for U.S. Appl. No. 14/869,715, dated Mar. 7, 2017, 41 pages.
Final Office Action received for U.S. Appl. No. 14/869,715, dated Oct. 6, 2016, 37 pages.

(56) References Cited

OTHER PUBLICATIONS

Final Office Action received for U.S. Appl. No. 14/871,635, dated Jan. 18, 2018, 33 pages.
Final Office Action received for U.S. Appl. No. 14/871,635, dated May 3, 2019, 32 pages.
Final Office Action received for U.S. Appl. No. 15/188,081, dated Dec. 13, 2018, 10 pages.
Final Office Action received for U.S. Appl. No. 15/291,829, dated Jun. 14, 2019, 24 pages.
Final Office Action received for U.S. Appl. No. 15/870,195, dated Dec. 13, 2018, 27 pages.
Final Office Action received for U.S. Appl. No. 15/940,017, dated Dec. 20, 2018, 17 pages.
Final Office Action received for U.S. Appl. No. 15/940,232, dated Jan. 10, 2019, 27 pages.
Final Office Action received for U.S. Appl. No. 16/116,221, dated Mar. 22, 2019, 35 pages.
Flatlinevertigo, "Black Desert Online :: Intro to Hair Customization", Online Available at: <https://www.youtube.com/watch?v=9MCbfd_eMEg>, Sep. 9, 2015, 3 pages.
Ting, "Giphy Cam (iOS) | Ting Download", Available online at: https://www.youtube.com/watch?v=mykfBpyD3gg, Oct. 2, 2015, 3 pages (see communication under 37 CFR § 1.98(a) (3)).
Giphy Inc. Communication, "Giphy Cam. The GIF Camera", Available at: <https://web.archive.org/web/20170309234909/https://play.google.com/store/apps/details?id=com.giphy.camera>, Mar. 9, 2017, pp. 1-3.
Google, "Android 2.2 User's Guide", May 20, 2010, pp. 1-2, 25-28, 52-53, 70-73.
Hazra et al., "Sentiment Learning Using Twitter Ideograms", 8th Annual Industrial Automation and Electromechanical Engineering Conference, 2017, pp. 115-120.
"Here are Warez Files", Eve Online Character Creator, Online Available at: <http://theherearewarezfiles.blogspot.com/2014/03/eve-online-character-creator-download.html>, Mar. 3, 2014, 7 pages.
Holotech Studios Entertainment, "FaceRig", Available at: <https://web.archive.org/web/20161120090627/https://play.google.com/store/apps/details?id=com.holotech.facerig&hl=da>, Nov. 9, 2016, 3 pages.
Intention to Grant received for Danish Patent Application No. PA201770418, dated Aug. 22, 2019, 2 pages.
Intention to Grant received for Danish Patent Application No. PA201770418, dated Nov. 16, 2018, 3 pages.
Intention to Grant received for Danish Patent Application No. PA201770419, dated Mar. 28, 2018, 2 pages.
Intention to Grant received for Danish Patent Application No. PA201770720, dated Apr. 4, 2019, 2 pages.
Intention to Grant received for Danish Patent Application No. PA201770720, dated Jun. 21, 2019, 2 pages.
Intention to Grant received for Danish Patent Application No. PA201770721, dated Apr. 4, 2019, 2 pages.
Intention to Grant received for Danish Patent Application No. PA201870375, dated Jun. 3, 2019, 2 pages.
Intention to Grant received for Danish Patent Application No. PA201870375, dated Mar. 26, 2019, 2 pages.
Intention to Grant received for Danish Patent Application No. PA201870377, dated Mar. 26, 2019, 2 pages.
Intention to Grant received for Danish Patent Application No. PA201870381, dated Jul. 18, 2019, 2 pages.
International Preliminary Report on Patentability received for PCT Patent Application No. PCT/US2015/065503, dated Dec. 21, 2017, 7 pages.
International Preliminary Report on Patentability received for PCT Patent Application No. PCT/US2009/060317, dated May 24, 2011, 5 pages.
International Preliminary Report on Patentability received for PCT Patent Application No. PCT/US2016/033751, dated Dec. 14, 2017, 11 pages.
International Preliminary Report on Patentability received for PCT Patent Application No. PCT/US2016/033946, dated Dec. 21, 2017, 11 pages.
International Preliminary Report on Patentability received for PCT Patent Application No. PCT/US2016/048044, dated Mar. 22, 2018, 8 pages.
International Preliminary Report on Patentability received for PCT Patent Application No. PCT/US2017/049760, dated Apr. 4, 2019, 9 pages.
International Search Report and Written Opinion received for PCT Patent Application No. PCT/US17/49760, dated Jan. 19, 2018, 12 pages.
International Search Report and Written Opinion received for PCT Patent Application No. PCT/US2015/065503, dated Mar. 2, 2016, 12 pages.
International Search Report and Written Opinion received for PCT Patent Application No. PCT/US2016/033751, dated Oct. 5, 2016, 14 pages.
International Search Report and Written Opinion received for PCT Patent Application No. PCT/US2016/033946, dated Oct. 18, 2016, 14 pages.
International Search Report and Written Opinion received for PCT Patent Application No. PCT/US2016/048044, dated Oct. 31, 2016, 9 pages.
International Search Report and Written Opinion received for PCT Patent Application No. PCT/US2018/014658, dated Jun. 6, 2018, 20 pages.
International Search Report and Written Opinion received for PCT Patent Application No. PCT/US2018/014892, dated Mar. 7, 2018, 10 pages.
International Search Report and Written Opinion received for PCT Patent Application No. PCT/US2018/033044, dated Sep. 11, 2018, 13 pages.
International Search Report and Written Opinion received for PCT Patent Application No. PCT/US2019/023793, dated Aug. 27, 2019, 17 pages.
Invitation to Pay Additional Fees received for PCT Patent Application No. PCT/US2018/014658, dated Apr. 11, 2018, 14 pages.
Invitation to Pay Additional Fees received for PCT Patent Application No. PCT/US2016/033946, dated Aug. 2, 2016, 2 pages.
Invitation to pay Additional Fees received for PCT Patent Application No. PCT/US17/49760, dated Nov. 21, 2017, 2 pages.
Invitation to Pay Additional Fees received for PCT Patent Application No. PCT/US2016/033751, dated Jul. 22, 2016, 2 pages.
Invitation to Pay Additional Fees received for PCT Patent Application No. PCT/US2019/023793, dated Jul. 5, 2019, 11 pages.
Iskandar et al., "Going Social with ReplayKit and Game Center", What's new in social gaming, Available online at: http://devstreaming.apple.com/videos/wwdc/2015/6053hq2fz0ebo0lm/605/605_going_social_with_replaykit_and_game_center.pdf?dl=1, Jun. 8, 2015, 103 pages.
Komninos et al., "Text Input on a Smart Watch", IEEE, 2014, pp. 50-58.
Koti, Kotresh, "Colour with Asian Paints.A Mobail App by Android Application—2018", Available Online at <https://www.youtube.com/watch?v=M6EIO7ErYd0&feature=youtu.be&t=81>, May 6, 2018, 2 pages.
McGrenere et al., "Affordances: Clarifying and Evolving a Concept", Proceedings of Graphics Interface 2000, May 2000, 8 pages.
Mega Ninja, "Face rig review", Available online at: https://www.youtube.com/watch?v=8YqeeiEVkRg, Feb. 6, 2017, 3 pages.
Minutes of the Oral Proceedings received for European Patent Application No. 18154163.2, dated May 17, 2019, 7 pages.
NCCU DCT, "Faceshift", Available online at: https://www.youtube.com/watch?v=4Ph0SP8tpA, Dec. 1, 2014, 3 pages.
Non-Final Office Action received for U.S. Appl. No. 14/869,715, dated Jan. 29, 2016, 62 pages.
Non-Final Office Action received for U.S. Appl. No. 14/863,616, dated Mar. 21, 2018, 17 pages.
Non-Final Office Action received for U.S. Appl. No. 12/274,346, dated Aug. 26, 2011, 26 pages.
Non-Final Office Action received for U.S. Appl. No. 12/365,887, dated Aug. 31, 2011, 22 pages.
Non-Final Office Action received for U.S. Appl. No. 12/365,888, dated Nov. 10, 2011, 8 pages.

(56) References Cited

OTHER PUBLICATIONS

Non-Final Office Action received for U.S. Appl. No. 13/596,666, dated Jan. 14, 2015, 13 pages.
Non-Final Office Action received for U.S. Appl. No. 13/596,666, dated May 8, 2014, 12 pages.
Non-Final Office Action received for U.S. Appl. No. 14/864,770, dated Sep. 25, 2017, 14 pages.
Non-Final Office Action received for U.S. Appl. No. 14/869,715, dated Oct. 11, 2016, 37 pages.
Non-Final Office Action received for U.S. Appl. No. 14/871,635, dated May 5, 2017, 23 pages.
Non-Final Office Action received for U.S. Appl. No. 14/871,635, dated Nov. 16, 2018, 36 pages.
Non-Final Office Action received for U.S. Appl. No. 14/871,654, dated May 4, 2017, 23 pages.
Non-Final Office Action received for U.S. Appl. No. 15/188,081, dated Jun. 8, 2017, 17 pages.
Non-Final Office Action received for U.S. Appl. No. 15/188,081, dated Mar. 30, 2018, 21 pages.
Non-Final Office Action received for U.S. Appl. No. 15/714,887, dated May 30, 2019, 47 pages.
Non-Final Office Action received for U.S. Appl. No. 15/940,017, dated Jun. 18, 2018, 15 pages.
Non-Final Office Action received for U.S. Appl. No. 15/940,017, dated Sep. 30, 2019, 16 pages.
Non-Final Office Action received for U.S. Appl. No. 15/940,232, dated Jun. 18, 2018, 23 pages.
Non-Final Office Action received for U.S. Appl. No. 16/035,419, dated Jan. 30, 2019, 24 pages.
Non-Final Office Action received for U.S. Appl. No. 16/116,221, dated Nov. 13, 2018, 27 pages.
Non-Final Office Action received for U.S. Appl. No. 16/142,288, dated Nov. 20, 2018, 15 pages.
Non-Final Office Action received for U.S. Appl. No. 16/142,305, dated Nov. 23, 2018, 32 pages.
Non-Final Office Action received for U.S. Appl. No. 16/142,328, dated Nov. 8, 2018, 18 pages.
Non-Final Office Action received for U.S. Appl. No. 16/289,346, dated Jul. 19, 2019, 14 pages.
Non-Final Office Action received for U.S. Appl. No. 15/870,195, dated May 2, 2018, 22 pages.
Non-Final Office Action received for U.S. Appl. No. 15/291,829, dated Dec. 14, 2018, 22 pages.
Non-Final Office Action received for U.S. Appl. No. 14/863,616, dated Nov. 21, 2016, 16 pages.
Norman, Don, "The Design of Everyday Things", 2013, pp. 1-5.
Notice of Allowance received for Chinese Patent Application no. 200980152822.9, dated Jun. 5, 2014, 2 pages (Official Copy only) (see communication under 37 CFR § 1.98(a) (3)).
Notice of Allowance received for Chinese Patent Application No. 201410334066.4, dated Apr. 4, 2018, 3 pages (1 page of English Translation and 2 pages of Official Copy).
Notice of Allowance received for Chinese Patent Application No. 201410334143.6, dated Jul. 25, 2017, 2 pages (1 page of English Translation and 1 page of Official Copy).
Notice of Allowance received for Japanese Patent Application No. 2013-144822, dated Apr. 27, 2015, 6 pages (3 pages of English Translation and 3 pages of Official Copy).
Notice of Allowance received for Japanese Patent Application No. 2015-129155, dated Jan. 6, 2017, 3 pages (Official Copy only) (see communication under 37 CFR § 1.98(a) (3)).
Notice of Allowance received for Japanese Patent Application No. 2017-012499, dated Mar. 22, 2019, 4 pages (1 page of English Translation and 3 pages of Official Copy).
Notice of Allowance received for Japanese Patent Application No. 2018-008937, dated Jul. 2, 2018, 4 pages (1 page of English Translation and 3 pages of Official copy).
Notice of Allowance received for Japanese Patent Application No. 2019-081308, dated Aug. 9, 2019, 4 pages (1 page of English Translation and 3 pages of Official Copy).
Notice of Allowance received for Korean Patent Application No. 10-2013-7009794, dated Oct. 23, 2015, 3 pages (1 page of English Translation and 2 pages of Official copy).
Notice of Allowance received for Korean Patent Application No. 10-2015-7017527, dated Oct. 23, 2015, 3 pages (1 page of English Translation and 2 pages of Official copy).
Notice of Allowance received for Korean Patent Application No. 10-2016-7002214, dated Jun. 30, 2017, 5 pages (2 pages of English Translation and 3 pages of Official Copy).
Notice of Allowance received for Korean Patent Application No. 10-2017-7029054, dated Jan. 2, 2019, 4 pages (2 pages of English Translation and 2 pages of Official copy).
Notice of Allowance received for Korean Patent Application No. 10-2017-7034677, dated May 27, 2019, 5 pages (2 pages of English Translation and 3 pages of Official Copy).
Notice of Allowance received for Korean Patent Application No. 10-2018-7001854, dated Aug. 21, 2018, 4 pages (1 page of English Translation and 3 pages of Official Copy).
Notice of Allowance received for U.S. Appl. No. 14/863,616, dated Dec. 11, 2018, 8 pages.
Notice of Allowance received for U.S. Appl. No. 12/274,346, dated Jul. 17, 2013, 10 pages.
Notice of Allowance received for U.S. Appl. No. 12/274,346, dated Mar. 12, 2013, 18 pages.
Notice of Allowance received for U.S. Appl. No. 12/365,887, dated May 23, 2012, 5 pages.
Notice of Allowance received for U.S. Appl. No. 14/864,770, dated Mar. 28, 2018, 8 pages.
Notice of Allowance received for U.S. Appl. No. 14/869,715, dated Dec. 19, 2017, 32 pages.
Notice of Allowance received for U.S. Appl. No. 14/871,654, dated May 22, 2018, 22 pages.
Notice of Allowance received for U.S. Appl. No. 15/188,081, dated Jun. 26, 2019, 8 pages.
Notice of Allowance received for U.S. Appl. No. 15/188,081, dated Mar. 20, 2019, 6 pages.
Notice of Allowance received for U.S. Appl. No. 15/870,195, dated Sep. 23, 2019, 13 pages.
Notice of Allowance received for U.S. Appl. No. 15/940,232, dated Jun. 4, 2019, 12 pages.
Notice of Allowance received for U.S. Appl. No. 15/981,754, dated Jul. 17, 2019, 15 pages.
Notice of Allowance received for U.S. Appl. No. 15/981,754, dated Sep. 18, 2019, 14 pages.
Notice of Allowance received for U.S. Appl. No. 16/035,419, dated May 24, 2019, 14 pages.
Notice of Allowance received for U.S. Appl. No. 16/116,221, dated Sep. 20, 2019, 13 pages.
Notice of Allowance received for U.S. Appl. No. 16/142,288, dated Jun. 24, 2019, 10 pages.
Notice of Allowance received for U.S. Appl. No. 16/142,288, dated Mar. 27, 2019, 9 pages.
Notice of Allowance received for U.S. Appl. No. 16/142,288, dated May 1, 2019, 4 pages.
Notice of Allowance received for U.S. Appl. No. 16/142,305, dated Apr. 3, 2019, 5 pages.
Notice of Allowance received for U.S. Appl. No. 16/142,305, dated May 1, 2019, 2 pages.
Notice of Allowance received for U.S. Appl. No. 16/142,328, dated Apr. 5, 2019, 7 pages.
Office Action received for Australian Patent Application No. 2016100795, dated Aug. 12, 2016, 6 pages.
Office Action received for Australian Patent Application No. 2016100795, dated Feb. 6, 2017, 3 pages.
Office Action received for Australian Patent Application No. 2016270775, dated May 29, 2019, 3 pages.
Office Action received for Australian Patent Application No. 2016270775, dated Nov. 26, 2018, 5 pages.
Office Action received for Australian Patent Application No. 2017100328, dated May 16, 2017, 3 pages.
Office Action received for Australian Patent Application No. 2017100328, dated Oct. 16, 2017, 6 pages.

(56) References Cited

OTHER PUBLICATIONS

Office Action received for Australian Patent Application No. 2017330208, dated Jul. 25, 2019, 5 pages.
Office Action received for Australian Patent Application No. 2018200485, dated Feb. 20, 2019, 6 pages.
Office Action received for Australian Patent Application No. 2018200485, dated Mar. 15, 2018, 3 pages.
Office Action received for Australian Patent Application No. 2018200485, dated Mar. 15, 2019, 4 pages.
Office Action received for Chinese Patent Application No. 201410334066.4, dated Apr. 6, 2017, 6 pages (3 pages of English Translation and 3 pages of Official Copy).
Office Action received for Chinese Patent Application No. 201410334066.4, dated Aug. 22, 2016, 8 pages (3 pages of English Translation and 5 pages of Official Copy).
Office Action received for Chinese Patent Application No. 201410334066.4, dated Dec. 4, 2017, 6 pages (3 pages of English Translation and 3 pages of Official Copy).
Office Action received for Chinese Patent Application No. 201410334143.6, dated Nov. 30, 2016, 10 pages (4 pages of English Translation and 6 pages of Official Copy).
Office Action received for Chinese Patent Application No. 201610371856.9, dated Dec. 19, 2018, 12 pages (5 pages of English Translation and 7 pages of Official Copy).
Office Action received for Chinese Patent Application No. 201610371856.9, dated Jul. 10, 2019, 6 pages (3 pages of English Translation and 3 pages of Official Copy).
Office Action received for Chinese Patent Application No. 201620509362.8, dated Feb. 10, 2017, 2 pages (Official Copy only) (see communication under 37 CFR § 1.98(a) (3)).
Office Action received for Chinese Patent Application No. 201620509362.8, dated Oct. 21, 2016, 3 pages (1 page of English Translation and 2 pages of Official Copy).
Office Action received for Chinese Patent Application No. 201680031372.8, dated Dec. 6, 2018, 15 pages (6 pages of English Translation and 9 pages of Official copy).
Office Action received for Danish Patent Application No. PA 201670709, dated Jul. 21, 2017, 4 pages.
Office Action received for Danish Patent Application No. PA 201670709, dated Nov. 30, 2016, 10 pages.
Office Action received for Danish Patent Application No. PA201670363, dated Feb. 12, 2018, 2 pages.
Office Action received for Danish Patent Application No. PA201670363, dated Jun. 1, 2017, 5 pages.
Office Action received for Danish Patent Application No. PA201670363, dated Nov. 4, 2016, 11 pages.
Office Action received for Danish Patent Application No. PA201670710, dated Dec. 8, 2016, 10 pages.
Office Action received for Danish Patent Application No. PA201670710, dated Sep. 25, 2017, 6 pages.
Office Action received for Danish Patent Application No. PA201770393, dated Dec. 12, 2018, 7 pages.
Office Action received for Danish Patent Application No. PA201770393, dated Jul. 11, 2019, 2 pages.
Office Action received for Danish Patent Application No. PA201770393, dated Mar. 19, 2018, 8 pages.
Office Action received for Danish Patent Application No. PA201770418, dated May 8, 2018, 3 pages.
Office Action received for Danish Patent Application No. PA201770419, dated Jan. 10, 2018, 4 pages.
Office Action received for Danish Patent Application No. PA201770720, dated Apr. 26, 2018, 3 pages.
Office Action received for Danish Patent Application No. PA201770720, dated Nov. 16, 2018, 3 pages.
Office Action received for Danish Patent Application No. PA201770720, dated Oct. 18, 2017, 8 pages.
Office Action received for Danish Patent Application No. PA201770721, dated Apr. 26, 2018, 3 pages.
Office Action received for Danish Patent Application No. PA201770721, dated Nov. 16, 2018, 3 pages.
Office Action received for Danish Patent Application No. PA201770721, dated Oct. 19, 2017, 8 pages.
Office Action received for Danish Patent Application No. PA201870372, dated Aug. 20, 2019, 2 pages.
Office Action received for Danish Patent Application No. PA201870372, dated Jan. 31, 2019, 4 pages.
Office Action received for Danish Patent Application No. PA201870374, dated Feb. 6, 2019, 5 pages.
Office Action received for Danish Patent Application No. PA201870374, dated Jun. 17, 2019, 5 pages.
Office Action received for Danish Patent Application No. PA201870375, dated Jan. 31, 2019, 4 pages.
Office Action received for Danish Patent Application No. PA201870377, dated Jan. 31, 2019, 4 pages.
Office Action received for European Patent Application No. 16803996.4, dated Nov. 29, 2018, 12 pages.
Office Action received for European Patent Application No. 18154163.2, dated Apr. 11, 2018, 6 pages.
Office Action received for European Patent Application No. 18704335.1, dated Sep. 23, 2019, 7 pages.
Office Action received for European Patent Application No. 19186042.8, dated Sep. 24, 2019, 6 pages.
Office Action received for Japanese Patent Application No. 2013-144822, dated Jun. 30, 2014, 3 pages (Official Copy only) (see communication under 37 CFR § 1.98(a) (3)).
Office Action received for Japanese Patent Application No. 2015129155, dated May 27, 2016, 5 pages (2 pages of English Translation and 3 pages of Official Copy).
Office Action received for Japanese Patent Application No. 2017-012499, dated Apr. 16, 2018, 6 pages (3 pages of English translation and 3 pages of official copy).
Office Action received for Japanese Patent Application No. 2017-562050, dated Feb. 1, 2019, 15 pages (8 pages of English Translation and 7 pages of Official Copy).
Office Action received for Korean Patent Application No. 10-2013-7009794, dated Dec. 30, 2014, 4 pages (1 page of English Translation and 3 pages of Official copy).
Office Action received for Korean Patent Application No. 10-2016-7002214, dated Feb. 28, 2017, 7 pages (3 page of English Translation and 4 pages of Official Copy).
Office Action received for Korean Patent Application No. 10-2016-7002214, dated May 20, 2016, 7 pages (3 pages of English Translation and 4 pages of Official copy).
Office Action received for Korean Patent Application No. 10-2017-7029054, dated Aug. 29, 2018, 5 pages (2 page of English Translation and 3 pages of Official copy).
Office Action received for Korean Patent Application No. 10-2017-7029054, dated Feb. 2, 2018, 5 pages (2 page of English Translation and 3 pages of Official copy).
Office Action received for Korean Patent Application No. 10-2017-7034677, dated Nov. 1, 2018, 5 pages (2 pages of English Translation and 3 pages of Official Copy).
Office Action received for Korean Patent Application No. 10-2018-7001854, dated Apr. 2, 2018, 13 pages (6 pages of English Translation and 7 pages of Official Copy).
Opuni, Kojo, "FaceShift Studio Demo", Available online at: https://www.youtube.com/watch?v=72ty7PYKwGU, Oct. 1, 2012, 3 pages.
PC World, "How to make AR Emojis on the Samsung Galaxy S9", You Tube, Available Online: https://www.youtube.com/watch?v=8wQICfulkz0, Feb. 25, 2018, 2 pages.
Preliminary Opinion before Oral Proceedings received for European Patent Application No. 18154163.2, dated Apr. 16, 2019, 12 pages.
Russell, Kyle, "Kamcord Launches on Android With a Streamlined Video Capture Experience", Available Online at: https://techcrunch.com/2015/06/02/kamcord-launches-on-android-with-a-streamlined-video-capture-experience/, Jun. 2, 2015, 2 pages.
Russell, Kyle, "Kamcord Now Lets Users Upload Edited Videos of Their Mobile Gaming Sessions", Available online at: https://techcrunch.com/2015/03/31/kamcord-now-lets-users-upload-edited-videos-of-their-mobile-gaming-sessions/, Mar. 31, 2015, 2 pages.
Search Report and Opinion received for Danish Patent Application No. PA201770393, dated Jun. 21, 2017, 9 pages.

(56) References Cited

OTHER PUBLICATIONS

Search Report and Opinion received for Danish Patent Application No. PA201770418, dated Jun. 23, 2017, 8 pages.
Search Report and Opinion received for Danish Patent Application No. PA201770419, dated Jun. 19, 2017, 6 pages.
Search Report and Opinion received for Danish Patent Application No. PA201870372, dated Sep. 14, 2018, 8 pages.
Search Report and Opinion received for Danish Patent Application No. PA201870372, dated Sep. 17, 2018, 10 pages.
Search Report and Opinion received for Danish Patent Application No. PA201870374, dated Aug. 27, 2018, 9 pages.
Search Report and Opinion received for Danish Patent Application No. PA201870375, dated Aug. 23, 2018, 8 pages.
Search Report and Opinion received for Danish Patent Application No. PA201870377, dated Sep. 4, 2018, 8 pages.
Search Report received for Danish Patent Application No. PA201870381, dated Sep. 13, 2018, 7 pages.
Slashgear, "Samsung AR Emoji demo on the Galaxy S9", Available Online at <https://www.youtube.com/watch?v=GQwNKzY4C9Y>, Feb. 25, 2018, 3 pages.
Spellburst, "The Sims 3: Create a Sim With Me | #2—Dark Fairy + Full CC List!", Available online at: <https://www.youtube.com/watch?v=Dy_5g9B-wkA>, Oct. 9, 2017, 2 pages.
Summons to Attend Oral Proceedings received for European Patent Application No. 16803996.4, dated Oct. 2, 2019, 16 pages.
Summons to Attend Oral Proceedings received for European Patent Application No. 18154163.2, dated Nov. 29, 2018, 9 pages.
Swaney et al., "Dynamic Web File Format Transformations with Grace", 5th International Web Archiving Workshop and Digital Preservation (IWAW 05), Dec. 16, 2005, 12 pages.
Tomic et al., "Emoticons", FIP—Journal of Finance and Law, vol. 1, No. 1, 2013, pp. 35-42.
Twins, Tornado, "New Tutorial: Add Facial Expressions to your Game Characters!", Available online at: https://www.youtube.com/watch?v=wKSjByNyaKA, Mar. 14, 2014, 4 pages.
Wan, Adrian, "Game recording service Kamcord 'investing heavily' as China's mobile gaming market overtakes US", Available online at: http://www.scmp.com/tech/apps-gaming/article/1814442/game-recording-service-kamcord-investing-heavily-chinas-mobile, Jun. 4, 2015, 4 pages.

"Windows Vista & IE7", Windows Start, Oct. 29, 2005, pp. 96-101 (Official Copy only) (see communication under 37 CFR § 1.98(a) (3)).
A Day in the Life of Mike, "#SnapChat Vs #Msqrd", Available Online at: <https://www.youtube.com/watch?v=vS_1mrWXmC8>, See especially 4:22-6:05, Mar. 9, 2016, 4 pages.
Appes, Stela, "Gif Me! Camera [Android] Video review by Stelapps", Available Online at: <https://www.youtube.com/watch?v=uae0xUucOyY>, Jul. 17, 2014, 3 pages.
Applicant-Initiated Interview Summary received for U.S. Appl. No. 16/583,706, dated Feb. 27, 2020, 6 pages.
Chicaview, "What Is New! Make Funny GIFs Clips—Gif Me (Phone App)", Available online at : <https://www.youtube.com/watch?v=0LPGSFFP-V0>, See especially 1:15-2:25, Sep. 20, 2016, 3 pages.
"How to Use MSQRD", Available Online at: <https://web.archive.org/web/20160505072814/https:/www.wikihow.com/Use-MSQRD>, May 5, 2016, 3 pages.
Intention to Grant received for Danish Patent Application No. PA201870372, dated Feb. 13, 2020, 2 pages.
Office Action received for Danish Patent Application No. PA201770393, dated Jan. 31, 2020, 6 pages.
Office Action received for Danish Patent Application No. PA201970531, dated Feb. 17, 2020, 3 pages.
Office Action received for Korean Patent Application No. 10-2019-7005136, dated Jan. 28, 2020, 5 pages (2 pages of English Translation and 3 pages of Official Copy).
Result of Consultation received for European Patent Application No. 16803996.4, dated Feb. 17, 2020, 14 pages.
Sambrook, Jade, "Video Selfie Filters with MSQRD for Facebook Live", Available Online at: <https://www.youtube.com/watch?v=JZMK2NEFeg>, See especially 2:44-3:03, Jul. 2, 2016, 3 pages.
Yom, Mama, "SnapChat Tutorial for Beginners!", Available Online at: <https://www.youtube.com/watch?v=zUmj039NNOU>, See especially 6:55-7:22, Jun. 6, 2016, 3 pages.
Office Action received for Danish Patent Application No. PA201970530, dated Mar. 4, 2020, 4 pages.
Nathan B Tech, "New Samsung SIO AR Emojis in Depth", Available online at: https://www.youtube.com/watch?v=xXeNSuNoEHc, Mar. 17, 2019; 4 pages.

\* cited by examiner

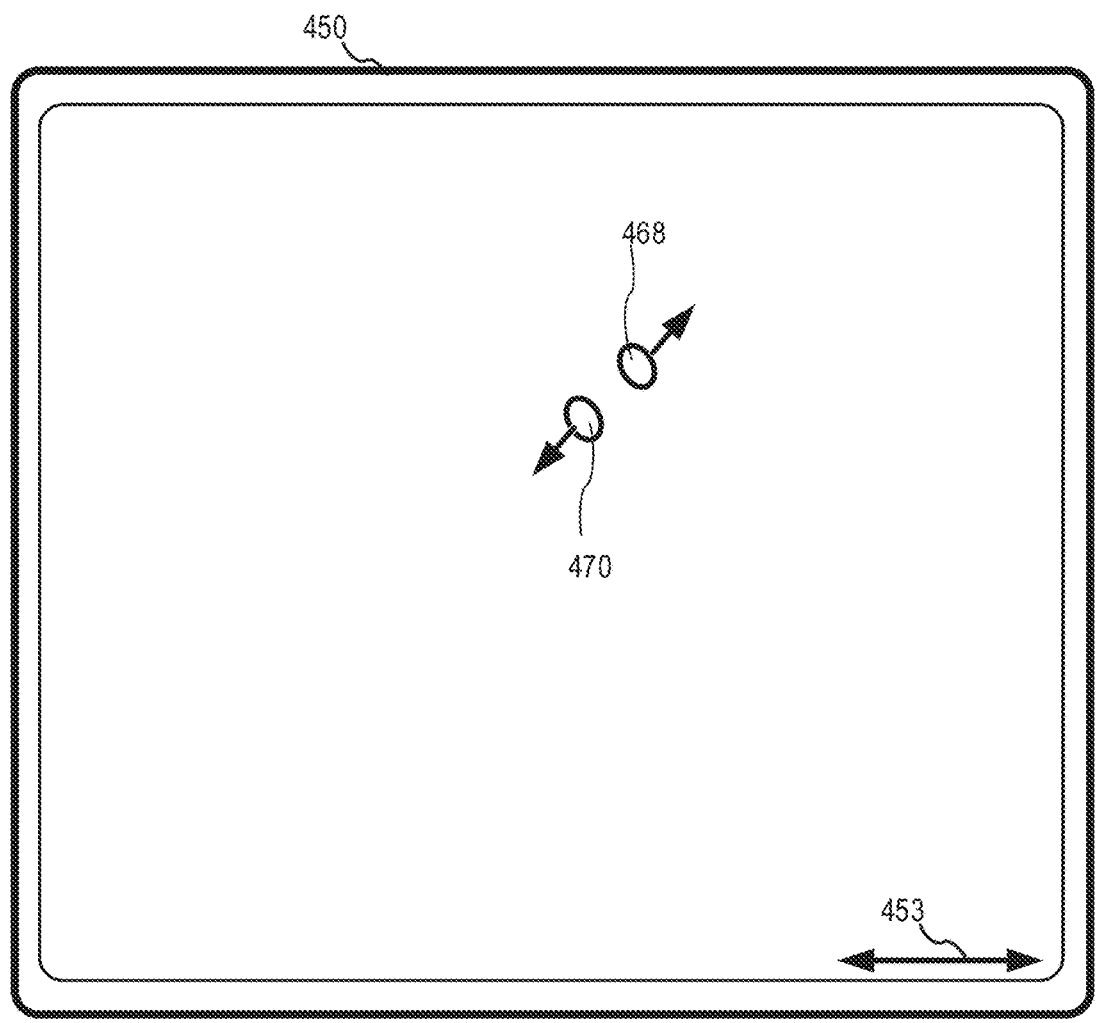
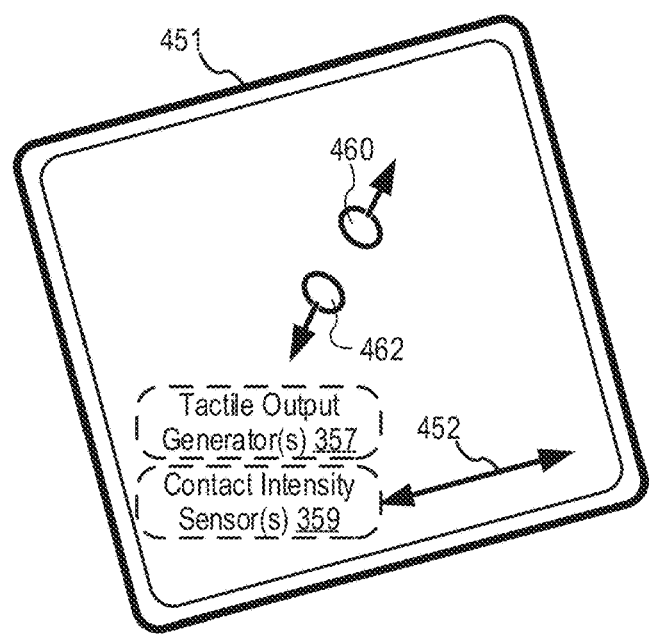
FIG. 4B

700

702
Receive a request, via the one or more input devices, to display a sticker user interface

704
In response to receiving the request to display the sticker user interface, display, via the display device, a sticker user interface that includes representations of a plurality of sets of stickers based on user-created avatars, including:

706
In accordance with a determination that the user has created a first set of two or more user-created avatars including a first avatar and a second avatar, display representations of a first plurality of sets of stickers wherein the representations of the first plurality of sets of stickers includes a representation of a set of stickers based on the first avatar and a representation of a set of stickers based on the second avatar

708
in accordance with a determination that the user has created a second set of two or more user-created avatars including a third avatar not included in the first set of two or more user-created avatars, display representations of a second plurality of sets of stickers that is different from the representations of the first plurality of sets of stickers, wherein the representations of the second plurality of sets of stickers includes a representation of a set of stickers based on the third avatar that was not included in the representations of the first plurality of sets of stickers

802
Display, via the display device, a content creation user interface.

804
While displaying the content creation user interface, receive, via the one or more input devices, a request to display a first display region, the first display region including a plurality of graphical objects that correspond to predefined content for insertion into the content creation user interface, wherein displaying the first display region includes:

806
In response to receiving the request, display, via the display device, the first display region including a first subset of graphical objects that have an appearance based on a set of avatars available at the electronic device, including:

808
In accordance with a determination that the set of avatars includes an avatar of a first type, display one of the graphical objects in the first subset having an appearance based on the avatar of the first type.

810
In accordance with a determination that the set of avatars does not include any avatars of the first type, display the graphical objects in the first subset having an appearance based on an avatar of a second type different from the first type, without displaying one of the graphical objects in the first subset having an appearance based on the avatar of the first type.

1502
Display, via the display device, a virtual avatar having one or more avatar features that change appearance in response to detected changes in pose of a face in a field of view of the one or more cameras, including a first avatar feature with a first appearance that is modified in response to detected changes in pose of the face in the field of view of the one or more cameras.

1504
While the face is detected in the field of view of the one or more cameras, the face including one or more detected facial features, detect movement of one or more facial features of the face.

1506
In response to detecting the movement of the one or more facial features:

1508
In accordance with a determination that the detected movement of the one or more facial features causes first pose criteria to be met, modify the virtual avatar to display the first avatar feature with a second appearance, different from the first appearance, that is modified in response to detected changes in pose of the face in the field of view of the one or more cameras.

1510
In accordance with a determination that the detected movement of the one or more facial features causes second pose criteria, that is different from the first pose criteria, to be met, modify the virtual avatar to display the first avatar feature with a third appearance, different from the first appearance and the second appearance, that is modified in response to detected changes in pose of the face in the field of view of the one or more cameras.

1512
In accordance with a determination that the detected movement of the one or more facial features meets criteria for maintaining display of the first avatar feature with the first appearance, modify the virtual avatar to display the first avatar feature by modifying the first appearance of the first avatar feature in response to detected changes in pose of the face in the field of view of the one or more cameras.

*FIG. 15*

1700 

1702
Receive a request to transmit a first message to a set of contactable users, the set of contactable users including a first contactable user.

1704
In response to receiving the request to transmit the first message:

1706
In accordance with a determination that a set of sharing criteria is satisfied for the first contactable user, the set of sharing criteria including a first sharing criterion that is satisfied when the first contactable user corresponds to an approved recipient:

1708
Transmit, via the one or more communication devices, to the first contactable user: the first message and contact information of the user associated with the electronic device.

1710
In accordance with a determination that the set of sharing criteria is not satisfied for the first contactable user:

1712
Transmit, to the first contactable user, via the one or more communication devices, the first message without transmitting the contact information of the user associated with the electronic device.

*FIG. 17*

AVATAR INTEGRATION WITH MULTIPLE APPLICATIONS

CROSS-REFERENCE TO RELATED APPLICATIONS

This application claims the benefit of U.S. Provisional Application No. 62/843,967, entitled "AVATAR INTEGRATION WITH MULTIPLE APPLICATIONS," filed on May 6, 2019, and U.S. Provisional Application No. 62/855,891, entitled "AVATAR INTEGRATION WITH MULTIPLE APPLICATIONS," filed on May 31, 2019, the contents of which are hereby incorporated by reference in their entirety.

FIELD

The present disclosure relates generally to computer user interfaces, and more specifically to techniques for displaying avatars in various application user interfaces.

BACKGROUND

Multimedia content, such as emojis, stickers, and virtual avatars, are sometimes used in various application user interfaces. The emojis, stickers, and virtual avatars represent a variety of people, objects, actions, and/or other things. Individuals' contact information, such as their name and photo representation, are used in messaging applications.

BRIEF SUMMARY

Some techniques for displaying and using avatars in various application user interfaces using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for displaying avatars in various application user interfaces. Such methods and interfaces optionally complement or replace other methods for displaying avatars in various application user interfaces. Such methods and interfaces reduce the cognitive burden on a user and produce a more efficient human-machine interface. For battery-operated computing devices, such methods and interfaces conserve power and increase the time between battery charges.

Example methods are described herein. An example method includes, at an electronic device having a display device and an input device: receiving a request, via the one or more input devices, to display a sticker user interface; and in response to receiving the request to display the sticker user interface, displaying, via the display device, a sticker user interface that includes representations of a plurality of sets of stickers based on user-created avatars, including: in accordance with a determination that the user has created a first set of two or more user-created avatars including a first avatar and a second avatar, displaying representations of a first plurality of sets of stickers wherein the representations of the first plurality of sets of stickers includes a representation of a set of stickers based on the first avatar and a representation of a set of stickers based on the second avatar; and in accordance with a determination that the user has created a second set of two or more user-created avatars including a third avatar not included in the first set of two or more user-created avatars, displaying representations of a second plurality of sets of stickers that is different from the representations of the first plurality of sets of stickers, wherein the representations of the second plurality of sets of stickers includes a representation of a set of stickers based on the third avatar that was not included in the representations of the first plurality of sets of stickers.

Example non-transitory computer-readable storage media are described herein. An example non-transitory computer-readable storage medium stores one or more programs configured to be executed by one or more processors of an electronic device with a display device and an input device, the one or more programs including instructions for: receiving a request, via the one or more input devices, to display a sticker user interface; and in response to receiving the request to display the sticker user interface, displaying, via the display device, a sticker user interface that includes representations of a plurality of sets of stickers based on user-created avatars, including: in accordance with a determination that the user has created a first set of two or more user-created avatars including a first avatar and a second avatar, displaying representations of a first plurality of sets of stickers wherein the representations of the first plurality of sets of stickers includes a representation of a set of stickers based on the first avatar and a representation of a set of stickers based on the second avatar; and in accordance with a determination that the user has created a second set of two or more user-created avatars including a third avatar not included in the first set of two or more user-created avatars, displaying representations of a second plurality of sets of stickers that is different from the representations of the first plurality of sets of stickers, wherein the representations of the second plurality of sets of stickers includes a representation of a set of stickers based on the third avatar that was not included in the representations of the first plurality of sets of stickers.

Example transitory computer-readable storage media are described herein. An example transitory computer-readable storage medium stores one or more programs configured to be executed by one or more processors of an electronic device with a display device and an input device, the one or more programs including instructions for: receiving a request, via the one or more input devices, to display a sticker user interface; and in response to receiving the request to display the sticker user interface, displaying, via the display device, a sticker user interface that includes representations of a plurality of sets of stickers based on user-created avatars, including: in accordance with a determination that the user has created a first set of two or more user-created avatars including a first avatar and a second avatar, displaying representations of a first plurality of sets of stickers wherein the representations of the first plurality of sets of stickers includes a representation of a set of stickers based on the first avatar and a representation of a set of stickers based on the second avatar; and in accordance with a determination that the user has created a second set of two or more user-created avatars including a third avatar not included in the first set of two or more user-created avatars, displaying representations of a second plurality of sets of stickers that is different from the representations of the first plurality of sets of stickers, wherein the representations of the second plurality of sets of stickers includes a representation of a set of stickers based on the third avatar that was not included in the representations of the first plurality of sets of stickers.

An example electronic device is described herein. An example electronic device includes a display device; an input device; one or more processors; and memory storing one or more programs configured to be executed by the one or more processors, the one or more programs including instructions for: receiving a request, via the one or more input devices, to display a sticker user interface; and in response to receiving the request to display the sticker user interface, displaying, via the display device, a sticker user interface that includes representations of a plurality of sets of stickers based on user-created avatars, including: in accordance with a determination that the user has created a first set of two or more user-created avatars including a first avatar and a second avatar, displaying representations of a first plurality of sets of stickers wherein the representations of the first plurality of sets of stickers includes a representation of a set of stickers based on the first avatar and a representation of a set of stickers based on the second avatar; and in accordance with a determination that the user has created a second set of two or more user-created avatars including a third avatar not included in the first set of two or more user-created avatars, displaying representations of a second plurality of sets of stickers that is different from the representations of the first plurality of sets of stickers, wherein the representations of the second plurality of sets of stickers includes a representation of a set of stickers based on the third avatar that was not included in the representations of the first plurality of sets of stickers.

An example electronic device is described herein. An example electronic device includes a display device; an input device; means for receiving a request, via the one or more input devices, to display a sticker user interface; and means for, in response to receiving the request to display the sticker user interface, displaying, via the display device, a sticker user interface that includes representations of a plurality of sets of stickers based on user-created avatars, including: in accordance with a determination that the user has created a first set of two or more user-created avatars including a first avatar and a second avatar, displaying representations of a first plurality of sets of stickers wherein the representations of the first plurality of sets of stickers includes a representation of a set of stickers based on the first avatar and a representation of a set of stickers based on the second avatar; and in accordance with a determination that the user has created a second set of two or more user-created avatars including a third avatar not included in the first set of two or more user-created avatars, displaying representations of a second plurality of sets of stickers that is different from the representations of the first plurality of sets of stickers, wherein the representations of the second plurality of sets of stickers includes a representation of a set of stickers based on the third avatar that was not included in the representations of the first plurality of sets of stickers.

An example method is described herein. An example method includes, at an electronic device having a display device and one or more input devices: displaying, via the display device, a contactable user editing user interface, the contactable user editing user interface including: one or more representation options for a contactable user including an avatar representation option; detecting, via the one or more input devices, a selection of the avatar representation option; in response to detecting selection of the avatar representation option, initiating a process for selecting an avatar to use as a representation of the contactable user in the contactable user interface; as a part of the process for selecting the avatar to use as a representation of the contactable user in the contactable user interface, receiving a sequence of one or more inputs, via the one or more input devices, that correspond to selection of a simulated three-dimensional avatar; and in response to selection of the simulated three-dimensional avatar, displaying, via the display device, a posing user interface that includes one or more controls for selecting a pose of the simulated three-dimensional avatar from a plurality of different poses.

An example non-transitory computer-readable storage medium is described herein. An example non-transitory computer-readable storage medium stores one or more programs configured to be executed by one or more processors of an electronic device with a display device and one or more input devices, the one or more programs including instructions for: displaying, via the display device, a contactable user editing user interface, the contactable user editing user interface including: one or more representation options for a contactable user including an avatar representation option; detecting, via the one or more input devices, a selection of the avatar representation option; in response to detecting selection of the avatar representation option, initiating a process for selecting an avatar to use as a representation of the contactable user in the contactable user interface; as a part of the process for selecting the avatar to use as a representation of the contactable user in the contactable user interface, receiving a sequence of one or more inputs, via the one or more input devices, that correspond to selection of a simulated three-dimensional avatar; and in response to selection of the simulated three-dimensional avatar, displaying, via the display device, a posing user interface that includes one or more controls for selecting a pose of the simulated three-dimensional avatar from a plurality of different poses.

An example transitory computer-readable storage medium is described herein. An example transitory computer-readable storage medium stores one or more programs configured to be executed by one or more processors of an electronic device with a display device and one or more input devices, the one or more programs including instructions for: displaying, via the display device, a contactable user editing user interface, the contactable user editing user interface including: one or more representation options for a contactable user including an avatar representation option; detecting, via the one or more input devices, a selection of the avatar representation option; in response to detecting selection of the avatar representation option, initiating a process for selecting an avatar to use as a representation of the contactable user in the contactable user interface; as a part of the process for selecting the avatar to use as a representation of the contactable user in the contactable user interface, receiving a sequence of one or more inputs, via the one or more input devices, that correspond to selection of a simulated three-dimensional avatar; and in response to selection of the simulated three-dimensional avatar, displaying, via the display device, a posing user interface that includes one or more controls for selecting a pose of the simulated three-dimensional avatar from a plurality of different poses.

An example electronic device is described herein. An example electronic device includes a display device; one or more input devices; one or more processors; and memory storing one or more programs configured to be executed by the one or more processors, the one or more programs including instructions for: displaying, via the display device, a contactable user editing user interface, the contactable user editing user interface including: one or more representation options for a contactable user including an avatar representation option; detecting, via the one or more input devices, a selection of the avatar representation option; in response to detecting selection of the avatar representation option, initiating a process for selecting an avatar to use as a representation of the contactable user in the contactable user interface; as a part of the process for selecting the avatar to use as a representation of the contactable user in the contactable user interface, receiving a sequence of one or more inputs, via the one or more input devices, that correspond to selection of a simulated three-dimensional avatar; and in response to selection of the simulated three-dimensional avatar, displaying, via the display device, a posing user interface that includes one or more controls for selecting a pose of the simulated three-dimensional avatar from a plurality of different poses.

An example electronic device is described herein. An example electronic device includes a display device; one or more input devices; means for displaying, via the display device, a contactable user editing user interface, the contactable user editing user interface including: one or more representation options for a contactable user including an avatar representation option; means for detecting, via the one or more input devices, a selection of the avatar representation option; means for, in response to detecting selection of the avatar representation option, initiating a process for selecting an avatar to use as a representation of the contactable user in the contactable user interface; means for, as a part of the process for selecting the avatar to use as a representation of the contactable user in the contactable user interface, receiving a sequence of one or more inputs, via the one or more input devices, that correspond to selection of a simulated three-dimensional avatar; and means for, in response to selection of the simulated three-dimensional avatar, displaying, via the display device, a posing user interface that includes one or more controls for selecting a pose of the simulated three-dimensional avatar from a plurality of different poses.

An example method is described herein. An example method includes, at an electronic device having a display device and an input device, displaying, via the display device, an avatar editing user interface including: an avatar including a first feature, the first feature having a first color pattern generated with a first set of colors including a first color in a first region of the first color pattern; a set of color options for the first feature; and a plurality of color pattern options for the first feature including a second color pattern option that is different from the first color pattern; while the first feature is displayed with the first color pattern generated with the first set of colors including the first color in the first region of the first color pattern, detecting, via the input device, a selection of a color option in the set of color options that corresponds to a second color; in response to detecting the selection: changing an appearance of one or more color pattern options in the plurality of color pattern options having a first portion corresponding to the set of color options, wherein changing the appearance includes changing a portion of the second color pattern option from a respective color to the second color; and maintaining display of the avatar including the first feature, the first feature having the first color pattern; detecting a selection of a respective color pattern option of the color pattern options having the changed appearance; and in response to detecting the selection of the respective color pattern option and while the second color is selected for the set of color options: changing an appearance of the first feature of the avatar to have an appearance generated based on the respective color pattern option with the second color applied to a portion of the respective color pattern option.

An example non-transitory computer-readable storage medium is described herein. An example non-transitory computer-readable storage medium stores one or more programs configured to be executed by one or more processors of an electronic device with a display device and an input device, the one or more programs including instructions for displaying, via the display device, an avatar editing user interface including: an avatar including a first feature, the first feature having a first color pattern generated with a first set of colors including a first color in a first region of the first color pattern; a set of color options for the first feature; and a plurality of color pattern options for the first feature including a second color pattern option that is different from the first color pattern; while the first feature is displayed with the first color pattern generated with the first set of colors including the first color in the first region of the first color pattern, detecting, via the input device, a selection of a color option in the set of color options that corresponds to a second color; in response to detecting the selection: changing an appearance of one or more color pattern options in the plurality of color pattern options having a first portion corresponding to the set of color options, wherein changing the appearance includes changing a portion of the second color pattern option from a respective color to the second color; and maintaining display of the avatar including the first feature, the first feature having the first color pattern; detecting a selection of a respective color pattern option of the color pattern options having the changed appearance; and in response to detecting the selection of the respective color pattern option and while the second color is selected for the set of color options: changing an appearance of the first feature of the avatar to have an appearance generated based on the respective color pattern option with the second color applied to a portion of the respective color pattern option.

An example transitory computer-readable storage medium is described herein. An example transitory computer-readable storage medium stores one or more programs configured to be executed by one or more processors of an electronic device with a display device and an input device, the one or more programs including instructions for displaying, via the display device, an avatar editing user interface including: an avatar including a first feature, the first feature having a first color pattern generated with a first set of colors including a first color in a first region of the first color pattern; a set of color options for the first feature; and a plurality of color pattern options for the first feature including a second color pattern option that is different from the first color pattern; while the first feature is displayed with the first color pattern generated with the first set of colors including the first color in the first region of the first color pattern, detecting, via the input device, a selection of a color option in the set of color options that corresponds to a second color; in response to detecting the selection: changing an appearance of one or more color pattern options in the plurality of color pattern options having a first portion corresponding to the set of color options, wherein changing the appearance includes changing a portion of the second color pattern option from a respective color to the second color; and maintaining display of the avatar including the first feature, the first feature having the first color pattern; detecting a selection of a respective color pattern option of the color pattern options having the changed appearance; and in response to detecting the selection of the respective color pattern option and while the second color is selected for the set of color options: changing an appearance of the first feature of the avatar to have an appearance generated based on the respective color pattern option with the second color applied to a portion of the respective color pattern option.

An example electronic device is described herein. An example electronic device includes a display device; an input device; one or more processors; and memory storing one or more programs configured to be executed by the one or more processors, the one or more programs including instructions for displaying, via the display device, an avatar editing user interface including: an avatar including a first feature, the first feature having a first color pattern generated with a first set of colors including a first color in a first region of the first color pattern; a set of color options for the first feature; and a plurality of color pattern options for the first feature including a second color pattern option that is different from the first color pattern; while the first feature is displayed with the first color pattern generated with the first set of colors including the first color in the first region of the first color pattern, detecting, via the input device, a selection of a color option in the set of color options that corresponds to a second color; in response to detecting the selection: changing an appearance of one or more color pattern options in the plurality of color pattern options having a first portion corresponding to the set of color options, wherein changing the appearance includes changing a portion of the second color pattern option from a respective color to the second color; and maintaining display of the avatar including the first feature, the first feature having the first color pattern; detecting a selection of a respective color pattern option of the color pattern options having the changed appearance; and in response to detecting the selection of the respective color pattern option and while the second color is selected for the set of color options: changing an appearance of the first feature of the avatar to have an appearance generated based on the respective color pattern option with the second color applied to a portion of the respective color pattern option.

An example electronic device is described herein. An example electronic device includes a display device; an input device; means for displaying, via the display device, an avatar editing user interface including: an avatar including a first feature, the first feature having a first color pattern generated with a first set of colors including a first color in a first region of the first color pattern; a set of color options for the first feature; and a plurality of color pattern options for the first feature including a second color pattern option that is different from the first color pattern; means for, while the first feature is displayed with the first color pattern generated with the first set of colors including the first color in the first region of the first color pattern, detecting, via the input device, a selection of a color option in the set of color options that corresponds to a second color; means for, in response to detecting the selection: changing an appearance of one or more color pattern options in the plurality of color pattern options having a first portion corresponding to the set of color options, wherein changing the appearance includes changing a portion of the second color pattern option from a respective color to the second color; and maintaining display of the avatar including the first feature, the first feature having the first color pattern; means for detecting a selection of a respective color pattern option of the color pattern options having the changed appearance; and means for, in response to detecting the selection of the respective color pattern option and while the second color is selected for the set of color options: changing an appearance of the first feature of the avatar to have an appearance generated based on the respective color pattern option with the second color applied to a portion of the respective color pattern option.

An example method is described herein. An example method includes, at an electronic device having a display device and an input device, displaying, via the display device, an avatar editing user interface including: an avatar, the respective avatar feature having a first pose; and an avatar option selection region including a plurality of avatar feature options corresponding to a set of candidate values for a characteristic of an avatar feature and having an appearance based on the avatar; detecting, via the input device, a request to display options for editing the respective avatar feature; and in response to detecting the request, updating the avatar option selection region to display avatar feature options corresponding to a set of candidate values for a characteristic of the respective avatar feature, including concurrently displaying: a representation of a first option for the respective avatar feature in which the respective avatar feature has a second pose; and a representation of a second option for the respective avatar feature in which the respective avatar feature has a third pose that is different from the second pose.

An example non-transitory computer-readable storage medium is described herein. An example non-transitory computer-readable storage medium stores one or more programs configured to be executed by one or more processors of an electronic device with a display device and an input device, the one or more programs including instructions for displaying, via the display device, an avatar editing user interface including: an avatar, the respective avatar feature having a first pose; and an avatar option selection region including a plurality of avatar feature options corresponding to a set of candidate values for a characteristic of an avatar feature and having an appearance based on the avatar; detecting, via the input device, a request to display options for editing the respective avatar feature; and in response to detecting the request, updating the avatar option selection region to display avatar feature options corresponding to a set of candidate values for a characteristic of the respective avatar feature, including concurrently displaying: a representation of a first option for the respective avatar feature in which the respective avatar feature has a second pose; and a representation of a second option for the respective avatar feature in which the respective avatar feature has a third pose that is different from the second pose.

An example transitory computer-readable storage medium is described herein. An example transitory computer-readable storage medium stores one or more programs configured to be executed by one or more processors of an electronic device with a display device and an input device, the one or more programs including instructions for displaying, via the display device, an avatar editing user interface including: an avatar, the respective avatar feature having a first pose; and an avatar option selection region including a plurality of avatar feature options corresponding to a set of candidate values for a characteristic of an avatar feature and having an appearance based on the avatar; detecting, via the input device, a request to display options for editing the respective avatar feature; and in response to detecting the request, updating the avatar option selection region to display avatar feature options corresponding to a set of candidate values for a characteristic of the respective avatar feature, including concurrently displaying: a representation of a first option for the respective avatar feature in which the respective avatar feature has a second pose; and a representation of a second option for the respective avatar feature in which the respective avatar feature has a third pose that is different from the second pose.

An example electronic device is described herein. An example electronic device includes a display device; an input device; one or more processors; and memory storing one or more programs configured to be executed by the one or more processors, the one or more programs including instructions for: displaying, via the display device, an avatar editing user interface including: an avatar, the respective avatar feature having a first pose; and an avatar option selection region including a plurality of avatar feature options corresponding to a set of candidate values for a characteristic of an avatar feature and having an appearance based on the avatar; detecting, via the input device, a request to display options for editing the respective avatar feature; and in response to detecting the request, updating the avatar option selection region to display avatar feature options corresponding to a set of candidate values for a characteristic of the respective avatar feature, including concurrently displaying: a representation of a first option for the respective avatar feature in which the respective avatar feature has a second pose; and a representation of a second option for the respective avatar feature in which the respective avatar feature has a third pose that is different from the second pose.

An example electronic device is described herein. An example electronic device includes a display device; an input device; means for displaying, via the display device, an avatar editing user interface including: an avatar, the respective avatar feature having a first pose; and an avatar option selection region including a plurality of avatar feature options corresponding to a set of candidate values for a characteristic of an avatar feature and having an appearance based on the avatar; means for detecting, via the input device, a request to display options for editing the respective avatar feature; and means for, in response to detecting the request, updating the avatar option selection region to display avatar feature options corresponding to a set of candidate values for a characteristic of the respective avatar feature, including concurrently displaying: a representation of a first option for the respective avatar feature in which the respective avatar feature has a second pose; and a representation of a second option for the respective avatar feature in which the respective avatar feature has a third pose that is different from the second pose.

An example method is described herein. An example method includes, at an electronic device having a display device and one or more cameras, displaying, via the display device, a virtual avatar having one or more avatar features that change appearance in response to detected changes in pose of a face in a field of view of the one or more cameras, including a first avatar feature with a first appearance that is modified in response to detected changes in pose of the face in the field of view of the one or more cameras; while the face is detected in the field of view of the one or more cameras, the face including one or more detected facial features, detecting movement of one or more facial features of the face; in response to detecting the movement of the one or more facial features: in accordance with a determination that the detected movement of the one or more facial features causes first pose criteria to be met, modifying the virtual avatar to display the first avatar feature with a second appearance, different from the first appearance, that is modified in response to detected changes in pose of the face in the field of view of the one or more cameras; in accordance with a determination that the detected movement of the one or more facial features causes second pose criteria, that is different from the first pose criteria, to be met, modifying the virtual avatar to display the first avatar feature with a third appearance, different from the first appearance and the second appearance, that is modified in response to detected changes in pose of the face in the field of view of the one or more cameras; and in accordance with a determination that the detected movement of the one or more facial features meets criteria for maintaining display of the first avatar feature with the first appearance, modifying the virtual avatar to display the first avatar feature by modifying the first appearance of the first avatar feature in response to detected changes in pose of the face in the field of view of the one or more cameras.

An example non-transitory computer-readable storage medium is described herein. An example non-transitory computer-readable storage medium stores one or more programs configured to be executed by one or more processors of an electronic device with a display device and one or more cameras, the one or more programs including instructions for: displaying, via the display device, a virtual avatar having one or more avatar features that change appearance in response to detected changes in pose of a face in a field of view of the one or more cameras, including a first avatar feature with a first appearance that is modified in response to detected changes in pose of the face in the field of view of the one or more cameras; while the face is detected in the field of view of the one or more cameras, the face including one or more detected facial features, detecting movement of one or more facial features of the face; in response to detecting the movement of the one or more facial features: in accordance with a determination that the detected movement of the one or more facial features causes first pose criteria to be met, modifying the virtual avatar to display the first avatar feature with a second appearance, different from the first appearance, that is modified in response to detected changes in pose of the face in the field of view of the one or more cameras; in accordance with a determination that the detected movement of the one or more facial features causes second pose criteria, that is different from the first pose criteria, to be met, modifying the virtual avatar to display the first avatar feature with a third appearance, different from the first appearance and the second appearance, that is modified in response to detected changes in pose of the face in the field of view of the one or more cameras; and in accordance with a determination that the detected movement of the one or more facial features meets criteria for maintaining display of the first avatar feature with the first appearance, modifying the virtual avatar to display the first avatar feature by modifying the first appearance of the first avatar feature in response to detected changes in pose of the face in the field of view of the one or more cameras.

An example transitory computer-readable storage medium is described herein. An example transitory computer-readable storage medium stores one or more programs configured to be executed by one or more processors of an electronic device with a display device and one or more cameras, the one or more programs including instructions for: displaying, via the display device, a virtual avatar having one or more avatar features that change appearance in response to detected changes in pose of a face in a field of view of the one or more cameras, including a first avatar feature with a first appearance that is modified in response to detected changes in pose of the face in the field of view of the one or more cameras; while the face is detected in the field of view of the one or more cameras, the face including one or more detected facial features, detecting movement of one or more facial features of the face; in response to detecting the movement of the one or more facial features: in accordance with a determination that the detected movement of the one or more facial features causes first pose criteria to be met, modifying the virtual avatar to display the first avatar feature with a second appearance, different from the first appearance, that is modified in response to detected changes in pose of the face in the field of view of the one or more cameras; in accordance with a determination that the detected movement of the one or more facial features causes second pose criteria, that is different from the first pose criteria, to be met, modifying the virtual avatar to display the first avatar feature with a third appearance, different from the first appearance and the second appearance, that is modified in response to detected changes in pose of the face in the field of view of the one or more cameras; and in accordance with a determination that the detected movement of the one or more facial features meets criteria for maintaining display of the first avatar feature with the first appearance, modifying the virtual avatar to display the first avatar feature by modifying the first appearance of the first avatar feature in response to detected changes in pose of the face in the field of view of the one or more cameras.

An example electronic device is described herein. An example electronic device includes a display device; one or more cameras; one or more processors; and memory storing one or more programs configured to be executed by the one or more processors, the one or more programs including instructions for: displaying, via the display device, a virtual avatar having one or more avatar features that change appearance in response to detected changes in pose of a face in a field of view of the one or more cameras, including a first avatar feature with a first appearance that is modified in response to detected changes in pose of the face in the field of view of the one or more cameras; while the face is detected in the field of view of the one or more cameras, the face including one or more detected facial features, detecting movement of one or more facial features of the face; in response to detecting the movement of the one or more facial features: in accordance with a determination that the detected movement of the one or more facial features causes first pose criteria to be met, modifying the virtual avatar to display the first avatar feature with a second appearance, different from the first appearance, that is modified in response to detected changes in pose of the face in the field of view of the one or more cameras; in accordance with a determination that the detected movement of the one or more facial features causes second pose criteria, that is different from the first pose criteria, to be met, modifying the virtual avatar to display the first avatar feature with a third appearance, different from the first appearance and the second appearance, that is modified in response to detected changes in pose of the face in the field of view of the one or more cameras; and in accordance with a determination that the detected movement of the one or more facial features meets criteria for maintaining display of the first avatar feature with the first appearance, modifying the virtual avatar to display the first avatar feature by modifying the first appearance of the first avatar feature in response to detected changes in pose of the face in the field of view of the one or more cameras.

An example electronic device is described herein. An example electronic device includes a display device; one or more cameras; means for displaying, via the display device, a virtual avatar having one or more avatar features that change appearance in response to detected changes in pose of a face in a field of view of the one or more cameras, including a first avatar feature with a first appearance that is modified in response to detected changes in pose of the face in the field of view of the one or more cameras; means for, while the face is detected in the field of view of the one or more cameras, the face including one or more detected facial features, detecting movement of one or more facial features of the face; means for, in response to detecting the movement of the one or more facial features: in accordance with a determination that the detected movement of the one or more facial features causes first pose criteria to be met, modifying the virtual avatar to display the first avatar feature with a second appearance, different from the first appearance, that is modified in response to detected changes in pose of the face in the field of view of the one or more cameras; in accordance with a determination that the detected movement of the one or more facial features causes second pose criteria, that is different from the first pose criteria, to be met, modifying the virtual avatar to display the first avatar feature with a third appearance, different from the first appearance and the second appearance, that is modified in response to detected changes in pose of the face in the field of view of the one or more cameras; and in accordance with a determination that the detected movement of the one or more facial features meets criteria for maintaining display of the first avatar feature with the first appearance, modifying the virtual avatar to display the first avatar feature by modifying the first appearance of the first avatar feature in response to detected changes in pose of the face in the field of view of the one or more cameras.

An example method is described herein. An example method includes, at an electronic device having a display device and one or more input devices: displaying, via the display device, a content creation user interface; while displaying the content creation user interface, receiving, via the one or more input devices, a request to display a first display region, the first display region including a plurality of graphical objects that correspond to predefined content for insertion into the content creation user interface, wherein displaying the first display region includes: in response to receiving the request, displaying, via the display device, the first display region including a first subset of graphical objects that have an appearance based on a set of avatars available at the electronic device, including: in accordance with a determination that the set of avatars includes an avatar of a first type, displaying one of the graphical objects in the first subset having an appearance based on the avatar of the first type; and in accordance with a determination that the set of avatars does not include any avatars of the first type, displaying the graphical objects in the first subset having an appearance based on an avatar of a second type different from the first type, without displaying one of the graphical objects in the first subset having an appearance based on the avatar of the first type.

An example non-transitory computer-readable storage medium is described herein. An example non-transitory computer-readable storage medium stores one or more programs configured to be executed by one or more processors of an electronic device with a display device and one or more input devices, the one or more programs including instructions for: displaying, via the display device, a content creation user interface; while displaying the content creation user interface, receiving, via the one or more input devices, a request to display a first display region, the first display region including a plurality of graphical objects that correspond to predefined content for insertion into the content creation user interface, wherein displaying the first display region includes: in response to receiving the request, displaying, via the display device, the first display region including a first subset of graphical objects that have an appearance based on a set of avatars available at the electronic device, including: in accordance with a determination that the set of avatars includes an avatar of a first type, displaying one of the graphical objects in the first subset having an appearance based on the avatar of the first type; and in accordance with a determination that the set of avatars does not include any avatars of the first type, displaying the graphical objects in the first subset having an appearance based on an avatar of a second type different from the first type, without displaying one of the graphical objects in the first subset having an appearance based on the avatar of the first type.

An example transitory computer-readable storage medium is described herein. An example transitory computer-readable storage medium stores one or more programs configured to be executed by one or more processors of an electronic device with a display device and one or more input devices, the one or more programs including instructions for: displaying, via the display device, a content creation user interface; while displaying the content creation user interface, receiving, via the one or more input devices, a request to display a first display region, the first display region including a plurality of graphical objects that correspond to predefined content for insertion into the content creation user interface, wherein displaying the first display region includes: in response to receiving the request, displaying, via the display device, the first display region including a first subset of graphical objects that have an appearance based on a set of avatars available at the electronic device, including: in accordance with a determination that the set of avatars includes an avatar of a first type, displaying one of the graphical objects in the first subset having an appearance based on the avatar of the first type; and in accordance with a determination that the set of avatars does not include any avatars of the first type, displaying the graphical objects in the first subset having an appearance based on an avatar of a second type different from the first type, without displaying one of the graphical objects in the first subset having an appearance based on the avatar of the first type.

An example electronic device is described herein. An example electronic device includes a display device; one or more input devices; one or more processors; and memory storing one or more programs configured to be executed by the one or more processors, the one or more programs including instructions for: displaying, via the display device, a content creation user interface; while displaying the content creation user interface, receiving, via the one or more input devices, a request to display a first display region, the first display region including a plurality of graphical objects that correspond to predefined content for insertion into the content creation user interface, wherein displaying the first display region includes: in response to receiving the request, displaying, via the display device, the first display region including a first subset of graphical objects that have an appearance based on a set of avatars available at the electronic device, including: in accordance with a determination that the set of avatars includes an avatar of a first type, displaying one of the graphical objects in the first subset having an appearance based on the avatar of the first type; and in accordance with a determination that the set of avatars does not include any avatars of the first type, displaying the graphical objects in the first subset having an appearance based on an avatar of a second type different from the first type, without displaying one of the graphical objects in the first subset having an appearance based on the avatar of the first type.

An example electronic device is described herein. An example electronic device includes a display device; one or more input devices; means for displaying, via the display device, a content creation user interface; means for, while displaying the content creation user interface, receiving, via the one or more input devices, a request to display a first display region, the first display region including a plurality of graphical objects that correspond to predefined content for insertion into the content creation user interface, wherein displaying the first display region includes: in response to receiving the request, displaying, via the display device, the first display region including a first subset of graphical objects that have an appearance based on a set of avatars available at the electronic device, including: means for, in accordance with a determination that the set of avatars includes an avatar of a first type, displaying one of the graphical objects in the first subset having an appearance based on the avatar of the first type; and means for, in accordance with a determination that the set of avatars does not include any avatars of the first type, displaying the graphical objects in the first subset having an appearance based on an avatar of a second type different from the first type, without displaying one of the graphical objects in the first subset having an appearance based on the avatar of the first type.

Exemplary methods are disclosed herein. An example method includes, at an electronic device with one or more communication devices, wherein a user is associated with the electronic device, receiving a request to transmit a first message to a set of contactable users, the set of contactable users including a first contactable user; and in response to receiving the request to transmit the first message: in accordance with a determination that a set of sharing criteria is satisfied for the first contactable user, the set of sharing criteria including a first sharing criterion that is satisfied when the first contactable user corresponds to an approved recipient: transmitting, via the one or more communication devices, to the first contactable user: the first message, and contact information of the user associated with the electronic device; and in accordance with a determination that the set of sharing criteria is not satisfied for the first contactable user: transmitting, to the first contactable user, via the one or more communication devices, the first message without transmitting the contact information of the user associated with the electronic device.

Exemplary non-transitory computer-readable storage media are described herein. An example non-transitory computer-readable storage medium stores one or more programs configured to be executed by one or more processors of an electronic device with one or more communication devices, wherein a user is associated with the electronic device and the one or more programs include instructions for: receiving a request to transmit a first message to a set of contactable users, the set of contactable users including a first contactable user; and in response to receiving the request to transmit the first message: in accordance with a determination that a set of sharing criteria is satisfied for the first contactable user, the set of sharing criteria including a first sharing criterion that is satisfied when the first contactable user corresponds to an approved recipient: transmitting, via the one or more communication devices, to the first contactable user: the first message, and contact information of the user associated with the electronic device; and in accordance with a determination that the set of sharing criteria is not satisfied for the first contactable user: transmitting, to the first contactable user, via the one or more communication devices, the first message without transmitting the contact information of the user associated with the electronic device.

Exemplary transitory computer-readable storage media are described herein. An example transitory computer-readable storage medium stores one or more programs configured to be executed by one or more processors of an electronic device with one or more communication devices, wherein a user is associated with the electronic device and the one or more programs include instructions for: receiving a request to transmit a first message to a set of contactable users, the set of contactable users including a first contactable user; and in response to receiving the request to transmit the first message: in accordance with a determination that a set of sharing criteria is satisfied for the first contactable user, the set of sharing criteria including a first sharing criterion that is satisfied when the first contactable user corresponds to an approved recipient: transmitting, via the one or more communication devices, to the first contactable user: the first message, and contact information of the user associated with the electronic device; and in accordance with a determination that the set of sharing criteria is not satisfied for the first contactable user: transmitting, to the first contactable user, via the one or more communication devices, the first message without transmitting the contact information of the user associated with the electronic device.

Exemplary electronic devices are described herein. An example electronic device includes one or more communication devices; one or more processors; and memory storing one or more programs configured to be executed by the one or more processors, wherein a user is associated with the electronic device and the one or more programs include instructions for: receiving a request to transmit a first message to a set of contactable users, the set of contactable users including a first contactable user; and in response to receiving the request to transmit the first message: in accordance with a determination that a set of sharing criteria is satisfied for the first contactable user, the set of sharing criteria including a first sharing criterion that is satisfied when the first contactable user corresponds to an approved recipient: transmitting, via the one or more communication devices, to the first contactable user: the first message, and contact information of the user associated with the electronic device; and in accordance with a determination that the set of sharing criteria is not satisfied for the first contactable user: transmitting, to the first contactable user, via the one or more communication devices, the first message without transmitting the contact information of the user associated with the electronic device.

Exemplary electronic devices are described herein. An example electronic device includes one or more communication devices, wherein a user is associated with the electronic device; means for receiving a request to transmit a first message to a set of contactable users, the set of contactable users including a first contactable user; and means for, in response to receiving the request to transmit the first message: in accordance with a determination that a set of sharing criteria is satisfied for the first contactable user, the set of sharing criteria including a first sharing criterion that is satisfied when the first contactable user corresponds to an approved recipient: transmitting, via the one or more communication devices, to the first contactable user: the first message, and contact information of the user associated with the electronic device; and in accordance with a determination that the set of sharing criteria is not satisfied for the first contactable user: transmitting, to the first contactable user, via the one or more communication devices, the first message without transmitting the contact information of the user associated with the electronic device.

Exemplary methods are disclosed herein. An example method includes, at an electronic device with a display device and with one or more communication devices: receiving, via the one or more communication devices, a first message; subsequent to receiving the first message, receiving a request to display the first message; and in response to receiving the request to display the first message: in accordance with a determination that a set of prompting criteria is satisfied for a first contactable user, wherein the set of prompting criteria includes a first prompting criterion that is satisfied when updated contact information corresponding to the first contactable user has been received, concurrently displaying, on the display device: the first message, and a visual indication that updated contact information is available for the first contactable user; and in accordance with a determination that the set of prompting criteria is not satisfied for the first contactable user, displaying, on the display device: the first message without displaying the visual indication that updated contact information is available for the first contactable user.

Exemplary non-transitory computer-readable storage media are described herein. An example non-transitory computer-readable storage medium stores one or more programs configured to be executed by one or more processors of an electronic device with a display device and one or more communication devices, the one or more programs including instructions for: receiving, via the one or more communication devices, a first message; subsequent to receiving the first message, receiving a request to display the first message; and in response to receiving the request to display the first message: in accordance with a determination that a set of prompting criteria is satisfied for a first contactable user, wherein the set of prompting criteria includes a first prompting criterion that is satisfied when updated contact information corresponding to the first contactable user has been received, concurrently displaying, on the display device: the first message, and a visual indication that updated contact information is available for the first contactable user; and in accordance with a determination that the set of prompting criteria is not satisfied for the first contactable user, displaying, on the display device: the first message without displaying the visual indication that updated contact information is available for the first contactable user.

Exemplary transitory computer-readable storage media are described herein. An example transitory computer-readable storage medium stores one or more programs configured to be executed by one or more processors of an electronic device with a display device and one or more communication devices, the one or more programs including instructions for: receiving, via the one or more communication devices, a first message; subsequent to receiving the first message, receiving a request to display the first message; and in response to receiving the request to display the first message: in accordance with a determination that a set of prompting criteria is satisfied for a first contactable user, wherein the set of prompting criteria includes a first prompting criterion that is satisfied when updated contact information corresponding to the first contactable user has been received, concurrently displaying, on the display device: the first message, and a visual indication that updated contact information is available for the first contactable user; and in accordance with a determination that the set of prompting criteria is not satisfied for the first contactable user, displaying, on the display device: the first message without displaying the visual indication that updated contact information is available for the first contactable user.

Exemplary electronic devices are described herein. An example device includes a display device; one or more communication devices; one or more processors; and memory storing one or more programs configured to be executed by the one or more processors, the one or more programs including instructions for: receiving, via the one or more communication devices, a first message; subsequent to receiving the first message, receiving a request to display the first message; and in response to receiving the request to display the first message: in accordance with a determination that a set of prompting criteria is satisfied for a first contactable user, wherein the set of prompting criteria includes a first prompting criterion that is satisfied when updated contact information corresponding to the first contactable user has been received, concurrently displaying, on the display device: the first message, and a visual indication that updated contact information is available for the first contactable user; and in accordance with a determination that the set of prompting criteria is not satisfied for the first contactable user, displaying, on the display device: the first message without displaying the visual indication that updated contact information is available for the first contactable user.

Exemplary electronic devices are described herein. An example device includes a display device; one or more communication devices; means for receiving, via the one or more communication devices, a first message; means for, subsequent to receiving the first message, receiving a request to display the first message; and means for, in response to receiving the request to display the first message: in accordance with a determination that a set of prompting criteria is satisfied for a first contactable user, wherein the set of prompting criteria includes a first prompting criterion that is satisfied when updated contact information corresponding to the first contactable user has been received, concurrently displaying, on the display device: the first message, and a visual indication that updated contact information is available for the first contactable user; and in accordance with a determination that the set of prompting criteria is not satisfied for the first contactable user, displaying, on the display device: the first message without displaying the visual indication that updated contact information is available for the first contactable user.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for displaying avatars in various application user interfaces, thereby increasing the effectiveness, efficiency, and user satisfaction with such devices. Such methods and interfaces may complement or replace other methods for displaying avatars in various application user interfaces.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7 is a flow diagram illustrating a method for displaying avatars in a stickers application user interface in accordance with some embodiments.

FIG. 8 is a flow diagram illustrating a method for displaying avatars in an avatar keyboard application user interface in accordance with some embodiments.

FIG. 15 is a flow diagram illustrating a method for displaying a virtual avatar in accordance with some embodiments.

FIG. 17 is a flow diagram illustrating a method for providing contact information using an electronic device in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for displaying avatars in various application user interfaces. For example, existing applications display avatars, but often the processes for displaying the avatars are cumbersome and inefficient. Moreover, such processes do not provide a seamless integration of the avatar with other user interfaces. Disclosed herein are techniques for displaying avatars in various application user interfaces. Such techniques can reduce the cognitive burden on a user who uses avatars in various application user interfaces, thereby enhancing productivity. Further, such techniques can reduce processor and battery power otherwise wasted on redundant user inputs.

Figure 9A:
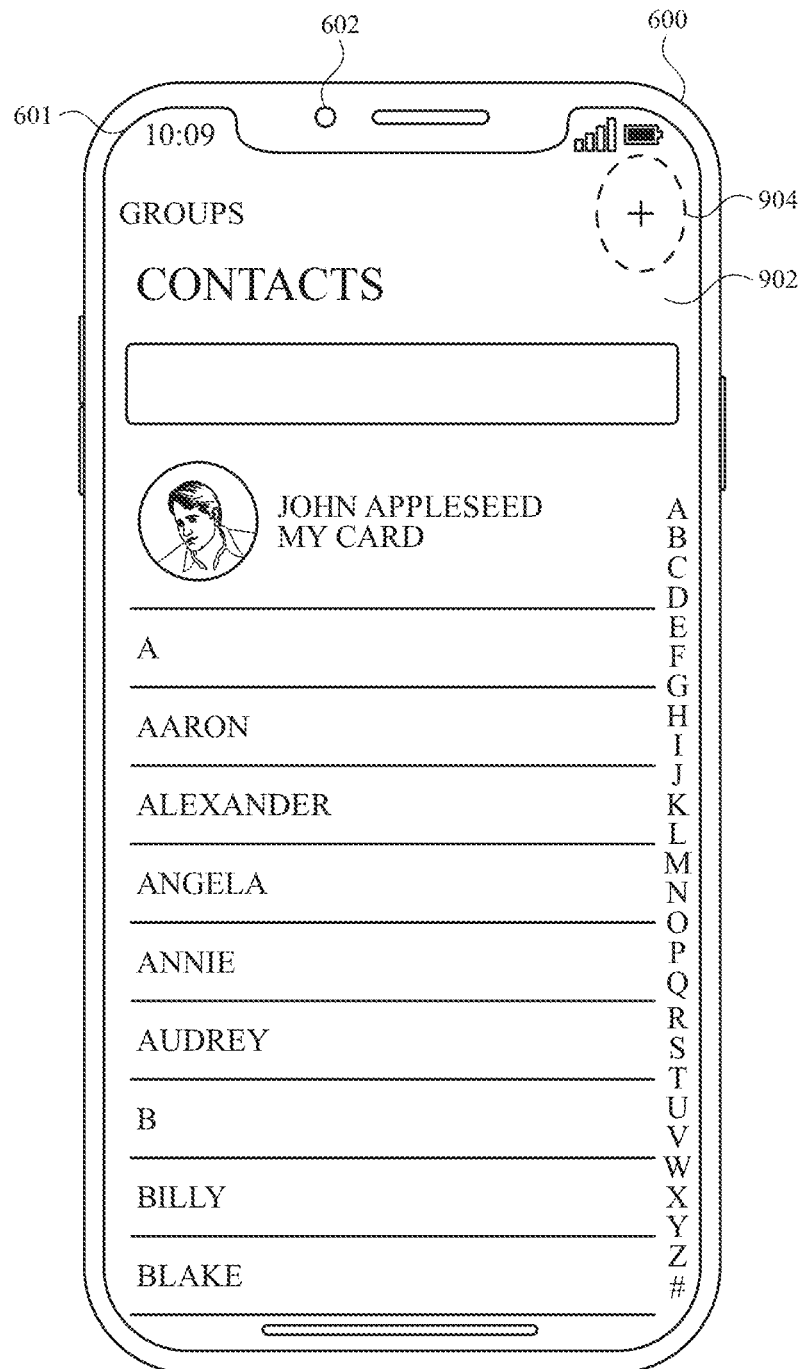
FIGS. 9A-9AG illustrate exemplary user interfaces for displaying avatars in a contacts application user interface in accordance with some embodiments.
Figure 10:
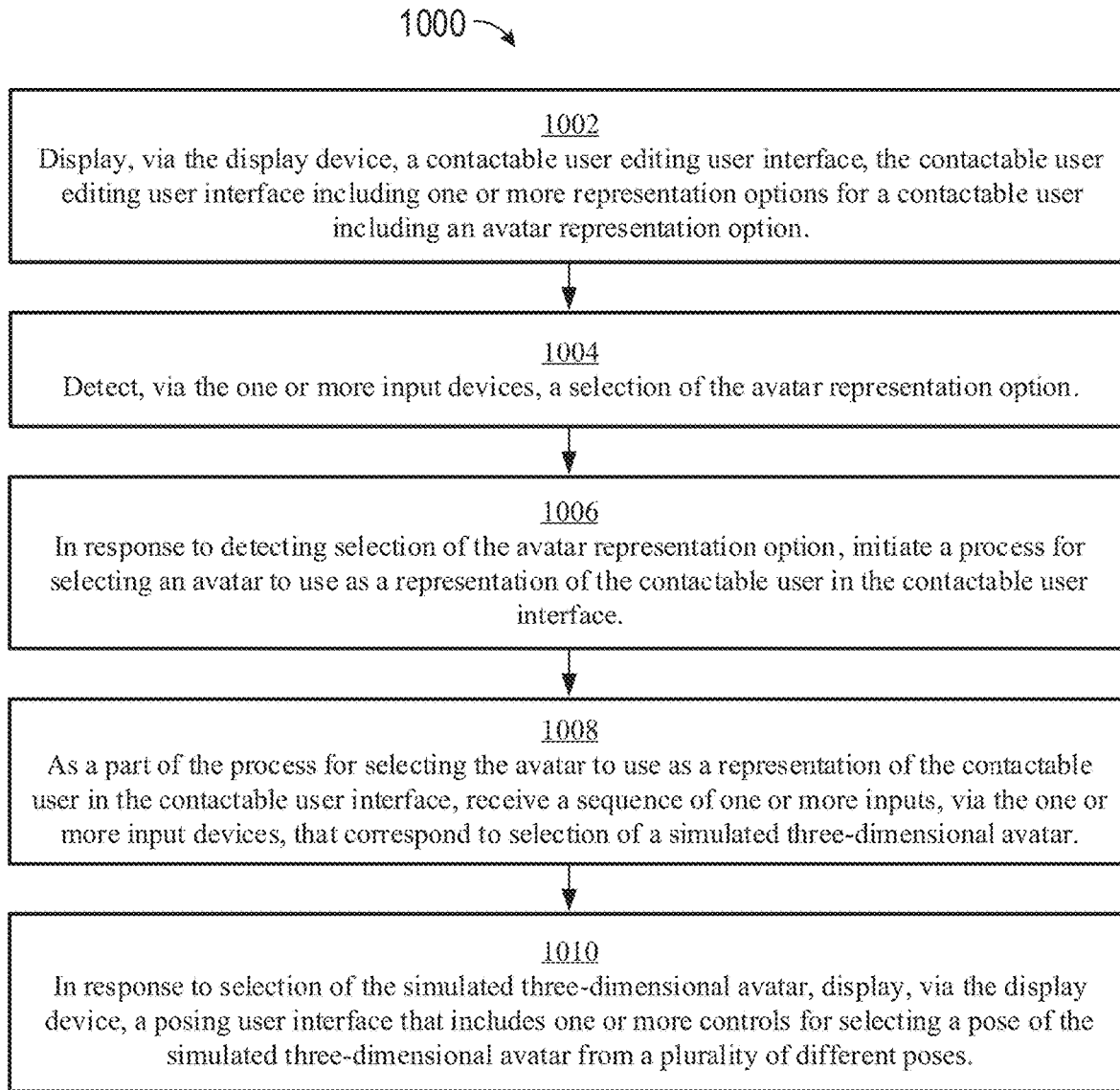
FIG. 10 is a flow diagram illustrating a method for displaying avatars in a contacts application user interface in accordance with some embodiments.
Figure 11A:
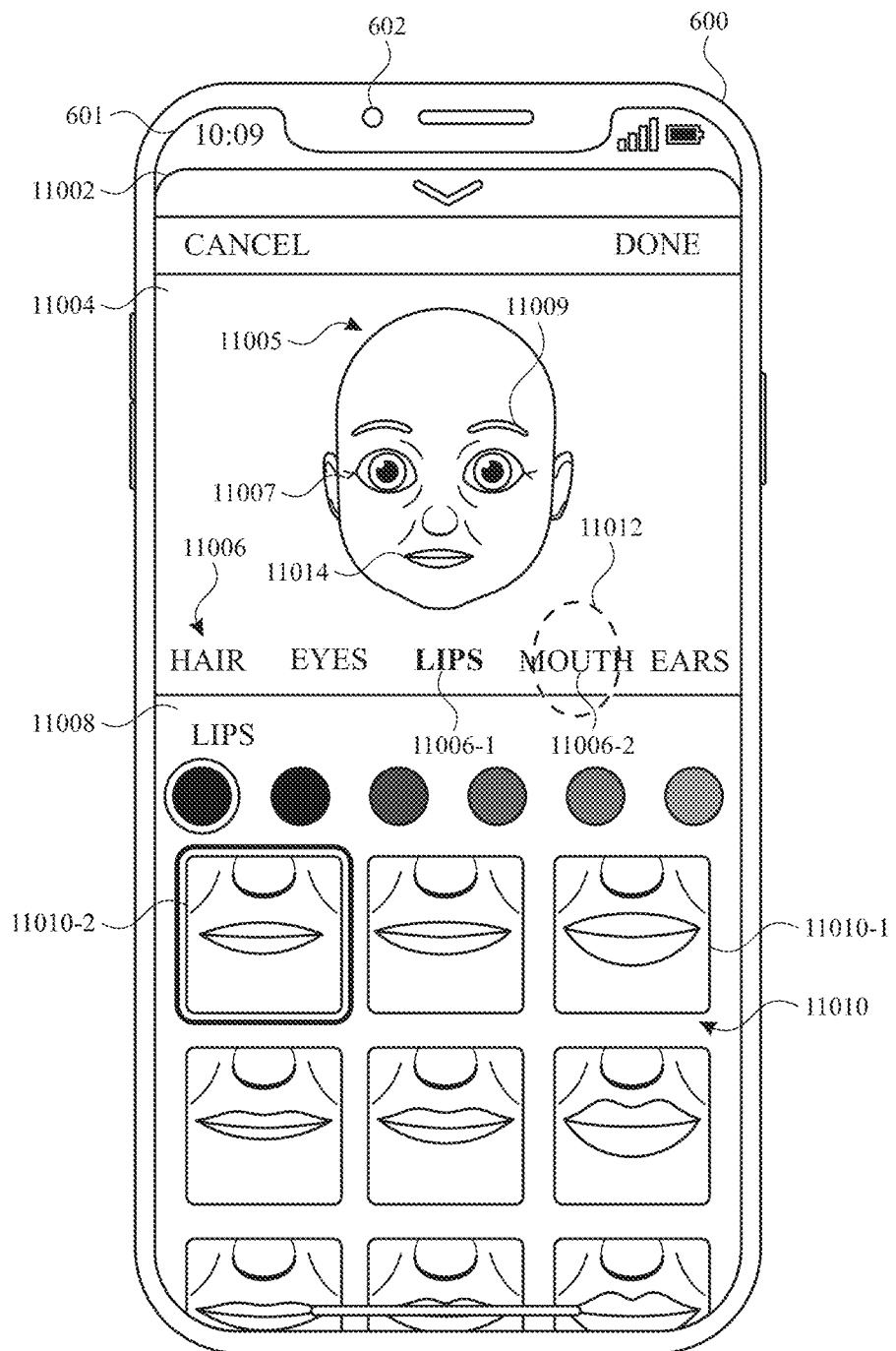
FIGS. 11A-11AD illustrate exemplary user interfaces for displaying avatars in an avatar editing application user interface in accordance with some embodiments.
Figure 12:
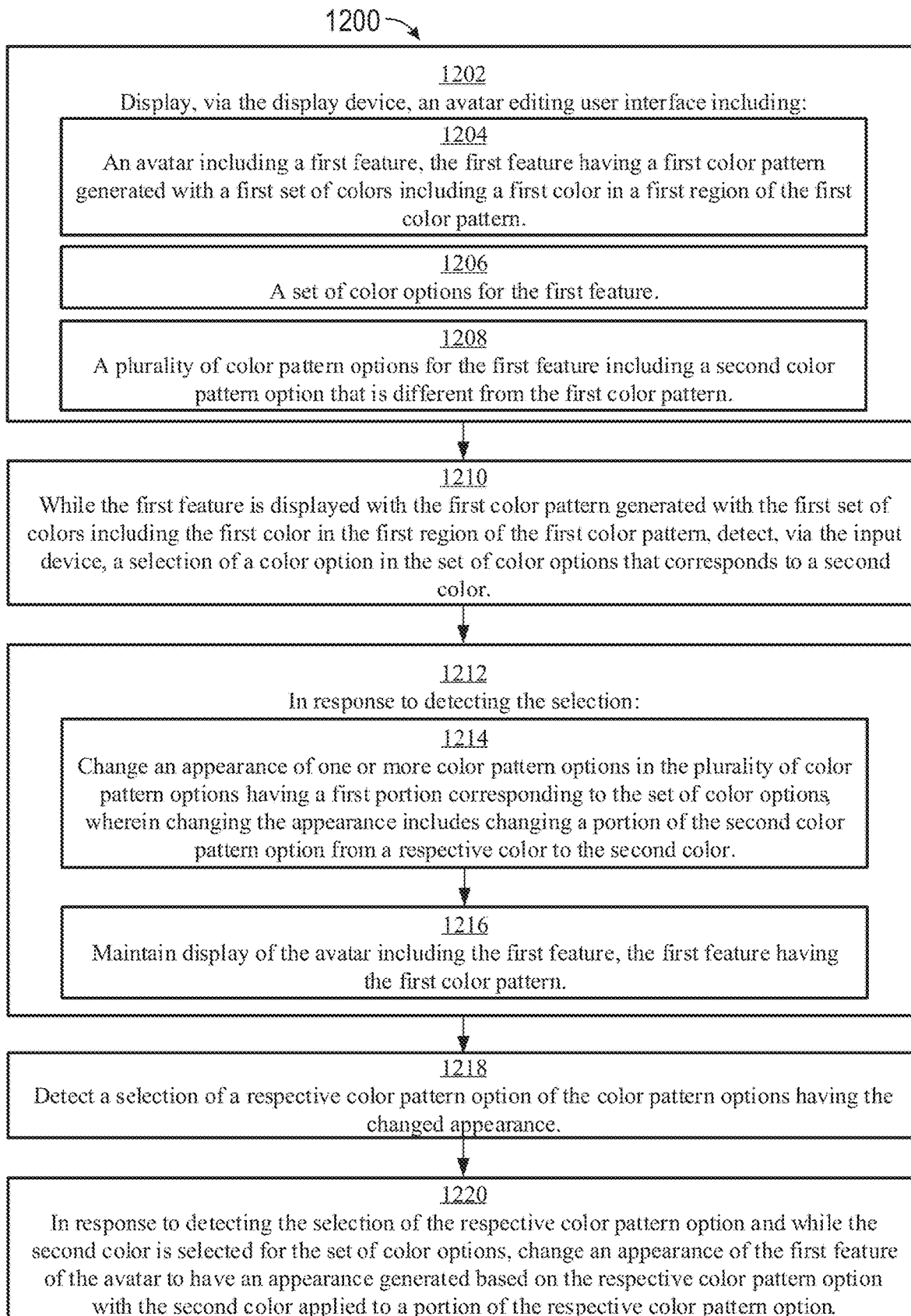
FIG. 12 is a flow diagram illustrating a method for displaying avatars in an avatar editing application user interface in accordance with some embodiments.
Figure 13:
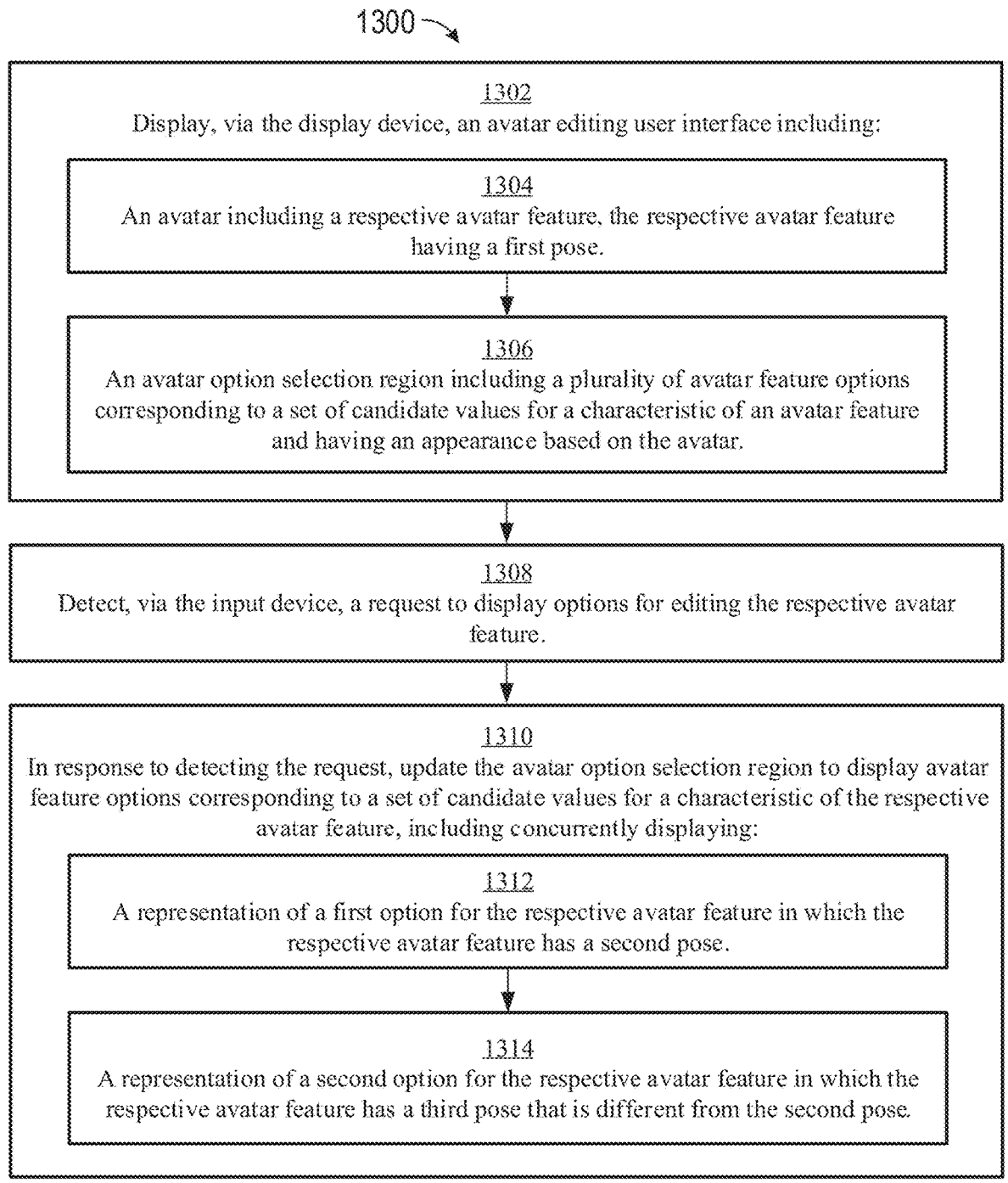
FIG. 13 is a flow diagram illustrating a method for displaying avatars in an avatar editing application user interface in accordance with some embodiments.
Figure 16A:
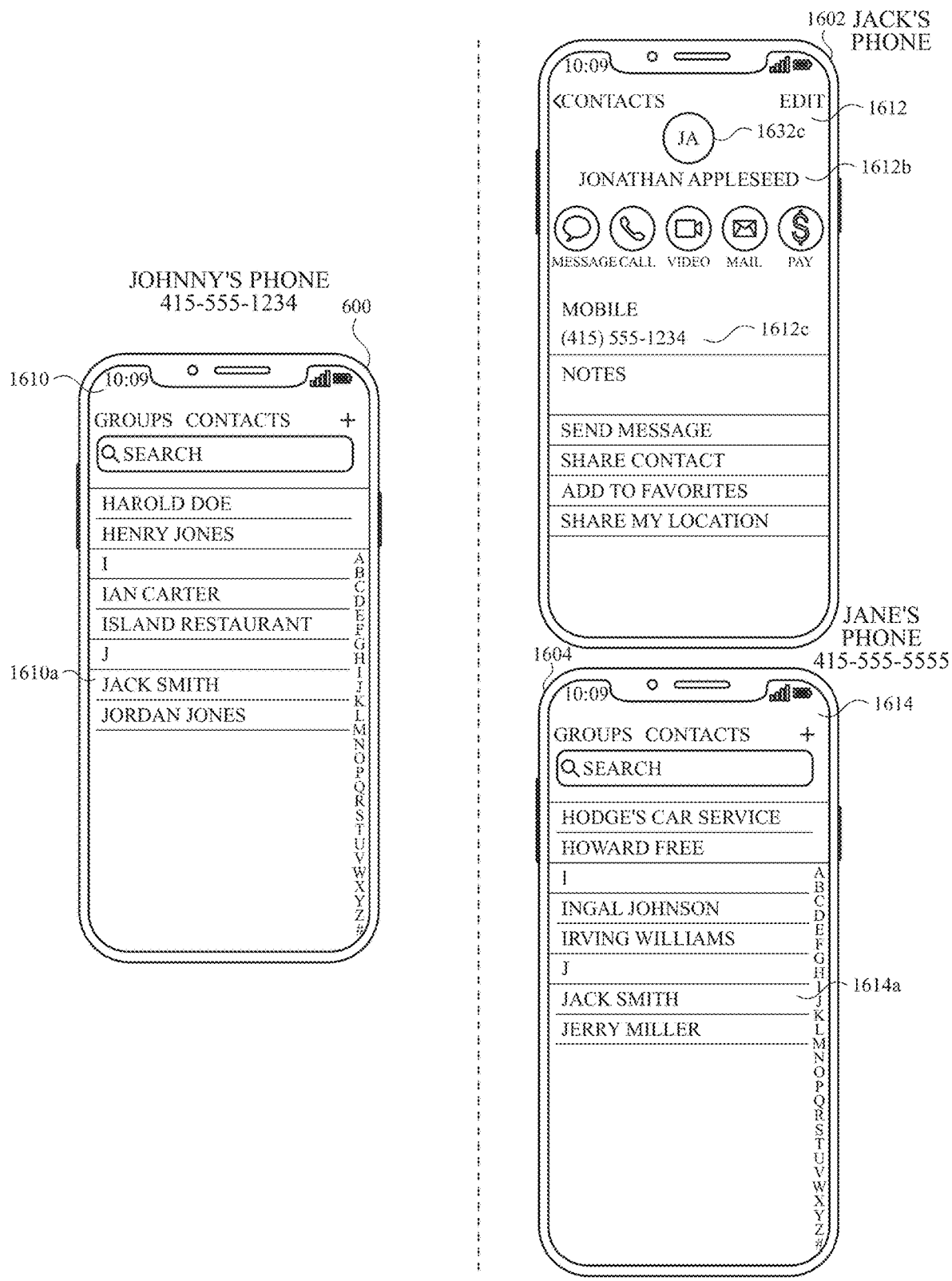
FIGS. 16A-16X illustrate exemplary devices and user interfaces for sharing contact information, in accordance with some embodiments.
Figure 18:
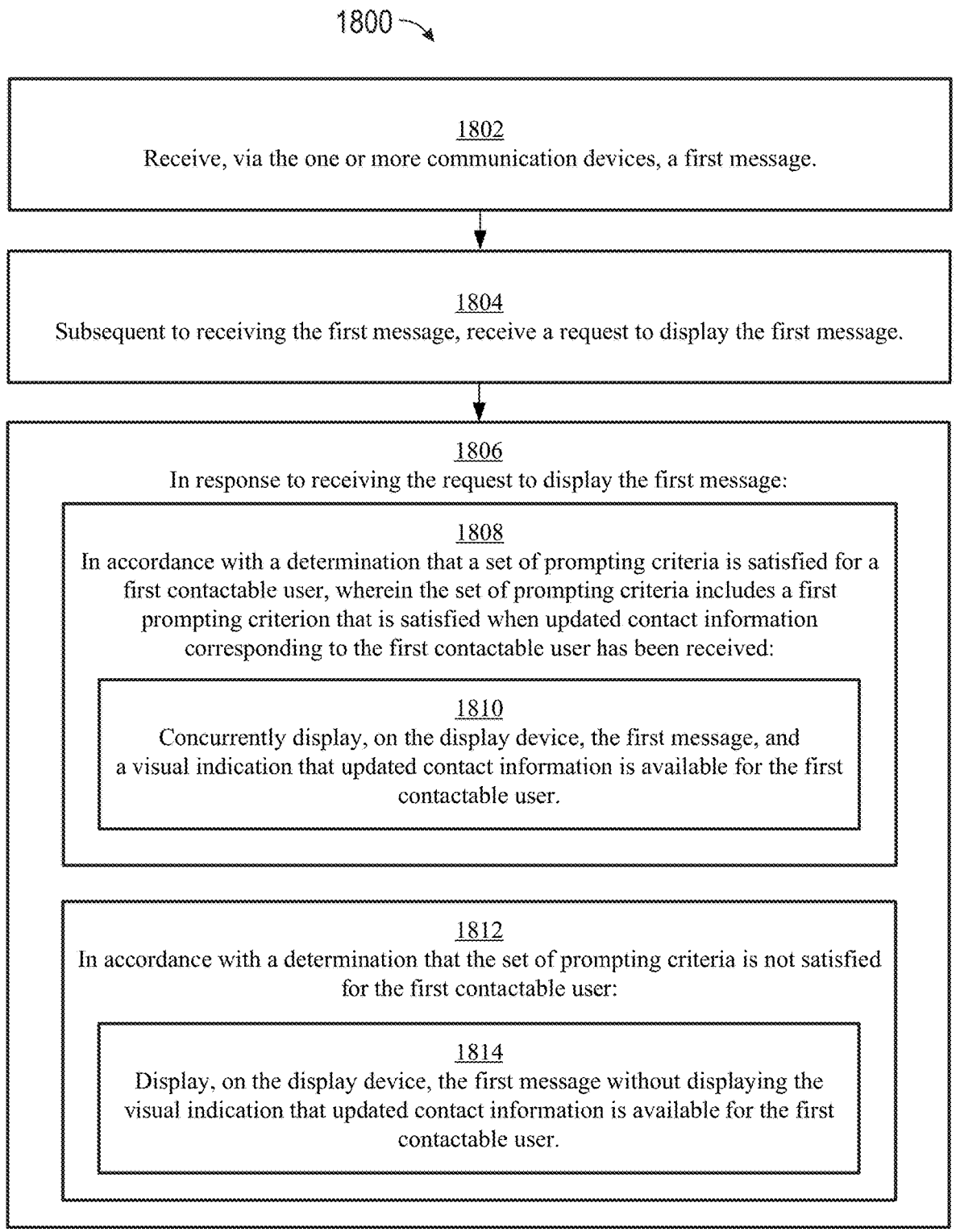
FIG. 18 is a flow diagram illustrating a method for receiving contact information using an electronic device in accordance with some embodiments.

Below, FIGS. 1A-1B, 2, 3, 4A-4B, and 5A-5B provide a description of exemplary devices for displaying avatars in various application user interfaces. FIGS. 6A-6V illustrate exemplary user interfaces for displaying avatars in a stickers application user interface and an avatar keyboard application user interface in accordance with some embodiments. FIG. 7 is a flow diagram illustrating a method for displaying avatars in a stickers application user interface in accordance with some embodiments. FIG. 8 is a flow diagram illustrating a method for displaying avatars in an avatar keyboard application user interface in accordance with some embodiments. The user interfaces in FIGS. 6A-6V are used to illustrate the processes described below, including the processes in FIGS. 7 and 8. FIGS. 9A-9AG illustrate exemplary user interfaces for displaying avatars in a contacts application user interface in accordance with some embodiments. FIG. 10 is a flow diagram illustrating a method for displaying avatars in a contacts application user interface in accordance with some embodiments. The user interfaces in FIGS. 9A-9AG are used to illustrate the processes described below, including the processes in FIG. 10. FIGS. 11A-11AD illustrate exemplary user interfaces for displaying avatars in an avatar editing application user interface in accordance with some embodiments. FIG. 12 is a flow diagram illustrating a method for displaying avatars in an avatar editing application user interface in accordance with some embodiments. FIG. 13 is a flow diagram illustrating a method for displaying avatars in an avatar editing application user interface in accordance with some embodiments. The user interfaces in FIGS. 11A-11AD are used to illustrate the processes below, including the processes in FIGS. 12 and 13. FIGS. 14A-14E illustrate exemplary user interfaces for displaying a virtual avatar in accordance with some embodiments. FIG. 15 is a flow diagram illustrating a method for displaying a virtual avatar in accordance with some embodiments. The user interfaces in FIGS. 14A-14E are used to illustrate the processes below, including the processes in FIG. 15. FIGS. 16A-16X illustrate exemplary devices and user interfaces for sharing contact information, in accordance with some embodiments. FIG. 17 is a flow diagram illustrating a method for providing contact information using an electronic device in accordance with some embodiments. FIG. 18 is a flow diagram illustrating a method for receiving contact information using an electronic device in accordance with some embodiments. The exemplary devices and user interfaces in FIGS. 16A-16X are used to illustrate the processes below, including the processes in FIGS. 17 and 18.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
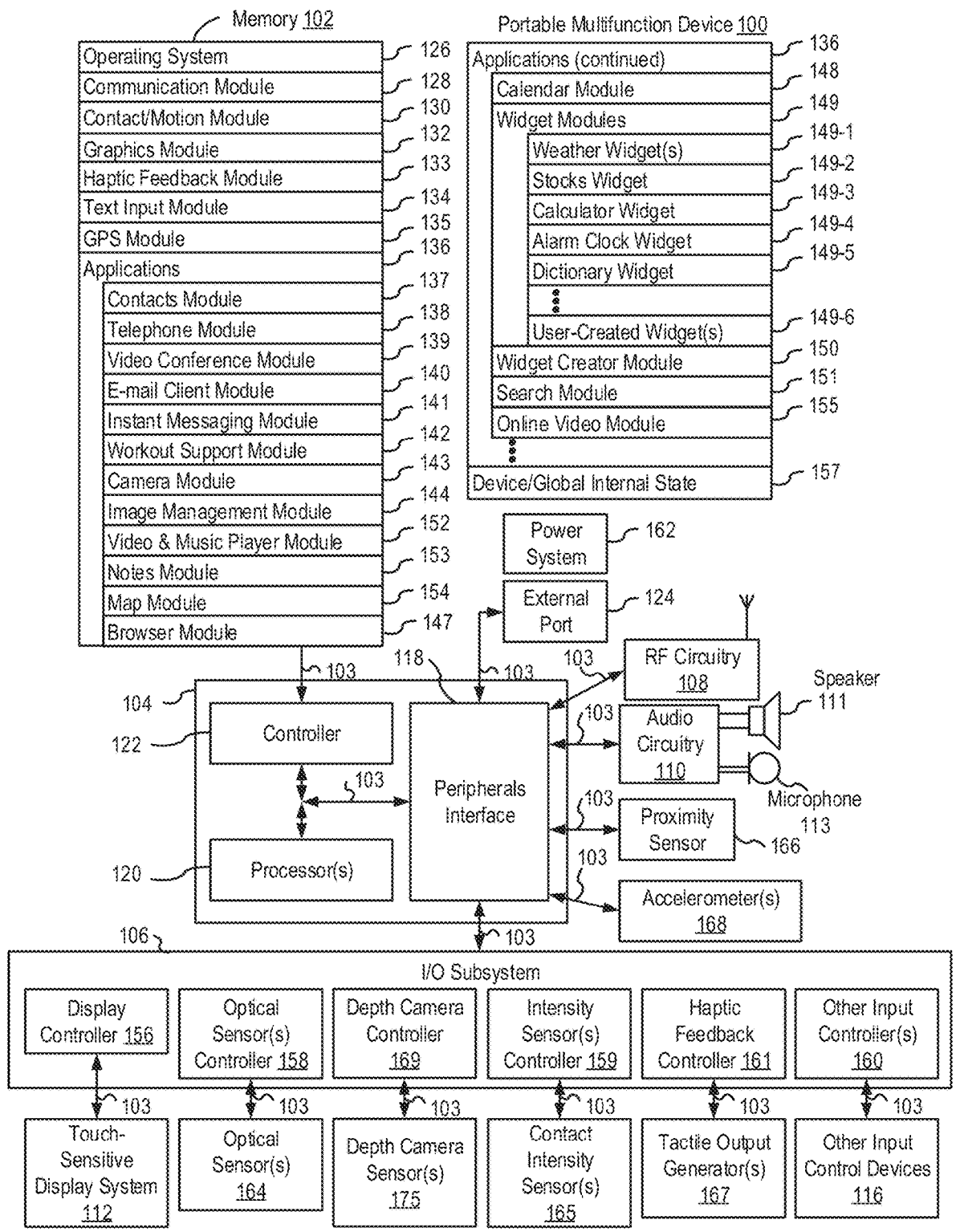
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557

(Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
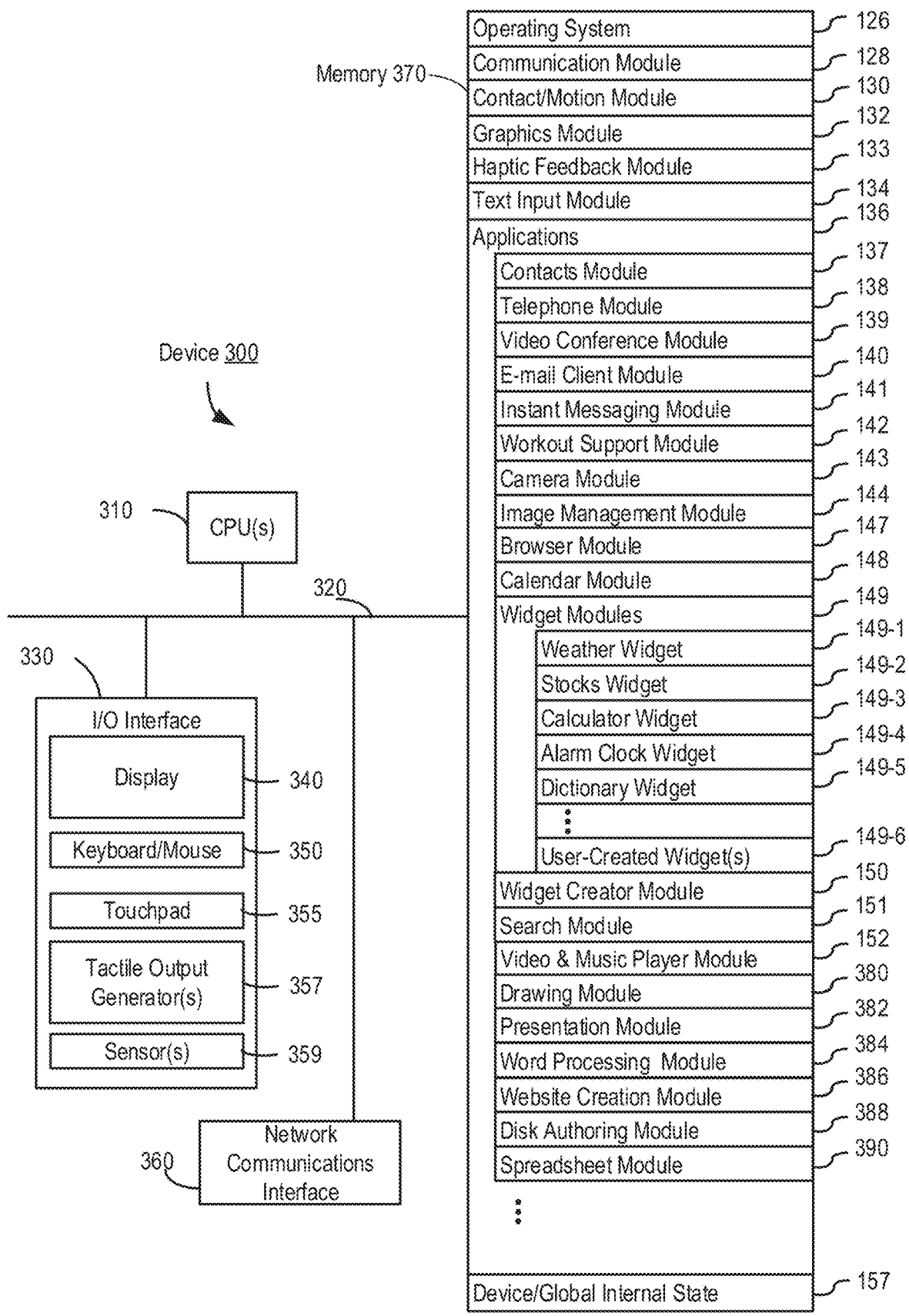
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
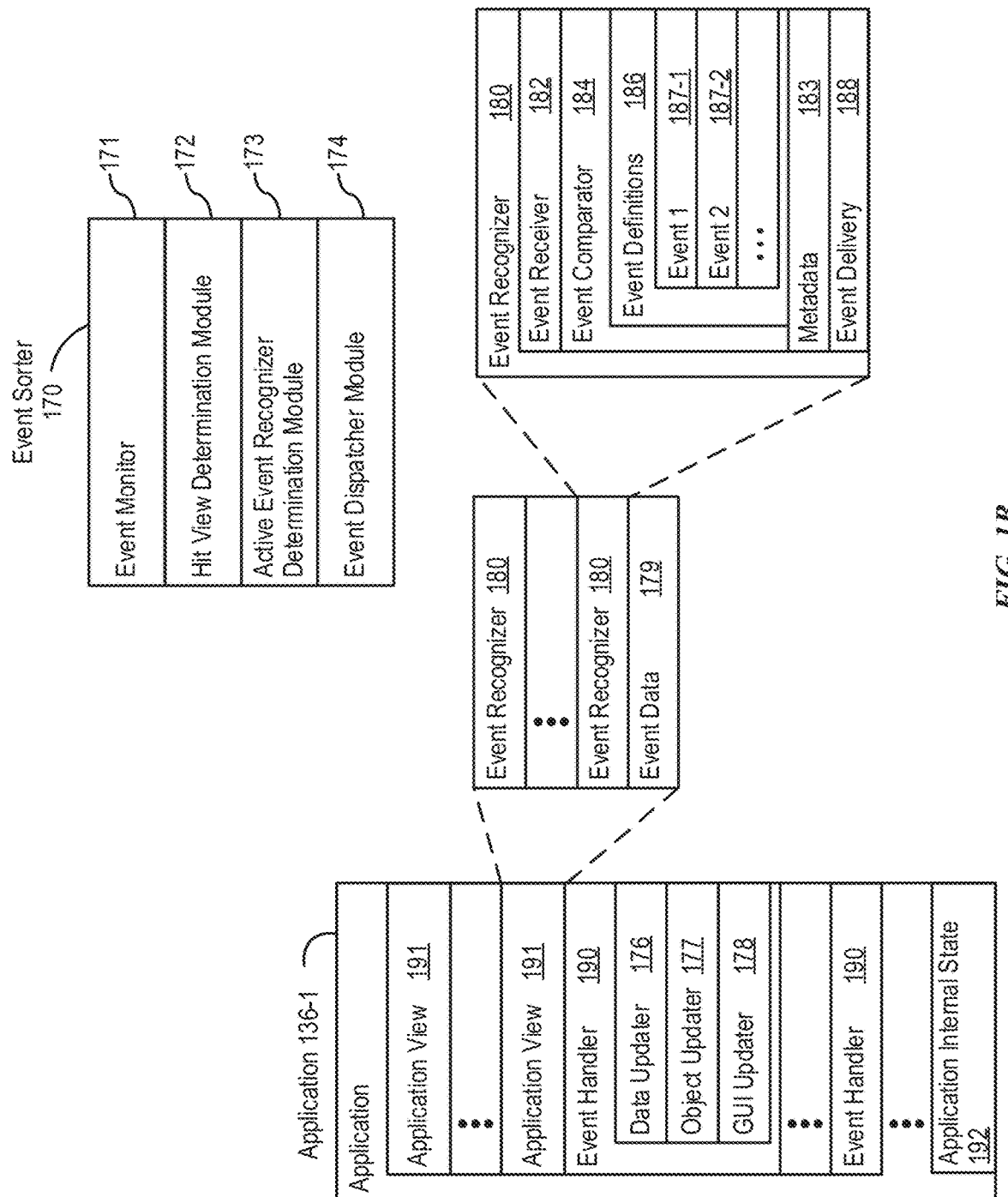
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
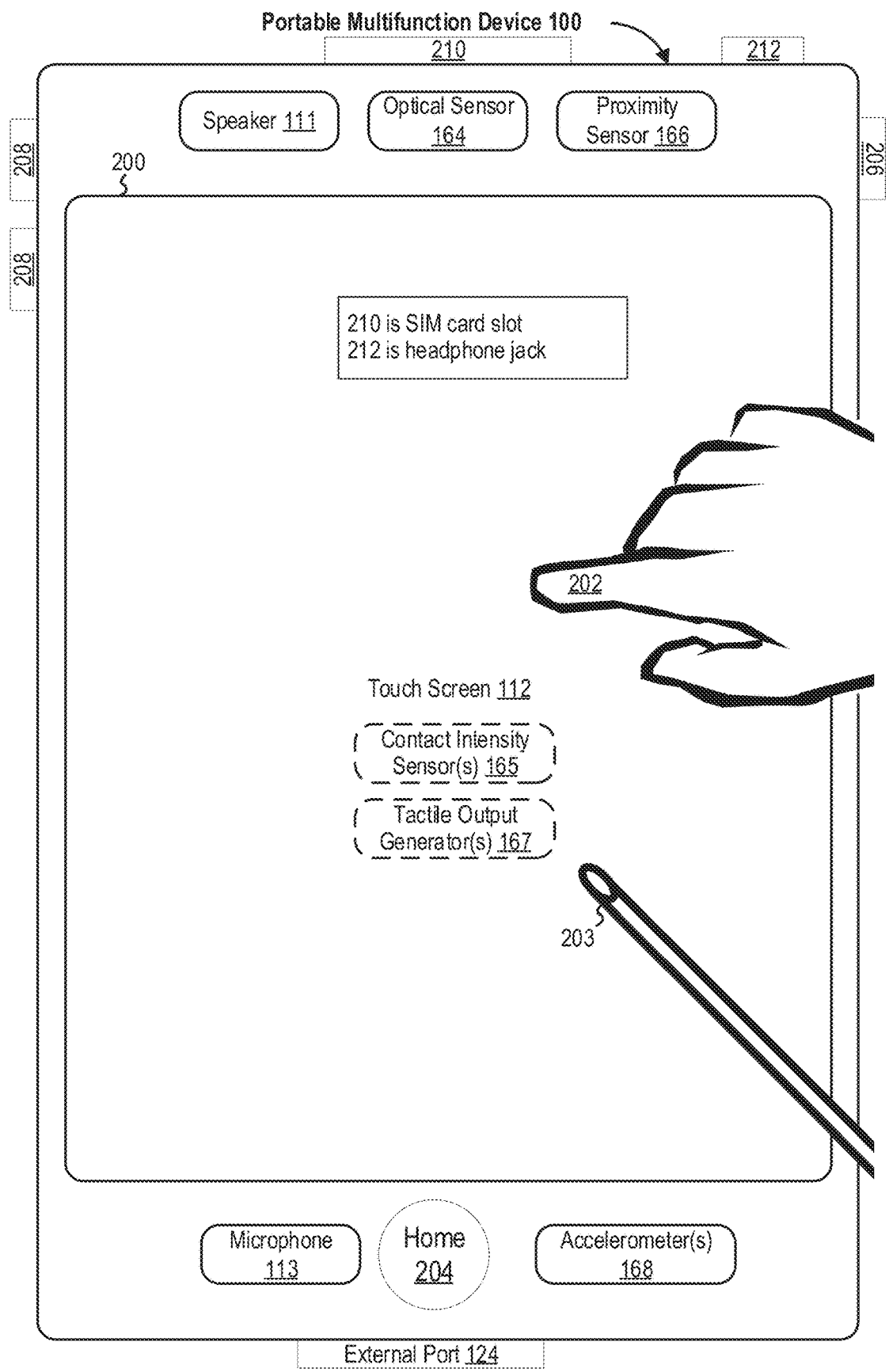
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
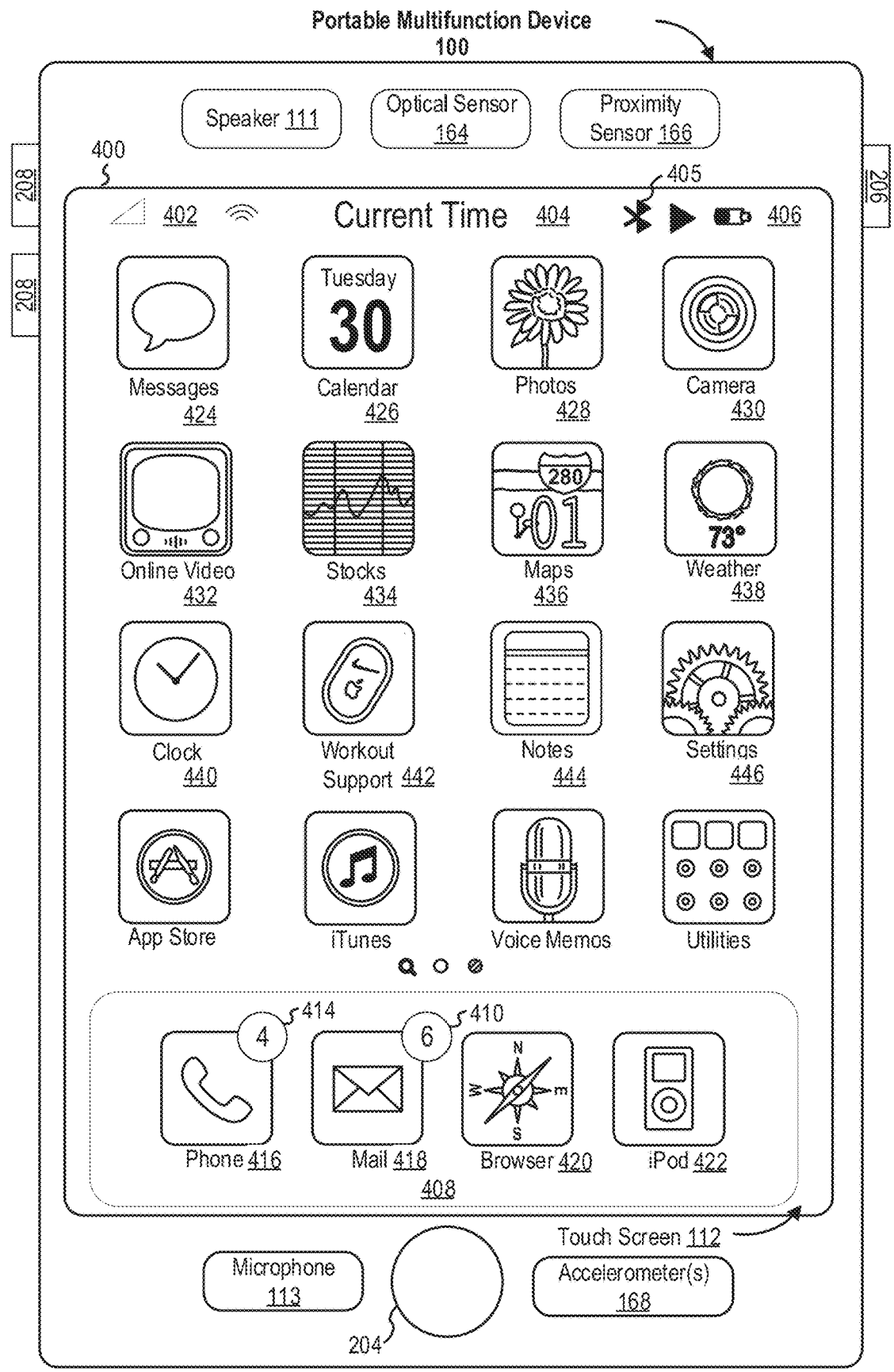
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
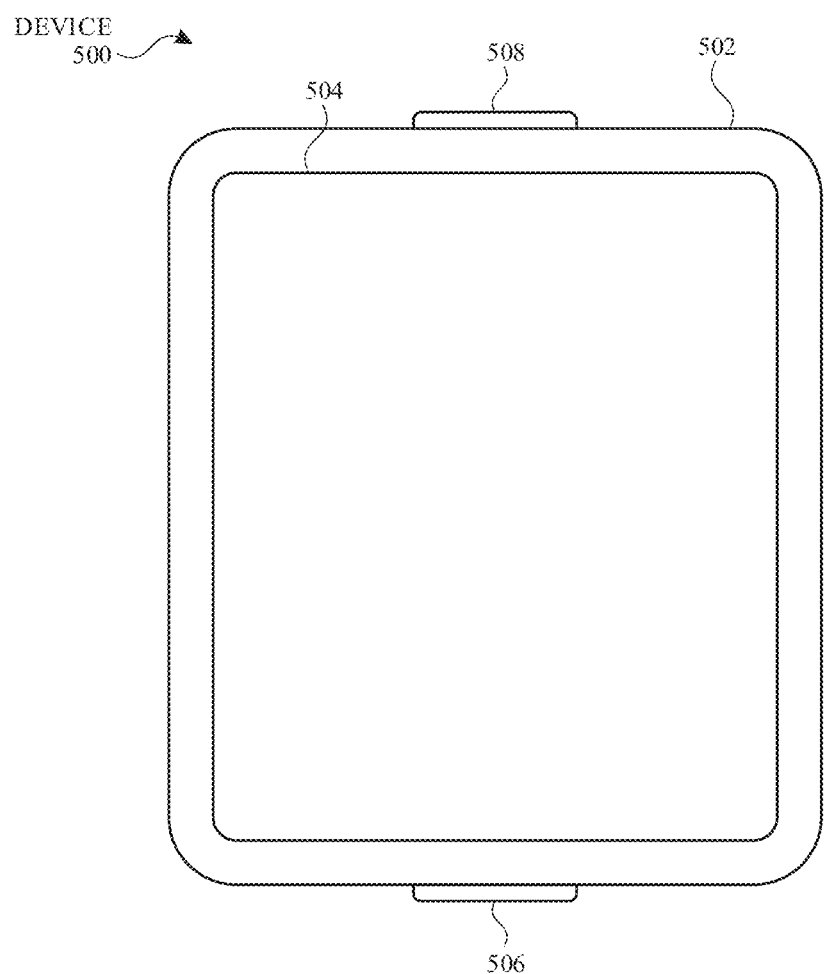
FIG. 5A illustrates a personal electronic device in accordance with some embodiments.
Figure 6A:
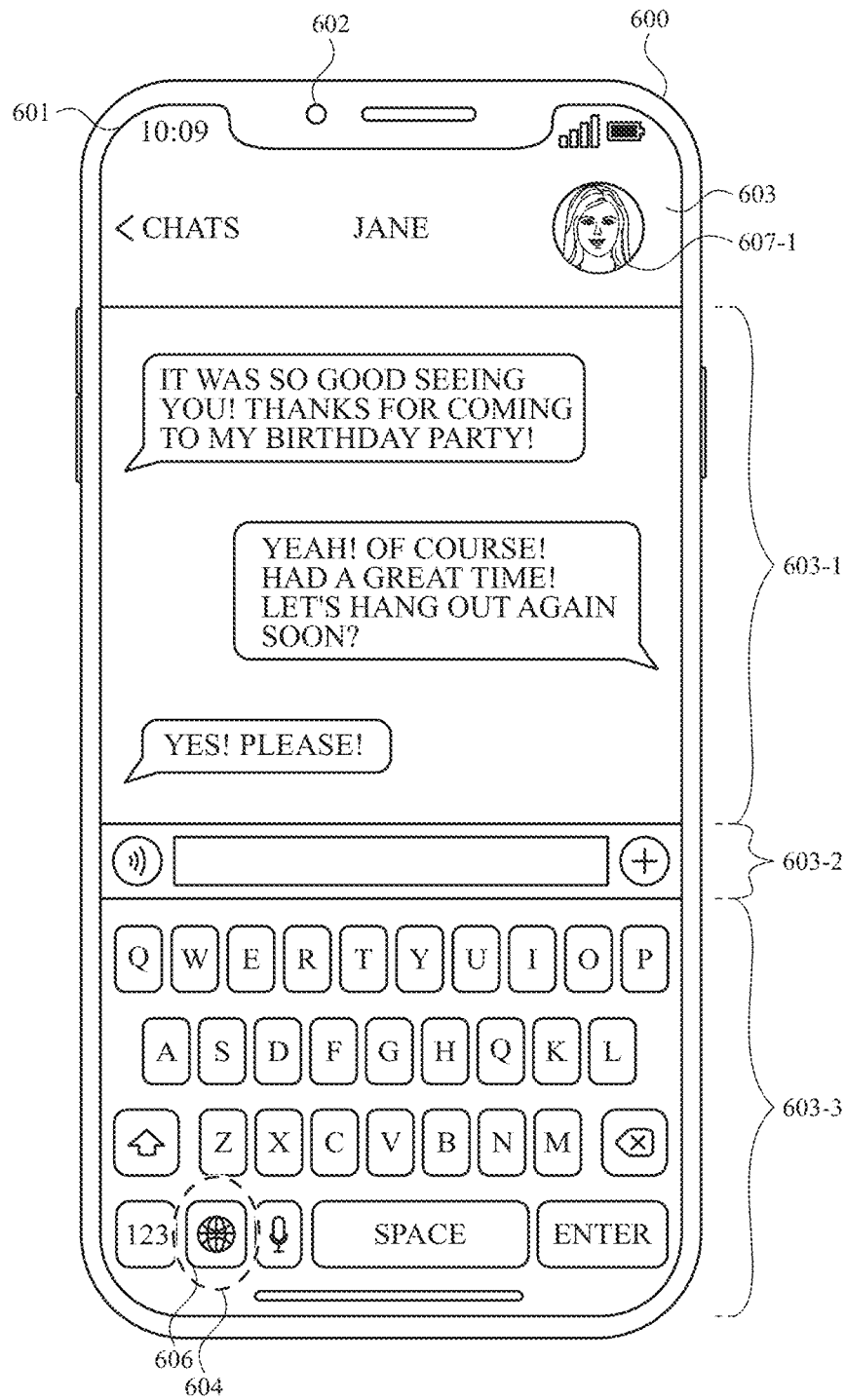
FIGS. 6A-6V illustrate exemplary user interfaces for displaying avatars in a stickers application user interface and an avatar keyboard application user interface in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications:

International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
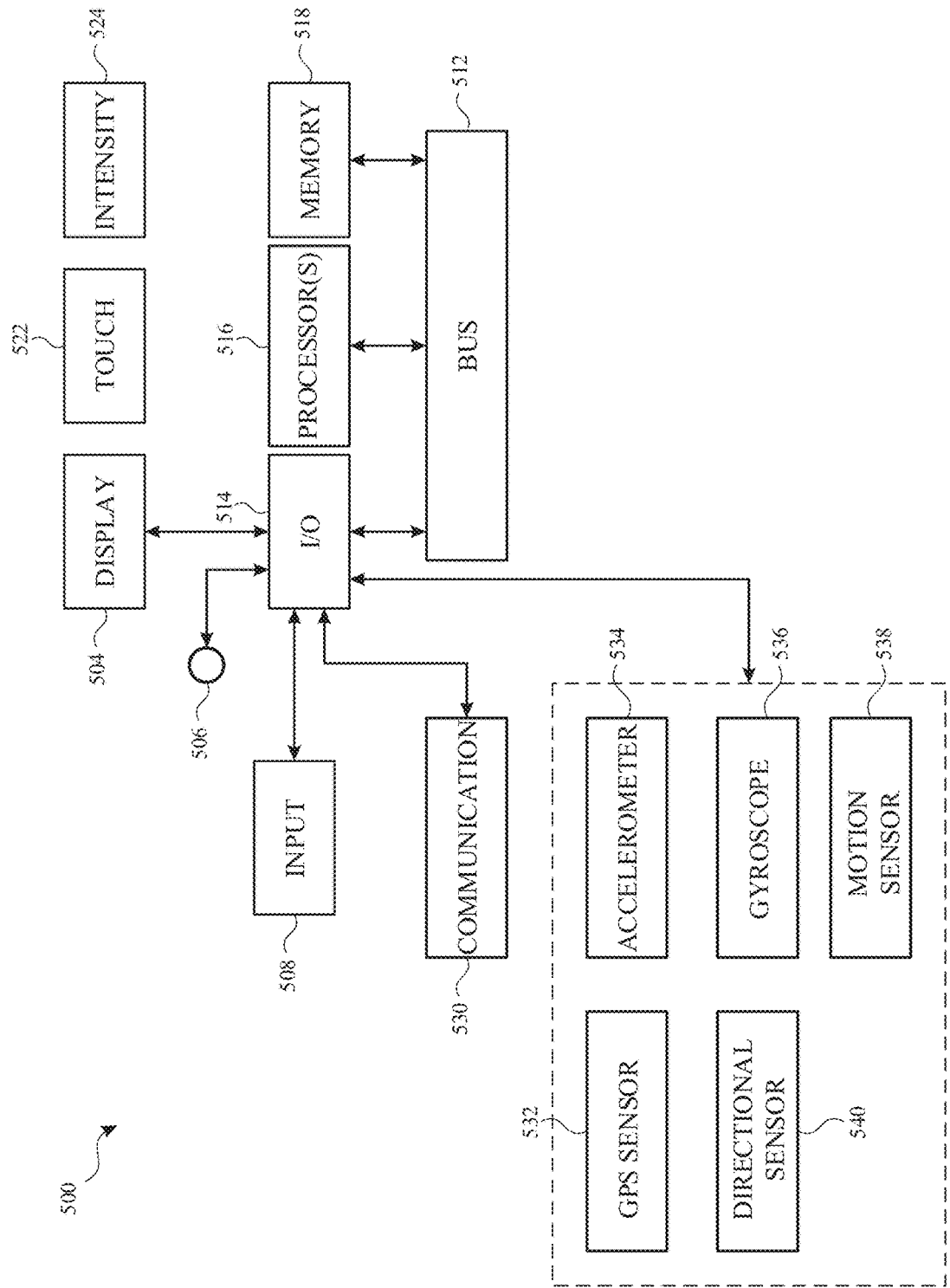
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 800, 1000, 1200, 1300, 1500, 1700, and 1800 (FIGS. 7, 8, 10, 12, 13, 15, 17, and 18). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6V illustrate exemplary user interfaces for displaying avatars in a stickers application user interface and an avatar keyboard application user interface, in accordance with some embodiments. The user interfaces in these figures are used to illustrate the processes described below, including the processes in FIGS. 7 and 8.

FIGS. 6A-6V illustrate exemplary user inputs and corresponding changes to one or more user interfaces, which can be displayed on an electronic device, such as electronic device 600 shown in FIG. 6A. Device 600 includes display 601, which in some cases is a touch-sensitive display, and camera 602, which, in some embodiments, includes an image sensor that is capable of capturing data representing a portion of the light spectrum (e.g., visible light, infrared light, or ultraviolet light). In some embodiments, camera 602 includes multiple image sensors and/or other types of sensors. In addition to capturing data representing sensed light, in some embodiments, camera 602 is capable of capturing other types of data, such as depth data. For example, in some embodiments, camera 602 also captures depth data using techniques based on speckle, time-of-flight, parallax, or focus. Image data that device 600 captures using camera 602 includes data corresponding to a portion of the light spectrum for a scene within the field of view of the camera. Additionally, in some embodiments, the captured image data also includes depth data for the light data. In some other embodiments, the captured image data contains data sufficient to determine or generate depth data for the data for the portion of the light spectrum. In some embodiments, device 600 includes one or more features of devices 100, 300, or 500.

In some examples, electronic device 600 includes a depth camera, such as an infrared camera, a thermographic camera, or a combination thereof. In some examples, the device further includes a light-emitting device (e.g., light projector), such an IR flood light, a structured light projector, or a combination thereof. The light-emitting device is, optionally, used to illuminate the subject during capture of the image by a visible light camera and a depth camera (e.g., an IR camera) and the information from the depth camera and the visible light camera are used to determine a depth map of different portions of subject captured by the visible light camera. In some embodiments, the lighting effects described herein are displayed using disparity information from two cameras (e.g., two visual light cameras) for rear facing images and using depth information from a depth camera combined with image data from a visual light camera for front facing images (e.g., selfie images). In some embodiments, the same user interface is used when the two visual light cameras are used to determine the depth information and when the depth camera is used to determine the depth information, providing the user with a consistent experience, even when using dramatically different technologies to determine the information that is used when generating the lighting effects. In some embodiments, while displaying the camera user interface with one of the lighting effects applied, the device detects selection of a camera switching affordance and switches from the front facing cameras (e.g., a depth camera and a visible light camera) to the rear facing cameras (e.g., two visible light cameras that are spaced apart from each other) (or vice versa) while maintaining display of the user interface controls for applying the lighting effect and replacing display of the field of view of the front facing cameras to the field of view of the rear facing cameras (or vice versa).

In FIG. 6A, device 600 displays messaging user interface 603, which is a user interface of a messaging application. Messaging user interface 603 includes message region 603-1 for displaying messages communicated between parties of a message conversation, message compose region 603-2 for displaying content being composed for communication in the message conversation, and keyboard region 603-3 for displaying various keyboard interfaces. In the embodiments illustrated in FIGS. 6A-6H, the messages correspond to a message conversation with first recipient 607-1.

Figure 6B:
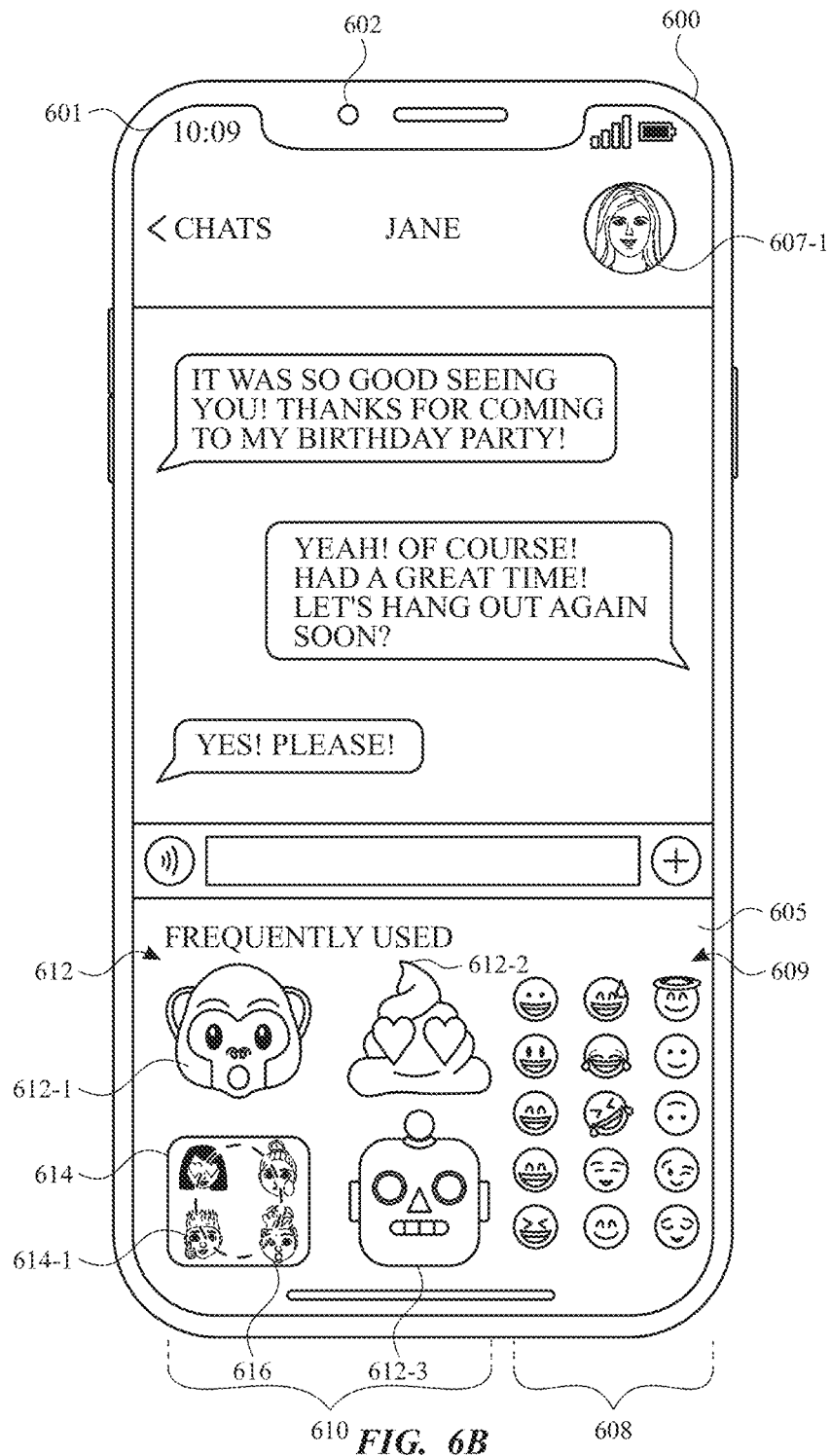

In FIG. 6A, device 600 detects input 604 (e.g., a tap gesture) on affordance 606 and, in response, displays avatar keyboard 605 in keyboard region 603-3, as shown in FIG. 6B.

Avatar keyboard 605 includes various graphical objects that can be selected for communicating in message user interface 603. Avatar keyboard 605 includes emoji region 608 displaying a set of emojis 609 that can be selected for communicating in message user interface 603, and sticker region 610 displaying stickers 612 and sticker application affordance 614, which, when selected, displays sticker user interface 615 (shown in FIG. 6C).

As shown in FIG. 6B, sticker region 610 includes stickers 612, which can be selected for communicating in message user interface 603. The stickers displayed in sticker region 610 each have an appearance that is based on various avatars that are available at device 600. The stickers also include a pose or expression of the avatar upon which the sticker's appearance is based. For example, monkey sticker 612-1 is displayed having an appearance of a monkey avatar having a surprised expression, poop sticker 612-2 is displayed having an appearance of a poop avatar with heart eyes, and robot sticker 612-3 is displayed having an appearance of a robot avatar in a neutral pose.

In some embodiments, device 600 selectively displays various stickers 612 in sticker region 610 based on a number of factors. For example, in some embodiments, device 600 selectively displays individual stickers based on a history of usage such as, for example, stickers that have been recently created (e.g., recommended/proposed stickers for an avatar that was recently created) and stickers that are frequently or recently used by the user. In some embodiments, device 600 selectively displays different stickers 612 so that a variety of sticker poses are represented in sticker region 610.

Device 600 also selectively displays various stickers 612 in sticker region 610 based on the types of avatars available at device 600. For example, different types of avatars can include avatars that are based on a non-human character, based on a human character, user-created (e.g., created and/or customizable by the user), or predefined (e.g., not created or customizable by the user). In the embodiment illustrated in FIG. 6B, monkey sticker 612-1, poop sticker 612-2, and robot sticker 612-3 each have an appearance based on a predefined avatar that is a non-human character.

Device 600 displays stickers 612 for avatars that are available at device 600. Therefore, if a particular avatar is not available at device 600, sticker region 610 does not include stickers for that avatar. For example, in FIG. 6B, device does not include any user-created avatars or avatars based on a human character and, therefore, does not display any stickers for such avatars. As discussed in greater detail below, when such an avatar is available at device 600, sticker region 610 displays one or more stickers for the avatar.

Sticker region 610 also includes sticker application affordance 614. Sticker application affordance 614 has an appearance that includes representations of various stickers. For example, in FIG. 6B, sticker application affordance 614 includes representations 614-1 of different stickers. Device 600 displays selectively displays various sticker representations in sticker application affordance 614 based on a number of factors. For example, in some embodiments, when a type of avatar is not available at device 600, the device displays representations of stickers based on an example avatar of the type not available at device 600. For example, in FIG. 6B, avatars of a user-created or human-based type are not available at device 600, and device 600 displays representations 614-1 of stickers for different user-created and human-based avatars. In some embodiments, when a new avatar is created, device 600 updates sticker application affordance 614 to include a representation of a sticker based on the newly created avatar. In some embodiments, device 600 displays representations of stickers for avatars of different types. In some embodiments, device 600 selectively displays different sticker representations such that a variety of sticker poses are represented in sticker application affordance 614. In some embodiments, the representations of stickers are displayed in an animated sequence in which the different representations cycle individually across the sticker application affordance 614.

Figure 6C:
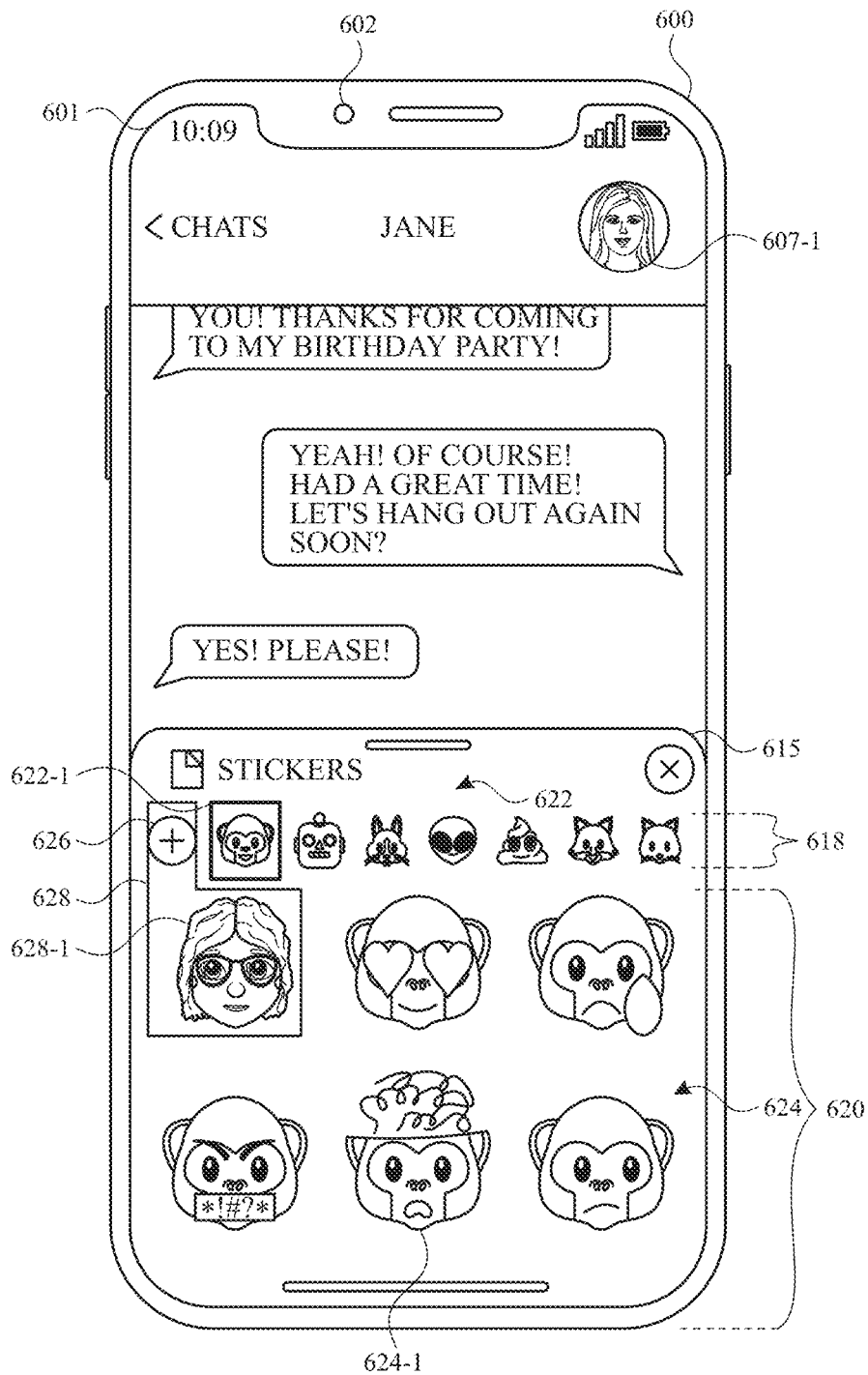

In FIG. 6B, device 600 detects input 616 on sticker application affordance 614 and, in response, replaces display of avatar keyboard 605 and compose region 603-2 with sticker user interface 615, as shown in FIG. 6C.

As shown in FIG. 6C, device 600 displays sticker user interface 615 having region 618 with representations 622 of sets of stickers, and sticker region 620 having stickers corresponding to a selected one of the sticker representations in region 618. Representations 622 correspond to sets of stickers that are available at device 600. A user can view different sets of stickers by selecting different representations 622 (e.g., by touching the corresponding representation 622 in region 618, or by swiping horizontally on the sticker region 620). When a different representation 622 is selected, device 600 updates region 618 to indicate the selected representation 622 and updates sticker region 620 to display stickers corresponding to the selected representation. In FIG. 6C, monkey representation 622-1 is selected in first region 618, and monkey stickers 624 are displayed in sticker region 620. In some embodiments, stickers 624 are shown having slight animations such as smiling, winking, waving, etc. Monkey stickers 624 include various poses such as a mind-blown pose shown in mind-blown monkey sticker 624-1.

In some embodiments, device 600 displays region 618 the first time sticker user interface 615 is displayed, and hides region 618 thereafter (e.g., does not initially display region 618 for subsequent instances of interface 615). The user can cause device 600 to re-display region 618 by dragging on sticker region 620, as shown in FIG. 6L.

Figure 6D:
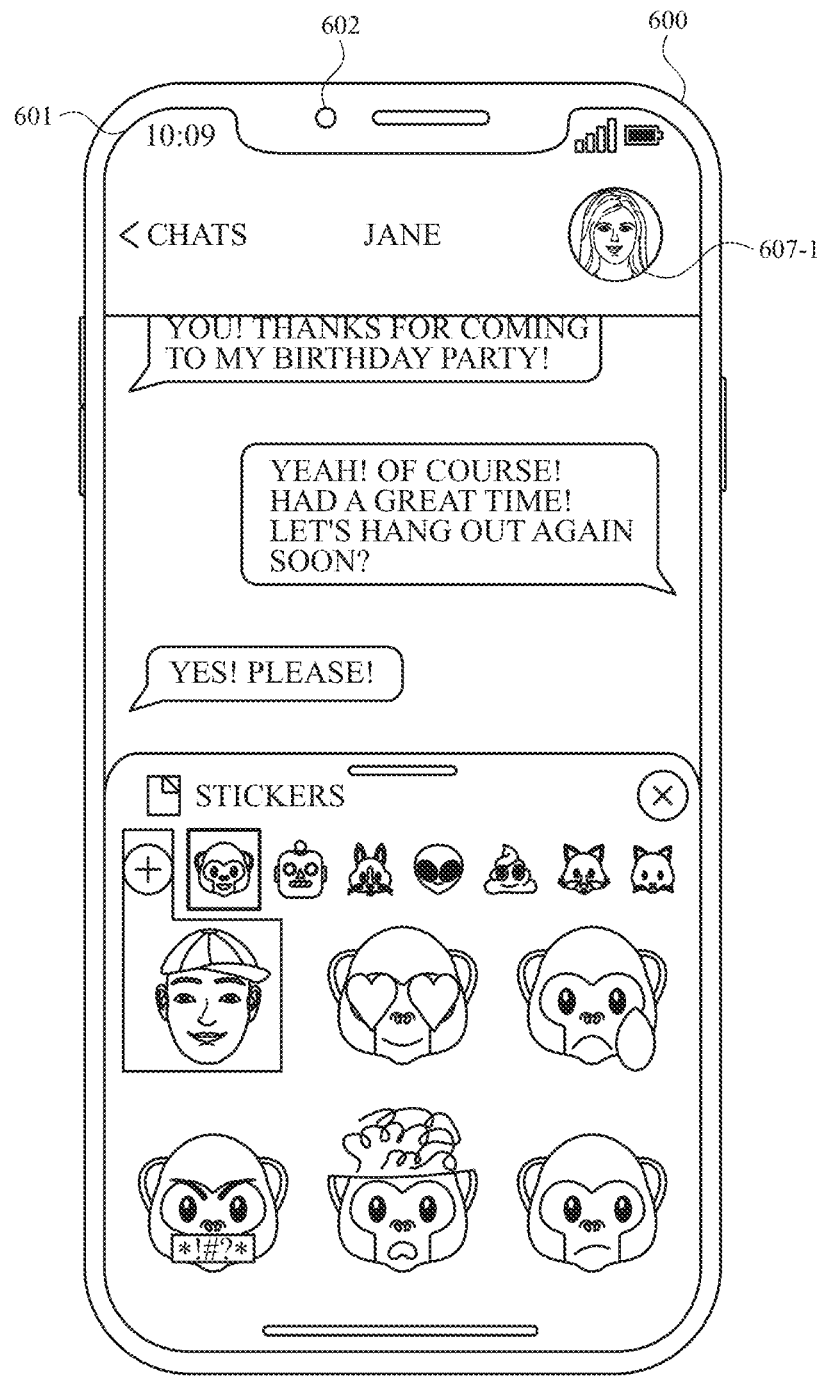
Figure 6E:
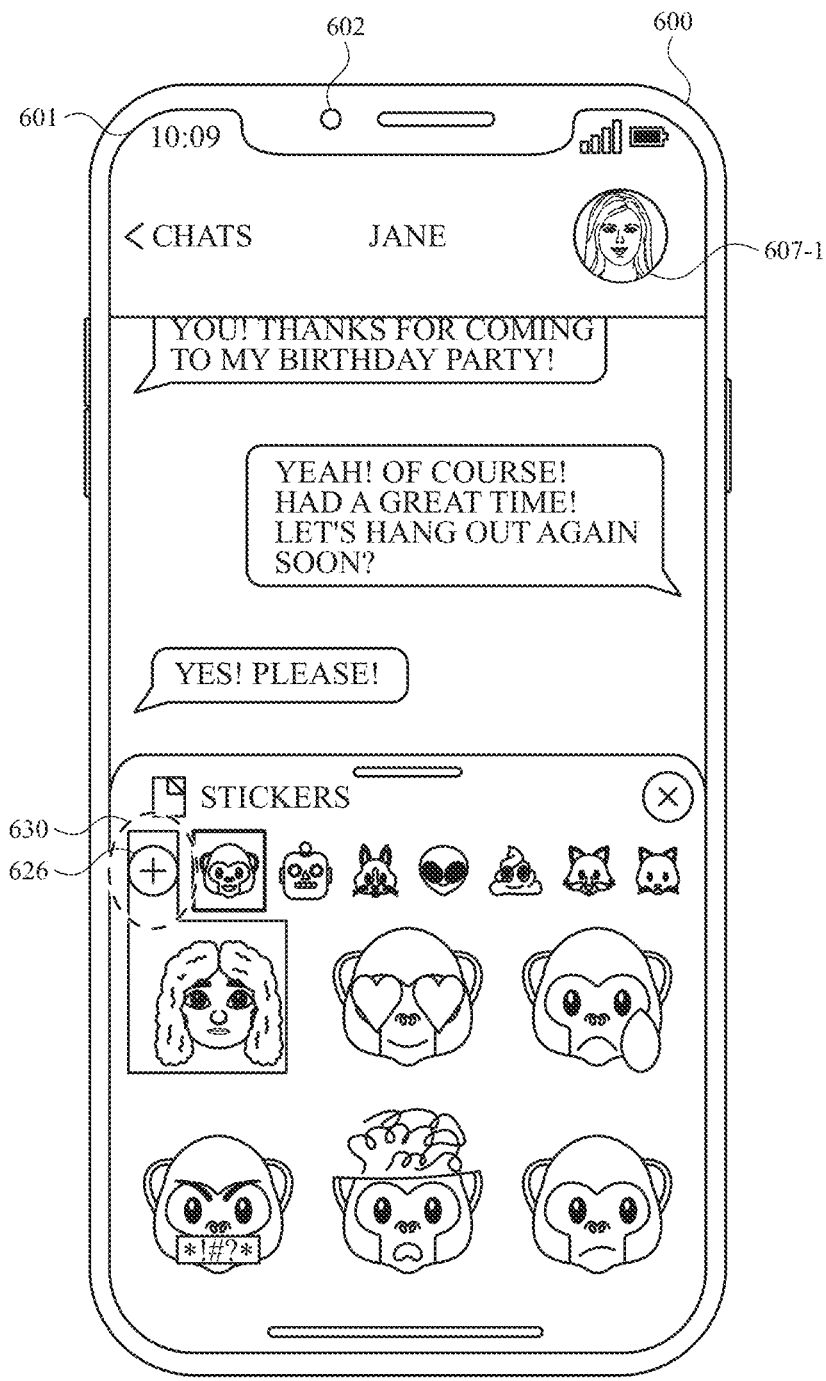

Referring now to FIGS. 6C-6E, region 618 further includes creation affordance 626, which can be selected to create a new avatar. As shown, region 618 does not include any representations of avatars of a user-created or human-based type, because no such avatars are currently available at device 600. Accordingly, device 600 displays paddle 628 extending from creation affordance 626 and having an animation of representations 628-1 of avatars cycling across the paddle, as shown by the different representations shown for FIGS. 6C-6E. This animation provides an indication to the user that no avatars of a user-created or human-based type are available at device 600, and encourages the user to select paddle 628 to create an avatar.

Figure 6F:
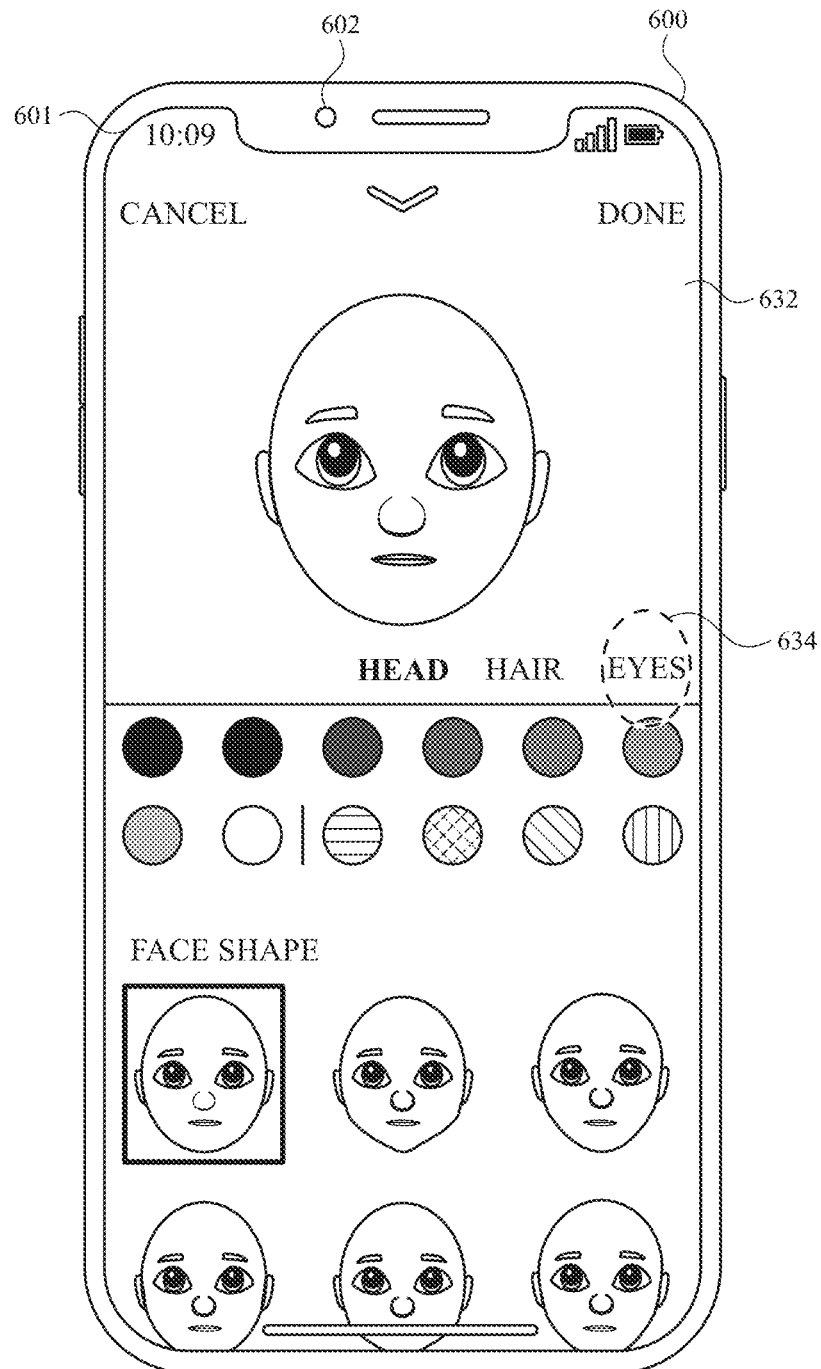
Figure 6G:
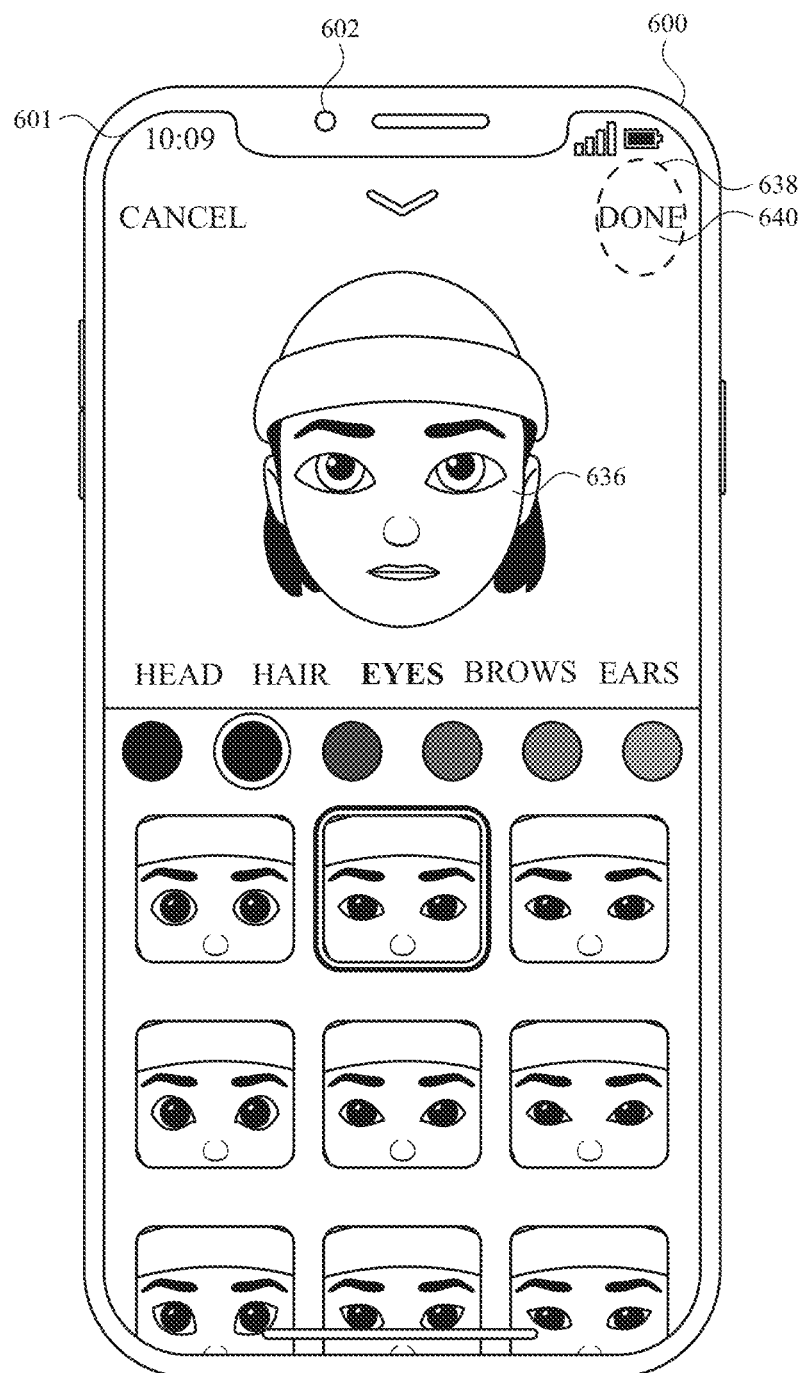
Figure 6H:
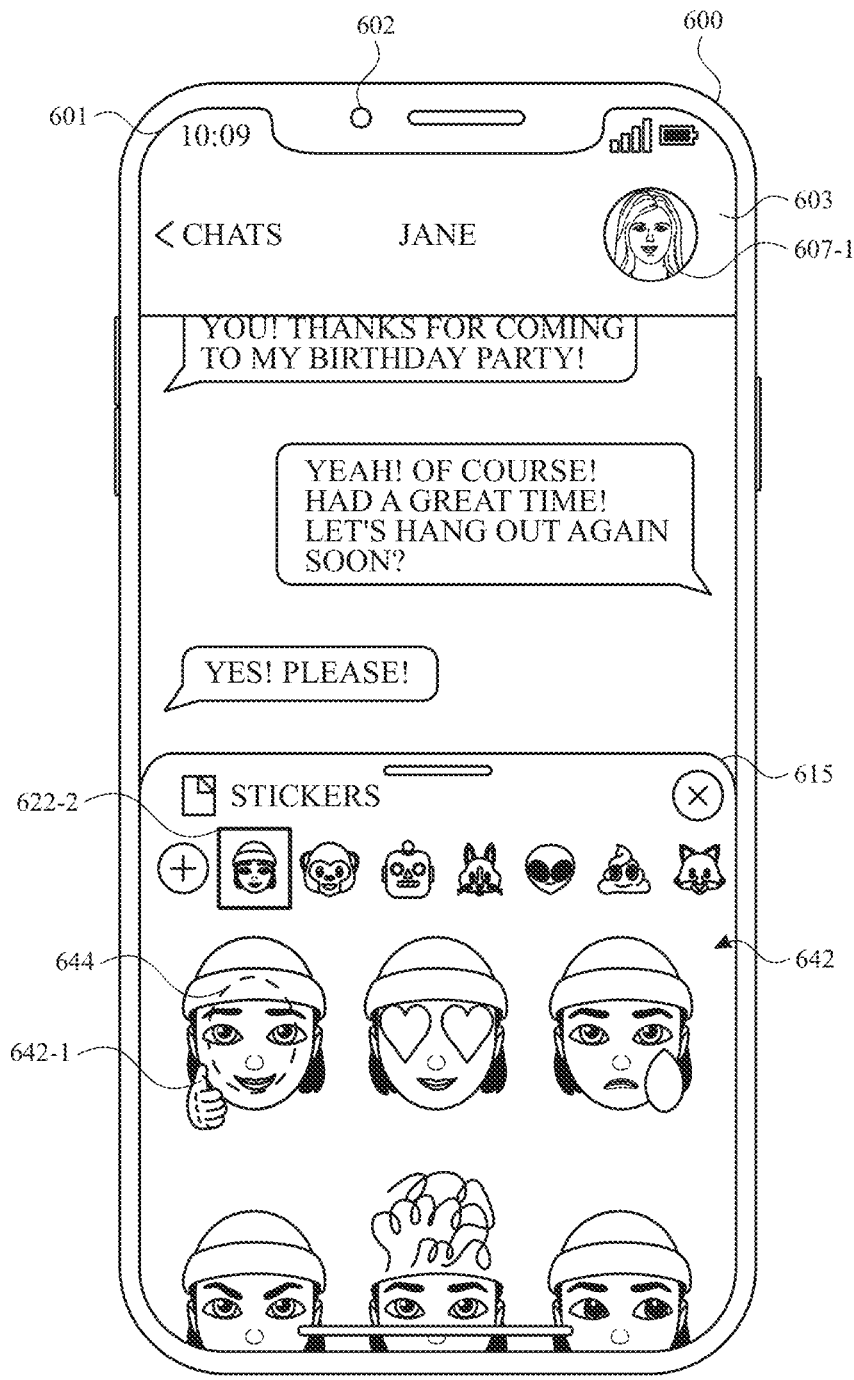

In FIG. 6E, device 600 detects input 630 on creation affordance 626 and, in response, displays avatar creation user interface 632, as shown in FIG. 6F. Device 600 detects inputs, represented generally by input 634, in avatar creation user interface 632 to select various avatar features to build/create a new avatar, beanie avatar 636, shown in FIG. 6G. In response to input 638 on done affordance 640, device 600 exits avatar creation user interface 632, and returns to messaging user interface 603 in FIG. 6H, showing sticker user interface 615 updated to include representation 622-2 of beanie avatar 636 selected in region 618 and beanie stickers 642 having the appearance of beanie avatar 636, but with different poses for each of the respective beanie stickers 642. Beanie stickers 642 include many of the same sticker poses as the monkey stickers shown in FIG. 6C. In some embodiments, after creating beanie avatar 636, the new avatar is then available for use at device 600, including in other applications such as, for example, a contacts application, a camera application, a media viewing application, and other applications on device 600. Additionally, beanie avatar 636 can be updated, and the updates are made to beanie avatar 636, including in the other applications.

In FIG. 6H, device 600 detects input 644 on thumbs up beanie sticker 642-1, which is a sticker having an appearance of beanie avatar 636 and a "thumbs up" pose. In some embodiments, the selection of thumbs up beanie sticker 642-1 causes device 600 to add the sticker to the message conversation (e.g., to send to first recipient 607-1). In some embodiments, the selection of thumbs up beanie sticker 642-1 causes device 600 to display thumbs up beanie sticker 642-1 in avatar keyboard 605, as shown in FIG. 6I.

Figure 6I:
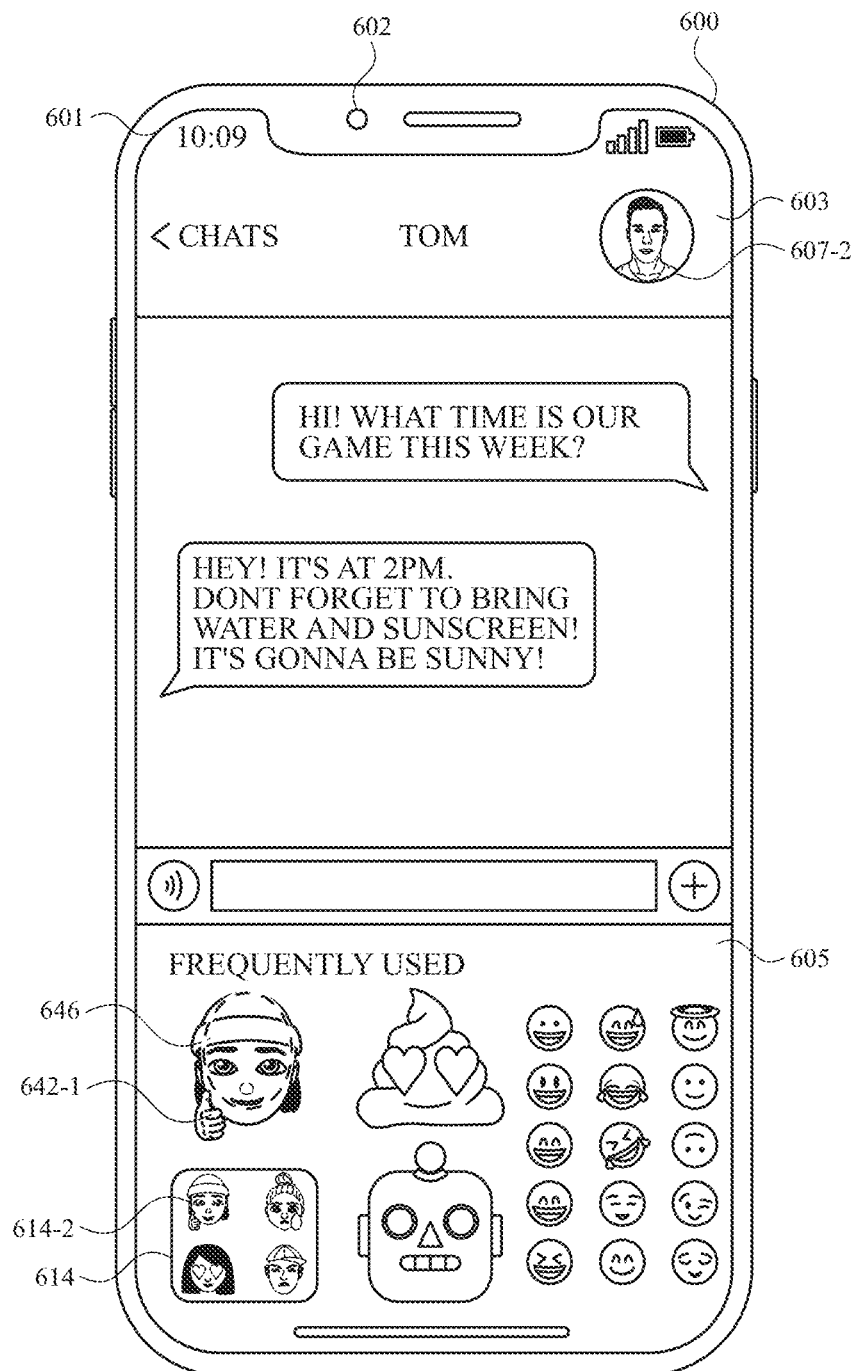
Figure 6J:
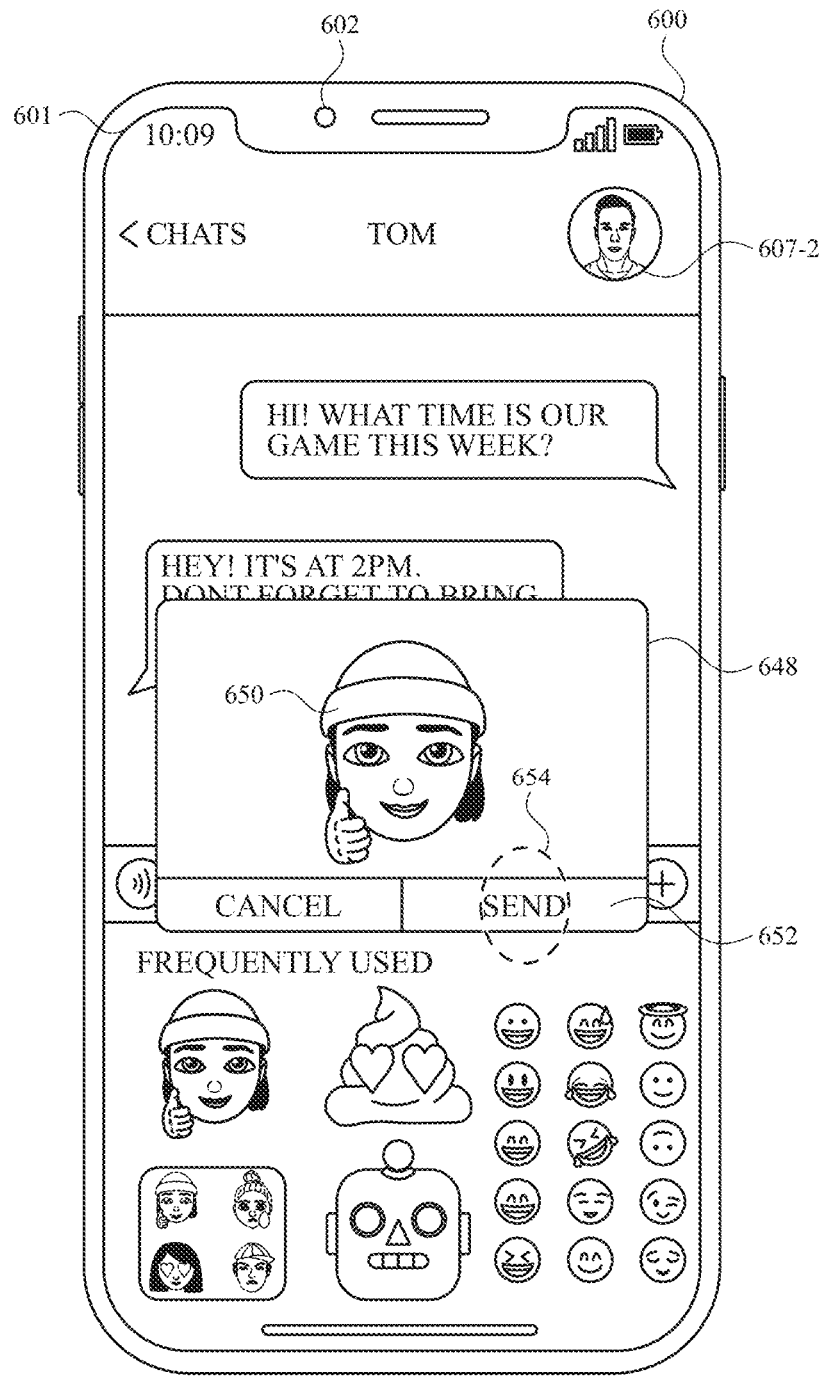
Figure 6K:
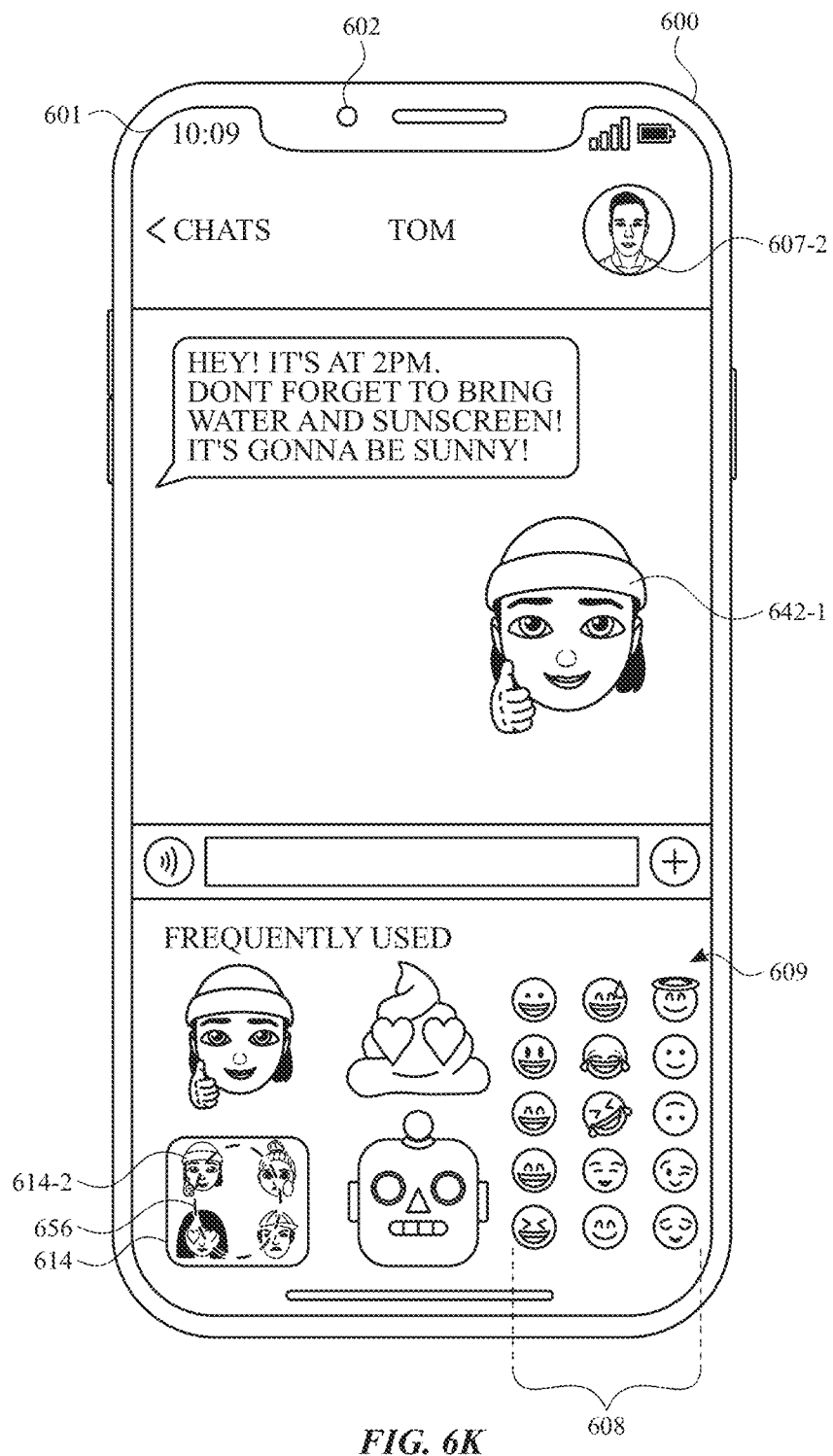
Figure 6L:
Figure 6M:
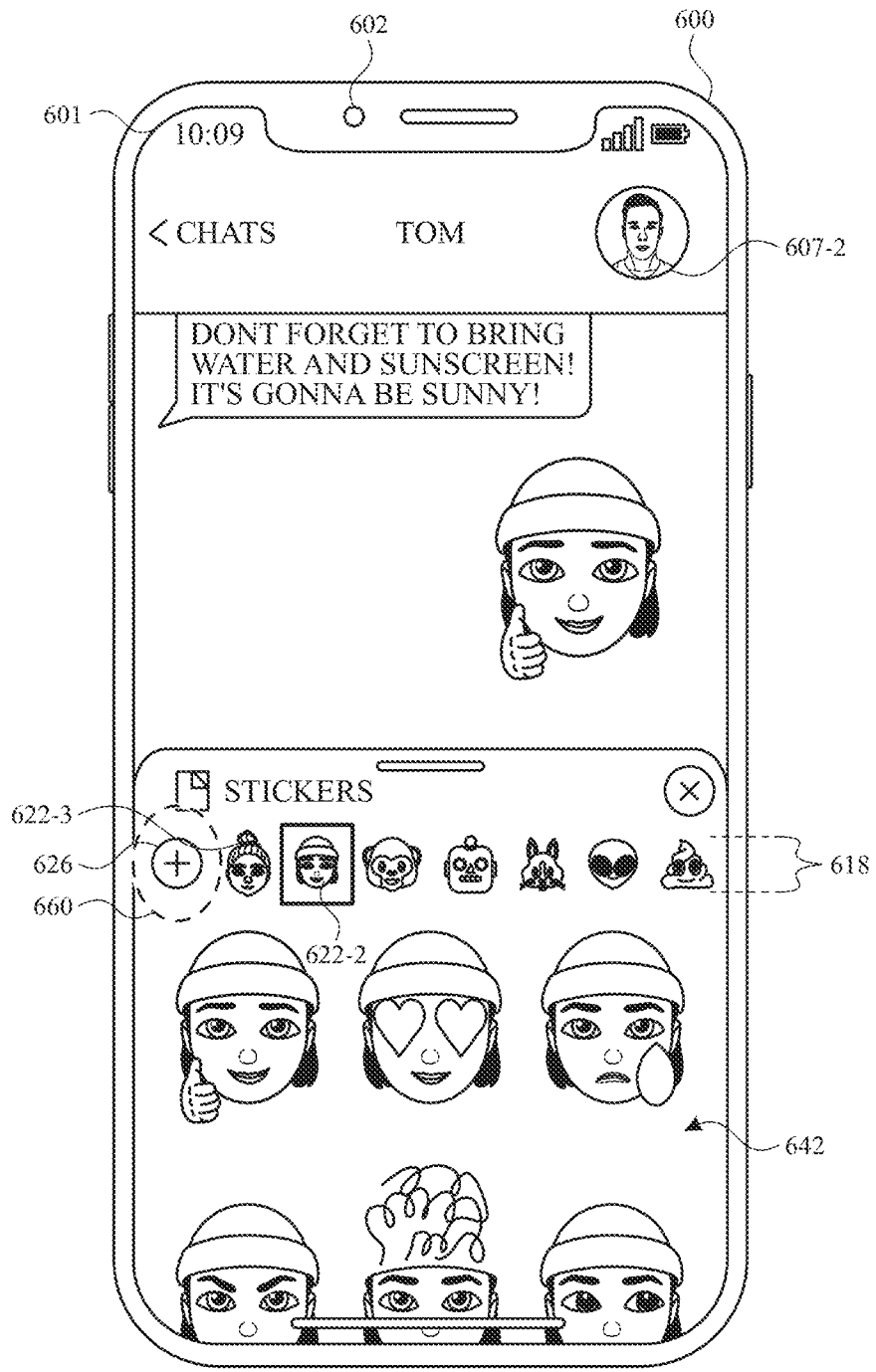
Figure 6N:
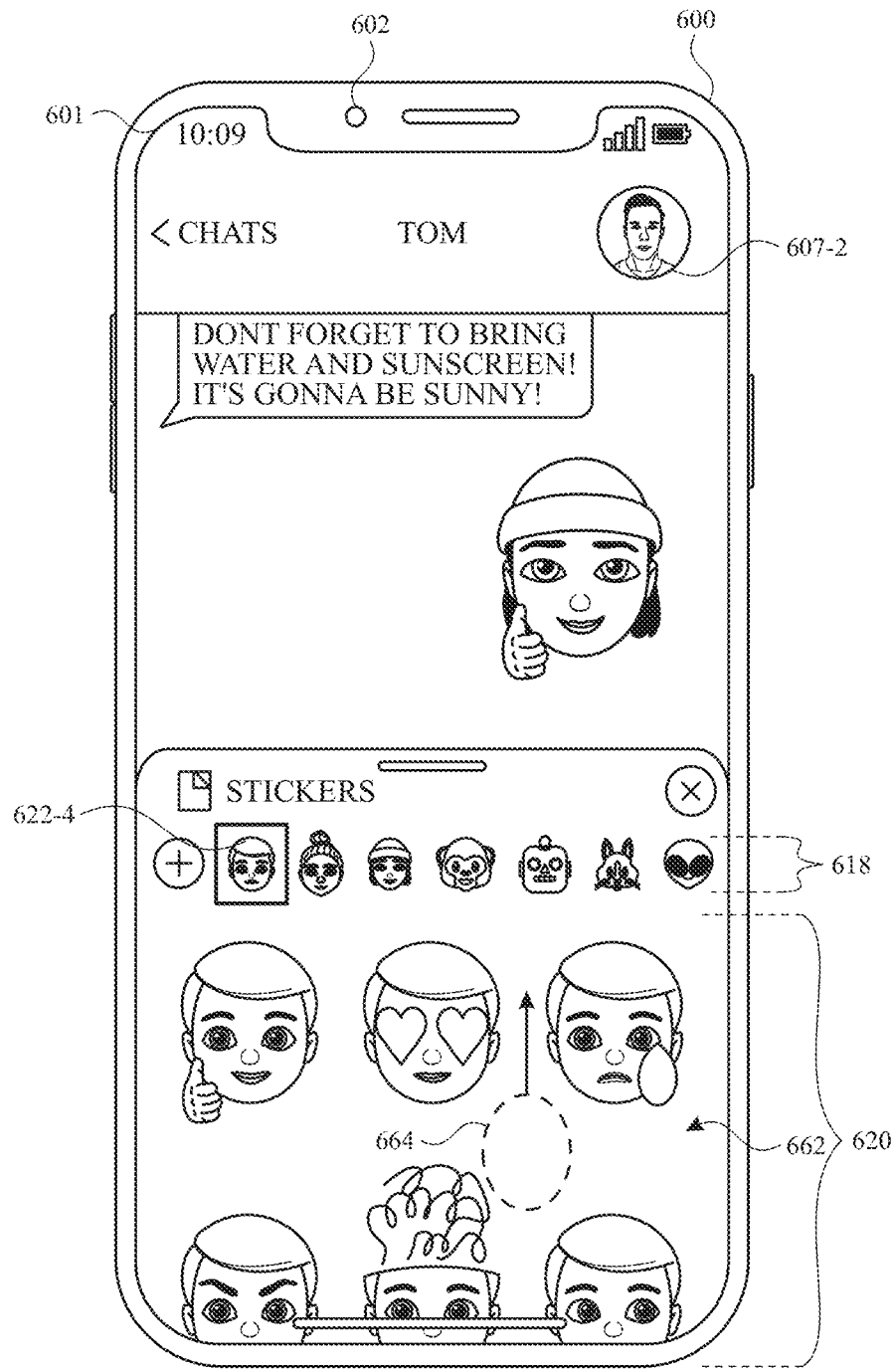
Figure 6O:
Figure 6P:
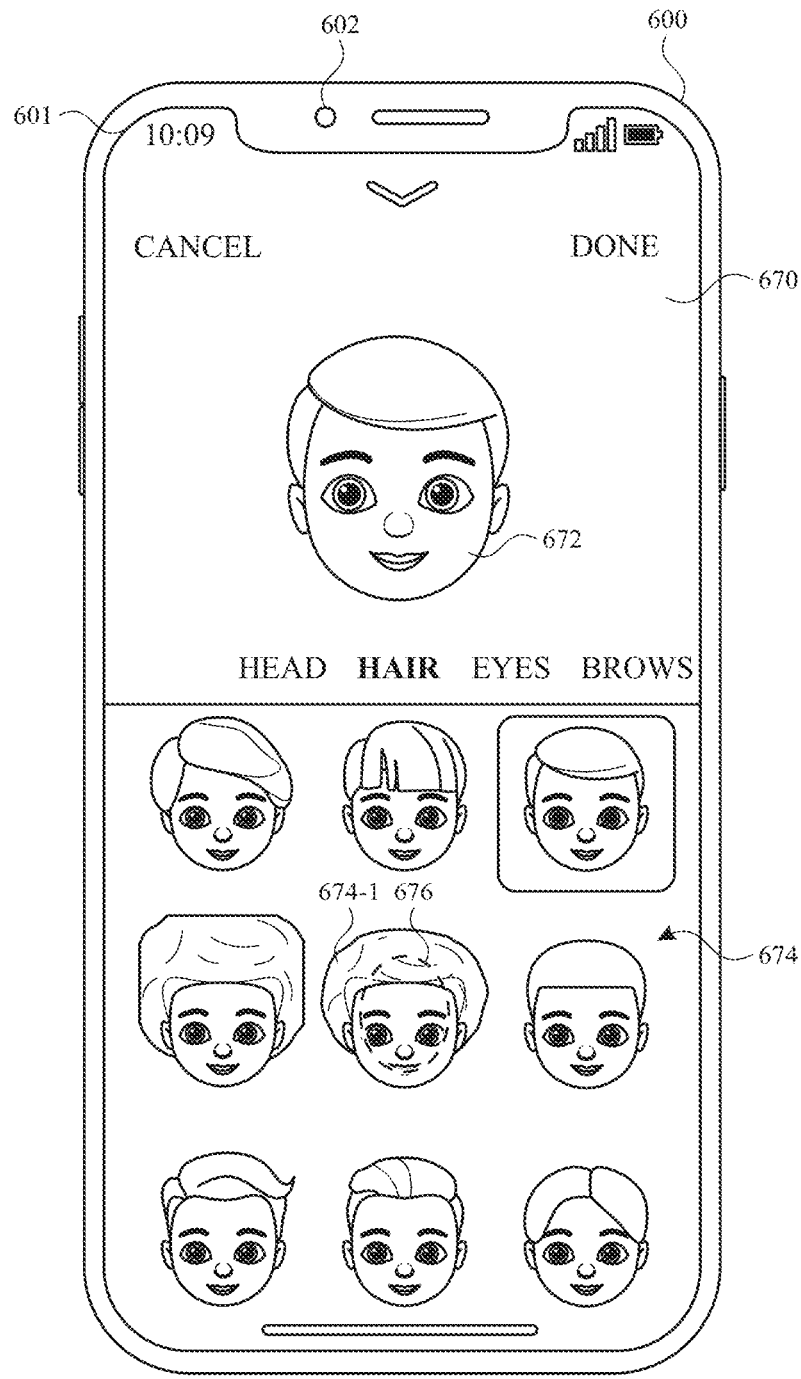
Figure 6Q:
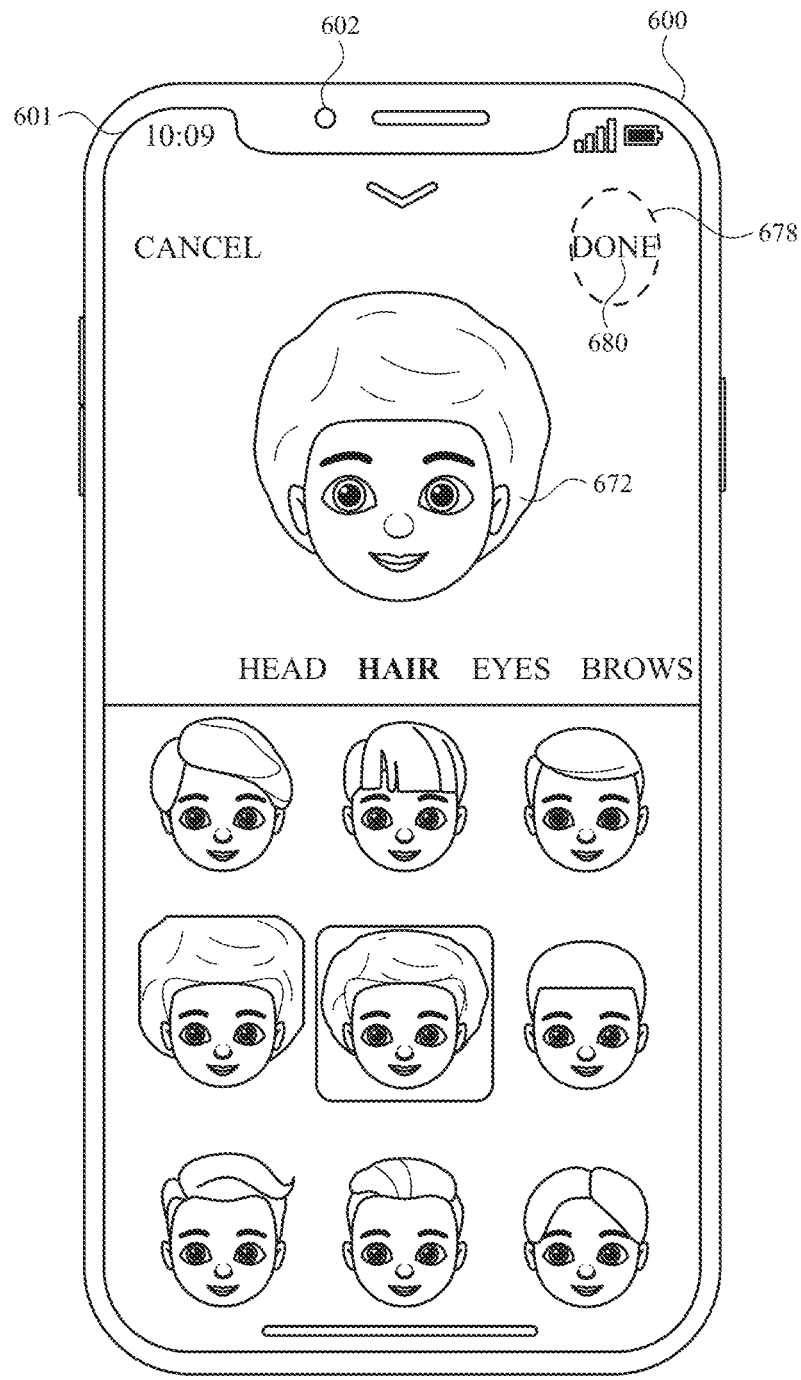
Figure 6R:
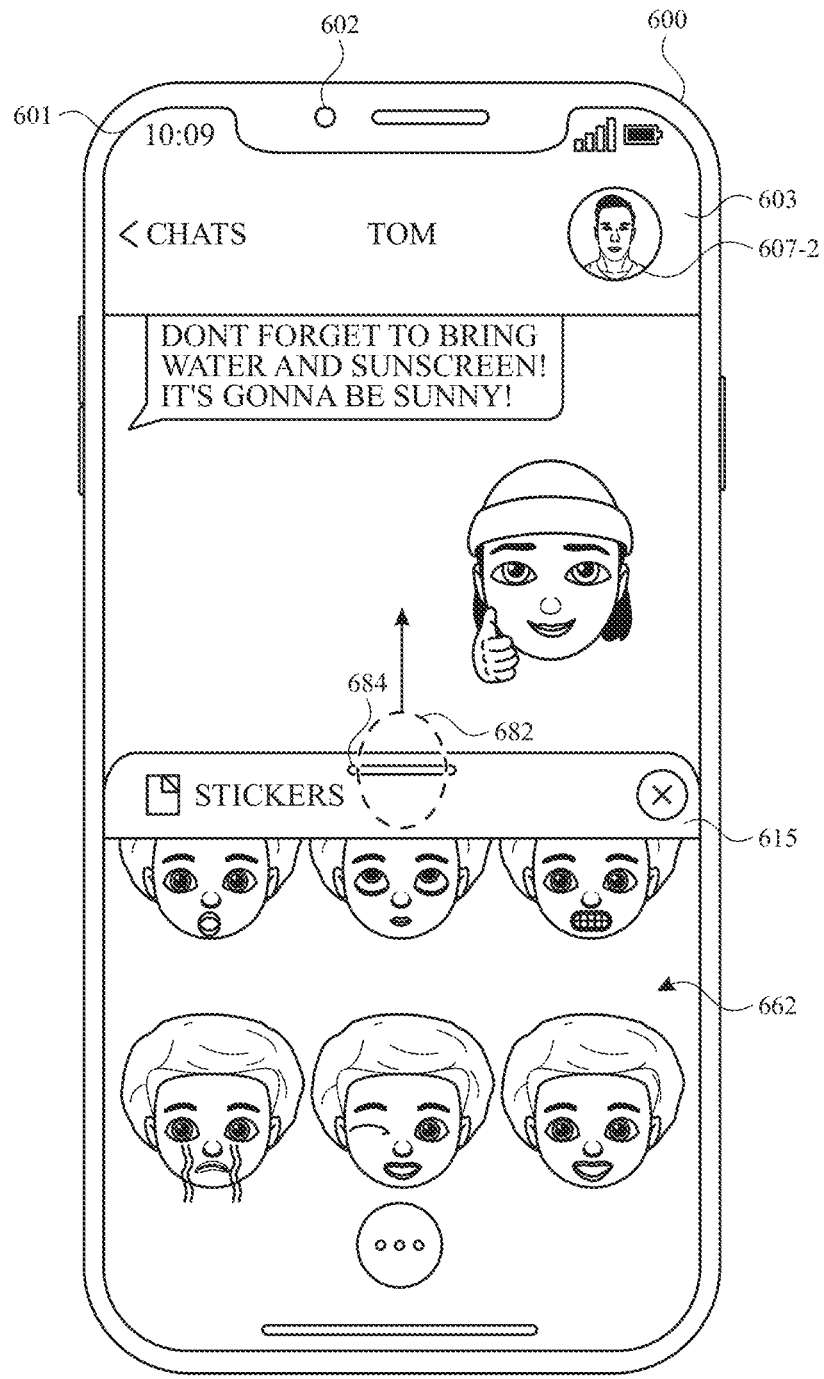
Figure 6S:
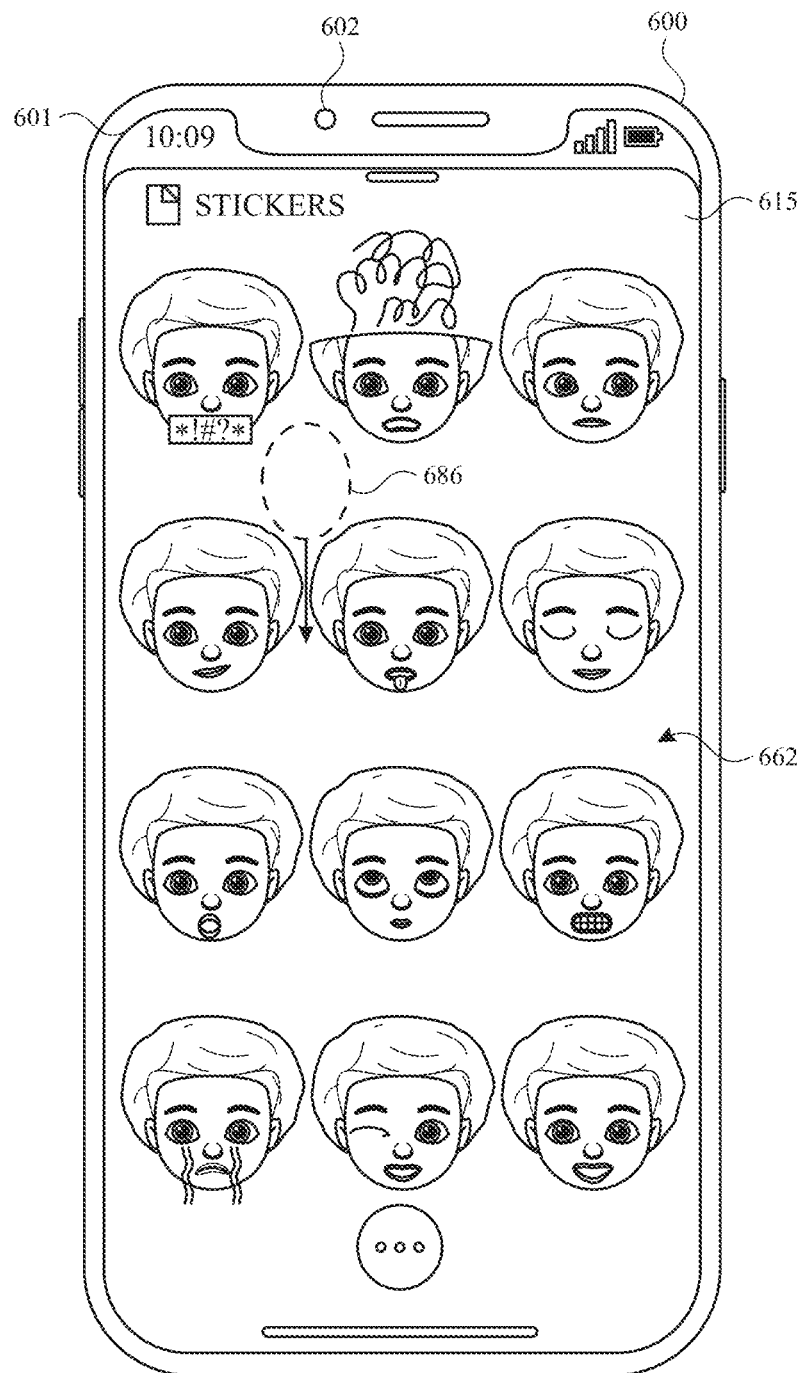
Figure 6T:
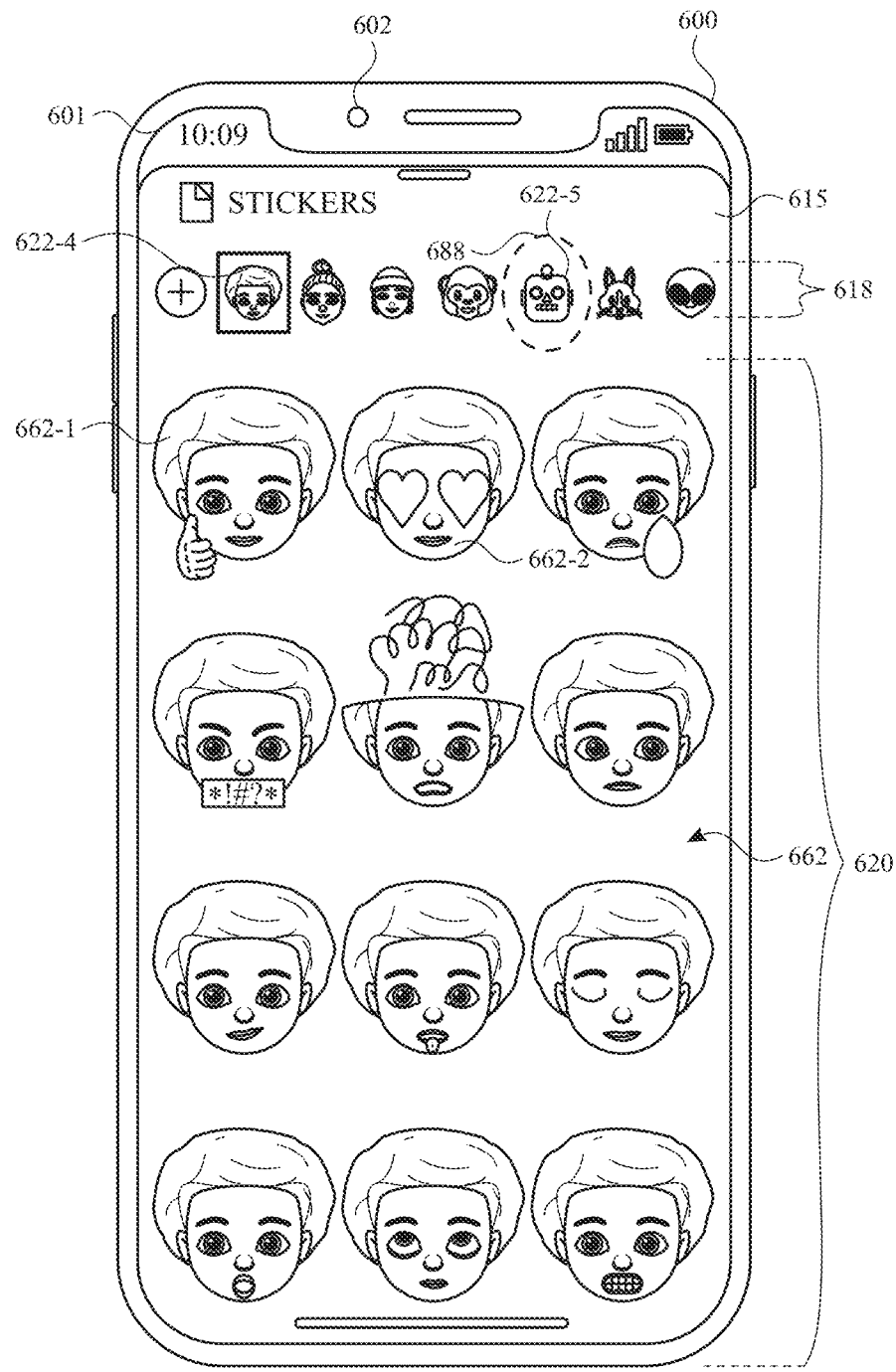
Figure 6U:
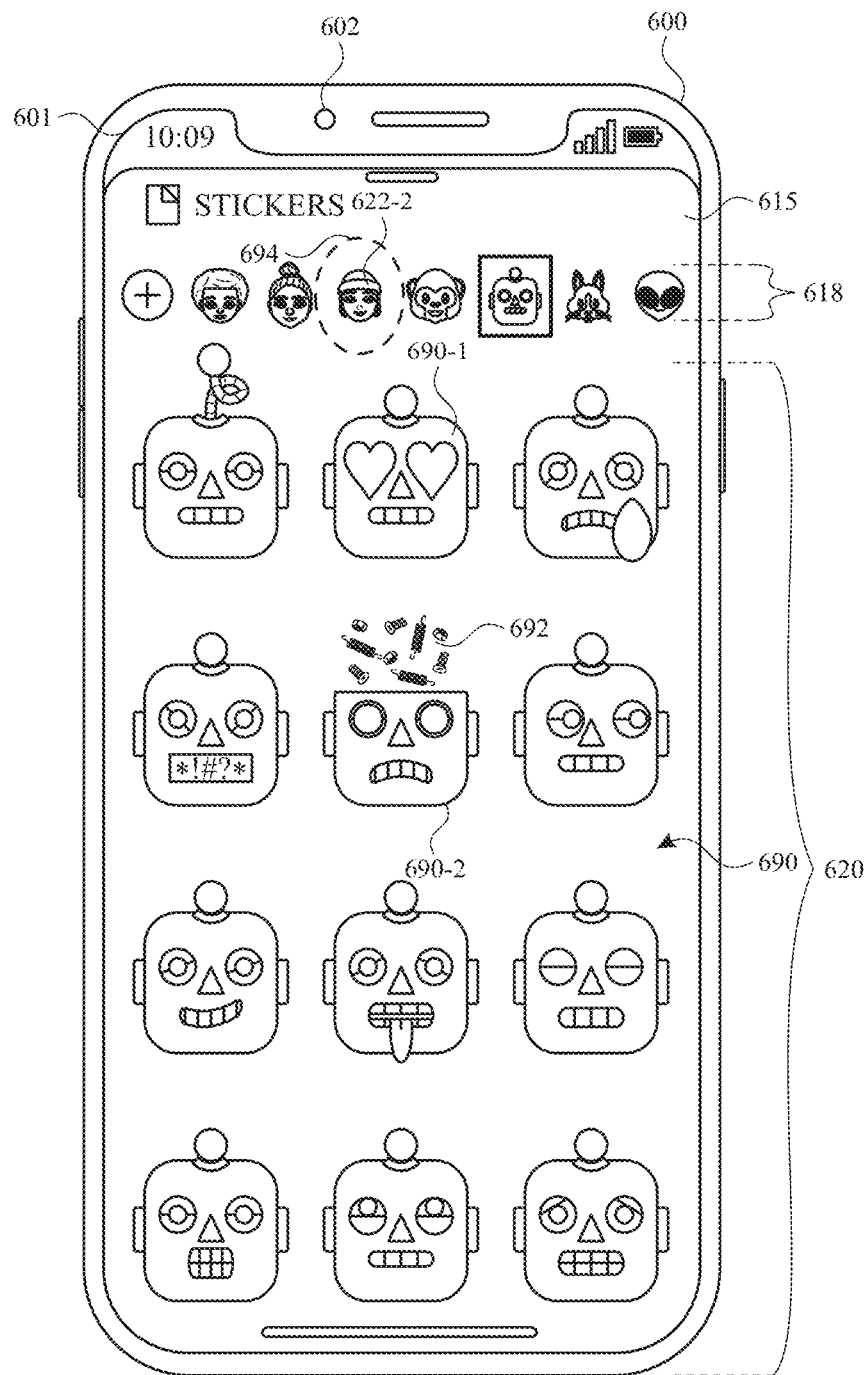
Figure 6V:
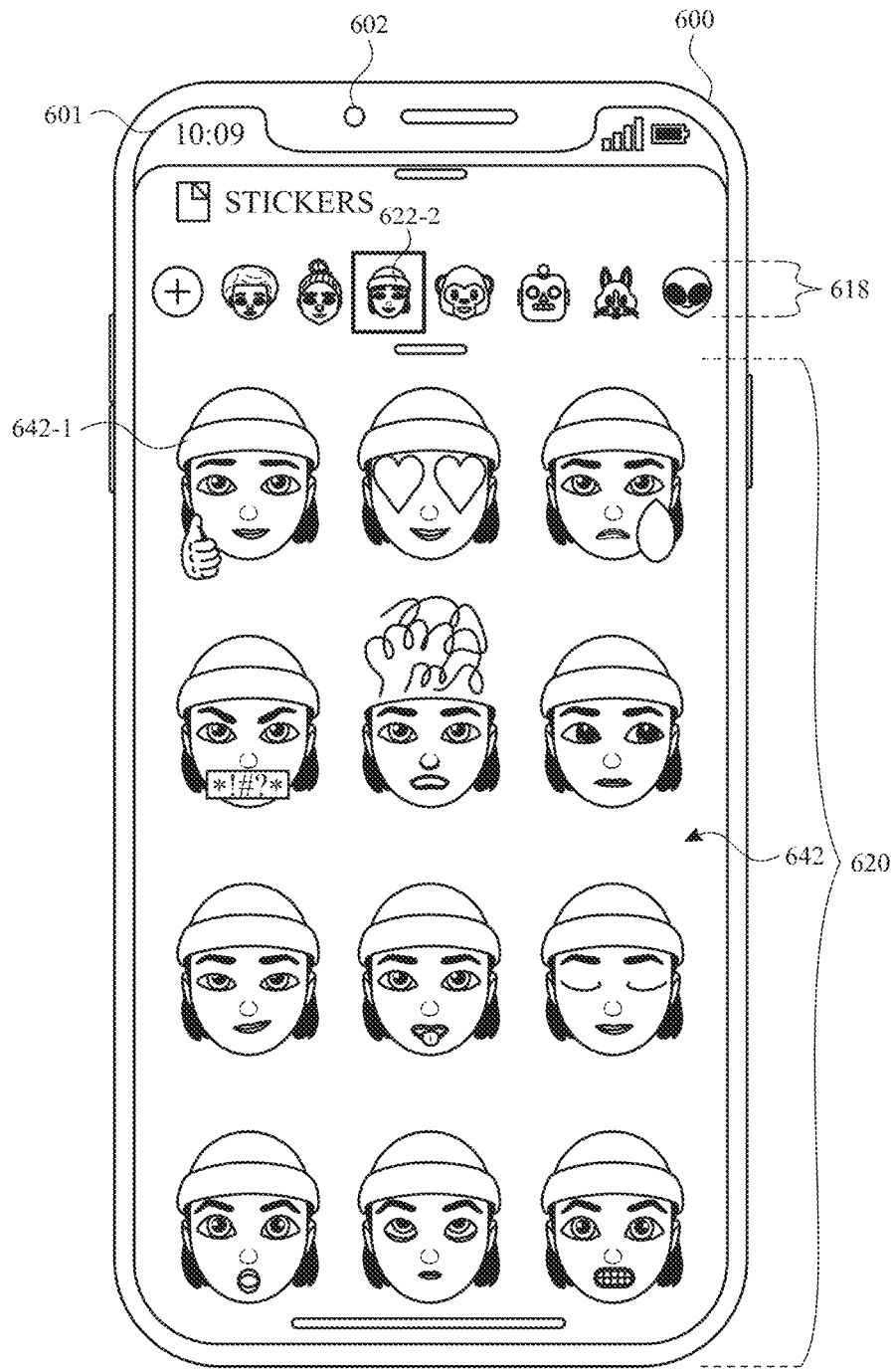

FIGS. 6I-6V illustrate messaging user interface 603 for embodiments in which the messages correspond to a message conversation with second recipient 607-2. In FIG. 6I, device 600 displays avatar keyboard 605 having thumbs up beanie sticker 642-1 displayed in place of monkey sticker 612-1. Additionally, device 600 updates display of sticker application affordance 614 to include representation 614-2 of beanie avatar 636. In some embodiments, representation 614-2 has an appearance of the recently used thumbs up beanie sticker 642-1. In some embodiments, representation 614-2 has an appearance of other stickers available for the recently created beanie avatar 636.

In FIG. 6I, device 600 detects input 646 on thumbs up beanie sticker 642-1 and, in response, displays sticker preview interface showing beanie sticker preview 650. In some embodiments, a user can perform a tap-and-hold gesture on beanie sticker preview 650 to generate a peeled appearance of beanie sticker preview 650 that can then be dragged to message region 603-1 to add the beanie sticker to the message conversation. In some embodiments, a user can select send affordance 652 (e.g., via input 654) to add thumbs up beanie sticker 642-1 to the message conversation as shown in FIG. 6K.

In FIG. 6K, device 600 detects input 656 on sticker application affordance 614 and, in response, displays sticker user interface 615. In some embodiments, device 600 ceases display of emojis 609, and displays stickers in emoji region 608 (e.g., beanie stickers 642 corresponding to beanie avatar 636).

In FIG. 6L, device 600 displays sticker user interface 615 having beanie stickers 642. In the embodiment shown in FIG. 6L, device 600 has previously displayed sticker user interface (e.g., in FIG. 6C) and, therefore, does not initially display region 618. Additionally, device 600 has generated a second user-created avatar (e.g., as a result of receiving a series of inputs to access and interact with the avatar creation user interface in a manner similar to that discussed above with respect to FIGS. 6E-6G), as will soon be apparent. In response to drag input 658, device scrolls beanie stickers 642 and, in FIG. 6M, displays region 618 with representations 622, including beanie representation 622-2 having a selected state and woman representation 622-3 corresponding to a set of woman stickers based on a user-created woman avatar.

In FIG. 6M, device 600 detects input 660 on creation affordance 626 to initiate a process for creating a boy avatar. The process for creating a boy avatar is similar to the processes described above for creating an avatar and, for the sake of brevity, is not repeated here. After device 600 creates the boy avatar, it displays sticker user interface 615 as shown in FIG. 6N. FIG. 6N shows region 618 updated to include boy representation 622-4 having a selected state, and sticker region 620 updated to include boy stickers 662, which include a set of poses that are based on the new boy avatar.

In FIG. 6N, device 600 detects scroll input 664 and, in response, scrolls sticker region 620 to display additional boy stickers 662 and edit affordance 665, as shown in FIG. 6O.

In FIG. 6O, device 600 detects input 668 on edit affordance 665 and, in response, displays avatar editing user interface 670 (similar to avatar creation user interface 632) showing boy avatar 672 and a set of selectable hairstyle options 674 that can be selected to modify an appearance of boy avatar 672, as shown in FIG. 6P.

In FIG. 6P, device 600 detects input 676 on afro hairstyle option 674-1 and, in response, modifies boy avatar 672 to have an afro hairstyle, as shown in FIG. 6Q. Device 600 detects input 678 on done affordance 680 in FIG. 6Q and, in response, exits avatar editing user interface 670 and displays messaging user interface 603 with updated sticker user interface 615, as shown in FIG. 6R.

In FIG. 6R, device 600 displays sticker user interface 615, which shows boy stickers 662 updated with the afro hairstyle. Device 600 detects drag input 682 on handle 684 and, in response, expands sticker user interface 615 as shown in FIG. 6S.

FIG. 6S shows additional boy stickers 662 updated with the afro hairstyle. Device 600 detects drag input 686 (e.g., a downward drag) and, in response, scrolls stickers 662 to display additional boy stickers 662, including thumbs up boy sticker 662-1 and heart-eyes boy sticker 662-2, as shown in FIG. 6T.

In FIG. 6T, sticker user interface 615 shows region 618, including boy representation 622-4, which is updated to include the afro hairstyle. Device 600 detects input 688 on robot representation 622-5 and, in response, selects robot representation 622-5 and replaces boy stickers 662 with robot stickers 690, as shown in FIG. 6U. In some embodiments, robot representation 622-5 can be selected, and the corresponding robot stickers 690 displayed, in response to one or more horizontal swipe gestures on sticker region 620.

In FIG. 6U, device 600 displays robot stickers 690 having an appearance based on a robot avatar, which, as previously discussed, is a predefined avatar that is based on a non-human character. In some embodiments, stickers that are based on such avatars (e.g., predefined avatars or avatars based on non-human characters) include some stickers with poses that match poses of stickers based on user-created avatars or avatars based on human characters. For example, robot stickers 690 include various poses, with some robot stickers having the same poses as some of the boy stickers 662. For example, heart-eyes robot sticker 690-1 has the same pose as heart-eyes boy sticker 662-2 (e.g., both stickers include a smiling facial expression with hearts over the eyes). It should be noted that robot sticker 690-1 and boy sticker 662-2 both have the same pose even though they have different appearances (e.g., robot sticker 690-1 has an appearance of a robot, whereas boy sticker 662-2 has an appearance of a boy). Furthermore, in some embodiments, stickers based on predefined avatars or avatars based on non-human characters optionally exclude certain poses that are included in stickers based on user-created avatars or avatars based on human-characters. For example, robot stickers 690 do not include a thumbs up pose. In some embodiments, the excluded sticker poses are those that include a human feature other than a head (e.g., a hand).

In some embodiments, sets of stickers that are based on predefined avatars or avatars based on non-human characters all have stickers with the same or similar poses. For example, all such avatars include a heart-eyes sticker and exclude a thumbs up sticker. In some embodiments, certain stickers have a same pose for different sticker sets, but are customized to the particular avatar upon which the sticker's appearance is based. For example, robot stickers 690 include mind-blown robot sticker 690-2, which is similar to corresponding poses in other sticker sets (e.g., FIG. 6E shows mind-blown monkey sticker 624-1 for a monkey, and FIG. 6T shows a mind-blown sticker for boy avatar), but the sticker has a custom appearance that corresponds to the characteristics of the avatar upon which the sticker's appearance is based. For example, mind-blown robot sticker 690-2 includes an appearance that shows mechanical parts 692 such as cogs, bolts, and springs exploding from the robot's head. In some embodiments, other avatars of a similar type (e.g., predefined, based on non-human character) can include similar poses but with different custom appearances based specifically on the characteristics of the avatar (e.g., a mind-blown unicorn sticker with glitter dust).

In some embodiments, stickers that are based on user-created avatars or avatars based on a non-human character all have stickers with the same poses. For example, the sticker poses shown for beanie stickers 642 are the same as the sticker poses shown for boy stickers 662 (e.g., same poses, but different appearances based on the different avatars).

In FIG. 6U, device 600 detects input 694 on beanie representation 622-2 and, in response, displays beanie representation 622-2 selected in region 618, and beanie stickers 642 replacing robot stickers 690 in sticker region 620, as shown in FIG. 6V. Beanie stickers 642 include the same poses as boy stickers 662, including thumbs up beanie sticker 642-1 corresponding to thumbs up boy sticker 662-1 and heart-eyes beanie sticker 642-2 corresponding to heart-eyes boy sticker 662-2.

FIG. 7 is a flow diagram illustrating a method for displaying avatars in a stickers application user interface using an electronic device in accordance with some embodiments. Method 700 is performed at a device (e.g., 100, 300, 500, 600) with a display and an input device. Some operations in method 700 are, optionally, combined, the orders of some operations are, optionally, changed, and some operations are, optionally, omitted.

As described below, method 700 provides an intuitive way for displaying avatars in a stickers application user interface. The method reduces the cognitive burden on a user for displaying avatars in a stickers application user interface, thereby creating a more efficient human-machine interface. For battery-operated computing devices, enabling a user to display avatars in a stickers application user interface faster and more efficiently conserves power and increases the time between battery charges.

An electronic device (e.g., 600) receives (702) a request (e.g., 616; 656) (e.g., selection of a user interface object (e.g., an affordance) associated with displaying the sticker user interface) (e.g., selection of a representation of a set of stickers) (e.g., a gesture on a set of stickers to display the representations of sets of stickers), via the one or more input devices (e.g., 601), to display a sticker user interface (e.g., 615) (e.g., a single user interface displaying stickers that may be selected for use in an application such as, for example, a messaging application).

In response to receiving the request to display the sticker user interface, the electronic device (e.g., 600) displays (704), via the display device (e.g., 601), a sticker user interface (e.g., 615) that includes representations (e.g., 622) of a plurality of sets of stickers based on user-created avatars (e.g., an avatar that can be created and, optionally, customized by the user). In some embodiments user-created avatars include customizable (e.g., selectable or configurable) avatar features. In some embodiments, a user-created avatar includes an avatar modeled to represent a human character, and the customizable avatar features generally correspond to physical traits of a human. For example, such an avatar may include a representation of a person having various physical, human features or characteristics (e.g., an older woman with a dark skin tone and having long, straight, brown hair). Such an avatar would also include a representation of a person having various non-human characteristics that are typically associated with an appearance of a human (e.g., cosmetic enhancements, hats, glasses, etc.). A user-created avatar does not include an avatar that is generated without input from the user to select features of the avatar.

In some embodiments, the representations of a plurality of sets of stickers based on user-created avatars are displayed in a first region (e.g., 618) (e.g., a sticker carousel) of the user interface. In some embodiments, the first region further includes one or more representations (e.g., 622-1) of sets of stickers based on avatars that are not user-created avatars (e.g., an avatar that cannot be created or customized by the user). In some embodiments, the sticker carousel can be scrolled (e.g., horizontally) (e.g., in response to a gesture such as, for example, a swipe gesture) to display additional representations of sets of stickers and other options displayed in the sticker carousel. In some embodiments, avatars that cannot be created or customized by the user include avatars that are modeled to represent non-human characters. In some embodiments, avatars modeled to represent a non-human character include, for example, a non-human character that is an anthropomorphic construct (e.g., a stylized animal, a stylized robot, or a stylization of a normally inanimate or normally inhuman object)). In some embodiments, such avatars include an avatar having customizable (e.g., selectable or configurable) avatar features that generally correspond to non-human traits and features. In some embodiments, such an avatar would not include a representation of a person having various physical, human features or characteristics (e.g., a young child having a round face and short, wavy hair), even if some of the customizable features of the human avatar include non-human characteristics (e.g., cosmetic enhancements, hats, glasses, or other inhuman objects that are typically associated with an appearance of a human). Displaying the first region having one or more representations of sets of stickers based on avatars that are not user-created avatars reduces the number of inputs to perform the technical task of locating and selecting stickers for display in an application. Reducing the number of inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first region further includes a creation user interface object (e.g., 626) (e.g., a creation affordance) that, when selected, displays a user interface (e.g., 632) for creating a user-created avatar (e.g., a new user-created avatar). Displaying such a creation user interface object reduces the number of inputs needed to access a user interface to perform the technical task of generating an avatar. Reducing the number of inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after detecting generation of a new user-created avatar, the electronic device displays, in the first region, a representation (e.g., 622-4) of a set of stickers based on the new user-created avatar.

In some embodiments, displaying the sticker user interface (e.g., 615) further includes, in accordance with a determination that the request to display the sticker user interface is a first received request (e.g., 616) to display the sticker user interface (e.g., the first time the electronic device receives the request to display the sticker user interface), displaying the sticker user interface having the first region (e.g., 618). In some embodiments, displaying the sticker user interface further includes, in accordance with a determination that the request to display the sticker user interface is a subsequent received request (e.g., 656) to display the sticker user interface (e.g., not the first time the electronic device receives the request to display the sticker user interface), displaying the sticker user interface without the first region (e.g., see sticker user interface 615 in FIG. 6L).

In some embodiments, while displaying the sticker user interface without the first region (e.g., see sticker user interface 615 in FIG. 6L) (e.g., the sticker user interface is displayed showing the stickers, but not the representations of the sets stickers), the electronic device receives a first input (e.g., 658). In some embodiments, in response to detecting the first input, in accordance with a determination that the first input satisfies a first set of criteria (e.g., the input includes a movement in a downward direction and originates on the displayed stickers), the electronic device displays the first region (e.g., updating the sticker user interface to include the first region) (e.g., see FIG. 6M).

In some embodiments, the set of stickers based on the first avatar (e.g., beanie avatar 636) have a first set of sticker poses (e.g., poses shown in stickers 642) and the set of stickers based on the second avatar have the first set of sticker poses (e.g. poses shown in stickers 662) (e.g., all sets of stickers that are based on user-created avatars have the same poses and facial expressions, but have different appearances that are based on the specific user-created avatar upon which each set of stickers is based). In some embodiments, a respective one of the sets of stickers based on user-created avatars is displayed in response to detecting a selection of a respective one of the representations of a plurality of sets of stickers based on user-created avatars. Displaying a set of stickers in response to detecting a selection of a representation of a set of stickers based on a user-created avatar reduces the number of inputs to perform the technical task of generating a sticker. Reducing the number of inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the sticker user interface (e.g., 615) further includes displaying a representation (e.g., 662-5) of a set of stickers based on a first predefined avatar (e.g., robot avatar) (e.g., predefined or preexisting avatars, avatars that are not created by the user, avatars that cannot be created by the user). In some embodiments, avatars that cannot be created or customized by the user include avatars that are modeled to represent non-human characters. In some embodiments, avatars modeled to represent a non-human character include, for example, a non-human character that is an anthropomorphic construct (e.g., a stylized animal, a stylized robot, or a stylization of a normally inanimate or normally inhuman object)). In some embodiments, such avatars include an avatar having customizable (e.g., selectable or configurable) avatar features that generally correspond to non-human traits and features. In some embodiments, such an avatar would not include a representation of a person having various physical, human features or characteristics (e.g., a young child having a round face and short, wavy hair), even if some of the customizable features of the human avatar include non-human characteristics (e.g., cosmetic enhancements, hats, glasses, or other inhuman objects that are typically associated with an appearance of a human). In some embodiments, the set of stickers (e.g., 690) based on the first predefined avatar have a second set of sticker poses (e.g., see stickers 690 in FIG. 6U) (e.g., each of the sets of stickers for the predefined avatars have a set of poses and facial expressions) that are different than the first set of sticker poses (e.g., see stickers 662 in FIG. 6T) (e.g., the collection of poses and facial expressions for the sets of stickers for the predefined avatar are different from the collection of poses and facial expressions for the sets of stickers for the user-created avatar). In some embodiments, a subset of the poses and facial expressions for the sets of stickers for the predefined avatars are the same as a subset of the poses and facial expressions for the sets of stickers for the user-created avatars (e.g., some of the sticker poses and facial expressions are common to the sets of stickers for the predefined avatars and the sets of stickers for the user-created avatars). In some embodiments, a subset of the poses and facial expressions for a respective set of stickers for the predefined avatars are the same as a subset of the poses and facial expressions for the other sets of stickers for the predefined avatar (e.g., some of the sticker poses and facial expressions are common to different sets of stickers for the predefined avatars). In some embodiments, the set of stickers based on the first non-user-created avatar is displayed in response to detecting a selection of the representation of the set of stickers based on the first non-user-created avatar.

In some embodiments, the set of stickers (e.g., 690) based on the first predefined avatar (e.g., an avatar representing an animated character that was not created by the user such as a unicorn avatar) includes a sticker having a first sticker pose (e.g., mind-blown robot sticker 690-2) (e.g., a sticker depicting an exploding head pose/expression). In some embodiments, displaying the sticker user interface further includes displaying a representation of a set of stickers based on a second predefined avatar (e.g., see stickers 624 in FIG. 6C) (e.g., an avatar representing an animated character that was not created by the user such as a robot avatar, an avatar that cannot be created or customized by the user). In some embodiments, avatars that cannot be created or customized by the user include avatars that are modeled to represent non-human characters. In some embodiments, avatars modeled to represent a non-human character include, for example, a non-human character that is an anthropomorphic construct (e.g., a stylized animal, a stylized robot, or a stylization of a normally inanimate or normally inhuman object)). In some embodiments, such avatars include an avatar having customizable (e.g., selectable or configurable) avatar features that generally correspond to non-human traits and features. In some embodiments, such an avatar would not include a representation of a person having various physical, human features or characteristics (e.g., a young child having a round face and short, wavy hair), even if some of the customizable features of the human avatar include non-human characteristics (e.g., cosmetic enhancements, hats, glasses, or other inhuman objects that are typically associated with an appearance of a human). In some embodiments, the set of stickers based on the second predefined avatar includes a sticker having the first sticker pose (e.g., see mind-blown monkey sticker 624-1 in FIG. 6C). In some embodiments, the sticker having the first sticker pose for the first predefined avatar includes a graphical element (e.g., mechanical parts 692) (e.g., glitter dust or cogs) corresponding to the first predefined avatar that is not included in the sticker having the first sticker pose for the second predefined avatar. In some embodiments, the sets of stickers for the predefined avatars include stickers that are unique to the set of stickers and incorporate a set of characteristics that are unique to the predefined avatar. For example, in the case of a "mind blown" unicorn sticker, the sticker has the appearance of a unicorn head with a top portion of the unicorn's head removed and displaying an exploded state of the unicorn's brain that includes glitter dust emanating from the unicorn brain. The appearance of the glitter dust in the "mind blown" sticker is unique to the unicorn stickers and corresponds to the mystical characteristics of the unicorn avatar. As another example, in the case of a "mind blown" robot sticker, the sticker has the appearance of a robot head with the top removed and displaying an exploded state of the robot's brain that includes cogs springing from the robot brain. The appearance of the cogs in the "mind blown" sticker is unique to the robot stickers and corresponds to the mechanical characteristics of the robot avatar.

In some embodiments, the first set of sticker poses includes at least one sticker pose (e.g., thumbs up sticker 662-1) (e.g., a sticker pose that includes hands) not included in the second set of sticker poses. In some embodiments, the excluded sticker poses include poses that display body parts other than a head. Stickers having such poses may include, for example, a "thumbs up" sticker, a "fist bump" sticker, a "hug" sticker, etc.

In some embodiments, displaying the sticker user interface further includes displaying a keyboard display region (e.g., 605), the keyboard display region including a plurality of emojis (e.g., 609) and the representations of the plurality of sets of stickers based on user-created avatars (e.g., sticker region 610). In some embodiments, the electronic device detects selection (e.g., 656) of one of the representations (e.g., 614-2 in FIG. 6K) of the plurality of sets of stickers based on user-created avatars. In some embodiments, in response to detecting the selection of the one of the representations of the plurality of sets of stickers based on user-created avatars, the electronic device displays, in the keyboard display region, a plurality of stickers (e.g., 642) in a set of stickers based on user-created avatars. In some embodiments, displaying the plurality of stickers in the keyboard display region includes ceasing to display the emojis. In some embodiments, the representations of the sets of stickers are displayed in a different location in the keyboard display region when the plurality of stickers are displayed. Displaying, in response to detecting the selection of the one of the representations of the plurality of sets of stickers based on user-created avatars, a plurality of stickers in a set of stickers based on user-created avatars in the keyboard display region reduces the number of inputs to perform the technical task of generating a sticker for communication in a messaging application (e.g., by reducing the number of menu options needed to locate and select a desired sticker). Reducing the number of inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Displaying (704) the sticker user interface (e.g., 615) includes, in accordance with a determination that the user has created a first set of two or more user-created avatars including a first avatar (e.g., beanie avatar 636) (e.g., an avatar that is created by the user to model a man) and a second avatar (e.g., an avatar that is created by the user to model a woman), displaying (706) (e.g., concurrently displaying) representations (e.g., 622) of a first plurality of sets of stickers (e.g., static representations of avatars upon which the corresponding sets of stickers are based such as, for example, representations of the user-created avatars). The representations of the first plurality of sets of stickers include a representation (e.g., 622-2) of a set of stickers based on the first avatar (e.g., a static representation of the first avatar having a static pose and an appearance based on the first avatar including features used to create the first avatar (e.g., a hat, sunglasses, hair style/color, skin tone, etc.)) and a representation (e.g., 622-3) of a set of stickers based on the second avatar (e.g., a static representation of the second avatar having a static pose and an appearance based on the second avatar including features used to create the second avatar (e.g., a hat, sunglasses, hair style/color, skin tone, etc.)). Displaying representations of sets of stickers when a set of avatars has been created reduces the number of inputs to perform the technical task of generating and selecting a sticker for communication in a messaging application (e.g., by reducing the number of menu options needed to locate and select a desired sticker). Reducing the number of inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Displaying (704) the sticker user interface (e.g., 615) includes, in accordance with a determination that the user has created a second set of two or more user-created avatars including a third avatar (e.g., boy avatar 672) not included in the first set of two or more user-created avatars (e.g., an avatar that is created by the user to model a child), displaying (708) (e.g., concurrently) representations of a second plurality of sets of stickers that is different from the representations of the first plurality of sets of stickers. In some embodiments, the representations of the second plurality of sets of stickers include a representation (e.g., 622-4) of a set of stickers based on the third avatar that was not included in the representations of the first plurality of sets of stickers (e.g., a static representation of the third avatar having a static pose and an appearance based on the third avatar including features used to create the third avatar (e.g., a hat, sunglasses, hair style/color, skin tone, etc.)). In some embodiments, the sets of stickers based on the respective avatars and the corresponding representations of the sets of stickers are generated (e.g., automatically (e.g., without subsequent user input after the avatar is created)) in response to detecting generation of the respective avatars (e.g., the first, second, and third avatars). In some embodiments, the representations of the first and/or second plurality of sets of stickers include representations of avatars that are not user-created. Displaying a different representation of sets of stickers when a new avatar has been created reduces the number of inputs to perform the technical task of generating and selecting a sticker for communication in a messaging application (e.g., by reducing the number of menu options needed to locate and select a desired sticker). Reducing the number of inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device detects a selection (e.g., 694) of the representation of the set of stickers based on the first avatar (e.g., beanie representation 622-2 in FIG. 6U) (e.g., a selection of one of the representations of a set of stickers based on the first, second, or third avatar). In some embodiments, the representation is selected by default (e.g., upon display of the sticker user interface). In some embodiments, the representation is selected in response to a user input. In some embodiments, in response to detecting the selection of the representation of the set of stickers based on the first avatar, the electronic device concurrently displays, with the selected representation (e.g., 622-2), a plurality of stickers (e.g., 642) in the set of stickers based on the first avatar (e.g., graphical objects that have an appearance based on an avatar (e.g., a user-created avatar) and having different poses and facial expressions), the plurality of stickers having an appearance based on the first avatar. In some embodiments, the stickers correspond to a selected one of the representations (e.g., the stickers have an appearance based on the avatar associated with the selected representation). When a different representation is selected, the stickers associated with the previously selected representation are replaced with a set of stickers associated with the newly selected representation. In some embodiments, the stickers include additional features that are displayed to modify an appearance of the avatar in order to convey a particular expression, emotion, sentiment, etc. For example, stickers can include a heart over the avatar's eyes to convey love or a tear under the avatar's eye(s) to convey sadness. In some embodiments, the stickers include slight modifications to the appearance of the avatar, such as altering a portion of the avatar while still retaining an overall recognizable representation of the avatar. An example of one such modification is a "mind blown" sticker in which the sticker is a representation of the avatar with a top portion of the avatar's head removed and displaying an exploded state of the avatar's brain.

In some embodiments, the plurality of stickers in the set of stickers based on the first avatar includes a first sticker (e.g., 642-1) having a first pose (e.g., thumbs up pose) and an appearance based on the first avatar, and a second sticker (e.g., 642-2) having a second pose (e.g., heart eyes) different from the first pose and an appearance based on the first avatar (e.g., beanie avatar 636) (e.g., the stickers in the set of stickers have a set of different poses and an appearance based on the first avatar). In some embodiments, while displaying the plurality of stickers in the set of stickers based on the first avatar, the electronic device detects a selection of the representation (e.g., 622-4) of the set of stickers based on the second avatar. In some embodiments, in response to detecting the selection of the representation of the set of stickers based on the second avatar, the electronic device ceases to display the plurality of stickers in the set of stickers based on the first avatar. In some embodiments, in response to detecting the selection of the representation of the set of stickers based on the second avatar, the electronic device displays the plurality of stickers (e.g., 662) in the set of stickers based on the second avatar. In some embodiments, the set of stickers based on the second avatar includes a third sticker (e.g., 662-1) having the first pose (e.g., thumbs up pose) and an appearance based on the second avatar (e.g., boy avatar 672), and a fourth sticker (e.g., 662-2) having the second pose (e.g., heart eyes) and an appearance based on the second avatar (e.g., the first set of stickers having the appearance of the first avatar and the set of poses are replaced with a second set of stickers having the same set of poses, but an appearance that is instead based on the second avatar). Displaying stickers having same sets of poses, but different appearances based on the respective avatar (e.g., a user-created avatar), allows a user to quickly and easily compose messages to express a known sentiment that is based on the poses, while still respecting the user's personal and artistic preferences with stickers of avatars having different appearances. This provides an improved control scheme for generating custom messages, which can require fewer inputs to generate the custom messages than would be necessary if a different control scheme were used (e.g., a control scheme requiring generation of individual, custom poses). Moreover, this type of control can be done in real time during, for example, a conversation such as a text conversation or a video conversation, whereas manual control to build a sticker would have to be done before the conversation started or after it had ended. Reducing the number of inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, one or more of the plurality of stickers are animated (e.g., the stickers are shown winking, waving, making facial expressions, etc.).

In some embodiments, after displaying the sticker user interface, the electronic device receives a request (e.g., 638) to redisplay the sticker user interface. In some embodiments, in response to receiving the request to redisplay the sticker user interface, the electronic device redisplays, via the display device, the sticker user interface (e.g., sticker user interface 615 is redisplayed in FIG. 6H). In some embodiments, redisplaying the sticker user interface includes in accordance with a determination that the user has created a fourth avatar (e.g., 636) not included in the first or second sets of two or more user-created avatars (e.g., the user has created a new avatar), displaying (e.g., concurrently) representations (e.g., representations 622 shown in FIG. 6H) of a third plurality of sets of stickers. In some embodiments, the representations of the third plurality of sets of stickers includes a representation (e.g., 622-2) of a set of stickers based on the fourth avatar that was not included in the representations of the first or second plurality of sets of stickers (e.g., as another example, sticker user interface 615 is redisplayed in FIG. 6N, after receiving a series of inputs to create boy avatar 672, and includes newly displayed boy representation 622-4 and boy stickers 662). In some embodiments, displaying the representation of the set of stickers includes concurrently displaying at least a portion of the set of stickers based on (e.g., having an appearance based on) the fourth avatar. For example, when the sticker UI is redisplayed, the representation of the set of stickers based on the fourth avatar is selected, and at least a portion of the stickers in the set are displayed having different appearances based on the appearance of the fourth avatar. Redisplaying the sticker user interface to display stickers after a user has created an avatar reduces the number of inputs to perform the technical task of generating a sticker (e.g., for sending in a message conversation). Reducing the number of inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the representation (e.g., 622-2) of the set of stickers based on the first avatar has an appearance of one of the stickers in the set of stickers based on the first avatar. In some embodiments, the representation (e.g., 622-4) of the set of stickers based on the second avatar has an appearance of one of the stickers in the set of stickers based on the second avatar. In some embodiments, the representation of the set of stickers based on the third avatar has an appearance of one of the stickers in the set of stickers based on the third avatar.

In some embodiments, displaying the sticker user interface further includes displaying an edit user interface object (e.g., 665) (e.g., edit affordance) that, when selected, displays an edit interface (e.g., 670) for editing a respective user-created avatar.

In some embodiments, displaying the sticker user interface further includes displaying a plurality of stickers (e.g., 662) in a set of stickers based on the respective user-created avatar (e.g., 672), wherein the plurality of stickers have an appearance that is based on a first appearance of the respective user-created avatar (e.g., boy stickers 662 in FIG. 6O). In some embodiments, displaying the sticker user interface further includes detecting a series of inputs (e.g., 668, 676, 678) corresponding to a request to edit the respective user-created avatar from the first appearance to a second appearance (e.g., from a first hairstyle to a second hairstyle) (e.g., a series of inputs that include selection of the edit affordance and interaction with the edit interface to edit the respective user-created avatar). In some embodiments, displaying the sticker user interface further includes detecting a request (e.g., 678) to display the plurality of stickers in the set of stickers based on the respective user-created avatar (e.g., exiting the edit interface) (e.g., detecting a selection of a representation of the set of stickers based on the respective user-created avatar). In some embodiments, displaying the sticker user interface further includes, in response to detecting the request to display the plurality of stickers in the set of stickers based on the respective user-created avatar, displaying the plurality of stickers (e.g., stickers 662 in FIG. 6R) in the set of stickers based on the respective user-created avatar. In some embodiments, stickers of the set of stickers have an updated appearance that is based on the second appearance of the respective user-created avatar (e.g., stickers 662 in FIG. 6R having the second hairstyle) (e.g., the stickers in the set of stickers based on the respective user-created avatar are changed/updated when the respective user-created avatar is changed/updated). In some embodiments, an appearance of a representation of the set of stickers based on the respective user-created avatar is updated when the respective user-created avatar is changed/updated. Automatically updating the appearance of a representation of a sticker after a user has created/updated the avatar reduces the number of inputs to perform the technical task of generating a sticker. Reducing the number of inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, editing the respective user-created avatar using the edit interface (e.g., 670) changes an appearance of the respective user-created avatar in the sticker user interface and in user interfaces other than the sticker user interface (e.g., the edit interface changes the appearance of the respective user-created avatar throughout the operating system, including instances in which the respective user-created avatar is displayed in different applications such as, for example, a camera application, a video communication application, a messaging application, a media display application, etc.). For example, in a camera application and a video communication application, a representation of the respective user-created avatar can be displayed in the field of view of the camera. When the appearance of the respective user-created avatar is changed in the sticker user interface, the changes to the appearance of the respective user-created avatar are also applied to the representation of the respective user-created avatar in the camera application and video communication application. In a messaging application, a participant in a message conversation can be represented using the respective user-created avatar. When the appearance of the respective user-created avatar is changed in the sticker user interface, the changes to the appearance of the respective user-created avatar are also applied to the respective user-created avatar in the message conversation of the messaging application. A media display application such as a photo-viewing application or a video-viewing application, can include a representation of the respective user-created avatar in the media item. When the appearance of the respective user-created avatar is changed in the sticker user interface, the changes to the appearance of the respective user-created avatar are also applied to the representation of the respective user-created avatar in the media item viewed in the media display application. Updating an appearance of an avatar throughout various user interfaces, in response to detecting changes made to an avatar in the sticker user interface reduces the number of inputs to perform the technical task of generating or updating an avatar for use in different applications. Reducing the number of inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 700 (e.g., FIG. 7) are also applicable in an analogous manner to the methods described below. For example, methods 800, 1000, 1200, 1300, 1500, 1700, and 1800 optionally includes one or more of the characteristics of the various methods described above with reference to method 700. For example, a sticker can be displayed and used in a user interface in a manner similar to that described above. For brevity, these details are not repeated below.

FIG. 8 is a flow diagram illustrating a method for displaying avatars in an avatar keyboard application user interface using an electronic device in accordance with some embodiments. Method 800 is performed at a device (e.g., 100, 300, 500, 600) with a display and one or more input devices. Some operations in method 800 are, optionally, combined, the orders of some operations are, optionally, changed, and some operations are, optionally, omitted.

As described below, method 800 provides an intuitive way for displaying avatars in an avatar keyboard application user interface. The method reduces the cognitive burden on a user for displaying avatars in an avatar keyboard application user interface, thereby creating a more efficient human-machine interface. For battery-operated computing devices, enabling a user to display avatars in an avatar keyboard application user interface faster and more efficiently conserves power and increases the time between battery charges.

The electronic device (e.g., 600) displays (802), via the display device (e.g., 601), a content creation user interface (e.g., 603) (e.g., a document creation user interface or a message compose user interface) (e.g., a single interface screen).

While displaying the content creation user interface (e.g., 603), the electronic device (e.g., 600) receives (804), via the one or more input devices, a request (e.g., 604) to display a first display region (e.g., 605) (e.g., a keyboard display region) (e.g., an emoji keyboard display region) (e.g., a sticker keyboard display region). In some embodiments, the first display region includes a plurality of graphical objects (e.g., 612; 609) (e.g., stickers) (e.g., emoji) that correspond to predefined content for insertion into the content creation user interface.

Displaying (804) the first display region (e.g., 605), in response to receiving the request, includes: in response to receiving the request, displaying (806), via the display device (e.g., 601), the first display region including a first subset of graphical objects (e.g., 612) (e.g., stickers) (e.g., a subset of the plurality of graphical objects in the first display region) that have an appearance based on a set of avatars (e.g., avatars such as, for example, an avatar modeled to represent a human character, an avatar modeled to represent a non-human character, an avatar that can be created and/or customized by the user, and an avatar that cannot be created or customized by the user) available at the electronic device (e.g., 600) (e.g., stickers that have an appearance based on a respective avatar and having different poses and facial expressions). In some embodiments, the stickers include additional features that are displayed to modify the respective avatar in order to convey a particular expression, emotion, sentiment, etc. For example, stickers can include a heart over the avatar's eyes to convey love or a tear under the avatar's eye(s) to convey sadness. In some embodiments, the stickers include slight modifications to the appearance of the avatar, such as altering a portion of the avatar while still retaining an overall recognizable representation of the avatar. An example of one such modification is a "mind blown" sticker in which the sticker is a representation of the avatar with a top portion of the avatar's head removed and displaying an exploded state of the avatar's brain. In some embodiments avatars modeled to represent a human include customizable (e.g., selectable or configurable) avatar features that generally correspond to physical traits of a human. For example, such an avatar may include a representation of a person having various physical, human features or characteristics (e.g., an older woman with a dark skin tone and having long, straight, brown hair). Such an avatar would also include a representation of a person having various non-human characteristics that are typically associated with an appearance of a human (e.g., cosmetic enhancements, hats, glasses, etc.). In some embodiments, such an avatar would not include an anthropomorphic construct such as a stylized animal, a stylized robot, or a stylization of a normally inanimate or normally inhuman object. In some embodiments, avatars modeled to represent a non-human character include, for example, a non-human character that is an anthropomorphic construct (e.g., a stylized animal, a stylized robot, or a stylization of a normally inanimate or normally inhuman object)). In some embodiments, such avatars include an avatar having customizable (e.g., selectable or configurable) avatar features that generally correspond to non-human traits and features. In some embodiments, such an avatar would not include a representation of a person having various physical, human features or characteristics (e.g., a young child having a round face and short, wavy hair), even if some of the customizable features of the human avatar include non-human characteristics (e.g., cosmetic enhancements, hats, glasses, or other inhuman objects that are typically associated with an appearance of a human).

Displaying (806) the first display region (e.g., 605) including a first subset (e.g., 610) of graphical objects (e.g., 612) that have an appearance based on a set of avatars available at the electronic device includes, in accordance with a determination that the set of avatars includes an avatar of a first type (e.g., an avatar that can be created and/or customized by a user of the electronic device) (e.g., an avatar modeled to represent a human character), displaying (808) one (e.g., one or more) of the graphical objects (e.g., 642-1 in FIG. 6I) in the first subset having an appearance based on the avatar of the first type (e.g., beanie avatar 636). In some embodiments, when the set of avatars includes one that is customizable, creatable, and/or modeled to represent a human character, the displayed stickers include one or more stickers that are derived from (e.g., having an appearance based on) the avatar. In some embodiments, these are referred to as stickers of a first type. In some embodiments, the stickers of a first type include stickers that are suggested by the electronic device based on a history of usage of the stickers of the first type (e.g., suggesting stickers that have been used recently and/or frequently).

Displaying (806) the first display region (e.g., 605) including a first subset of graphical objects (e.g., 612) that have an appearance based on a set of avatars available at the electronic device includes in accordance with a determination that the set of avatars does not include any avatars of the first type, displaying (810) the graphical objects (e.g., 612-1; 612-2; 612-3) in the first subset having an appearance based on an avatar of a second type (e.g., an avatar that cannot be created and/or customized by a user of the electronic device) (e.g., an avatar modeled to represent a non-human character) different from the first type, without displaying one (e.g., one or more) of the graphical objects in the first subset having an appearance based on the avatar of the first type. In some embodiments, when the set of avatars does not include one that is customizable, creatable, and/or modeled to represent a human, the displayed stickers are derived from (e.g., having an appearance based on) an avatar that is a non-human character and/or is not created or customizable by the user. In some embodiments, these are referred to as stickers of a second type. Displaying only avatars of a second type when an avatar of a first type is not available provides feedback to the user that no avatars of the first type are currently available at the device, and encourages the user to create an avatar of the first type. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the avatar of the first type is a user-created avatar (e.g., beanie avatar 636; boy avatar 672) (e.g., an avatar that can be created and, optionally, customized by the user), and the avatar of the second type is a predefined avatar (e.g., robot, monkey, poop) (e.g., an avatar of a type other than a user-created avatar) (e.g., an avatar that cannot be created and/or customized by a user of the electronic device). In some embodiments user-created avatars include customizable (e.g., selectable or configurable) avatar features.

In some embodiments, the avatar of the first type is based on a human character (e.g., beanie avatar 636; boy avatar 672) (e.g., an avatar modeled to represent a human), and the avatar of the second type is based on a non-human character (e.g., monkey, poop, robot) (e.g., an avatar modeled to represent an animal such as a pig, cat, dog, shark, and the like; a mythical character such as a unicorn, dragon, and alien; an anthropomorphized object such as a robot and poop; and/or a stylized expression such as an emoji). In some embodiments, avatars modeled to represent a non-human character include, for example, a non-human character that is an anthropomorphic construct (e.g., a stylized animal, a stylized robot, or a stylization of a normally inanimate or normally inhuman object)). In some embodiments, such avatars include an avatar having customizable (e.g., selectable or configurable) avatar features that generally correspond to non-human traits and features. In some embodiments, such an avatar would not include a representation of a person having various physical, human features or characteristics (e.g., a young child having a round face and short, wavy hair), even if some of the customizable features of the human avatar include non-human characteristics (e.g., cosmetic enhancements, hats, glasses, or other inhuman objects that are typically associated with an appearance of a human).

In some embodiments, displaying the first display region further includes displaying a sticker user interface object (e.g., 614) (e.g., a sticker affordance). In some embodiments, the electronic device receives an input (e.g., 616; 656) directed to the sticker user interface object. In some embodiments, in response to receiving the input directed to the sticker user interface object, the electronic device ceases to display the first display region (e.g., 605). In some embodiments, in response to receiving the input directed to the sticker user interface object, the electronic device displays a sticker user interface (e.g., 615) (e.g., a user interface displaying stickers that may be selected for use in the content creation user interface). In some embodiments, the sticker user interface including a second plurality of graphical objects (e.g., stickers 624; stickers 642) that correspond to predefined content for insertion into the content creation user interface. In some embodiments, the sticker user interface is displayed concurrently with a portion of the content creation user interface (e.g., a message display region). In some embodiments, the sticker user interface replaces the sticker keyboard display region. Displaying a set of graphical objects that correspond to predefined content for insertion into the content creation user interface allows a user to quickly and easily compose messages to express a known sentiment that is based on the predefined content. This provides an improved control scheme for generating messages, which can require fewer inputs to generate the messages than would be necessary if a different control scheme were used (e.g., a control scheme requiring generation of individual, custom content). Moreover, this type of control can be done in real time during, for example, a conversation such as a text conversation or a video conversation, whereas manual control to build a graphical object would have to be done before the conversation started or after it had ended.

In some embodiments, displaying the sticker user interface object includes displaying the sticker user interface object having a first appearance (e.g., 614 in FIG. 6B) that includes a plurality of representations (e.g., 614-1; 614-2) of avatars of the first type (e.g., the sticker affordance includes representations of stickers that are based on appearances of avatars of the first type). In some embodiments, the affordance also includes one or more representations of avatars of the second type. Displaying the sticker user interface object having a plurality of representations of avatars of the first type provides a feedback to the user that selection of the sticker user interface object will allow the user to access stickers of avatars of the first type. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after displaying the sticker user interface object (e.g., 614) having the first appearance (e.g., 614 in FIG. 6B), the electronic device receives a series of inputs corresponding to a request to create a third avatar (e.g., 636) of the first type. In some embodiments, the electronic device receives a request (e.g., 644) to redisplay the first display region. In some embodiments, in response to receiving the request to redisplay the first display region, the electronic device displays the sticker user interface object (e.g., 614) having a second appearance (e.g., 614 in FIG. 6I) that includes a representation (e.g., 614-2) of the third avatar of the first type (e.g., the keyboard display region is redisplayed having the sticker user interface object, and the sticker user interface object includes a representation of a sticker having an appearance based on the created avatar of the first type). In some embodiments, the sticker user interface object also includes one or more representations of avatars of the first type. In some embodiments, the sticker user interface object also includes one or more representations of avatars of the second type. Redisplaying the sticker user interface object having a different appearance that is updated to reflect a newly created avatar provides feedback to the user that creating additional avatars will update the sticker user interface object to display the additional avatars. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the sticker user interface object (e.g., 614) having the first appearance includes displaying an animated sequence of the representations of avatars of the first type and representations of avatars of the second type. In some embodiments, the animation includes showing a representation of a first sticker on the sticker user interface object having an animation (e.g., smiling, moving, etc.), then replacing the representation of the first sticker with a representation of a second sticker having an animation, and so on. In some embodiments, the representations of stickers in the animation include representations of stickers of the first type and representations of stickers of the second type. Displaying the sticker user interface object having an animation in which representations of avatars are displayed cycling across provides feedback to the user no such avatars are available at the device, and informs the user that selection of the sticker user interface object will allow the user to create such avatars. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the sticker user interface (e.g., 615) further includes, in accordance with a determination that the set of avatars does not include any avatars of the first type, displaying a creation user interface object (e.g., 626) (e.g., creation affordance) that, when selected, displays a creation user interface (e.g., 632) for creating an avatar of the first type. In some embodiments, when the set of avatars does not include any avatars of the first type, a plurality of representations (e.g., 622 in FIG. 6C) (e.g., 622-1; 622-5) of sets of stickers for avatars of the second type are displayed in the sticker user interface. In some embodiments, one of the representations of the sets of stickers for the avatars of the second type is displayed having a selected state and a set of stickers (e.g., 624; 690) of the second type corresponding to the selected representation is displayed.

In some embodiments, displaying the first display region further includes displaying a plurality of emojis (e.g., 609) (e.g., predefined emoji in predefined categories or predefined emoji selected based on prior user activity (e.g., recently/frequently used)).

In some embodiments, after displaying the graphical objects in the first subset having an appearance based on an avatar of a second type different from the first type, without displaying one of the graphical objects in the first subset having an appearance based on the avatar of the first type, the electronic device receives a series of inputs (e.g., 630, 634, 638) corresponding to a request to create a first avatar of the first type (e.g., detecting creation of an avatar of the first type (e.g., a user-created avatar)). In some embodiments, in response to receiving the series of inputs, the electronic device creates the first avatar (e.g., 636) of the first type and adds the first avatar to the set of avatars. In some embodiments, after creating the first avatar of the first type, the electronic device receives a request (e.g., 644) to redisplay the first display region (e.g., 605). In some embodiments, in response to receiving the request to redisplay the first display region, the electronic device displays the first display region with the first subset of graphical objects (e.g., 612). In some embodiments, the first subset of graphical objects includes a first graphical object (e.g., 642-1 in FIG. 6I) having an appearance based on the first avatar of the first type (e.g., the keyboard is redisplayed and the subset of graphical objects now includes a sticker having an appearance based on the newly created avatar). In some embodiments, stickers that are based on an avatar of the first type (e.g., a newly created avatar) are assigned a higher priority than stickers of the second type. In some embodiments, the keyboard display region includes stickers that are suggested by the electronic device based on the priority of the stickers. Displaying the first display region updated with a sticker for a newly created avatar gives feedback informing the user that the sticker can be selected for communicating in a message. Additionally, this reduces the number of inputs to perform the technical task of generating a sticker for the newly created avatar. Providing improved feedback and reducing the number of inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after displaying the graphical objects (e.g., 612) in the first subset having an appearance based on an avatar of a second type different from the first type, without displaying one of the graphical objects in the first subset having an appearance based on the avatar of the first type, the electronic device receives a series of inputs (e.g., 644) corresponding to usage (e.g., sending a sticker, creating a sticker, etc.) (e.g., in a content creation user interface such as a document creation user interface or a message compose user interface) of a graphical object (e.g., 642-1) corresponding to a second avatar of the first type (e.g., a sticker having an appearance based on the avatar of the first type). In some embodiments, after receiving the series of inputs corresponding to usage of the graphical object corresponding to the second avatar of the first type, the electronic device receives a request to redisplay the first display region. In some embodiments, in response to receiving the request to redisplay the first display region, the electronic device displays the first display region with the first subset of graphical objects, the first subset of graphical objects including the graphical object (e.g., 642-1) corresponding to the second avatar of the first type (e.g., the keyboard is redisplayed and the subset of graphical objects now includes the sticker that was used). In some embodiments, the keyboard display region includes stickers that are suggested by the electronic device based on a history of usage of the stickers of the first type (or second type) (e.g., suggesting stickers that have been used recently and/or frequently). Displaying the first display region updated with a sticker that was previously used reduces the number of inputs needed to locate and send the sticker in subsequent communications. Reducing the number of inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying a first instance (e.g., 642-1 in FIG. 6I) of a respective one of the graphical objects that have an appearance based on a set of avatars available at the electronic device, the electronic device receives an input (e.g., 646) of a first type (e.g., a tap gesture) directed to the first instance of the respective one of the graphical objects. In some embodiments, in response to receiving the input of the first type, the electronic device displays a second instance (e.g., 650) of the respective one of the graphical objects (e.g., a preview of the respective one of the graphical objects is displayed without transmitting a sticker corresponding to the respective one of the graphical objects). In some embodiments, other graphical objects in the keyboard display region (e.g., emojis) are responsive to an input of the first type (e.g., a tap gesture). For example, an emoji can be selected using a tap gesture. Displaying the second instance of the respective one of the graphical objects in response to receiving the input of the first type maintains a consistency for interacting with the graphical objects and the emojis displayed on the keyboard. This provides an intuitive interface for interacting with the different graphical objects presented in the keyboard display region, which promotes familiarity thereby enhancing the operability of the device and making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the second instance (e.g., 650) of the respective one of the graphical objects, the electronic device receives a second input directed to the second instance of the respective one of the graphical objects, wherein the second input includes a first portion that is stationary followed by a second portion that includes movement of the second input. In some embodiments, in response to receiving the second input, in accordance with a determination that the second input satisfies first criteria (e.g., the first portion of the second input is stationary at a location of the second instance of the respective one of the graphical objects for a threshold amount of time, and the second portion of the second input includes movement to a location corresponding to a messaging region of the content creation user interface), the electronic device sends a sticker corresponding to the respective one of the graphical objects to a recipient user. For example, in FIGS. 6J and 6K, device 600 sends beanie sticker 642-1 in the messaging conversation to second recipient 607-2 when the user touches and holds on preview 650 (triggering device 600 to select the sticker for sending), then drags the contact to message region 603-1. In some embodiments, in response to receiving the second input, in accordance with a determination that the second input does not satisfy the first criteria, the electronic device foregoes sending the sticker corresponding to the respective one of the graphical objects to the recipient user. For example, with reference to the previous example, if the user does not maintain contact on preview 650 long enough to trigger device 600 to select the sticker, device 600 does not send sticker 642-1 in the messaging conversation to second recipient 607-2, even if the user drags the contact to message region 603-1. Foregoing sending the sticker when the second input does not satisfy the first criteria reduces the likelihood of an accidental transmission of the sticker, which enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the second instance (e.g., 650) of the respective one of the graphical objects further includes displaying a send user interface object (e.g., 652) (e.g., send affordance). In some embodiments, the electronic device receives an input (e.g., 654) directed to the send user interface object. In some embodiments, in response to receiving the input directed to the send user interface object, the electronic device sends a sticker corresponding to the respective one of the graphical objects to a recipient user.

Note that details of the processes described above with respect to method 800 (e.g., FIG. 8) are also applicable in an analogous manner to the methods described above and below. For example, methods 700, 1000, 1200, 1300, 1500, 1700, and 1800 optionally includes one or more of the characteristics of the various methods described above with reference to method 800. For example, a sticker can be displayed and used in a user interface in a manner similar to that described above. For brevity, these details are not repeated below.

FIGS. 9A-9AG illustrate exemplary user interfaces for displaying avatars in a contacts application user interface, in accordance with some embodiments. The user interfaces in these figures are used to illustrate the processes described below, including the processes in FIG. 10.

FIG. 9A illustrates electronic device 600 displaying (e.g., on display 601) contacts user interface 902 showing a listing of contacts available in a contacts application on the electronic device. The contacts application is an application for managing contactable users.

Figure 9B:
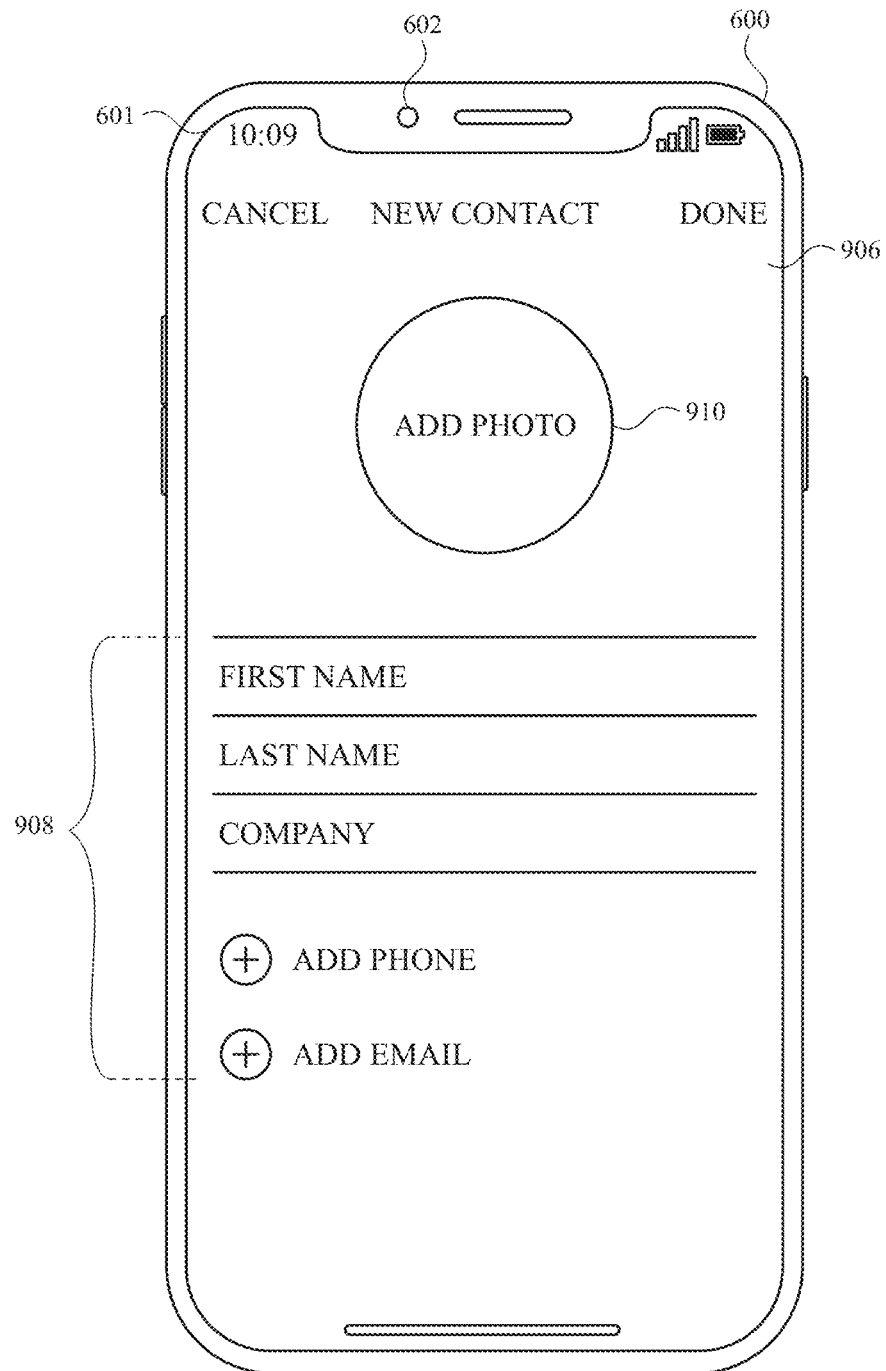

In FIG. 9A, the device detects input 904 (e.g., a tap gesture) and, in response, displays in FIG. 9B new contact user interface 906 for creating a new contact for the contacts application.

As shown in FIG. 9B, new contact user interface 906 includes data fields 908 and region 910, which optionally displays a representation of the new contact. The representation can be displayed to represent the contact in various user interfaces such as, for example, in a messaging application, a list of contacts, emails, or other instances in which the contact can be represented.

Figure 9C:
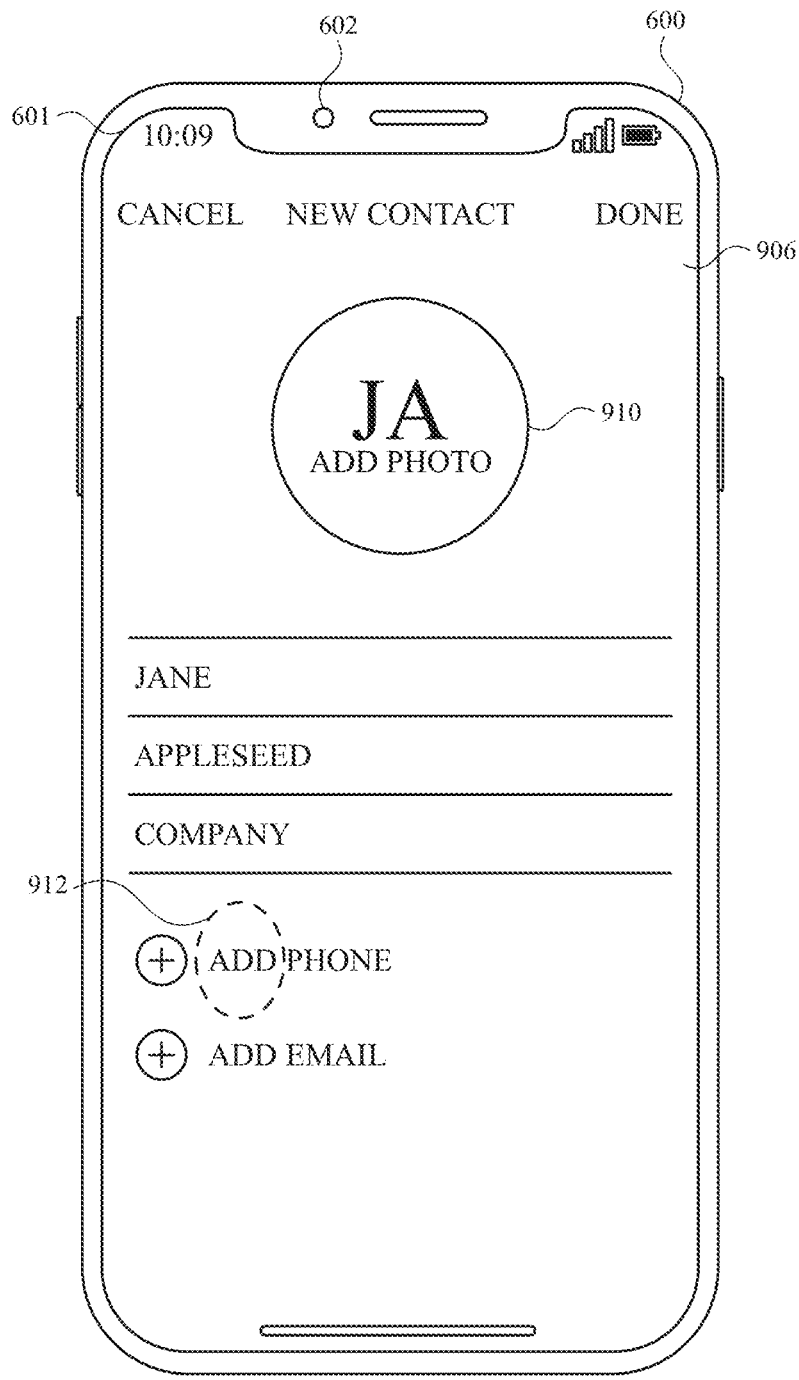

FIG. 9C shows information for the new contact entered in name fields of the new contact user interface. As shown in FIG. 9C, "Jane Appleseed" is entered as respective first and last names for the new contact. After receiving the name information, device 600 updates region 910 to display a monogram representation having initials "JA" corresponding to new contact name "Jane Appleseed."

Figure 9D:
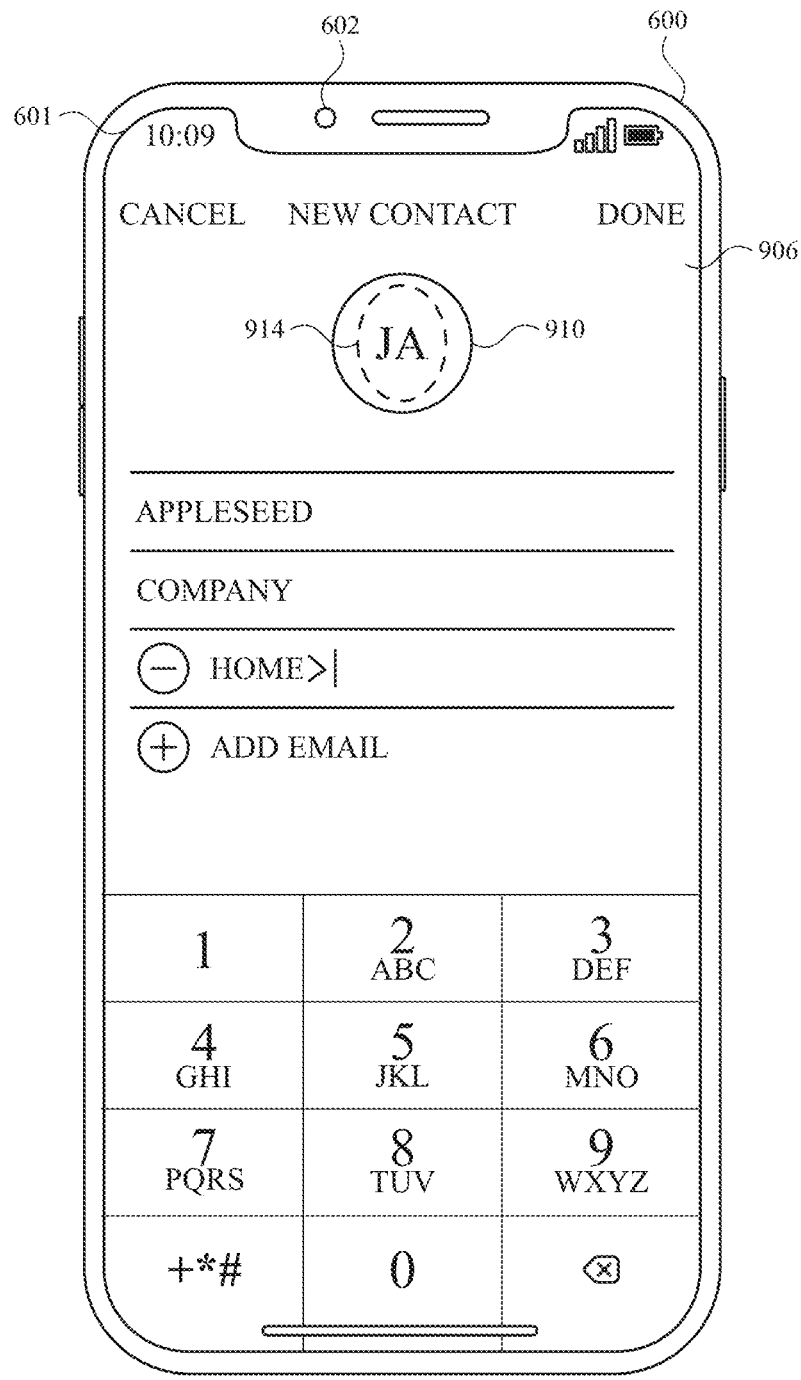

In FIG. 9C, device 600 detects input 912 (e.g., a tap gesture) on a phone number option, and displays a keyboard for entering a phone number for new contact Jane Appleseed, as shown in FIG. 9D.

In some embodiments, the new contact representation can be edited by selecting region 910 from new contact user interface 906. For example, FIG. 9D illustrates device 600 detecting input 914 on region 910.

Figure 9E:
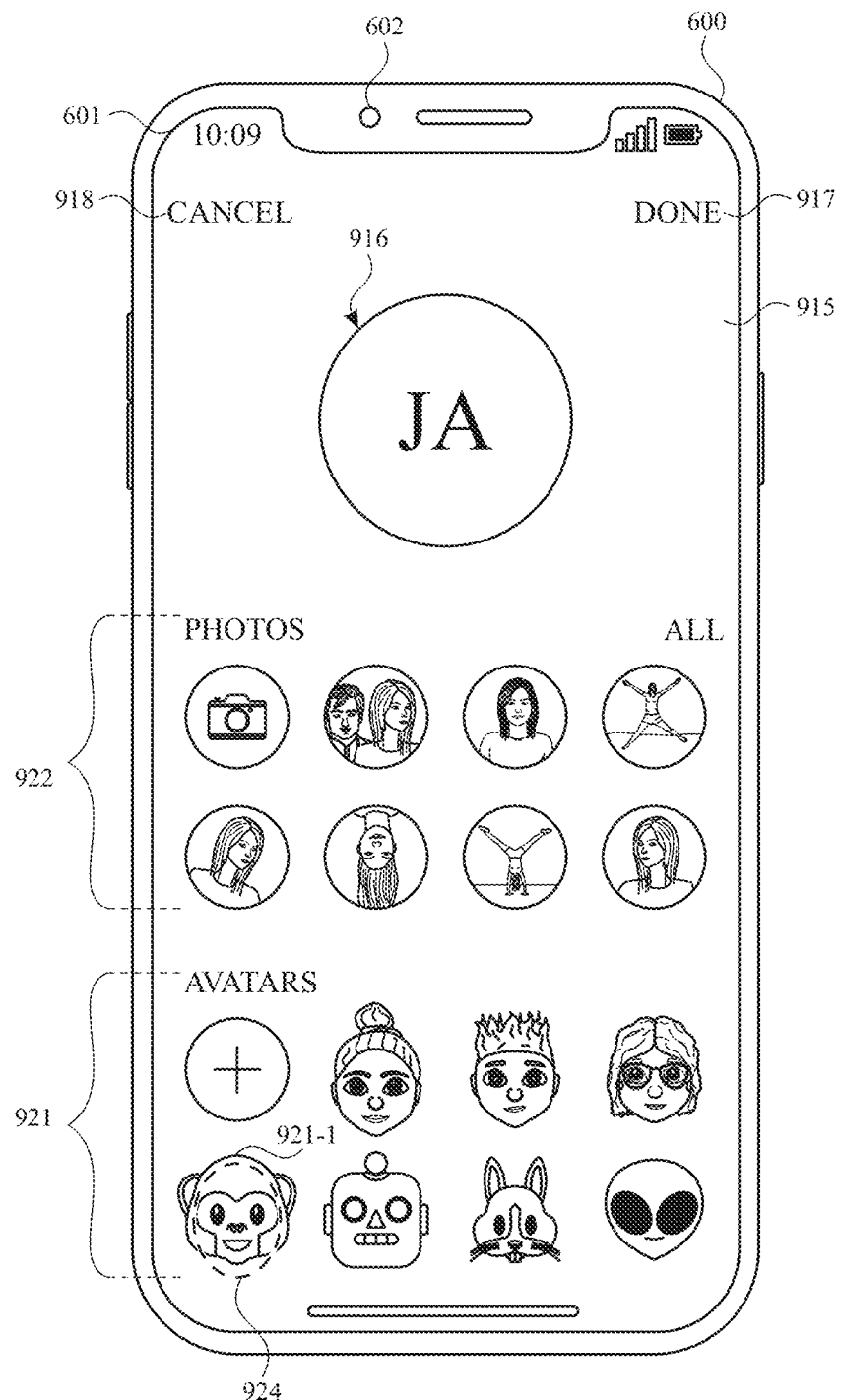

In response to detecting input 914 on region 910, device 600 displays representation editing user interface 915 for modifying the appearance of the representation of the new contact (e.g., Jane Appleseed), as seen in FIG. 9E. It should be appreciated that, in some embodiments, user interface 915 can be used to edit the appearance of the representation of an existing contact (e.g., not a new contact).

User interface 915 includes current representation 916. Current representation 916 represents the current appearance of the representation of the contact. Thus, upon exiting user interface 915 (e.g., in response to selecting done affordance 917), representations of the contact as shown throughout various user interfaces of device 600 (e.g., such as that appearing in region 910 of new contact user interface 906) will have the appearance shown in current representation 916. As discussed in detail below, current representation 916 is updated in response to a series of user inputs in user interface 915. However, such updates can be discarded, and the representation of the contact reverted back to its prior appearance (e.g., that shown in region 910 prior to displaying user interface 915), in response to detecting selection of cancel affordance 918.

Figure 9F:
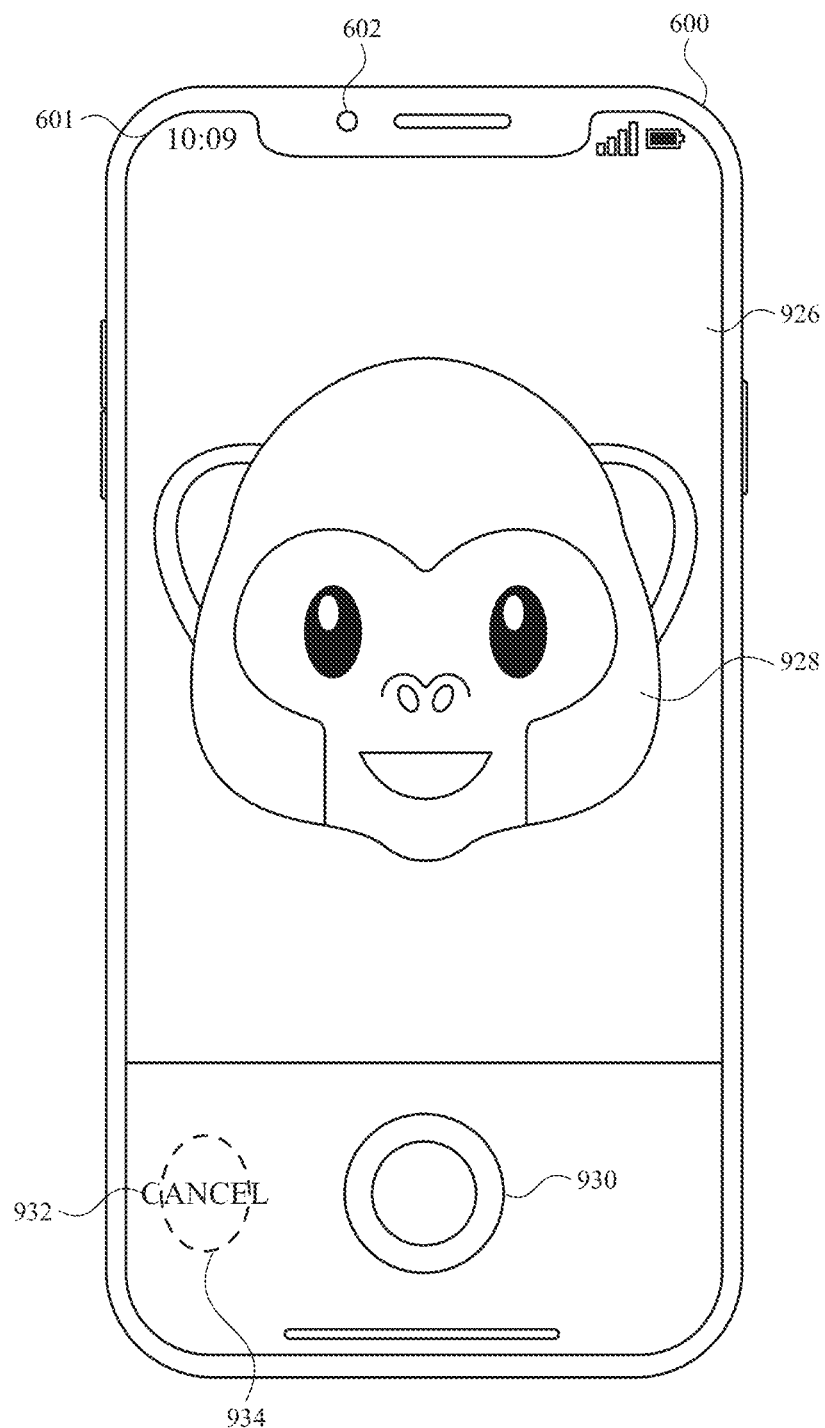

In FIG. 9E, current representation 916 has the appearance of the monogram option that was previously displayed in new contact user interface 906. FIGS. 9F-9AF illustrate a series of inputs for modifying current representation 916, in accordance with various embodiments of the present disclosure.

User interface 915 further includes sets of selectable options for modifying current representation 916. First set of options 921 includes options that, when selected, initiate a process for selecting an avatar to set as current representation 916. Second set of options 922 generally includes options that, when selected, initiate a process for selecting a non-avatar representation as current representation 916. Examples of non-avatar representations include pictures and monograms. In some embodiments, second set of options 922 can include a subset of options that are determined based on a history of use. For example, a subset that includes options that were previously (e.g., recently) used and/or options that are frequently used by the user. In such embodiments, the subset of options can include avatar options (e.g., avatar options that were recently used). In some embodiments second set of options 922 can include options that are recommended to the user based on information available for the new contact. For example, the options can include pictures of the contact, pictures/stickers/avatars sent to or received from the contact, avatars associated with the contact, or other representations previously used for the contact.

In some embodiments, the options are recommended based on information available at device 600 such as, for example, content from messaging metadata from communications with the contact.

In FIG. 9E, device 600 detects input 924 (e.g., a tap gesture) on monkey avatar option 921-1 and, in response, displays an interface for selecting a pose option for the selected avatar option. In some embodiments, device 600 can display different types of pose interfaces. For example, if camera 602 of device 600 is configured to capture depth data (e.g., data for capturing changes in pose of the user's face), device 600 displays a live pose interface that enables the user to control a displayed avatar to achieve a desired pose. In embodiments in which camera 602 is not configured to capture depth data, device 600 displays a canned pose interface that includes multiple predefined poses of the selected avatar option.

In FIG. 9F, device 600 displays live pose interface 926, which includes avatar 928 having an appearance corresponding to the selected avatar option, capture affordance 930, and cancel affordance 932. In FIG. 9F, avatar 928 corresponds to the monkey avatar option 921-1 selected via input 924. As discussed in greater detail below, avatar 928 tracks movement of the user's face (e.g., captured via camera 602), and is updated based on changes in pose of the user's face. In FIG. 9F, avatar 928 has a smiling pose that is controlled by the user's face (e.g., the user's face has a similar smiling pose).

Figure 9G:
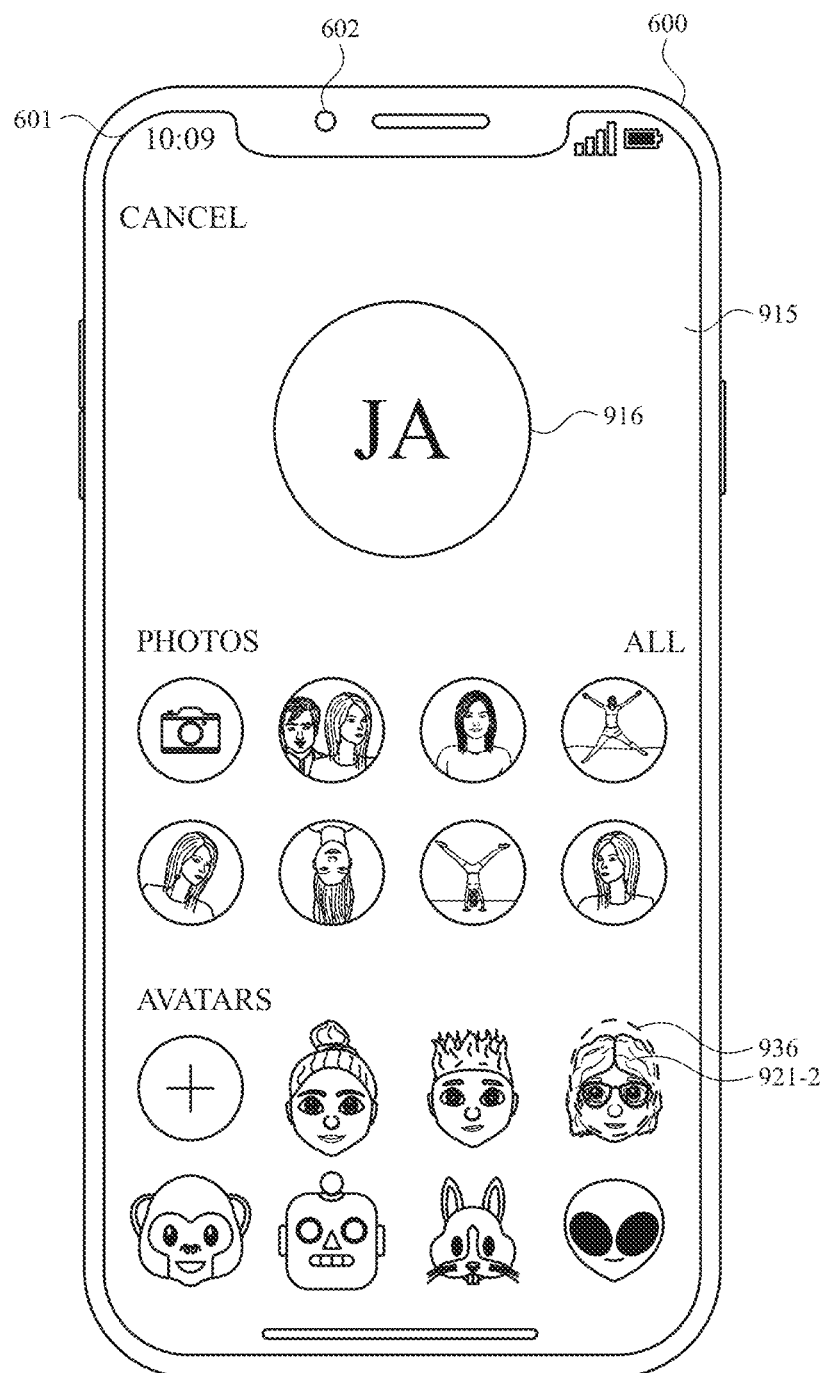

In FIG. 9F, device 600 detects input 934 on cancel affordance 932 and, in response, returns to representation editing user interface 915, without updating current representation 916, as shown in FIG. 9G.

Figure 9H:
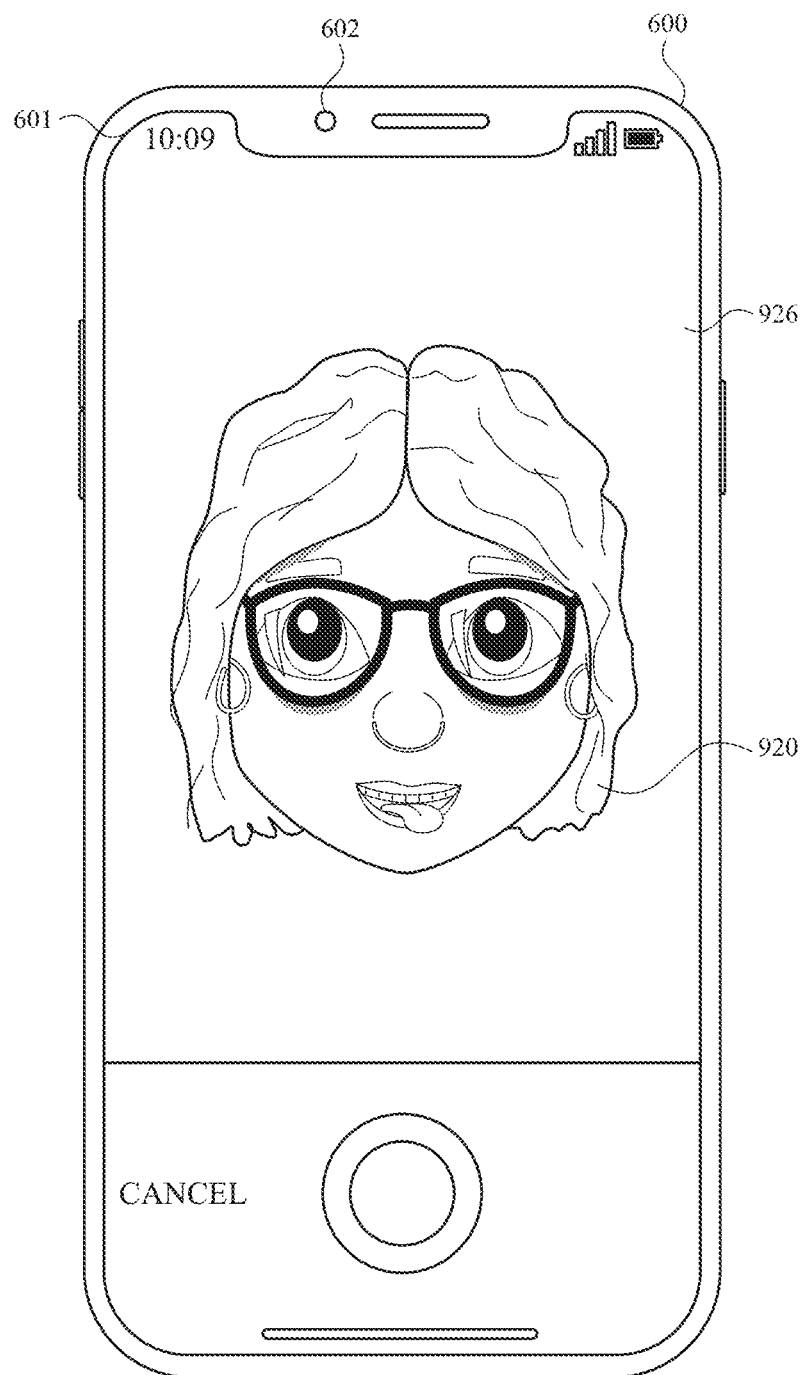

In FIG. 9G, device 600 detects input 936 on woman avatar option 921-2 and, in response, displays live pose user interface 926 in FIG. 9H with avatar 928 having an appearance that corresponds to woman avatar option 921-2 selected in FIG. 9G. In FIG. 9H, avatar 928 has a pose in which the avatar's tongue is sticking out. In this embodiment, avatar 928 is being controlled by the user's face, through changes in facial poses (e.g., changing facial expressions and moving facial features) that are detected via camera 602. Accordingly, the user can control display of various pose options for avatar 928 by moving their facial features in the field of view of camera 602, which causes device 600 to display corresponding changes to the pose of avatar 928.

Figure 9I:
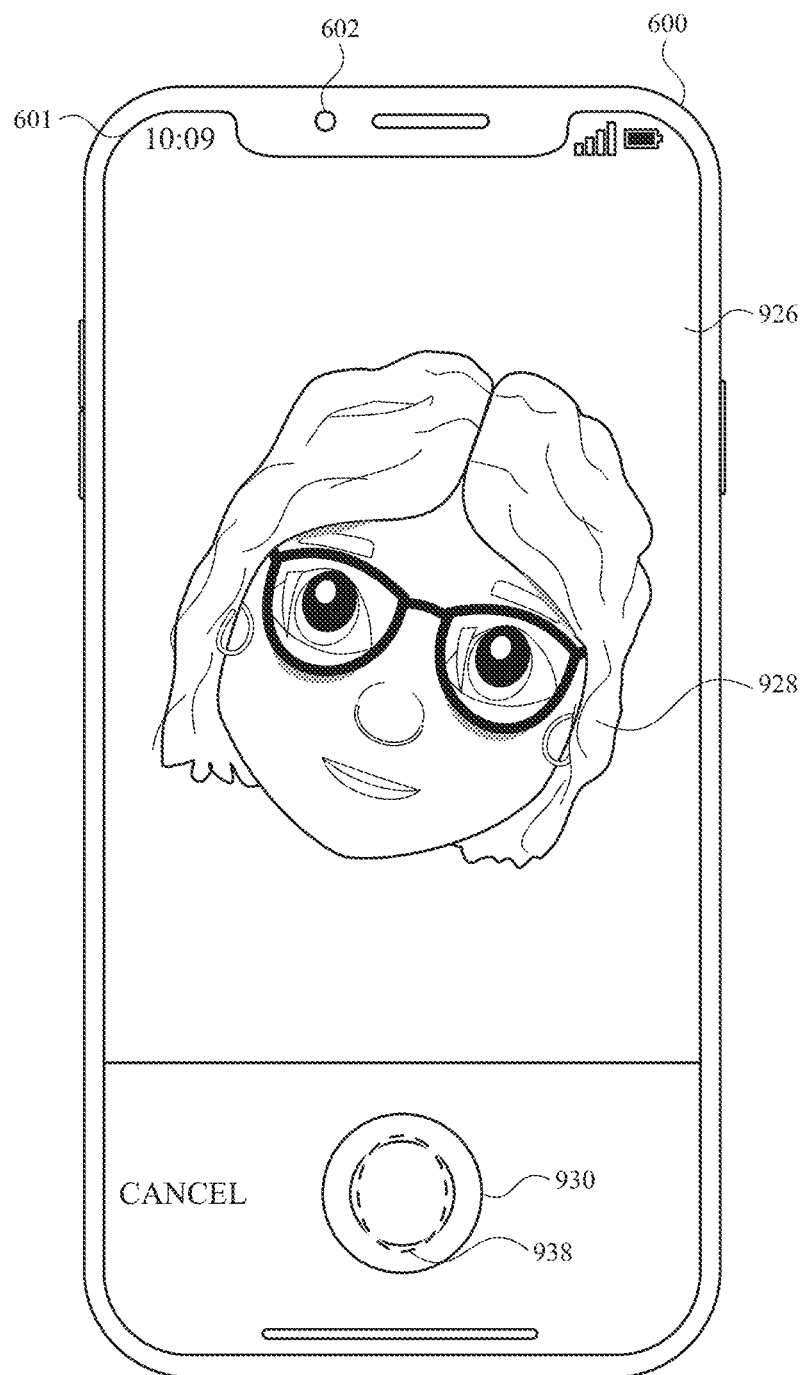

In FIG. 9I, device 600 detects (e.g., via camera 602) the user's face having a pose that includes a smile and head tilt and modifies avatar 928 to assume the same pose. Device 600 detects input 938 on capture affordance 930, which causes device 600 to select the current pose of avatar 928 (e.g., the pose of avatar 928 at the time capture affordance 930 was selected).

Figure 9J:
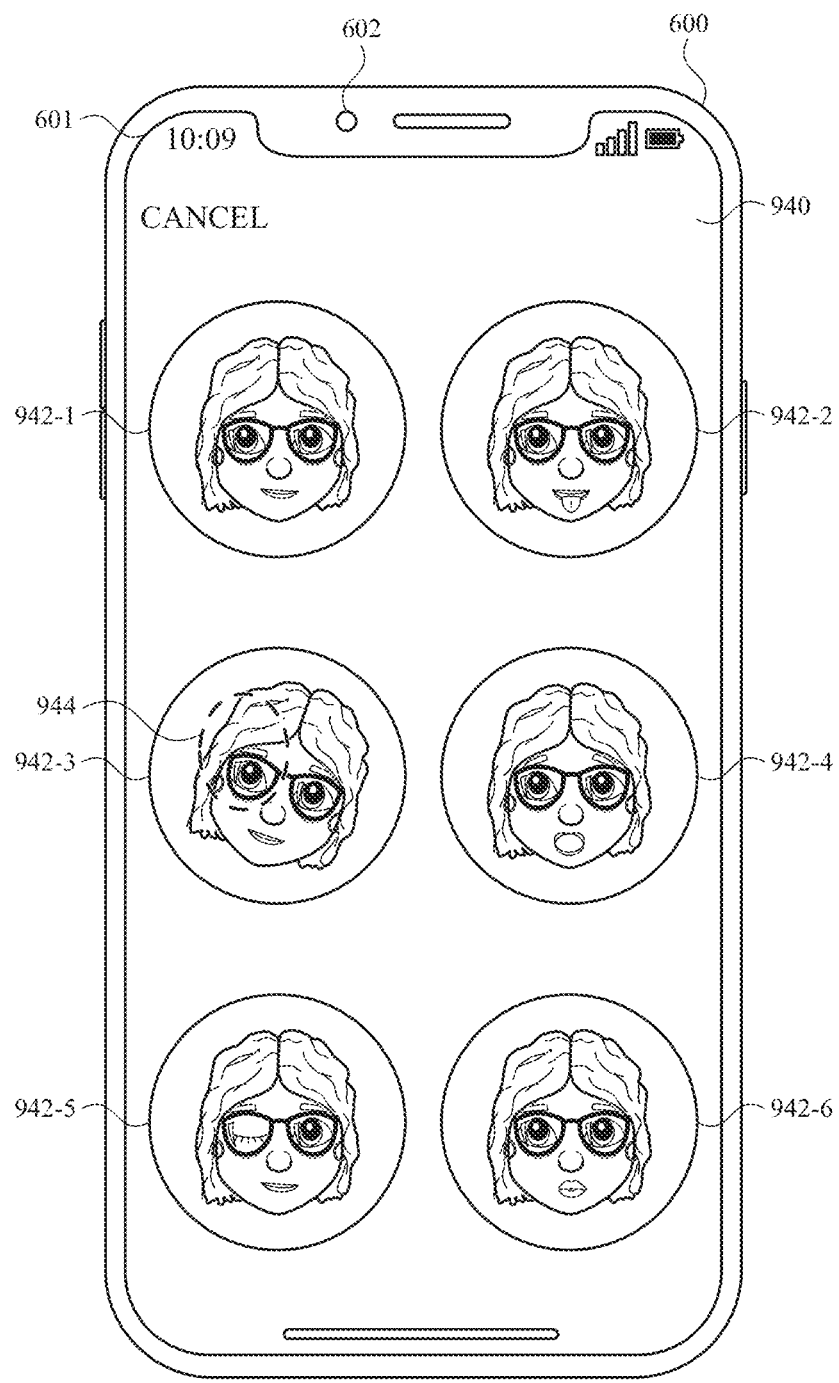

FIG. 9J illustrates an alternate embodiment for selecting a pose of selected woman avatar option 921-2 using canned pose interface 940. Canned pose interface 940 is displayed in lieu of live pose interface 926 (e.g., in response to input 936 on woman avatar option 921-2) if, for example, camera 602 is not configured to capture depth data (e.g., data used to track the face of a user). In canned pose interface 940, device 600 displays various predefined avatar poses 942-1 through 942-6. In FIG. 9J, device 600 detects input 944 selecting predefined avatar pose 642-3, which corresponds to a smiling head tilt pose.

Figure 9K:
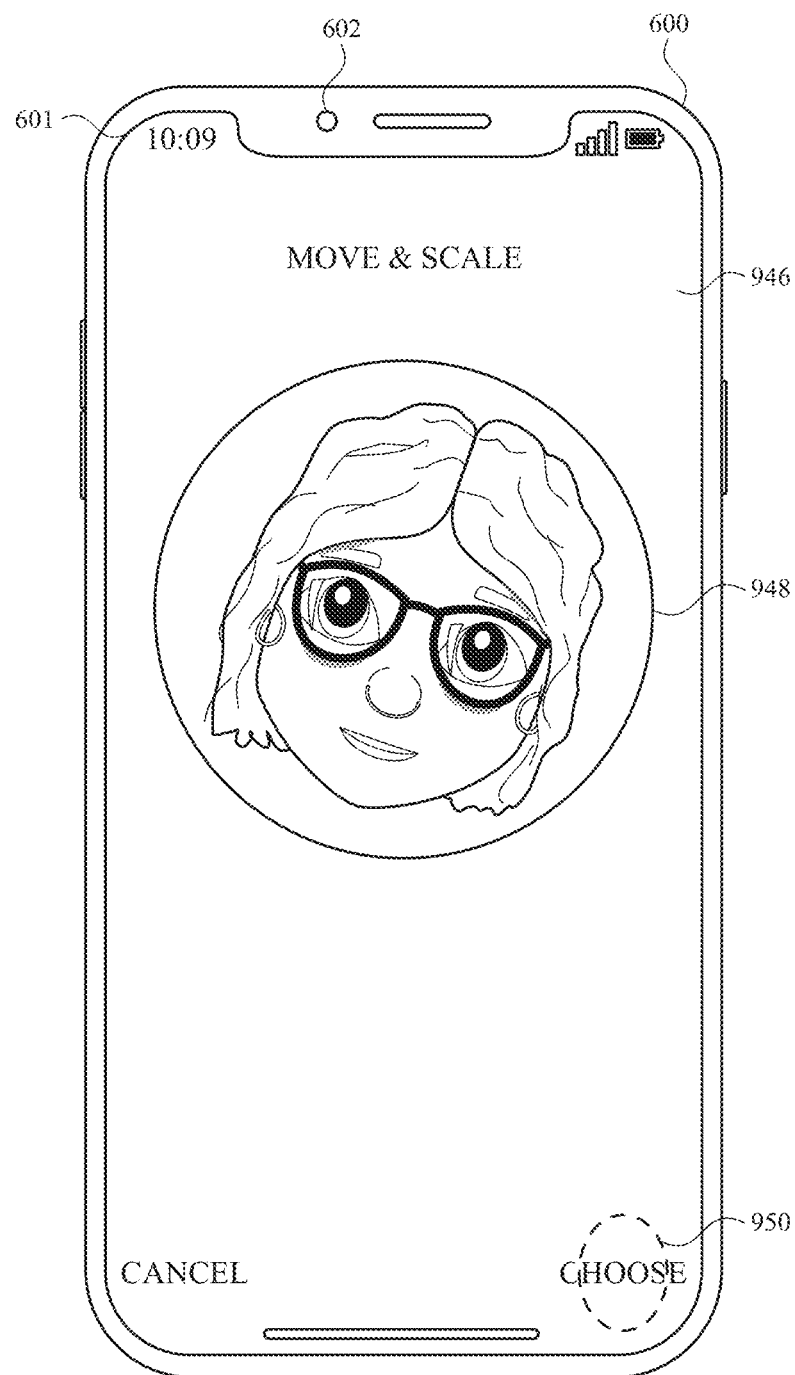
Figure 9L:
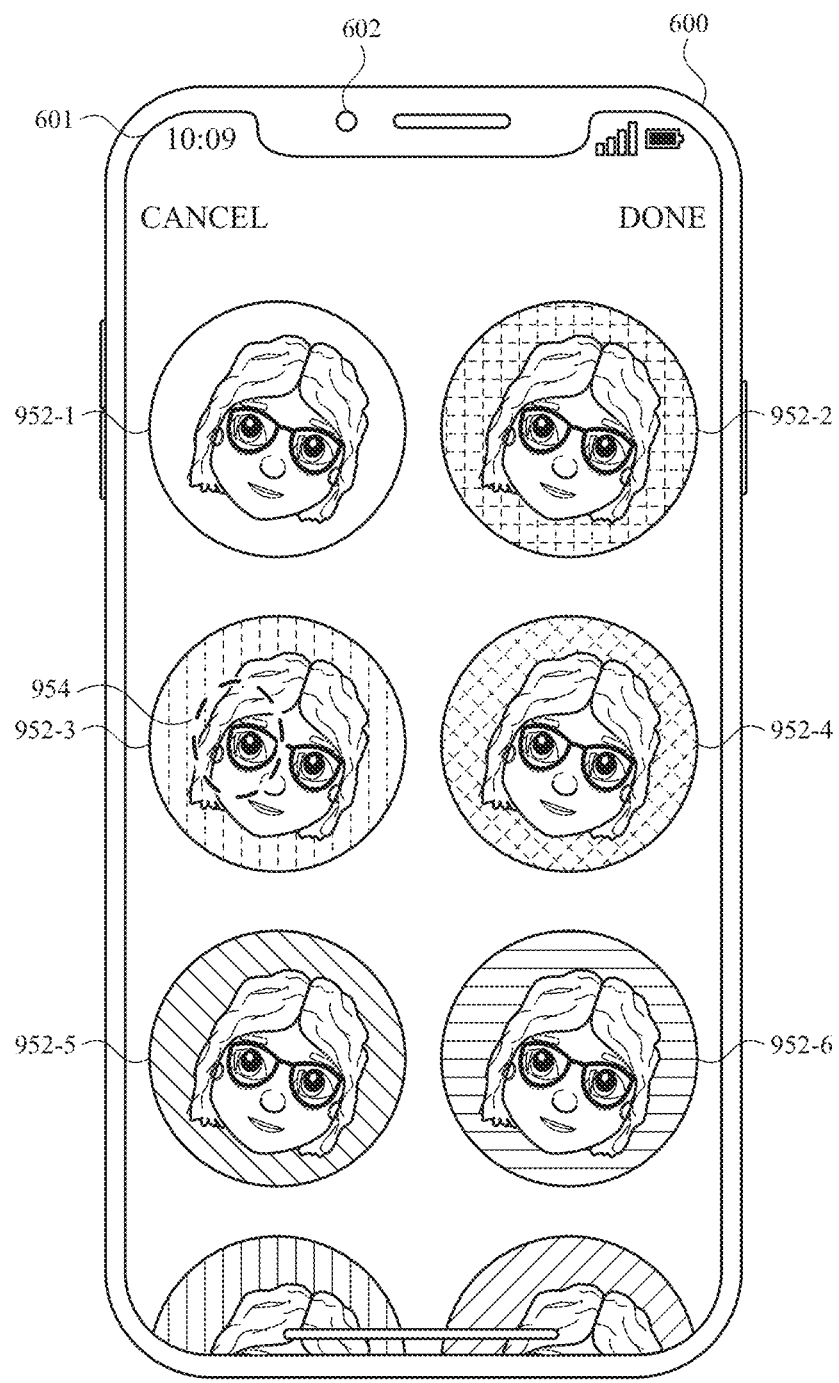

After capturing the avatar pose in FIG. 9I or 9J, device 600 displays scaling user interface 946 for changing a position and scale of selected avatar pose 948 as shown in FIG. 9K. In some embodiments, avatar pose 948 is moved (e.g., moved within the circular frame) in response to swipe gestures detected while displaying scaling interface 946. In some embodiments, avatar pose 948 is scaled (e.g., zoomed in or zoomed out) in response to pinch or de-pinch gestures detected while displaying scaling interface 946. After detecting input 950 to confirm the position and scale of selected avatar pose 948, device 600 displays background options 952-1 through 952-6 in FIG. 9L, detects selection of a background option for the avatar representation (e.g., via input 954 at background option 952-3), and returns to representation editing user interface 915 in FIG. 9M.

Figure 9M:
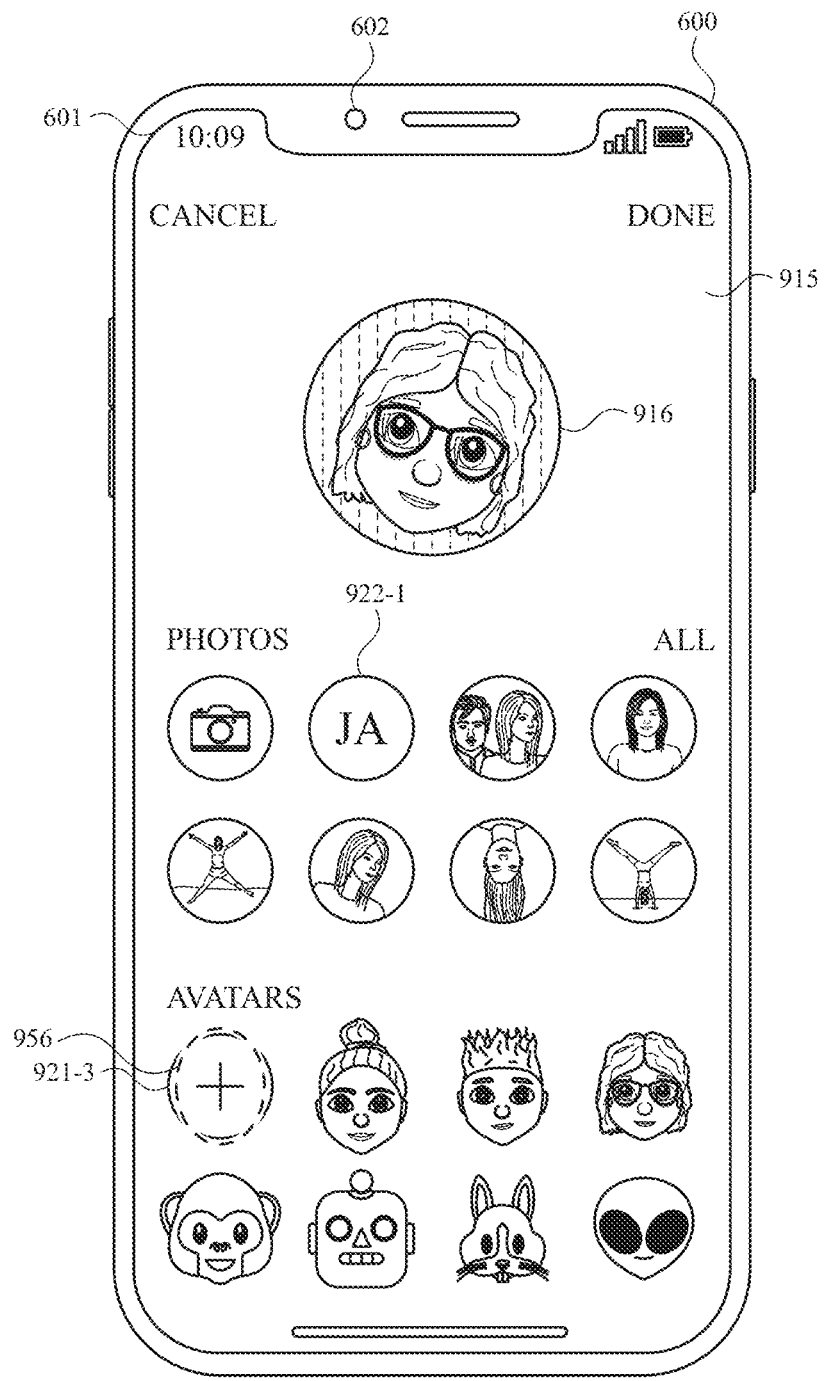

As shown in FIG. 9M, representation editing user interface 915 is updated based on the selection and customization of woman avatar option 921-2. For example, the appearance of current representation 916 is updated based on the various selections and/or inputs made in FIGS. 9G-9L. Specifically, current representation 916 is changed from the monogram appearance shown in FIG. 9G to the appearance in FIG. 9M showing the woman avatar option with the smile and head tilt pose, positioned and scaled and having selected background option 952-3. In addition, second set of options 922 is updated to include monogram option 922-1, which represents the previous appearance of current representation 916. That is, monogram option 922-1 is a selectable non-avatar option that, if selected, updates current representation 916 to have the appearance of the previously displayed monogram option (e.g., shown in FIG. 9G). The remaining non-avatar options in second set of options 922 are shifted to accommodate display of monogram option 922-1 in the set of options, and a previously displayed non-avatar option is removed from the set (e.g., to avoid pushing the first set of options 921 off display 601).

Figure 9N:
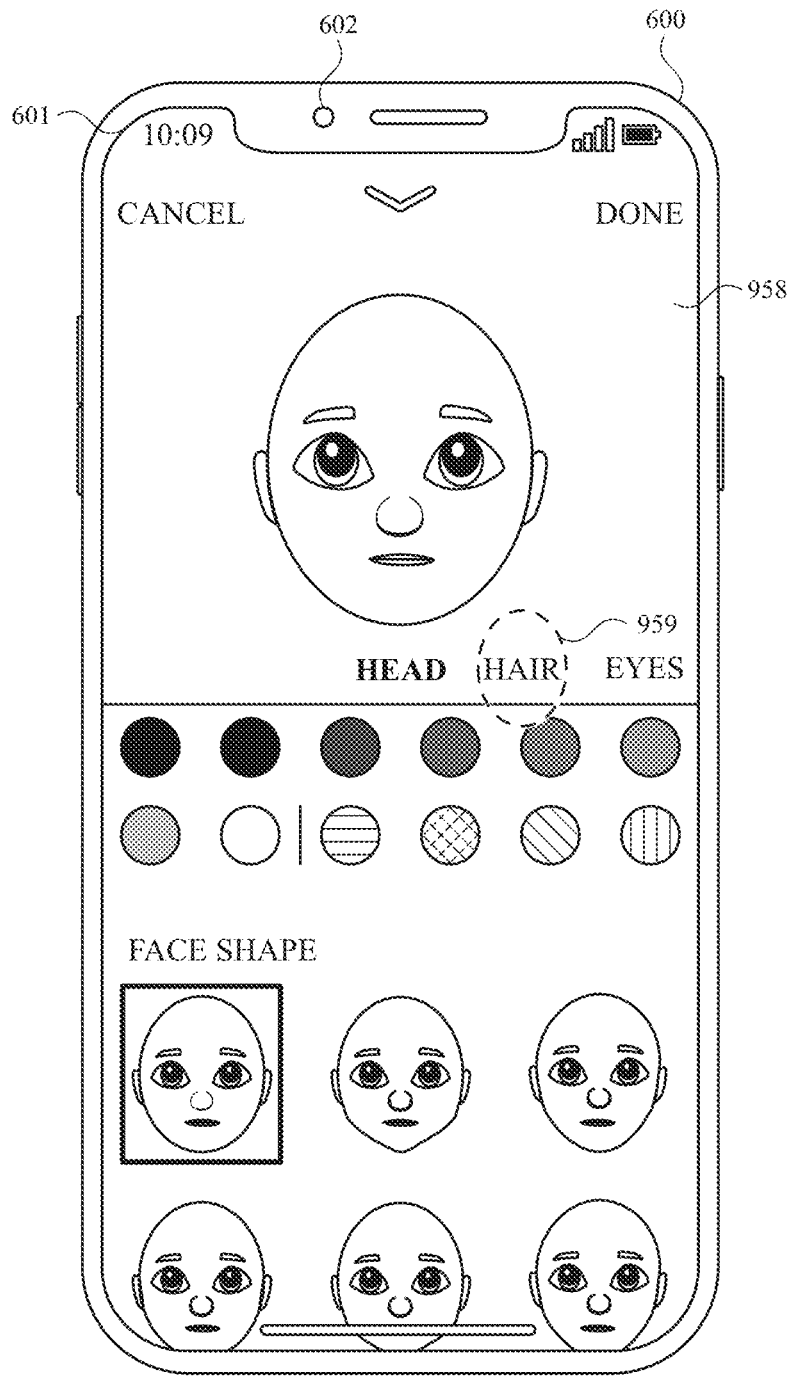
Figure 9O:
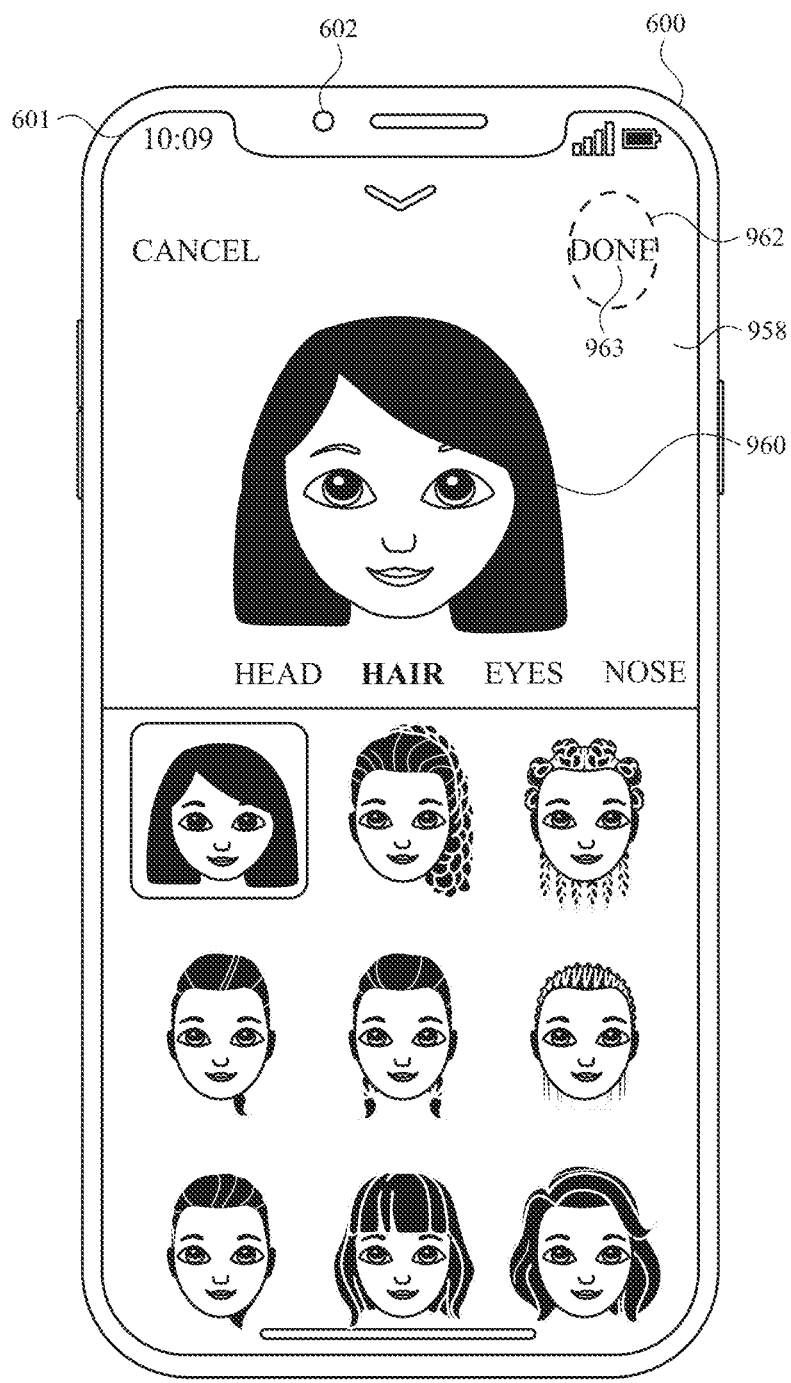
Figure 9P:
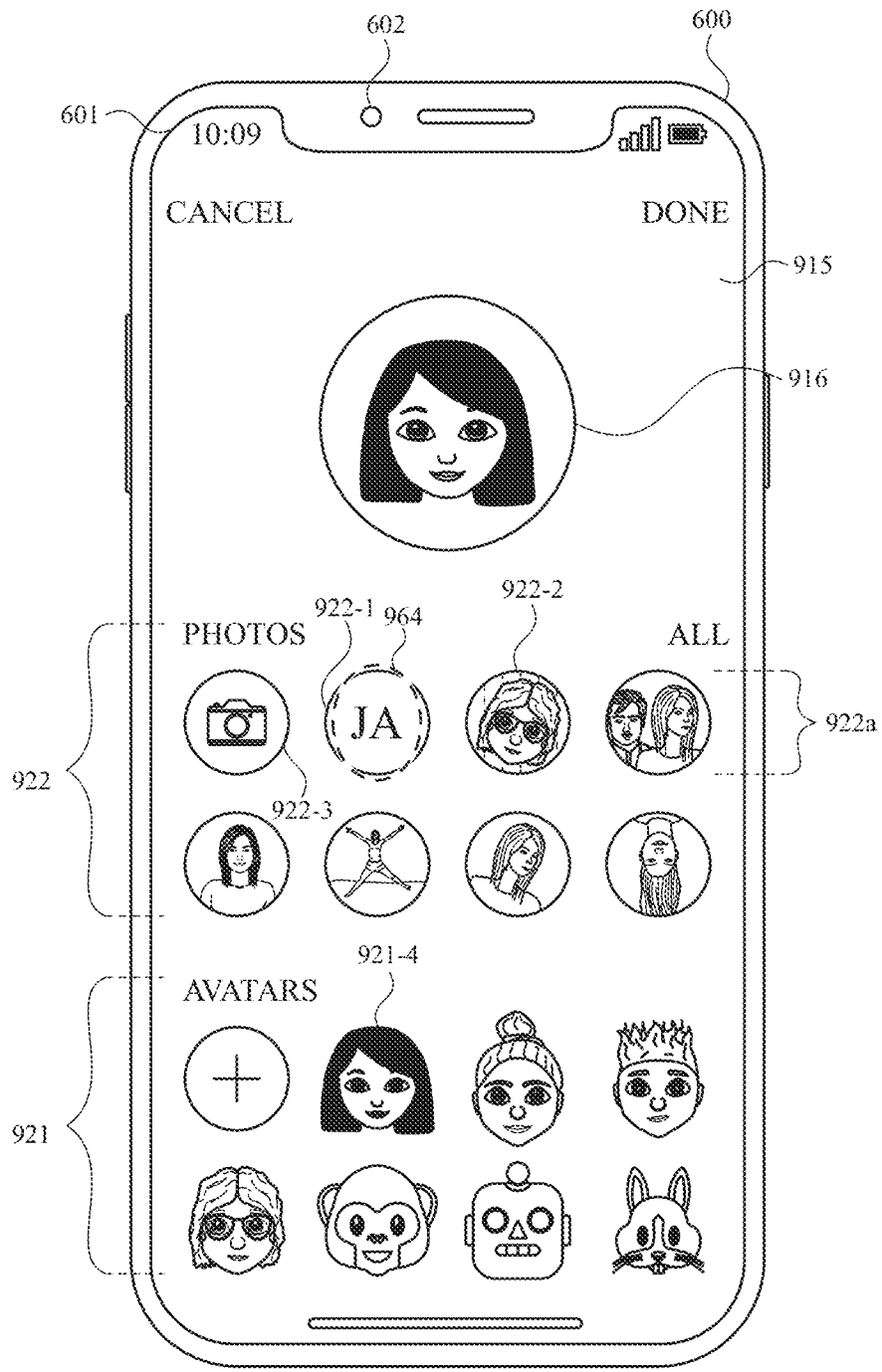

In some embodiments, a user can create an avatar for selection as current representation 916. For example, in FIG. 9M, device 600 detects input 956 selecting avatar creation option 921-3 and displays avatar creation user interface 958 in FIG. 9N (similar to avatar creation user interface 632 shown in FIG. 6F). Device 600 detects inputs, represented generally by input 959, in avatar creation user interface 958 of FIG. 9N to build/create new avatar 960 shown in FIG. 9O. In response to input 962 on done affordance 963, device 600 exits avatar creation user interface 958, and returns to representation editing user interface 915 in FIG. 9P, showing current representation 916 updated to have the appearance of new avatar 960. In some embodiments, after creating new avatar 960, the new avatar is then available for use at electronic device 600, including in other applications such as, for example, a messaging application, a camera application, a media viewing application, and other applications on device 600. Additionally, new avatar 960 can be updated, and the updates are made to new avatar 960, including in the other applications.

In addition, first set of options 921 is updated in FIG. 9P to include new avatar option 921-4, which is a representation of new avatar 960, and second set of options 922 is updated to include woman avatar option 922-2, which corresponds to the previous appearance of current representation 916. As before, some of the selectable options in second set of options 922 are shifted to accommodate the addition of woman avatar option 922-2. In some embodiments, previously used representation options are added to second set of options 922 at a location in top row 922a (e.g., adjacent camera option 922-3 or adjacent monogram option 922-1).

Figure 9Q:
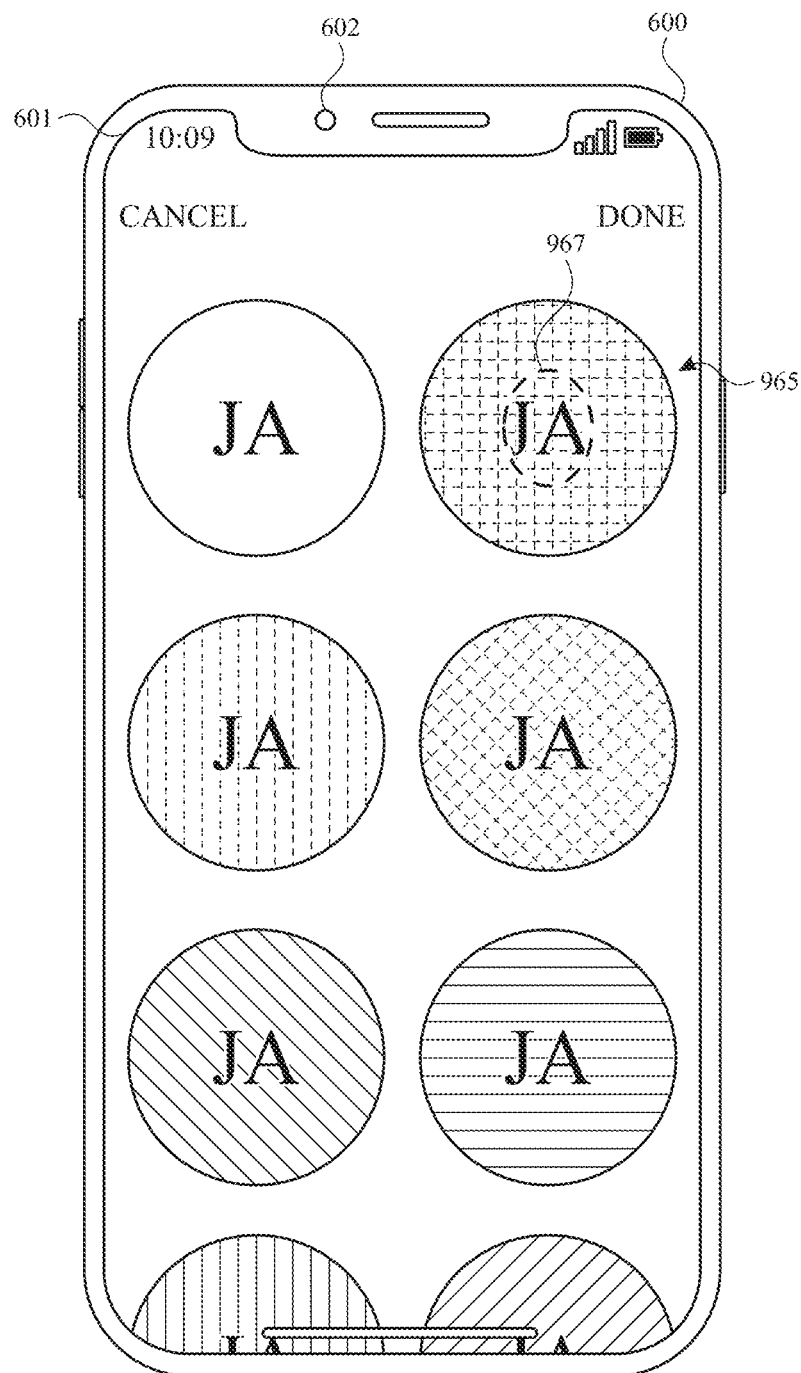
Figure 9R:
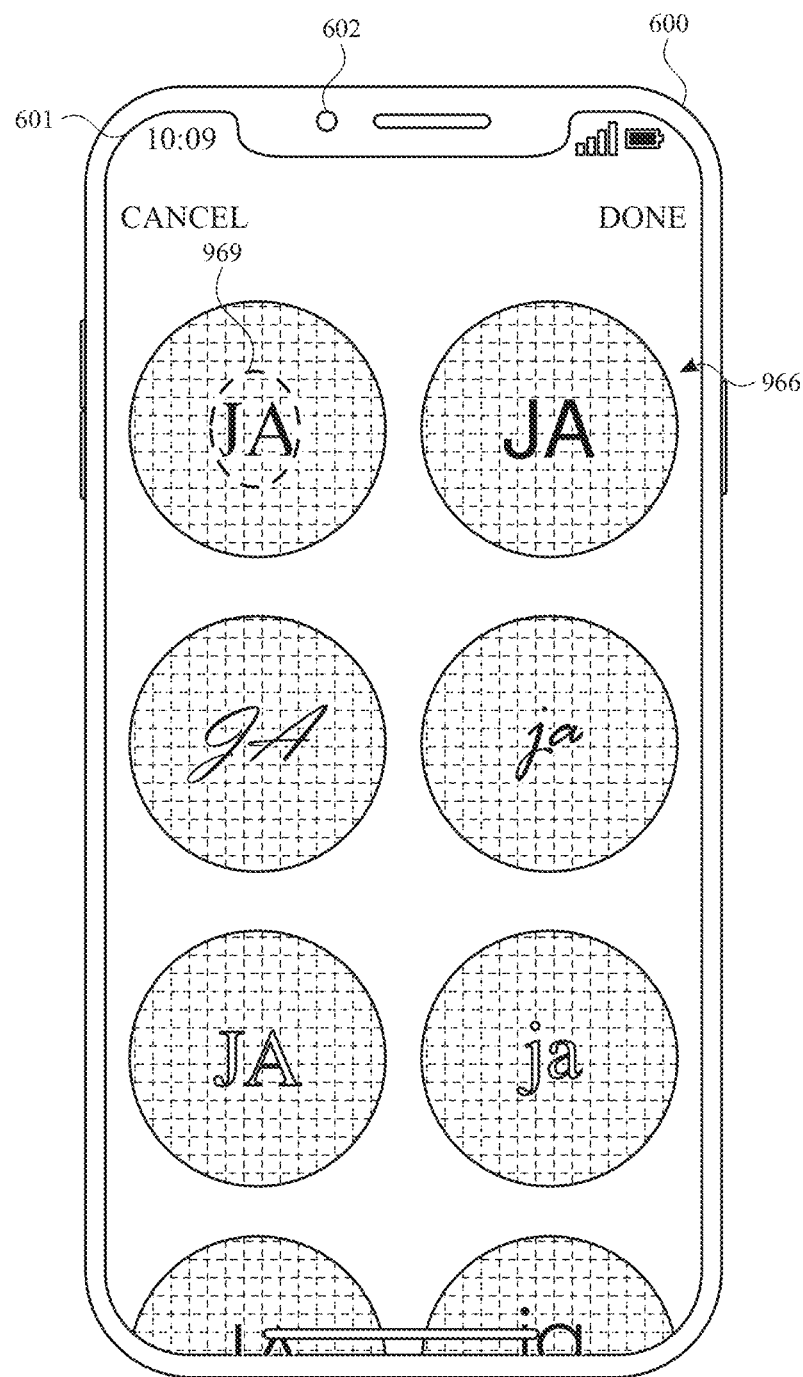

In FIG. 9P, device 600 detects input 964 on monogram option 922-1 and displays background options 965 in FIG. 9Q. After detecting a selection of a background option (e.g., via input 967), device 600 displays, in FIG. 9R, different font options 966 for the letters displayed in the monogram representation. After detecting selection of a font style (e.g., via input 969), device 600 again displays representation editing user interface 915, in FIG. 9S, showing current representation 916 updated with the selected monogram options, and new avatar option 922-4 added to second set of options 922.

Figure 9S:
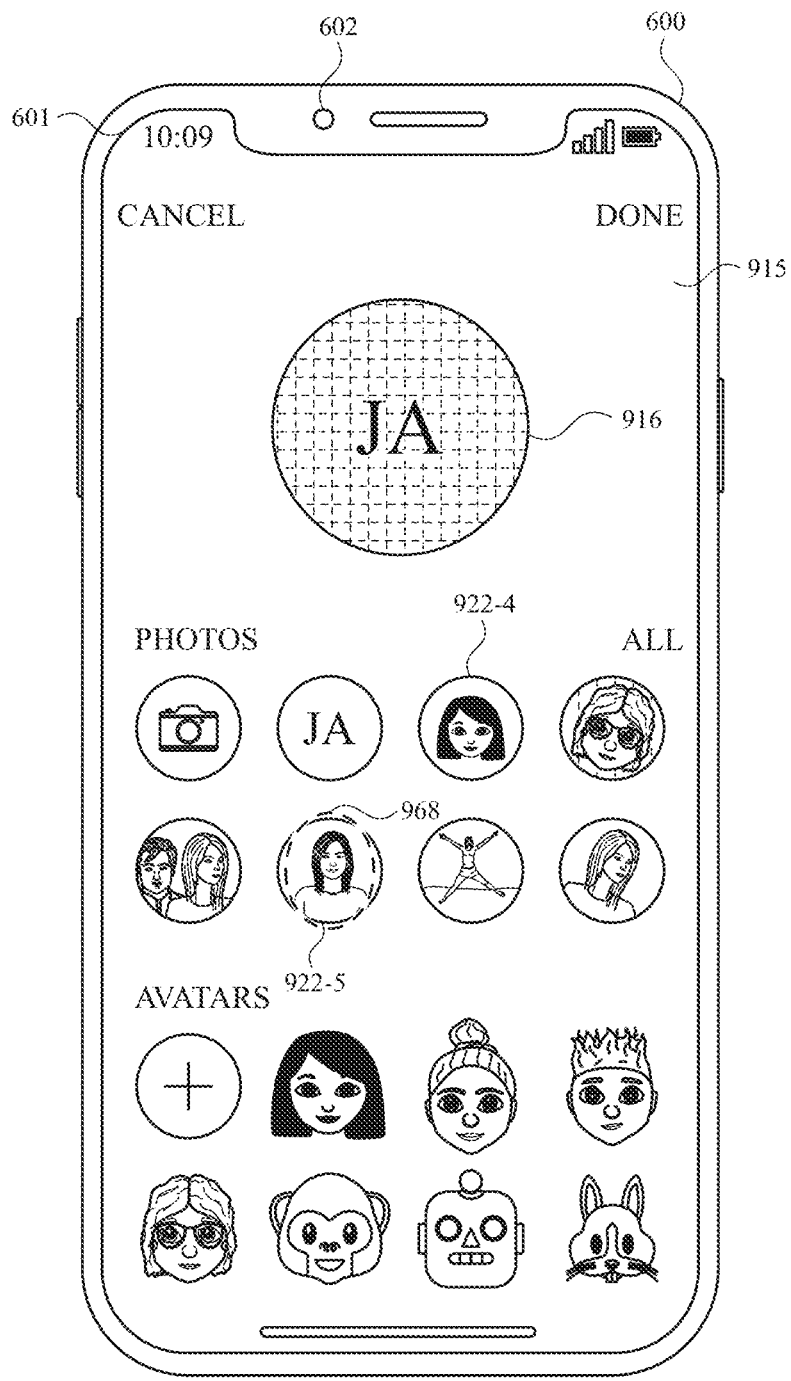

In FIG. 9S, device 600 detects input 968 on photo option 922-5. In some embodiments, photo option 922-5 represents a thumbnail view of a photograph available at device 600. In some embodiments, the photograph is identified (e.g., via automated image recognition) as a photograph of the contact (e.g., a photograph of Jane Appleseed). In some embodiments, photo option 922-5 is a recently used contact representation for the contact.

Figure 9T:
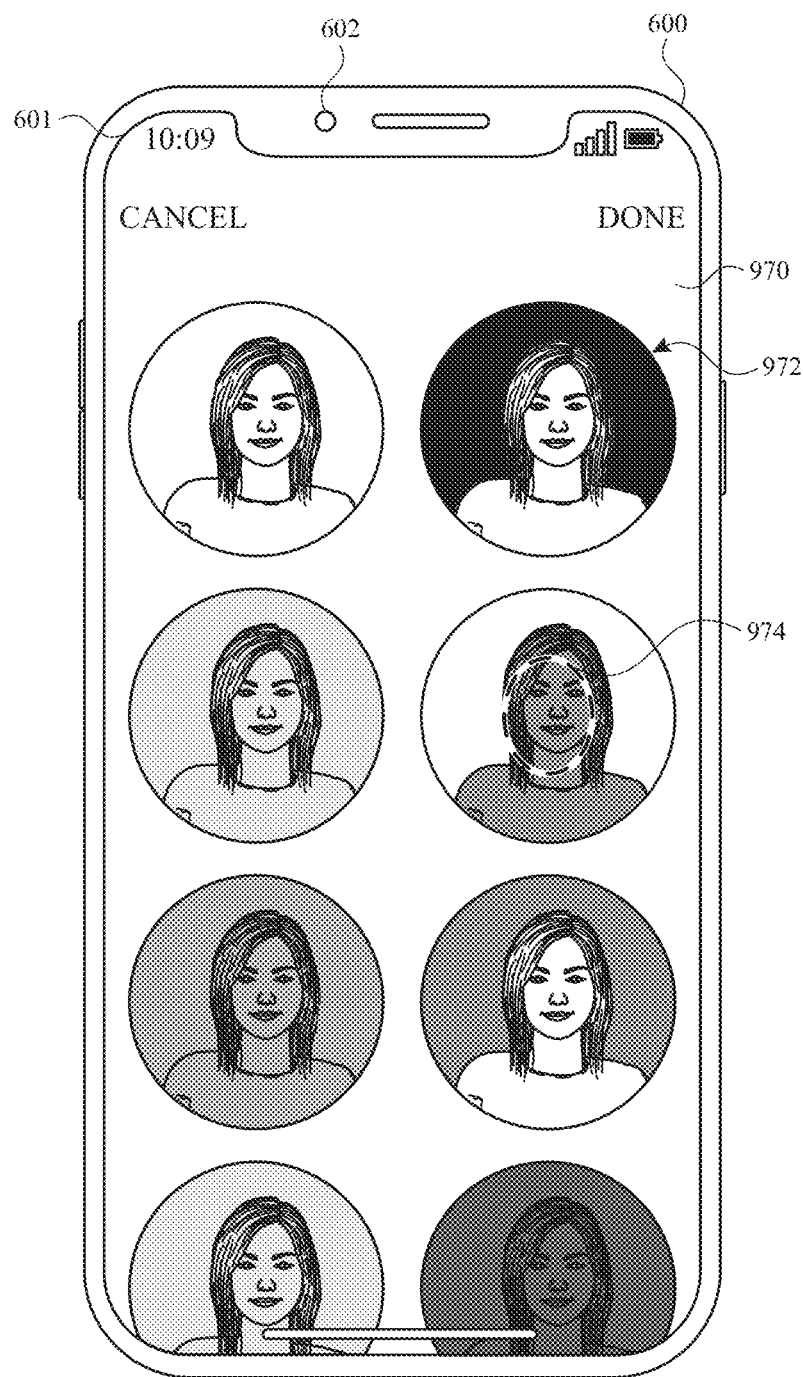
Figure 9U:
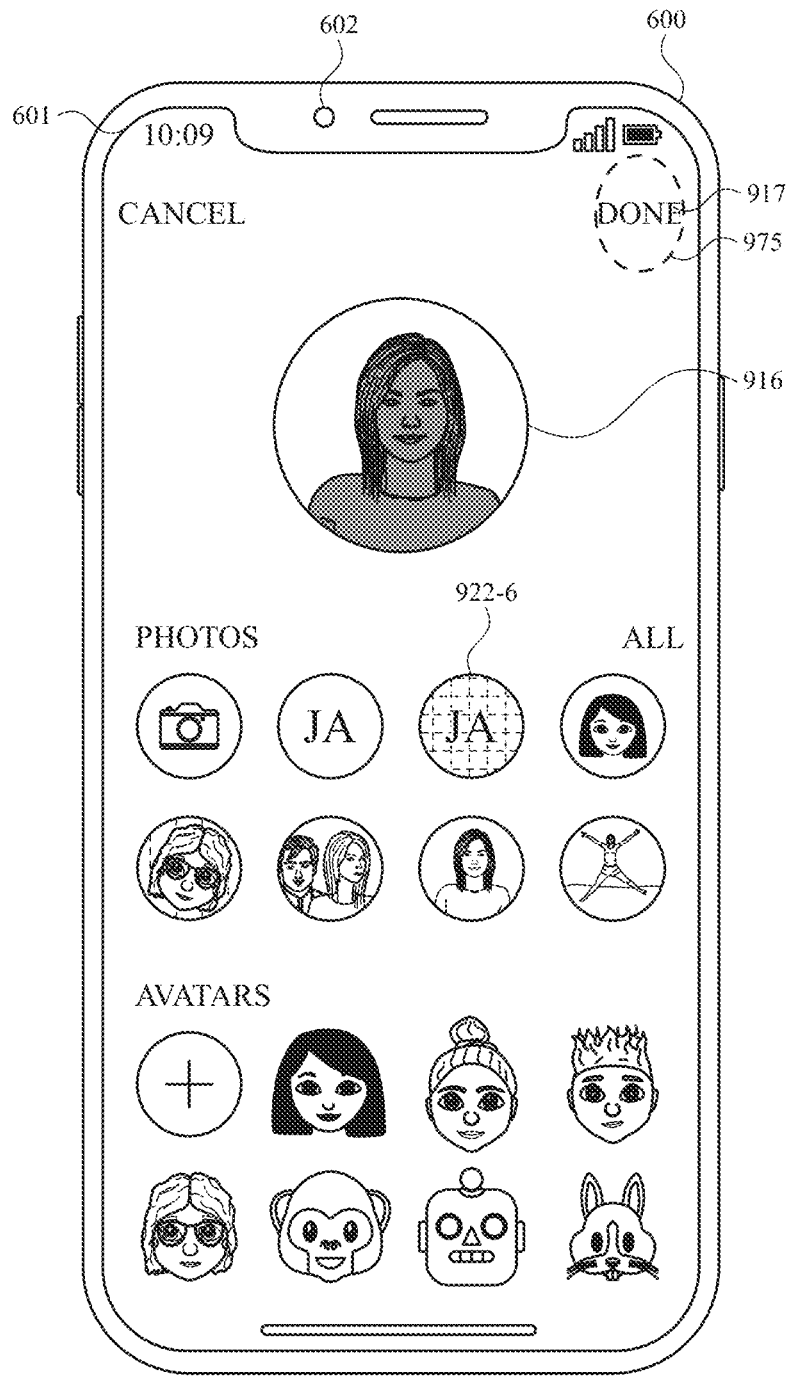

In response to detecting input 968, device 600 displays, in FIG. 9T, filter user interface 970 having different filter options 972 that can be selected and applied to the selected photo option. Device detects input 974 selecting one of the filter options 972 and applies the selected filter option to the photo as shown in FIG. 9U. Current representation 915 is displayed in FIG. 9U having the selected photo option 922-5, but modified with the selected filter option 972. Second set of options 922 is updated with recent monogram option 922-6, which represents the previous appearance of current representation 916.

In FIG. 9U, device 600 detects input 975 on done affordance 917, and exits representation editing user interface 915.

Figure 9V:

In FIG. 9V, device 600 displays contact card 976 for the contact (e.g., Jane Appleseed) with contact representation 978 having the appearance of current representation 916 in FIG. 9U.

Figure 9W:
Figure 9X:
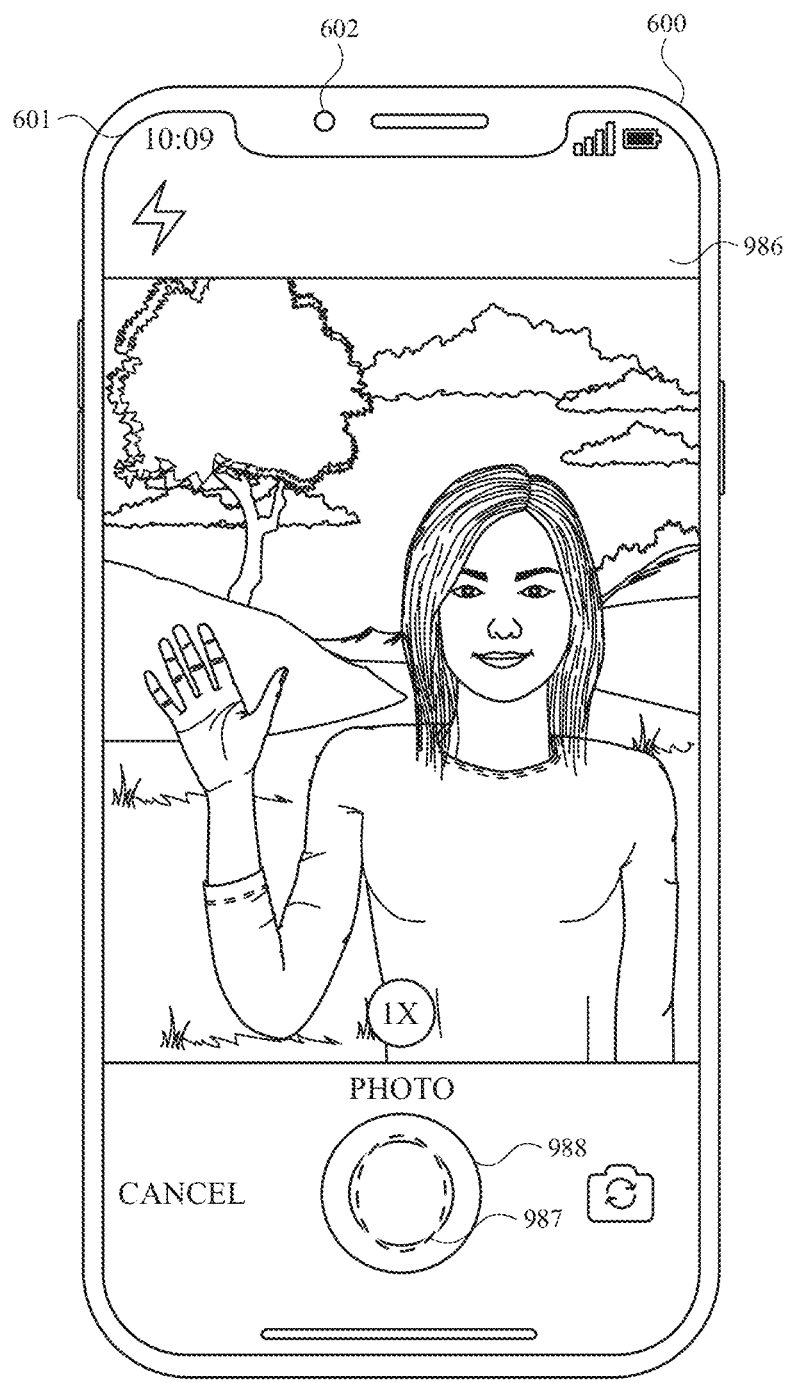

In FIG. 9V, device 600 detects input 980 on edit affordance 982 and, in response, displays representation editing user interface 915 in FIG. 9W.

In FIG. 9W, device 600 detects input 984 on camera option 922-3 and, in response, displays camera user interface 986 showing a representation of image data captured within the field of view of a camera of device 600 (e.g., camera 602). Device 600 detects input 987 on capture affordance 988, and captures image 989 displayed in FIG. 9Y with scaling user interface 990.

Figure 9Y:
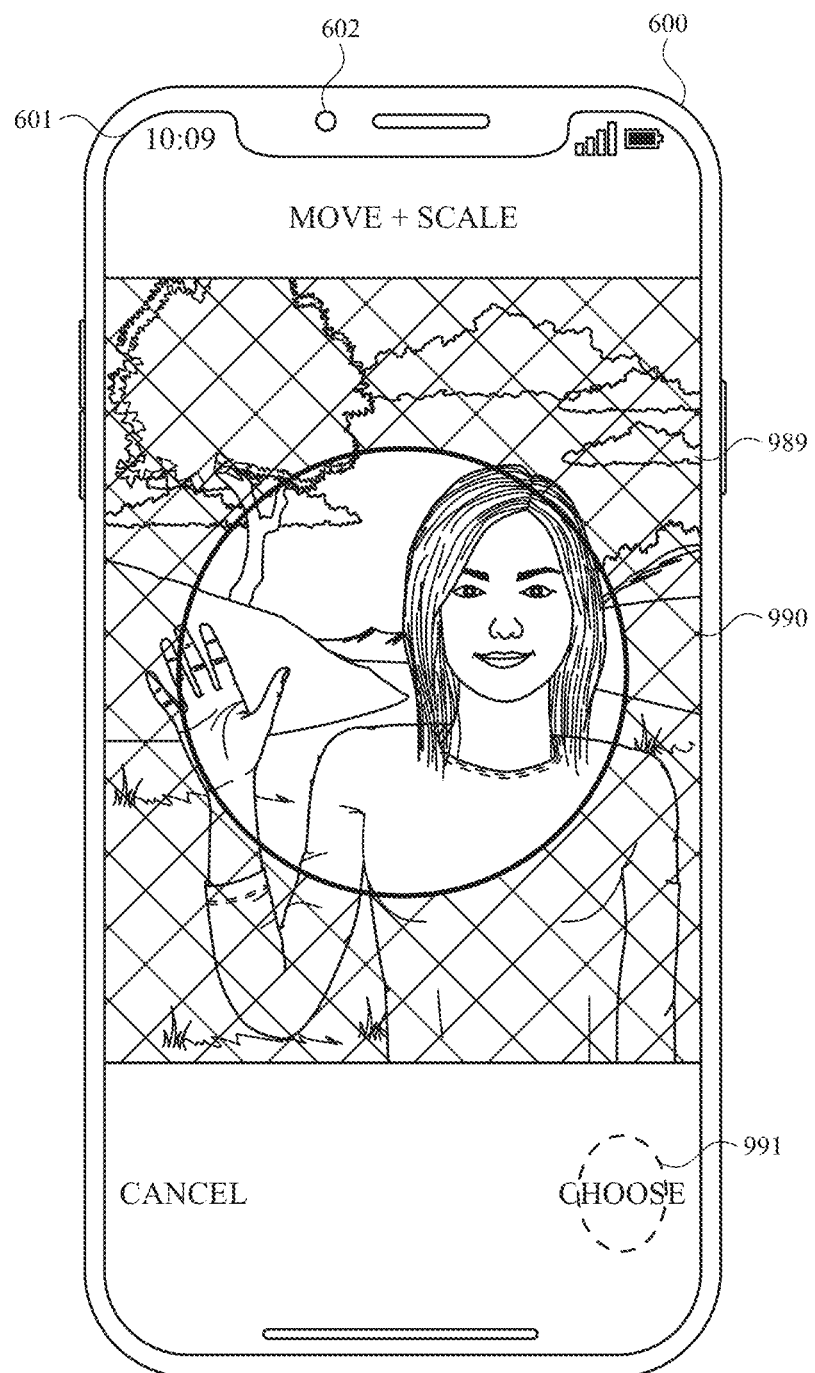
Figure 9Z:
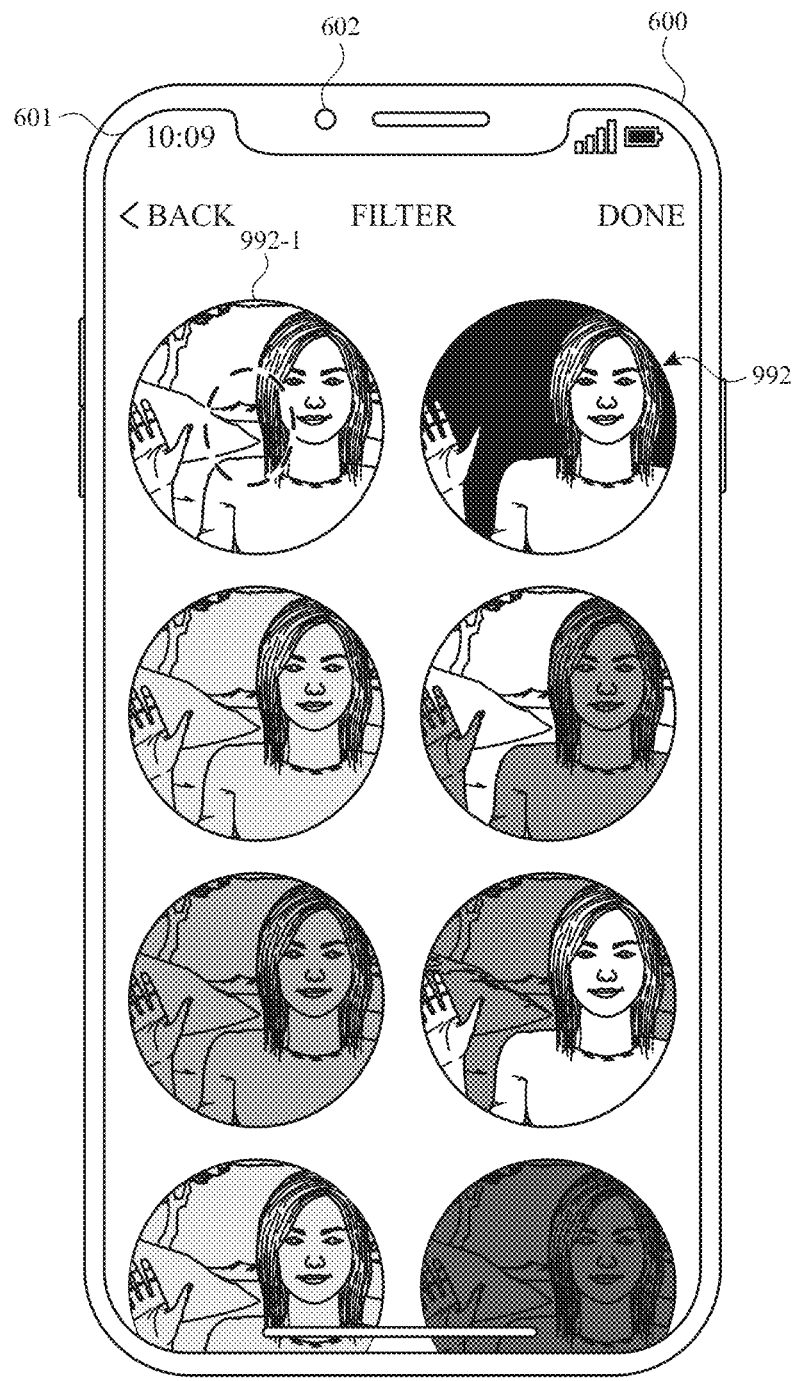
Figure 9A:
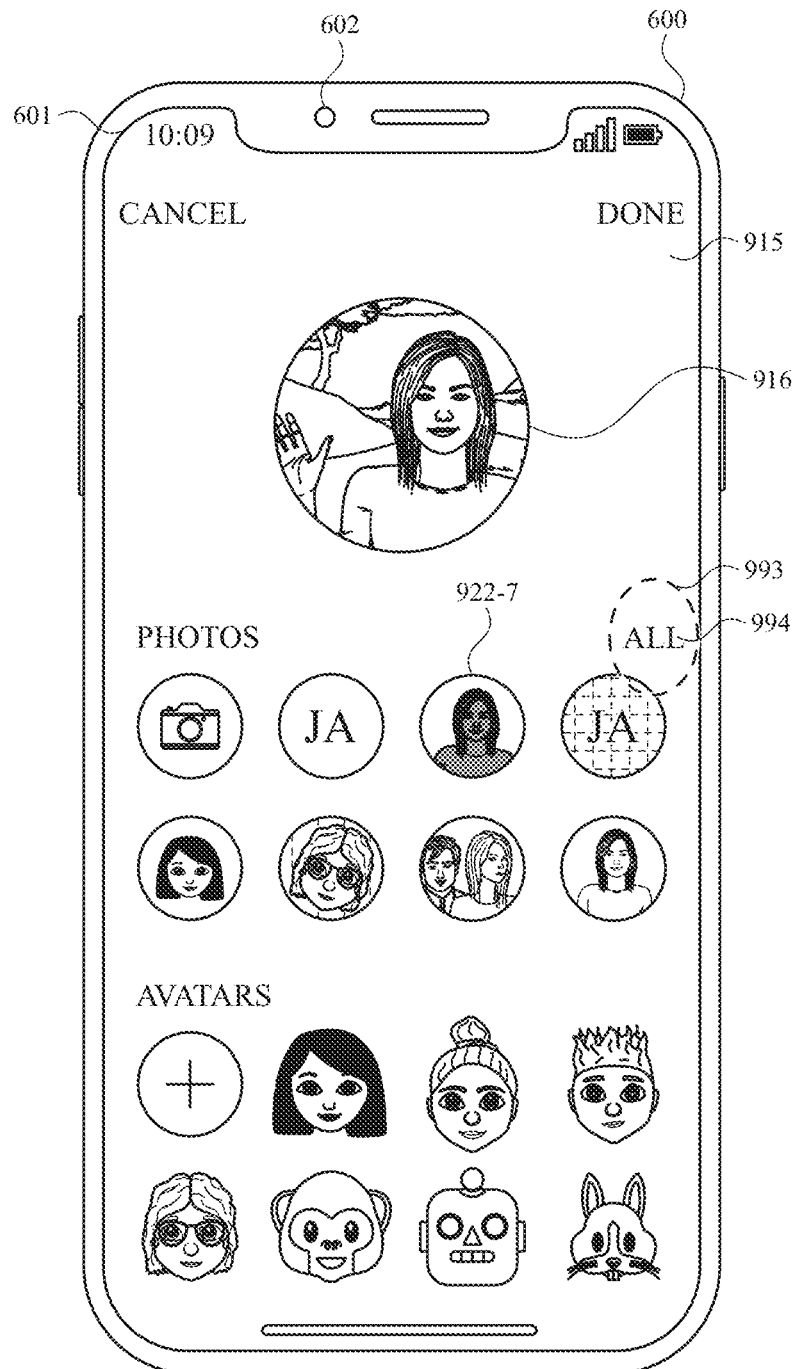
Figure 9A:
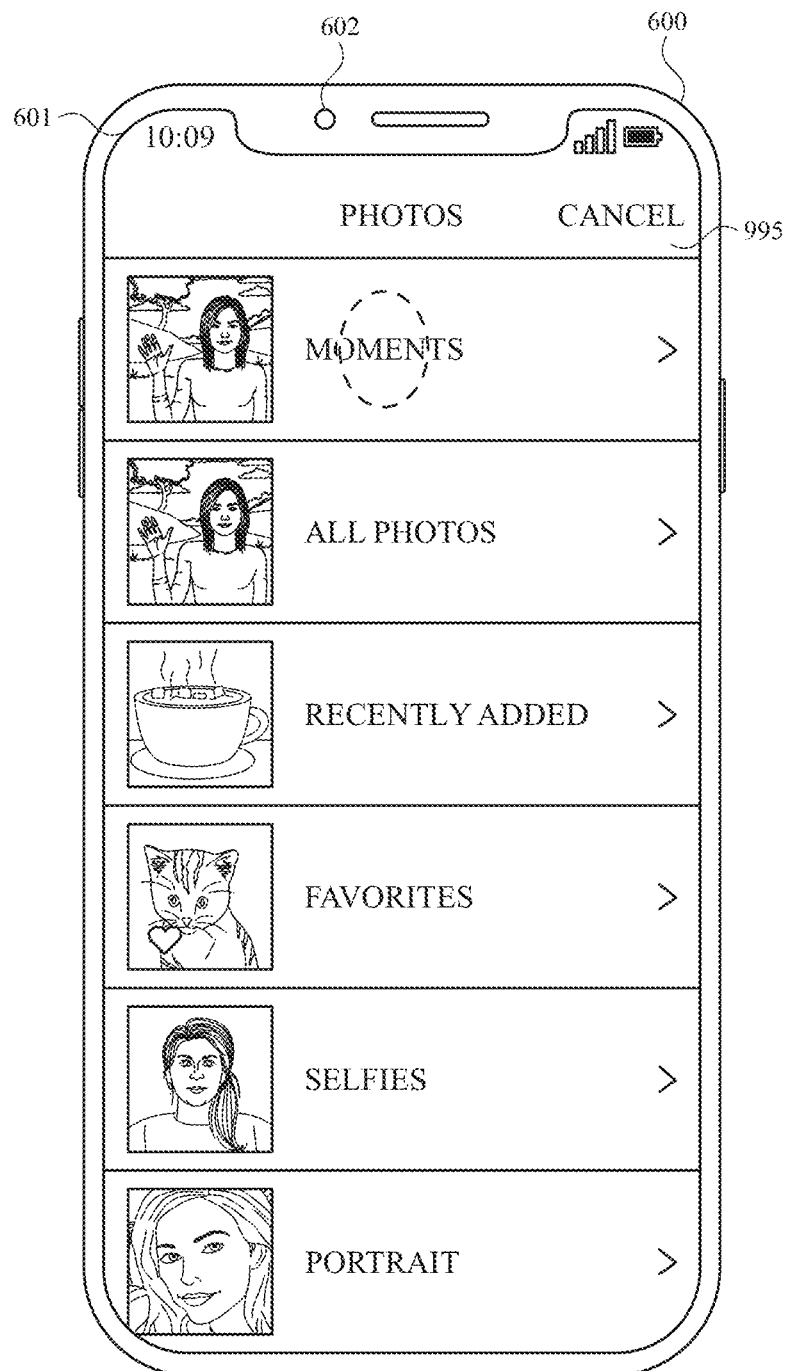
Figure 9A:
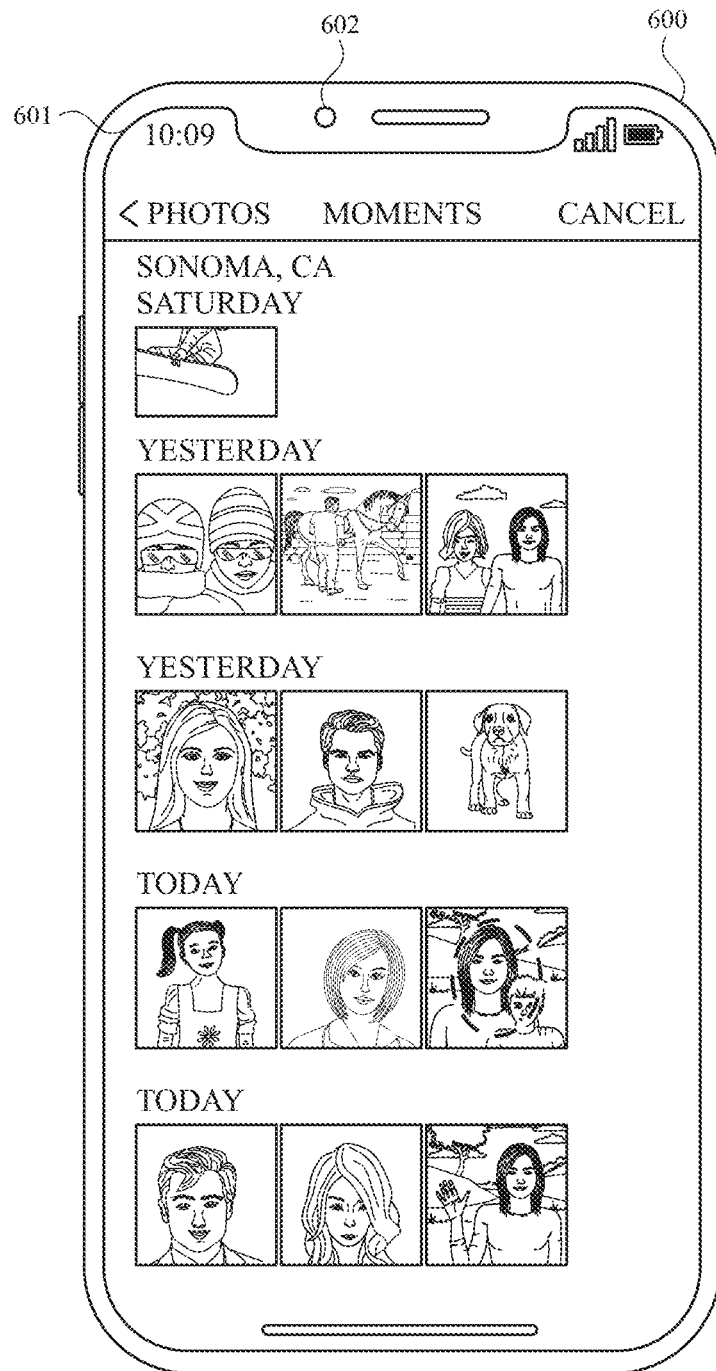
Figure 9A:
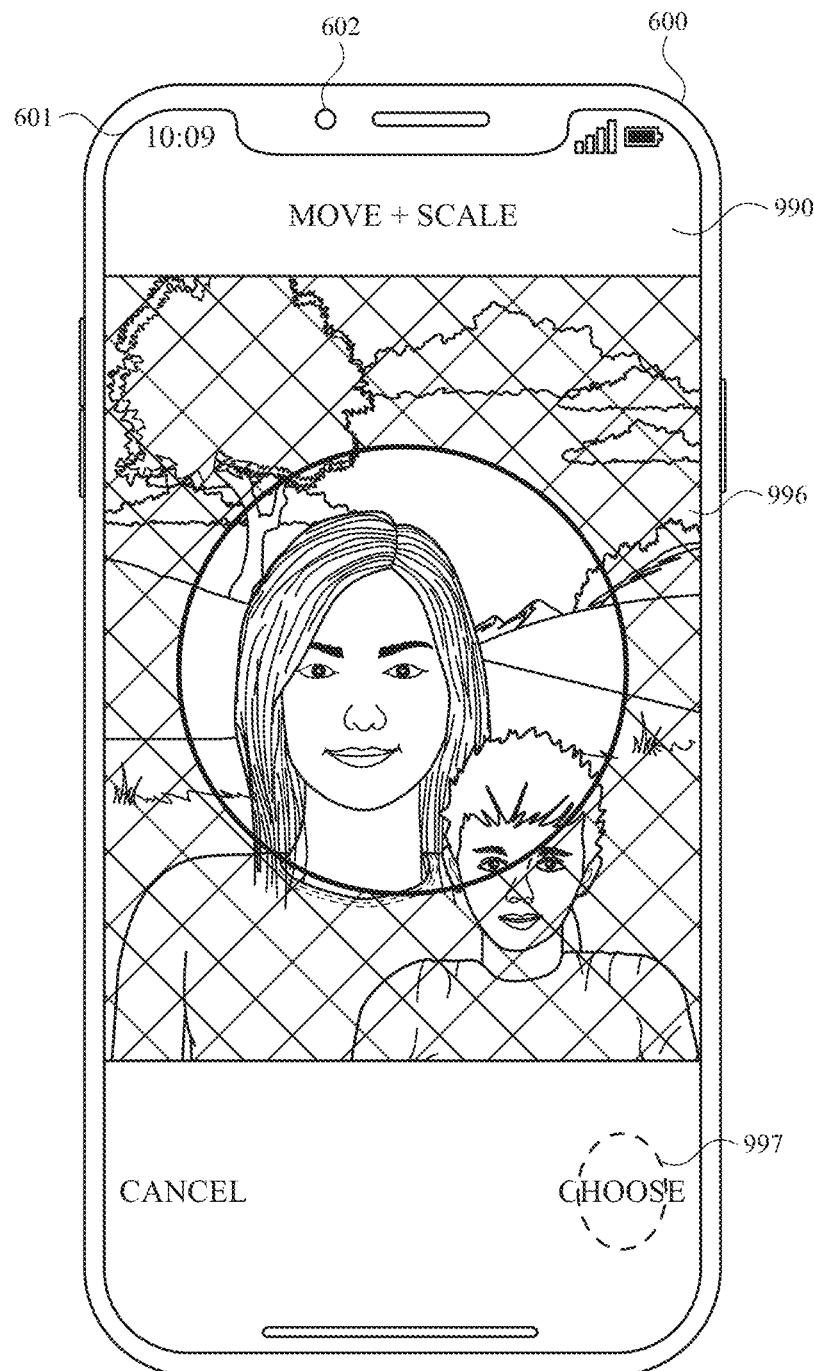
Figure 9A:
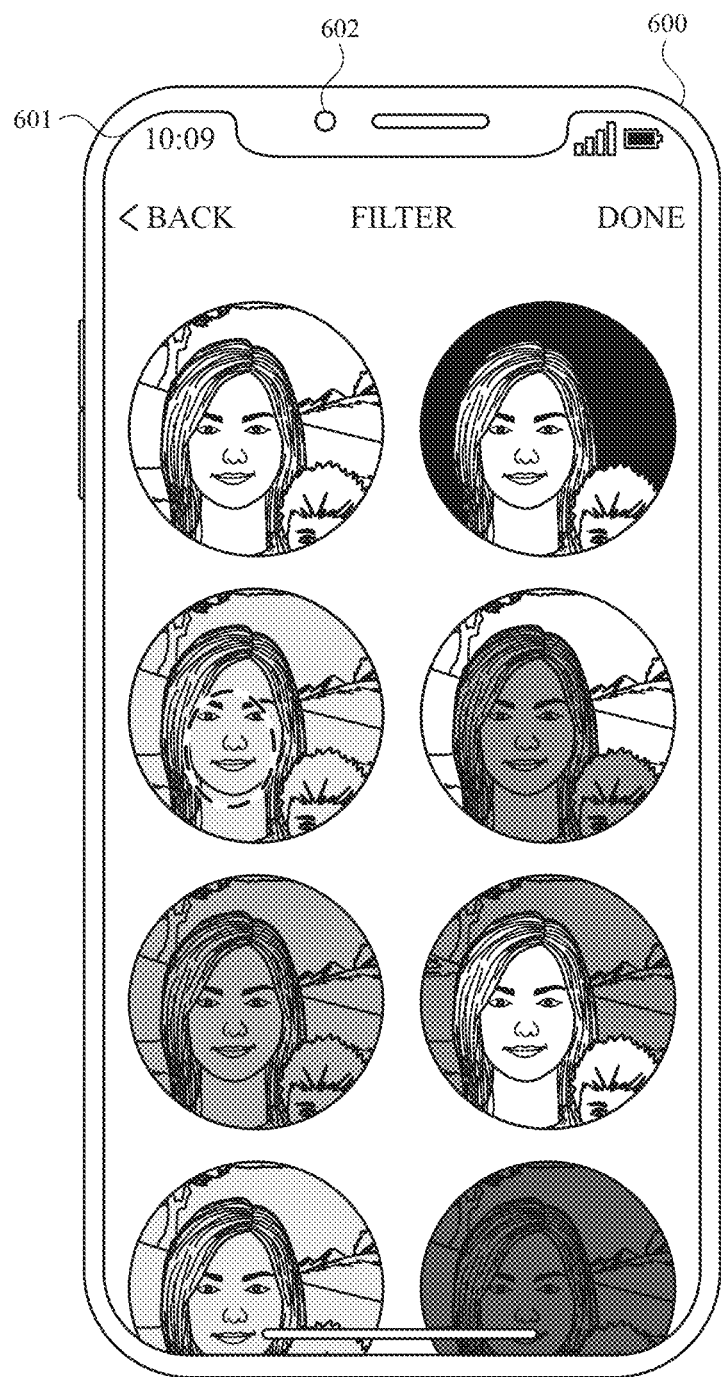
Figure 9A:
Figure 9A:
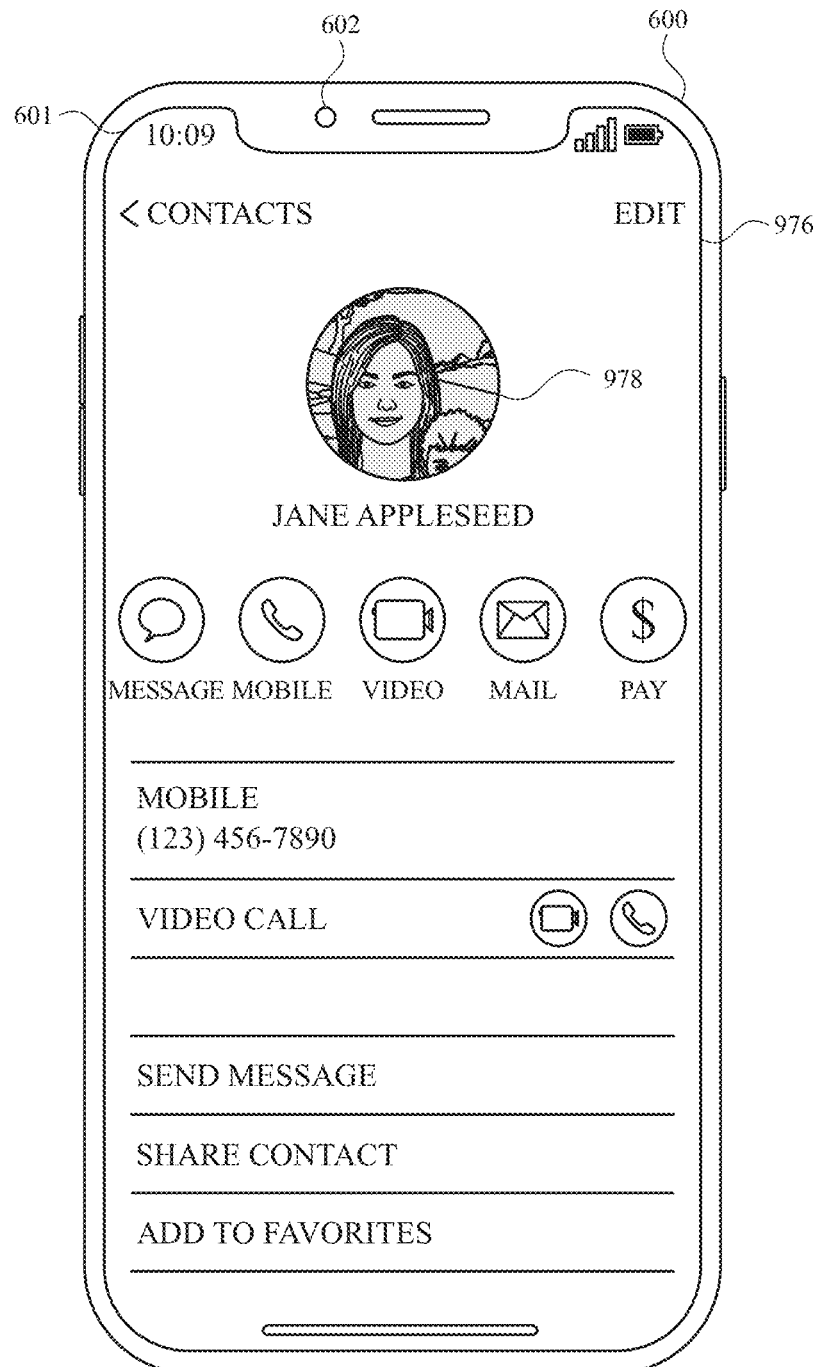

In FIG. 9Y, device 600 detects input 991 to select a scaled (and moved) portion of image 989, which is displayed with various filter options 992 in FIG. 9Z. Device 600 detects selection of a no-filter option 992-1 and, in response, displays representation editing user interface 915 in FIG. 9AA, having the non-filtered image captured and selected in FIGS. 9Y-9Z set as current representation 916. Second set of options 922 is updated to include filtered photo option 922-7, which represents the previous appearance of current representation 916.

In FIG. 9AA, device 600 detects input 993 on all affordance 994, which is an affordance for accessing a photo library available on device 600. In response, device 600 displays photo album user interface 995 in FIG. 9AB. In FIGS. 9AB and 9AC, device 600 detects selection of a photo from an album available at device 600, and displays representation 996 of the selected photo in scaling user interface 990 in FIG. 9AD.

Device 600 detects scaling and moving (e.g., cropping) of representation 996, and selection of the scaled and moved image in response to input 997 in FIG. 9AD.

In FIG. 9AE, device 600 displays filter options, detects a selection of one of the filter options, and displays current representation 916 having the image generated in the steps described above and illustrated in FIGS. 9AA-9AE. Second set of options 922 is updated with prior photo option 922-8.

Device 600 detects input 998 on done affordance 917, and displays, in FIG. 9AG, contact card 976 with contact representation 978 updated with the appearance of the contact representation generated by the selections made in FIGS. 9AA-9AE.

FIG. 10 is a flow diagram illustrating a method for displaying avatars in a contacts application user interface using an electronic device in accordance with some embodiments. Method 1000 is performed at a device (e.g., 100, 300, 500, 600) with a display and one or more input devices (e.g., 601; 602). Some operations in method 1000 are, optionally, combined, the orders of some operations are, optionally, changed, and some operations are, optionally, omitted.

As described below, method 1000 provides an intuitive way for displaying avatars in a contacts application user interface. The method reduces the cognitive burden on a user for displaying avatars in a contacts application user interface, thereby creating a more efficient human-machine interface. For battery-operated computing devices, enabling a user to display avatars in a contacts application user interface faster and more efficiently conserves power and increases the time between battery charges.

An electronic device (e.g., 600) displays (1002), via the display device (e.g., 601), a contactable user editing user interface (e.g., 915) (e.g., an interface for editing information at the electronic device for a contactable user (e.g., for contacting via telephone, email, messaging, etc.); a single interface screen). In some embodiments, the contactable user editing user interface includes (e.g., concurrently includes) one or more representation options (e.g., 921) (e.g., user interface objects (affordances)) for a contactable user including an avatar representation option (e.g., 921-2) (e.g., the avatar representation option is a user interface object (e.g., an affordance) that, when selected, initiates a process for selecting an avatar to use as a representation of the contactable user). In some embodiments, the avatar representation option has an appearance of an avatar (e.g., an avatar such as, for example, an avatar modeled to represent a human character, an avatar modeled to represent a non-human character, an avatar that can be created and/or customized by the user, and an avatar that cannot be created or customized by the user). In some embodiments avatars modeled to represent a human include customizable (e.g., selectable or configurable) avatar features that generally correspond to physical traits of a human. For example, such an avatar may include a representation of a person having various physical, human features or characteristics (e.g., an older woman with a dark skin tone and having long, straight, brown hair). Such an avatar would also include a representation of a person having various non-human characteristics that are typically associated with an appearance of a human (e.g., cosmetic enhancements, hats, glasses, etc.). In some embodiments, such an avatar would not include an anthropomorphic construct such as a stylized animal, a stylized robot, or a stylization of a normally inanimate or normally inhuman object. In some embodiments, avatars modeled to represent a non-human character include, for example, a non-human character that is an anthropomorphic construct (e.g., a stylized animal, a stylized robot, or a stylization of a normally inanimate or normally inhuman object). In some embodiments, such avatars include an avatar having customizable (e.g., selectable or configurable) avatar features that generally correspond to non-human traits and features. In some embodiments, such an avatar would not include a representation of a person having various physical, human features or characteristics (e.g., a young child having a round face and short, wavy hair), even if some of the customizable features of the human avatar include non-human characteristics (e.g., cosmetic enhancements, hats, glasses, or other inhuman objects that are typically associated with an appearance of a human).

In some embodiments, the contactable user editing user interface (e.g., 915) further includes a first representation of the contactable user (e.g., 916) (e.g., an image, monogram, or other symbol that provides a visual association to the contactable user). In some embodiments, the representation of the contactable user is displayed in other user interfaces (e.g., in a telephone application UI, in a messaging application UI, etc.) to represent the contactable user (typically in a small area on the screen). In some embodiments, the first representation of the contactable user is replaced with the avatar (e.g., 921-2) that is selected for use as a representation of the contactable user in the contactable user interface.

In some embodiments, the one or more representation options include a non-avatar option (e.g., 922-1; 922-3; 922-5; 922-6; 922-7; 922-8) (e.g., a contactable user representation option that does not correspond to an avatar) (e.g., the non-avatar option is associated with a photo, monogram, or other option that is not an avatar for selection to use as a representation of the contactable user in the contactable user interface). In some embodiments, the electronic device (e.g., 600) detects, via the one or more input devices (e.g., 601), a selection (e.g., 964; 968; 984; 993) of the non-avatar option. In some embodiments, in response to detecting selection of the non-avatar option, the electronic device initiates a process for selecting a representation option other than an avatar (e.g., a photo, monogram, etc.) to use as a representation of the contactable user in the contactable user interface.

In some embodiments, the one or more representation options includes a plurality of options (e.g., 922) selected based on information for the contactable user.

In some embodiments, the plurality of options selected based on information for the contactable user include a recently used representation of the contactable user (e.g., 922-1; 922-2; 922-4; 922-6; 922-7; 922-8) (e.g., a representation of the contactable user that was previously used within a predetermined amount of time or a predetermined number of instances of selecting a representation of the contactable user). In some embodiments, after a representation is selected for the contactable user, the representation is added to a collection of recently used representations of the contactable user. Adding the recently selected representation for the contactable user to a collection of recently used representations for the contactable user reduces the number of inputs needed for subsequent use of the recently selected representation (e.g., reducing the inputs needed to generate or access the representation). Reducing the number of inputs enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the plurality of options selected based on information for the contactable user include media items available at the electronic device identified as being associated with the contactable user (e.g., 922-5) (e.g., photos of the contactable user). In some embodiments, the plurality of options selected based on information for the contactable user include media items are identified as being associated with the contactable user and meeting a particular quality standard (e.g., the photo is primarily capturing the contactable user, the photo is in focus, etc.). In some embodiments, the media items correspond to the contactable user. For example, the media items include photos of the user. As another example, the media items were previously (e.g., recently) sent to or received from the contactable user. Displaying recently communicated media items for potential use as representations for the contactable user reduces the number of inputs needed for subsequent use of the media items (e.g., reducing the inputs needed to generate or access the representation). Reducing the number of inputs enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the information for the contactable user includes information from a messaging communication session with the contactable user. In some embodiments, the items include stickers, photos, or other content comprising messaging metadata from communications to/from the contactable user.

In some embodiments, the one or more representation options includes a monogram representation option (e.g., 922-1; 922-6) (e.g., a representation of the contactable user that is a monogram having initials corresponding to names (e.g., first name; last name; middle name) associated with the contactable user).

In some embodiments the one or more representation options includes a media item option (e.g., 922-5; 922-7; 922-8) (e.g., selecting a photograph associated with the contactable user (e.g., a photograph of the contactable user) from a collection of photographs associated with the contactable user (e.g., a collection of photographs of the contactable user)).

In some embodiments, after detecting a selection of the media item option, the electronic device (e.g., 600) displays, via the display device (e.g., 601), a plurality of filter options for applying a filter effect to a media item associated with the selected media item option. In some embodiments, a filter effect is applied to the media item by overlaying the filter effect onto the media item. In some embodiments, the filter effect applies changes to both a background in the media item as well as any applied visual effects (e.g., avatars, stickers, etc.) that may be included in the media item. In some embodiments, the filter changes an appearance of the media item (e.g., applying a comic book filter, a sketch drawing filter, a black and white filter, a greyscale filter, or the like). In some embodiments, the filter is a filter that reduces a realism of the media item (e.g., a sketch filter or a comic book filter). In some embodiments the filter is a filter that reduces a 3D effect (e.g., flattens) of the media item. Displaying filter options for modifying a media item option after it is selected reduces the number of inputs needed to customize the selected media item if a different control scheme were used (e.g., one that required navigation to a customization user interface and selection of different controls for displaying and modifying the selected media item). Reducing the number of inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The electronic device detects (1004), via the one or more input devices (e.g., 601), a selection (e.g., 936) of the avatar representation option (e.g., 921-2).

In response to detecting selection of the avatar representation option (e.g., 921-2), the electronic device (e.g., 600) initiates (1006) a process for selecting an avatar to use as a representation of the contactable user in the contactable user interface.

As a part of the process for selecting the avatar to use as a representation of the contactable user in the contactable user interface, the electronic device receives (1008) a sequence of one or more inputs (e.g., 936; 938; 944; 950; 954; 956; 959; 962; image data controlling avatar 928 in FIG. 9H), via the one or more input devices (e.g., 601; 602), that correspond to selection of a simulated three-dimensional avatar (e.g., 928; 916 in FIG. 9M; 960; 916 in FIG. 9P).

In some embodiments, in response to selection of the simulated three-dimensional avatar, the electronic device (e.g., 600) displays (1010), via the display device (e.g., 601), a posing user interface (e.g., 926; 940) that includes one or more controls (e.g., 942-1 through 942-6) (e.g., 930) (e.g., a plurality of user interface objects (e.g., affordances) corresponding to different predefined poses) (e.g., a capture affordance for capturing a pose using a camera of the electronic device) for selecting a pose of the simulated three-dimensional avatar from a plurality of different poses. Displaying a pose interface for selecting a pose of the avatar from a plurality of different poses after selecting the avatar reduces the number of inputs needed to customize the selected avatar if a different control scheme were used (e.g., one that required navigation to a customization user interface and selection of different controls for displaying and modifying the selected avatar). Reducing the number of inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the one or more controls include a first pose user interface object (e.g., 942-1) (e.g., first pose affordance) corresponding to a first predefined pose and a second pose user interface object (e.g., 942-2) (e.g., second pose affordance) corresponding to a second predefined pose, different than the first predefined pose. In some embodiments, in response to detecting selection of one of the pose affordances, the simulated three-dimensional avatar is set (e.g., displayed) having the pose that corresponds to the selected pose affordance.

In some embodiments, the one or more input devices includes a camera (e.g., 602). In some embodiments, the one or more controls include a capture user interface object (e.g., 630) (e.g., capture affordance) that, when selected, selects a pose for the simulated three-dimensional avatar that is based on a pose of a face detected in a field of view of the camera at a time that the capture user interface object was selected (e.g., see FIGS. 9H and 9I). In some embodiments, displaying the posing user interface includes displaying the capture affordance and the simulated three-dimensional avatar, wherein the simulated three-dimensional avatar is reactive to detected changes in the pose of the face detected in the field of view of the camera (e.g., different detected poses of the face correspond to the plurality of different poses that can be selected from to assign a pose to the three-dimensional avatar). When the capture affordance is selected, the electronic device selects the pose of the simulated three-dimensional avatar at the time the capture affordance is selected. Displaying a capture user interface object that selects a pose for the avatar based on a face detected in a field of view of a camera provides a control scheme for composing a representation of a contactable user on a display of an electronic device, wherein the system detects and processes input in the form of changes to facial features of a user (and the magnitude and/or direction of those changes), and through an iterative feedback loop provides the desired output in the form of the appearance (e.g., modified poses) of the avatar, while eliminating the need for manual handling of the user interface (e.g., providing touch inputs on the display). This provides improved visual feedback to the user regarding how to manipulate the display to control and/or compose the avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control poses of the avatar than would be necessary if a different animation control scheme were used (e.g., a control scheme requiring manipulation of individual control points for each frame of an animation sequence). Moreover, this type of control can be done in real time during, for example, a conversation such as a text conversation or a video conversation, whereas manual animation control of an avatar would have to be done before the conversation started or after it had ended.

In some embodiments, after selecting the pose of the simulated three-dimensional avatar from the plurality of different poses (e.g., 938 in FIG. 9I) (e.g., 944 in FIG. 9J), the electronic device sets the simulated three-dimensional avatar with the selected pose as the representation of the contactable user (e.g., 916 in FIG. 9M) (e.g., displaying the representation of the contactable user having an appearance of the simulated three-dimensional avatar having the selected pose; associating the simulated three-dimensional avatar, in the selected pose, with the contactable user so that the three-dimensional avatar, in the selected pose, is used to represent the contactable user).

In some embodiments, displaying the posing user interface (e.g., 926) includes, in accordance with a determination that a first avatar (e.g., 921-1) was selected as the simulated three-dimensional avatar (e.g., an avatar affordance corresponding to a first avatar was selected), displaying at least one representation of the first avatar (e.g., 928 in FIG. 9F) in the posing user interface (e.g., displaying the representation of the first avatar having at least one pose for selection). In some embodiments, displaying the posing user interface includes, in accordance with a determination that a second avatar (e.g., 921-2) (e.g., an avatar different from the first avatar) was selected as the simulated three-dimensional avatar (e.g., an avatar affordance corresponding to a second avatar was selected), displaying at least one representation of the second avatar (e.g., 928 in FIG. 9H) in the posing user interface (e.g., displaying the representation of the second avatar having at least one pose for selection) (e.g., without displaying a representation of the first avatar). Displaying the representation of the second avatar having a pose for selection without displaying a representation of the first avatar provides visual feedback to the user that changes in the pose affect the appearance of the second avatar and not the first avatar. Providing improved feedback enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to displaying the contactable user editing user interface (e.g., 915), the electronic device (e.g., 600) detects a series of inputs corresponding to a request to create a first user-created avatar (e.g., a series of inputs for creating the first user-created avatar that are detected, for example, in a user interface of a different application (e.g., avatar creation user interface 632 in FIG. 6F; avatar editing user interface 11002 in FIGS. 11A-11AD)) (e.g., 956). In some embodiments, the electronic device receives a request (e.g., 914) (e.g., 962) to display the contactable user editing user interface. In some embodiments, in response to receiving the request to display the contactable user editing user interface, the electronic device displays the contactable user editing user interface including the first user-created avatar (e.g., 921-1; 921-4). Displaying the contactable user editing user interface including the first user-created avatar after a user has created/updated the avatar reduces the number of inputs to perform the technical task of generating the avatar for use as a representation of a contactable user. Reducing the number of inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the sequence of one or more inputs that correspond to selection of the simulated three-dimensional avatar includes an input corresponding to selection (e.g., 936) of the first user-created avatar (921-4; 921-2) from a set of user-created avatars (e.g., 921-4, 921-2, girl avatar adjacent option 921-3 in FIG. 9G, spikey hair avatar adjacent woman avatar option 921-2 in FIG. 9G).

In some embodiments, the sequence of one or more inputs that correspond to selection of the simulated three-dimensional avatar includes a set of inputs (e.g., 956, 959, 962) corresponding to creating a new avatar (e.g., the avatar is created in response to detecting a series of user inputs directed to an avatar creation user interface). In some embodiments, the new avatar is created after the contactable user editing user interface is displayed (e.g., while the contactable user editing user interface display is displayed, a series of inputs is received to access an avatar creation user interface and to create the new avatar). In some embodiments, the newly created avatar is selected for use as the simulated three-dimensional avatar. Creating a new avatar in the contactable user editing user interface reduces the number of inputs to perform the technical task of generating a representation of the contactable user. This provides an improved control scheme for generating custom representations, which can require fewer inputs to generate the custom representations than would be necessary if a different control scheme were used (e.g., a control scheme requiring navigation to a different application to create and customize an avatar that can then be loaded into the contactable user editing user interface for selection). Moreover, this type of control can be done in real time during, for example, a conversation such as a text conversation or a video conversation, whereas manual control to build a sticker would have to be done before the conversation started or after it had ended. This enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after selecting the pose of the simulated three-dimensional avatar from the plurality of different poses, the electronic device (e.g., 600) displays, via the display device (e.g., 601), a background option (e.g., 952-3 in FIG. 9L) that, when selected (e.g., 954), changes an appearance (e.g., a color, shape, and/or texture) of a background region of the representation of the contactable user (e.g., see updated 916 in FIG. 9M).

In some embodiments, displaying the posing user interface that includes the one or more controls includes, in accordance with a determination that the one or more input devices (e.g., 602) include a depth camera sensor (e.g., depth camera sensor 175 in FIG. 1A) (e.g., a depth camera), displaying, via the display device (e.g., 601), the simulated three-dimensional avatar having a dynamic appearance (e.g., avatar 928 in FIGS. 9H and 9I) in which the simulated three-dimensional avatar changes poses in response to changes in a pose of a face detected in a field of view of the depth camera sensor (e.g., the simulated three-dimensional avatar mirrors the changes in pose of the face detected with the depth camera). In some embodiments, the one or more controls are displayed having a capture affordance that, when selected, captures a pose for the simulated three-dimensional avatar that is based on the pose of the face detected in the field of view of the depth camera at the time the capture affordance was selected. In some embodiments, displaying the posing user interface that includes the one or more controls includes, in accordance with a determination that the one or more input devices do not include a depth camera sensor, displaying, via the display device, a third pose user interface object (e.g., 942-3) (e.g., a third pose affordance) (e.g., the first pose affordance) corresponding to a third predefined pose (e.g., the first predefined pose) and a fourth pose user interface object (942-4) (e.g., a fourth pose affordance) (e.g., the second pose affordance) corresponding to a fourth predefined pose (e.g., the second predefined pose), different from the third predefined pose (e.g., the one or more controls are displaying as a plurality of affordances each having an appearance of the simulated three-dimensional avatar having one of the plurality of predefined poses). In some embodiments, in response to detecting selection of one of the pose affordances, the simulated three-dimensional avatar is set to the pose that corresponds to the selected pose affordance. Displaying the posing user interface that includes a third pose user interface object corresponding to a third predefined pose and a fourth pose user interface object corresponding to a fourth predefined pose provides a variety of selectable pose options, which reduces the number of inputs for selecting a pose to perform the technical task of creating a representation of a contactable user. Reducing the number of inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a depth camera captures image data that corresponds to depth data (e.g., the image data includes data captured by a visible light camera and a depth camera) (e.g., image data that includes a depth aspect (e.g., depth data independent of RGB data) of a captured image or video) that includes depth data for a subject positioned in the field of view of the depth camera (e.g., information about the relative depth positioning of one or more portions of the subject with respect to other portions of the subject and/or to other objects within the field of view of the one or more cameras). In some embodiments, the image data includes at least two components: an RGB component that encodes the visual characteristics of a captured image, and depth data that encodes information about the relative spacing relationship of elements within the captured image (e.g., the depth data encodes that a user is in the foreground, and background elements, such as a tree positioned behind the user, are in the background). In some embodiments, the image data includes depth data without an RGB component. In some embodiments, the depth data is a depth map. In some embodiments, a depth map (e.g., depth map image) contains information (e.g., values) that relates to the distance of objects in a scene from a viewpoint (e.g., a camera). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., camera) in the "three dimensional" scene. In other examples, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction. In some embodiments, the depth data has a first depth component (e.g., a first portion of depth data that encodes a spatial position of the subject in the camera display region; a plurality of depth pixels that form a discrete portion of the depth map, such as a foreground or a specific object) that includes the representation of the subject in the camera display region. In some embodiments, the depth data has a second depth component (e.g., a second portion of depth data that encodes a spatial position of the background in the camera display region; a plurality of depth pixels that form a discrete portion of the depth map, such as a background), separate from the first depth component, the second depth aspect including the representation of the background in the camera display region. In some embodiments, the first depth aspect and second depth aspect are used to determine a spatial relationship between the subject in the camera display region and the background in the camera display region. This spatial relationship can be used to distinguish the subject from the background. This distinction can be exploited to, for example, apply different visual effects (e.g., visual effects having a depth component) to the subject and background. In some embodiments, all areas of the image data that do not correspond to the first depth component (e.g., areas of the image data that are out of range of the depth camera) are segmented out (e.g., excluded) from the depth map. In some embodiments, the depth data is in the form of a depth map or depth mask.

Note that details of the processes described above with respect to method 1000 (e.g., FIG. 10) are also applicable in an analogous manner to the methods described above and below. For example, methods 700, 800, 1200, 1300, 1500, 1700, and 1800 optionally includes one or more of the characteristics of the various methods described above with reference to method 1000. For example, an avatar can be displayed and used in a user interface in a manner similar to that described above. For brevity, these details are not repeated below.

FIGS. 11A-11AD illustrate exemplary user interfaces for displaying avatars in an avatar editing application user interface, in accordance with some embodiments. The user interfaces in these figures are used to illustrate the processes described below, including the processes in FIGS. 12 and 13.

FIG. 11A illustrates electronic device 600 displaying (e.g., on display 601) avatar editing user interface 11002, for editing features of avatar 11005. Avatar editing user interface 11002 is similar to avatar creation user interface 603, avatar editing user interface 670, and avatar creation user interface 958, shown in FIGS. 6F, 6P, and 9N, respectively. Details for editing avatar 11005 using avatar editing user interface 11002 are provided below. Additional details for editing an avatar in a similar editing user interface are provided in U.S. patent application Ser. No. 16/116,2221, which is hereby incorporated by reference for all purposes.

Avatar editing user interface 11002 includes avatar display region 11004 having avatar 11005 and selectable avatar feature menu options 11006. Avatar editing user interface 11002 further includes avatar option region 11008, which includes various feature options that can be selected to change features of avatar 11005. In FIG. 11A, lips menu option 11006-1 is selected, and avatar option region 11008 displays selectable lip options 11010. Avatar 11005 has an appearance that includes a face with no selected skin tone or hair and having facial wrinkles 11007 and eyebrows 11009. Avatar 11005 also has mouth 11014 with lips corresponding to selected lip option 11010-2.

Feature options (e.g., lip options 11010) have an appearance that represents a potential appearance of the avatar (e.g., avatar 11005) if the respective feature option is selected. The appearances of the feature options can be dynamically updated (e.g., in real time) when feature options are selected.

The selectable feature options correspond options for modifying a corresponding characteristic of an avatar feature (e.g., the avatar's lips feature as shown in FIG. 11A). When a feature option is selected (e.g., thick lips option 11010-1), the characteristic (e.g., lip shape/size) is assigned the corresponding value (e.g., thick), and the changed characteristic is then reflected in displayed changes to avatar 11005 and other feature options (e.g., in avatar option region 11008) that include a displayed representation of the characteristic. To continue the current example, in response to detecting selection of thick lips option 11010-1, device 600 would change the lips of avatar 11005 to thick lips and any displayed feature options showing lips would also be updated to display thick lips.

Figure 11B:
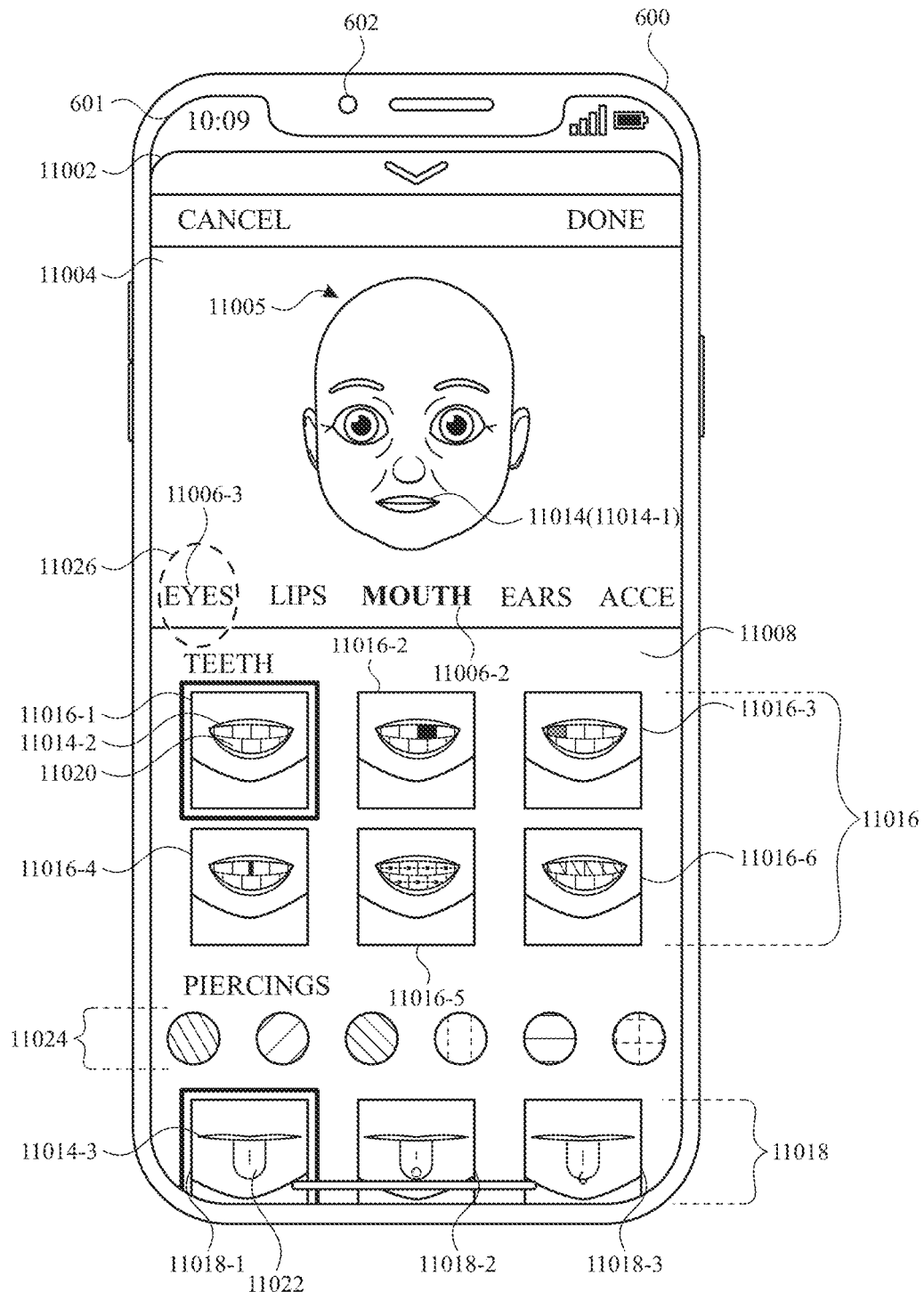

In FIG. 11A, device 600 detects input 11012 (e.g., a tap gesture) on mouth menu option 11006-2 and, in response, updates avatar display region 11004 to show avatar feature menu options 11006 updated (e.g., repositioned with mouth menu option 11006-2 selected), and updates avatar option region 11008 to display various feature options for modifying characteristics of avatar mouth 11014, as shown in FIG. 11B.

In FIG. 11B, device 600 shows avatar option region 11008 having sets of feature options for modifying different characteristics of avatar mouth 11014, which is shown on avatar 11005 having neutral pose 11014-1. In some embodiments, avatar 11005 is responsive to detected changes in the pose of a user's face positioned in the field of view of camera 602. In the embodiments disclosed herein, avatar 11005 has a neutral pose because the user is maintaining a neutral pose while interacting with avatar editing user interface 11002.

The sets of feature options include teeth options 11016, and tongue piercing options 11018. Each set of feature options displays avatar mouth 11014 having a different pose to display, for the respective set of feature options, the mouth characteristics that are capable of being modified by the feature options in the respective set of feature options. For example, while avatar mouth 11014 has neutral pose 11014-1 on avatar 11005, teeth options 11016 show avatar mouth 11014 having smile pose 11014-2 to reveal avatar teeth 11020, so that the different teeth options are displayed for the user to more easily view. Similarly, while avatar mouth 11014 has neutral pose 11014-1 on avatar 11005, tongue piercing options 11018 show avatar mouth 11014 having tongue-out pose 11014-3 to reveal avatar tongue 11022, so that the different piercing options are displayed for the user to more easily view. In embodiments in which avatar 11005 tracks the user's face, displaying mouth 11014 with smile pose 11014-2 and tongue-out pose 1114-3 in the respective teeth options 11016 and tongue piercing options 11018 allows the user to view the respective feature options without requiring the user to stick their tongue out or maintain a smiling pose.

Teeth options 11016 show different options for selecting teeth for avatar 11005. Teeth options 11016 include default teeth 11016-1 (e.g., no missing teeth or modifications), missing tooth 11016-2, gold tooth 11016-3, lucky tooth gap 11016-4, braces 11016-5, and grill 11016-6. Additional teeth options can include an option for fangs. Additional teeth options can include options for different grills, including different grill colors (e.g., gold, silver) and locations in the mouth (e.g., lower grill, upper and lower grill, partial grill). Additional teeth options can include different missing teeth, including displaying one or more teeth missing in different locations in the mouth (e.g., hockey player teeth, missing bottom tooth). Various combinations of the foregoing teeth options can be included in teeth options 11016.

Tongue piercing options 11018 show different options for selecting piercings for a tongue of avatar 11005. Examples include no piercing 11018-1, stud piercing 11018-2, and ring piercing 11018-3. Tongue piercing options 11018 can include additional options such, for example, a spike tongue piercing and a barbell tongue piercing.

Avatar option region 11008 also includes piercing color options 11024, corresponding to different colors for the tongue piercings.

The appearance of avatar mouth 11014 shown in teeth options 11016 and tongue piercing options 11018 is a representation of the current mouth of avatar 11005. Therefore, when modifications are made to characteristics of avatar mouth 11014, those modifications can be displayed in the respective teeth options 11016 and tongue piercing options 11018 (if the modified characteristics are displayed in the respective sets of feature options). For example, if avatar mouth 11014 is updated to include lipstick, the appearance of avatar mouth 11014 will be updated to include lipstick in the various poses (e.g., 11014-1, 11014-2, and 11014-3).

Figure 11C:
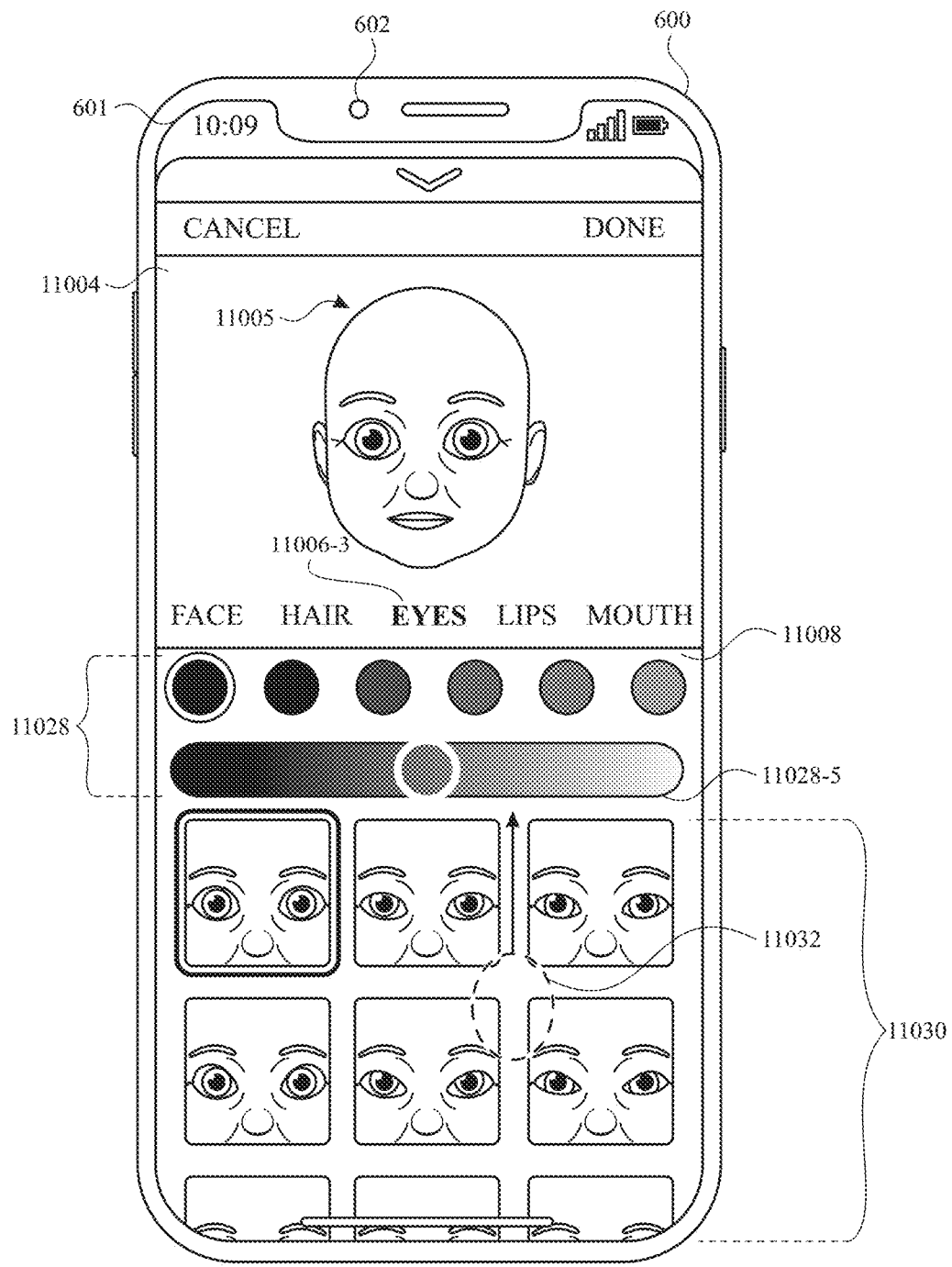

In FIG. 11B, device 600 detects input 11026 on eyes menu option 11006-3 and, in response, updates avatar display region to show selection of eyes menu option 11006-3, and updates avatar option region 11008 to show options for editing avatar eye features, as shown in FIG. 11C. Eye options include eye color options 11028 (including eye color slider control 11028-5) for selecting and adjusting an eye color for avatar 11005. Eye options also include eye shape options 11030 for selecting different shapes for the avatar's eyes.

Figure 11D:
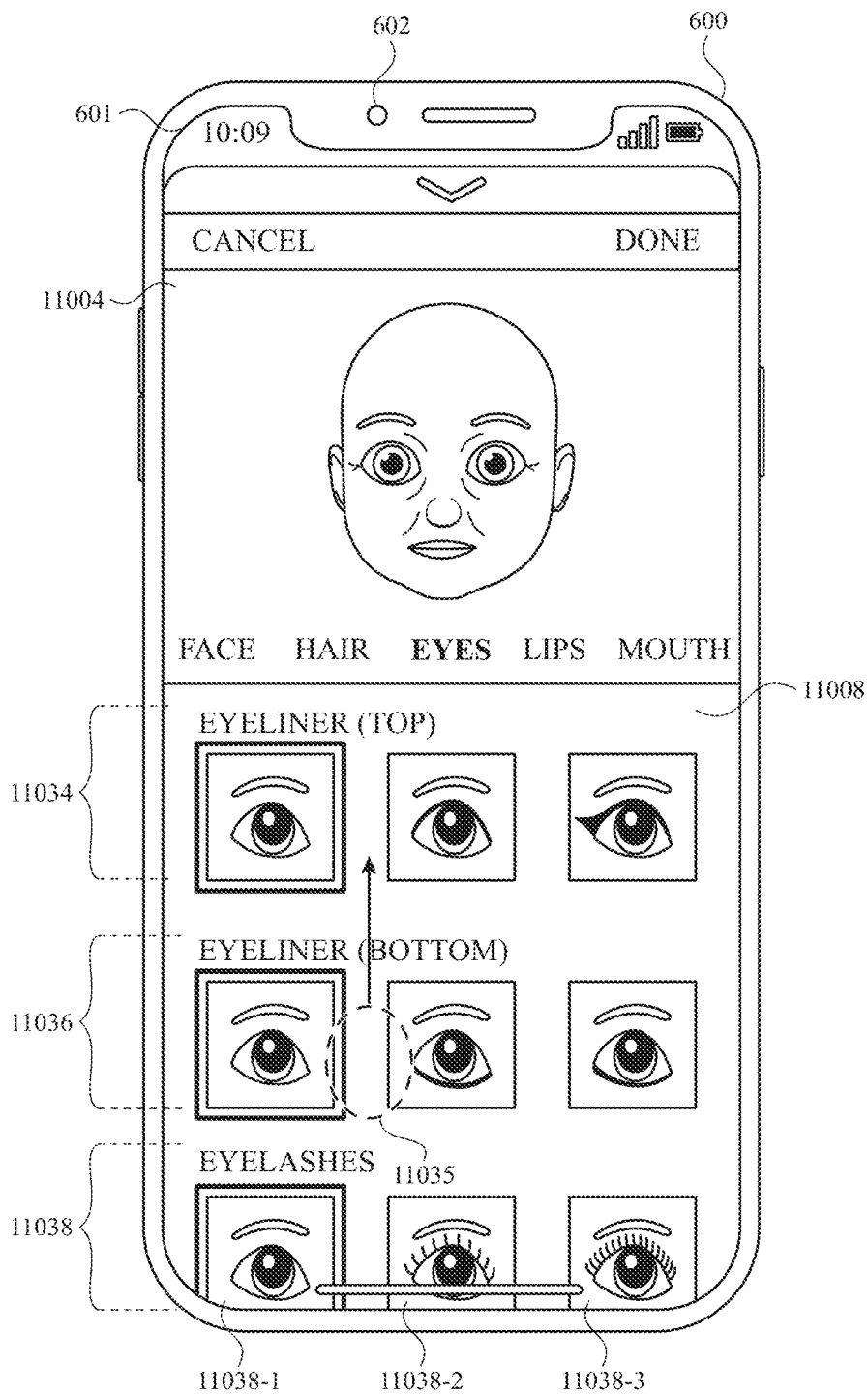
Figure 11E:
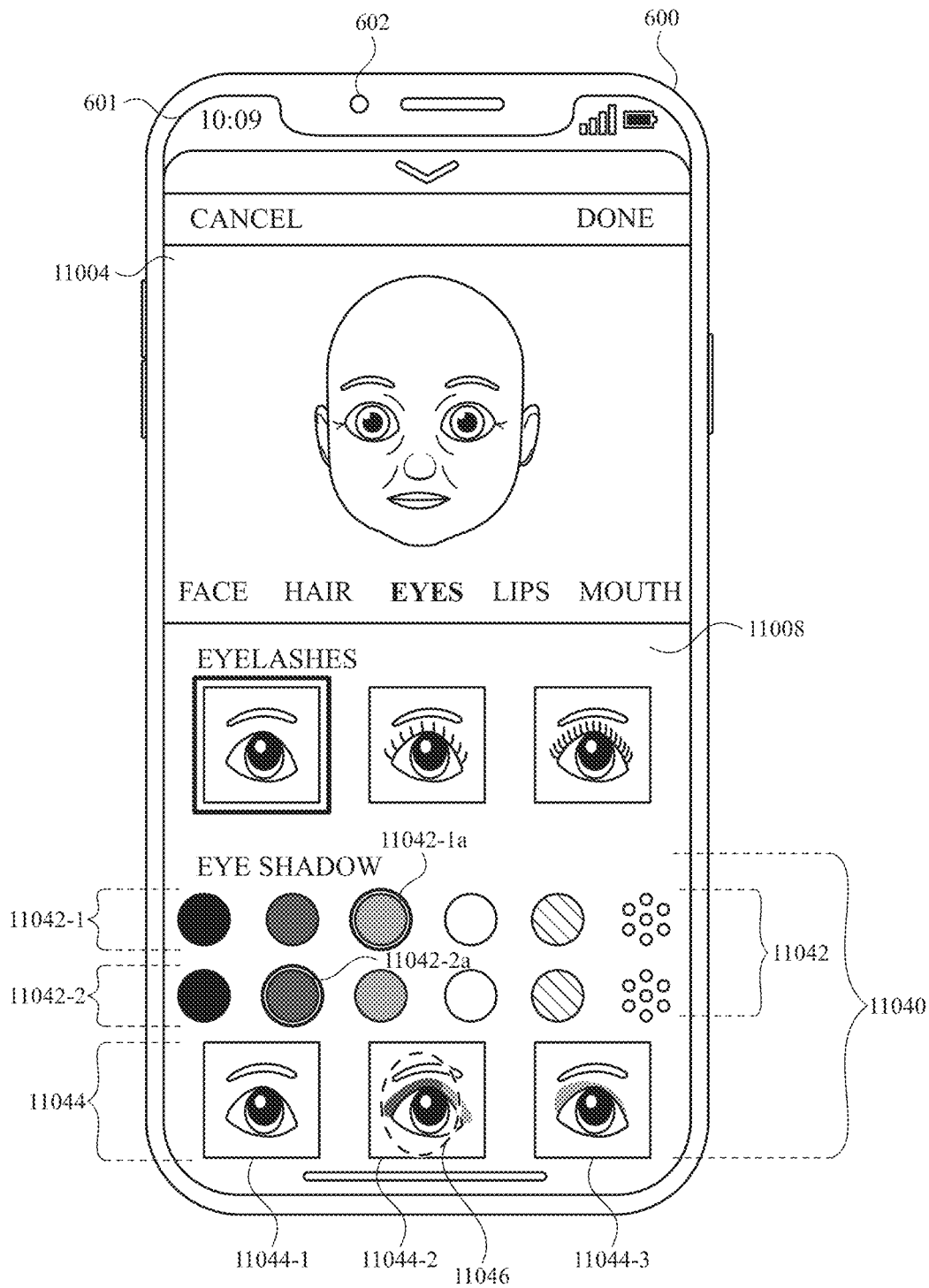
Figure 11F:
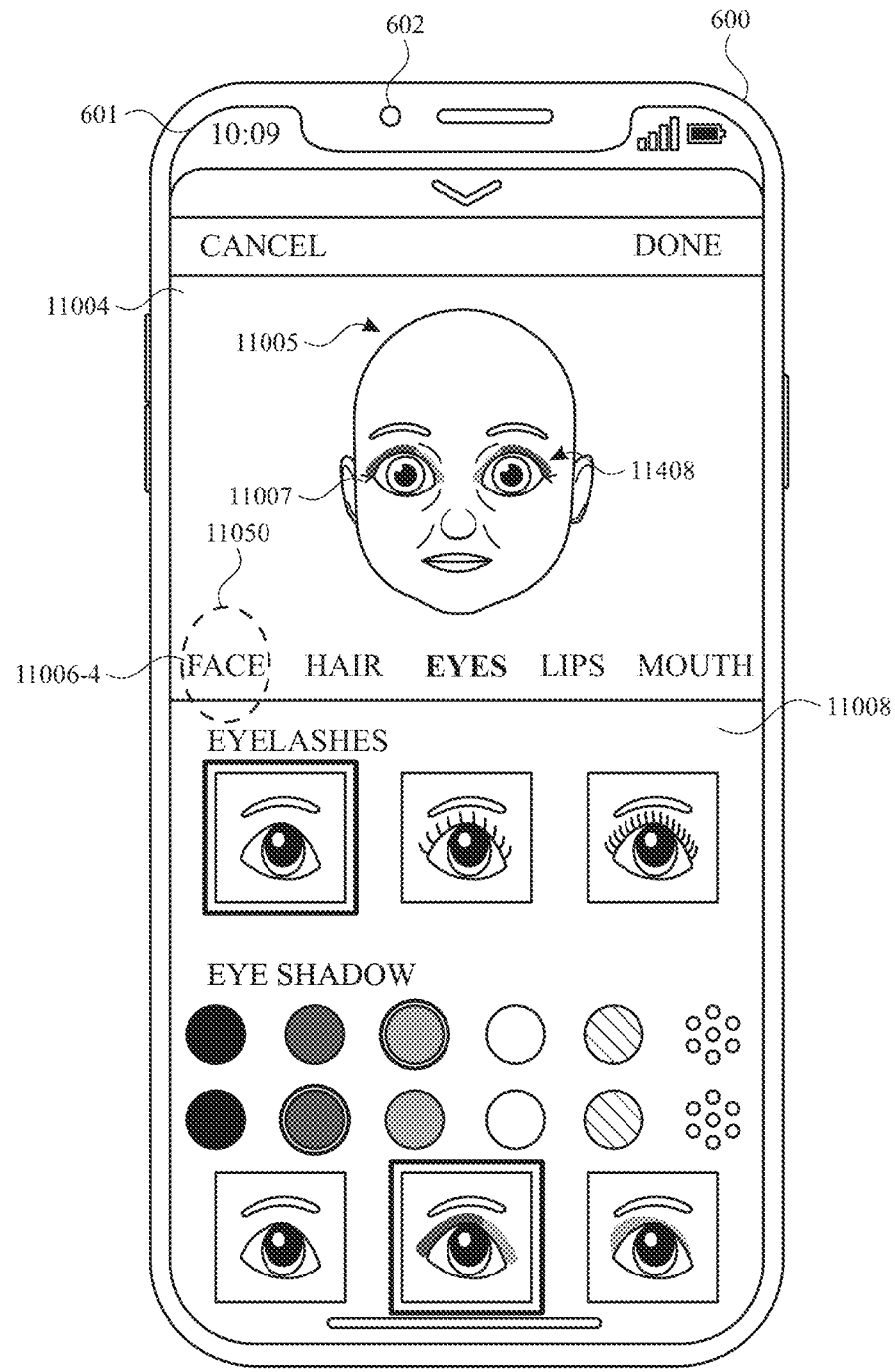

In FIG. 11C, device 600 detects input 11032 (e.g., a drag gesture corresponding to a scrolling command) and, in response, scrolls avatar option region 11008 to display eye makeup options, which are shown collectively in FIGS. 11D-11F.

As shown in FIG. 11D, the eye makeup options include top eyeliner options 11034, bottom eyeliner options 11036, and eyelashes options 11038. Top eyeliner options 11034 include options for selecting an eyeliner pattern for a top edge of the avatar's eyes. Bottom eyeliner options 11036 include options for selecting an eyeliner pattern for a bottom edge of the avatar's eyes. Eyelashes options 11038 include options for selecting eyelash styles such as, for example, no eyelashes 11038-1, sparse eyelashes 11038-2, and dense eyelashes 11038-3.

In FIG. 11D, device 600 detects input 11035 (e.g., a drag gesture corresponding to a scrolling command) and, in response, scrolls avatar option region 11008 to display additional eye makeup options, including eyeshadow options 11040, as shown in FIG. 11E.

As shown in FIG. 11E, eyeshadow options 11040 include eyeshadow color options 11042 for selecting eyeshadow colors and eyeshadow application options 11044 for selecting an eyeshadow pattern. Eyeshadow color options 11042 includes a set of first eyeshadow color options 11042-1, and a set of second eyeshadow color options 11042-2. First eyeshadow color 11042-*la* and second eyeshadow color 11042-2*a* can be applied concurrently, depending on the eyeshadow pattern selected from eyeshadow application options 11044. Eyeshadow application options 11044 include no eyeshadow 11044-1, first eyeshadow pattern 11044-2, and second eyeshadow pattern 11044-3.

In FIG. 11E, first eyeshadow color 11042-*la* is selected, second eyeshadow color 11042-2*a* is selected, and eyeshadow application options 11044 are updated to show the application pattern options that can be applied to avatar 11005 using the selected colors 11042-*la* and 11042-2*a*. Device 600 detects input 11046 on first eyeshadow pattern 11044-2. In response, device 600 applies first eyeshadow pattern 11044-2 to avatar 11005 using selected colors 11042-*la* and 11042-2*a*, as shown in FIG. 11F.

As shown in FIG. 11F, avatar 11005 is now displayed with eye makeup 11048, which includes the eyeshadow colors and application patterns selected in FIG. 11E. In some embodiments, facial wrinkles 11007 are displayed over eye makeup 11048, as shown in FIG. 11F. Device 600 detects input 11050 on face menu option 11006-4 and, in response, updates avatar display region 11004 to show the selection of face menu option 11006-4 and updates avatar option region 11008 to display beauty mark options 11052, as shown in FIG. 11G.

Figure 11G:
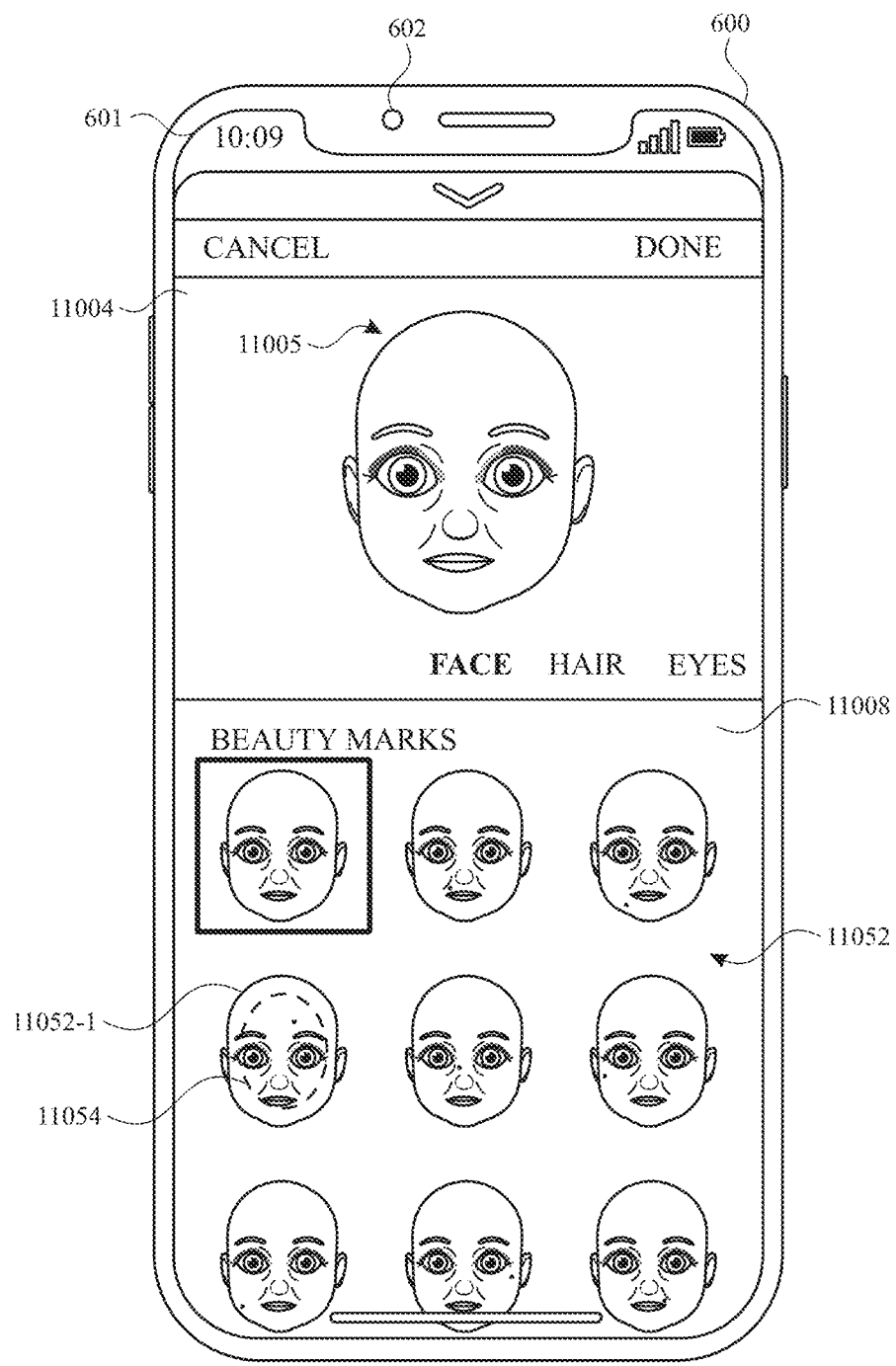

In FIG. 11G, beauty mark options 11052 are displayed with eye makeup (as a result of the selections made in avatar option region 11008 of FIG. 11E). Device 600 detects input 11054 on forehead beauty mark option 11052-1 and, in response, updates avatar 11005 to have forehead beauty mark 11055 (in addition to eye makeup 11048), as shown in FIG. 11H.

Figure 11H:
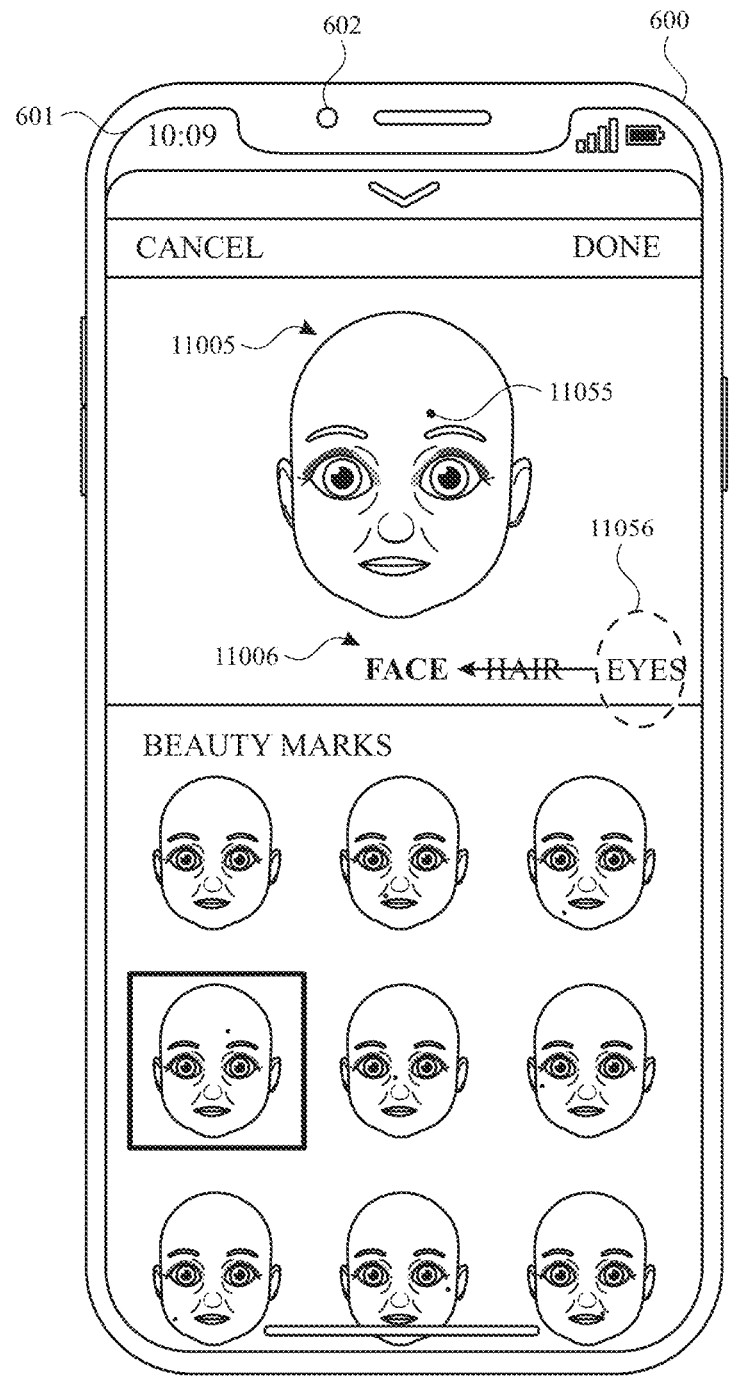
Figure 111:
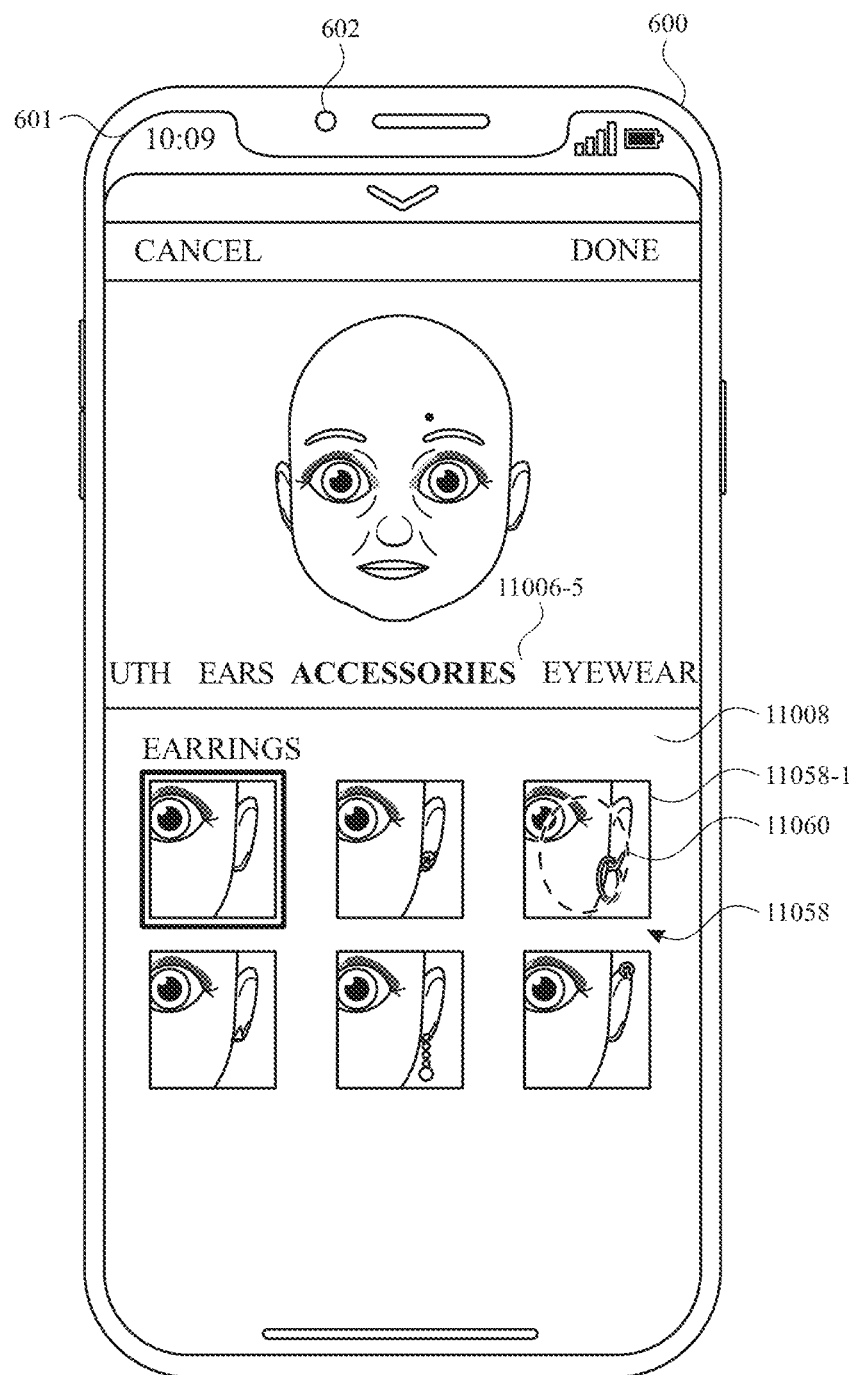

In FIG. 11H, device 600 detects input 11056, which corresponds to a scrolling gesture on avatar feature menu options 11006, and, in response, scrolls feature menu options 11006 such that accessories menu option 11006-5 is selected, as shown in FIG. 11I.

Figure 11J:
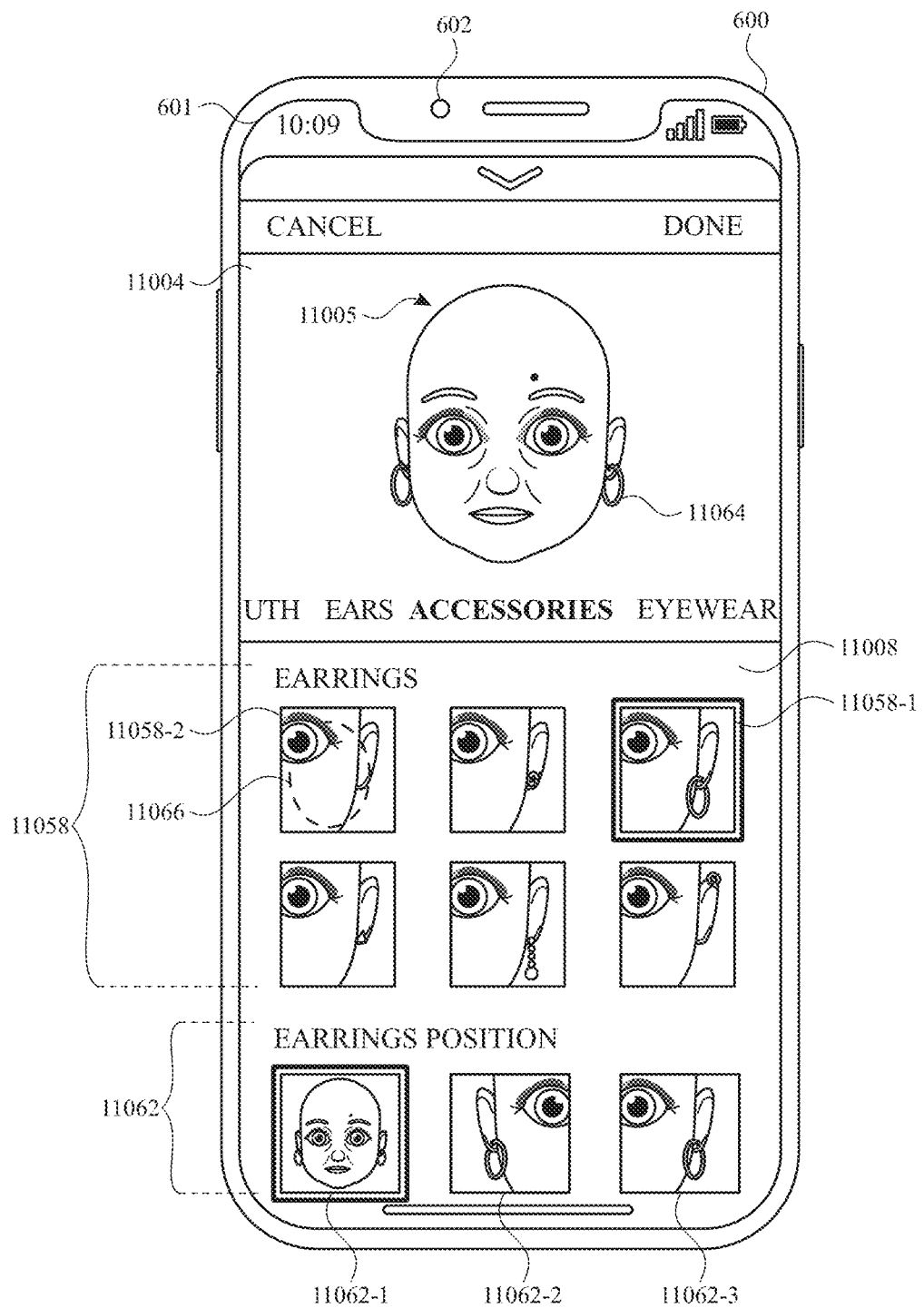

In FIG. 11I, device 600 displays earring options 11058 in avatar option region 11008, and detects input 11060 selecting hoop earring 11058-1. In response, device 600 updates avatar option region 11008 to display earring position options 11062, and updates avatar display region 11004 to show avatar 11005 with hoop earrings 11064, as shown in FIG. 11J. Earring position options 11062 include both ears 11062-1, right ear 11062-2, and left ear 11062-3. Device 600 displays hoop earrings 11064 on both of the avatar's ears because both ears 11062-1 is selected.

Figure 11K:
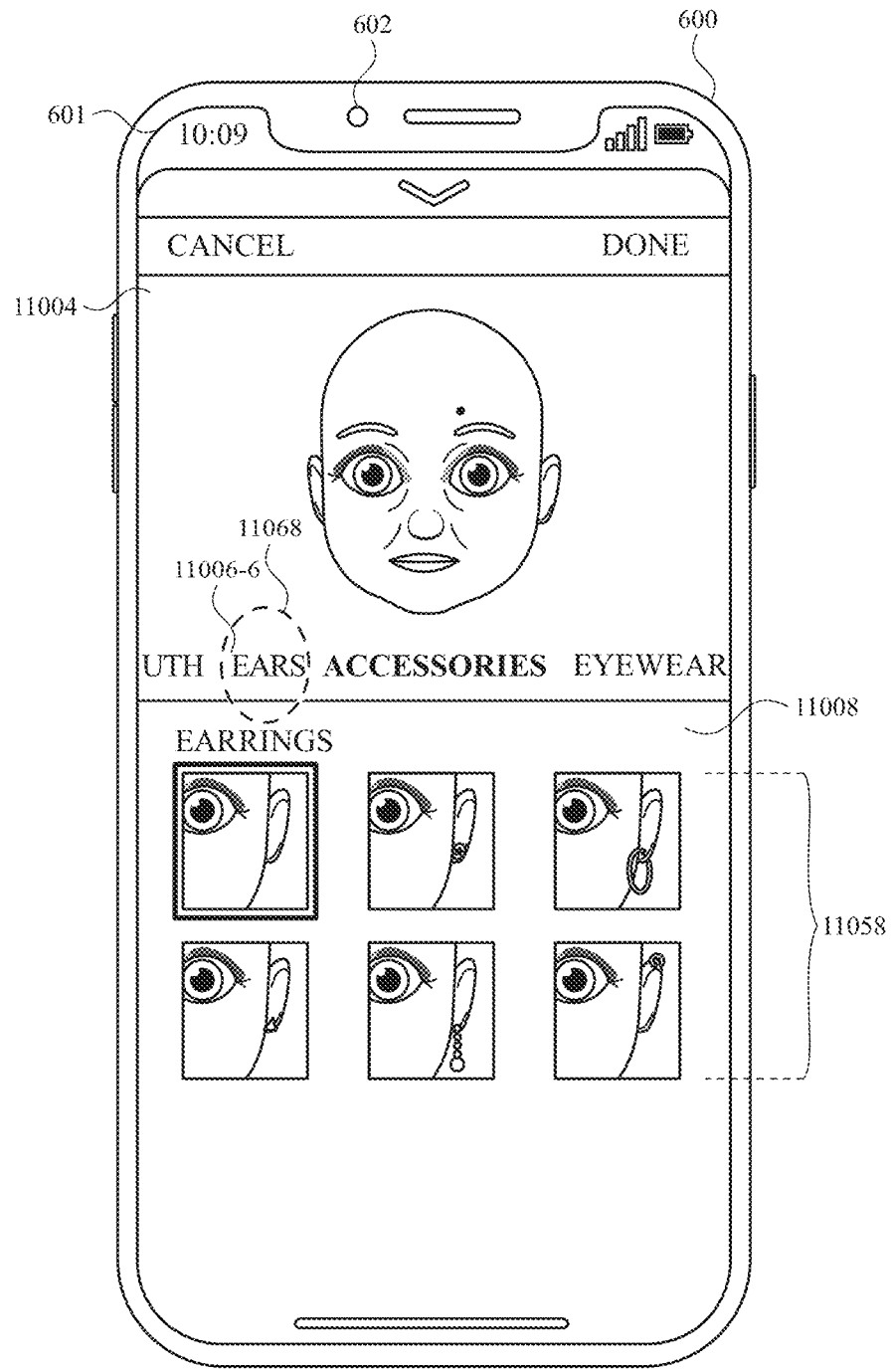

In FIG. 11J, device 600 detects input 11066 on no earring option 11058-2 and, in response, removes hoop earrings 11064 from avatar 11005 and ceases display of earring position options 11062, as shown in FIG. 11K.

In FIG. 11K, device 600 detects input 11068, which is an input corresponding to a selection of ears menu option 11006-6. In response, device 600 updates avatar display region 11004 to show selection of ears menu option 11006-6, and updates avatar option region 11008 to display another set of options for applying earrings to avatar 11005, as shown in FIG. 11L.

Figure 11L:
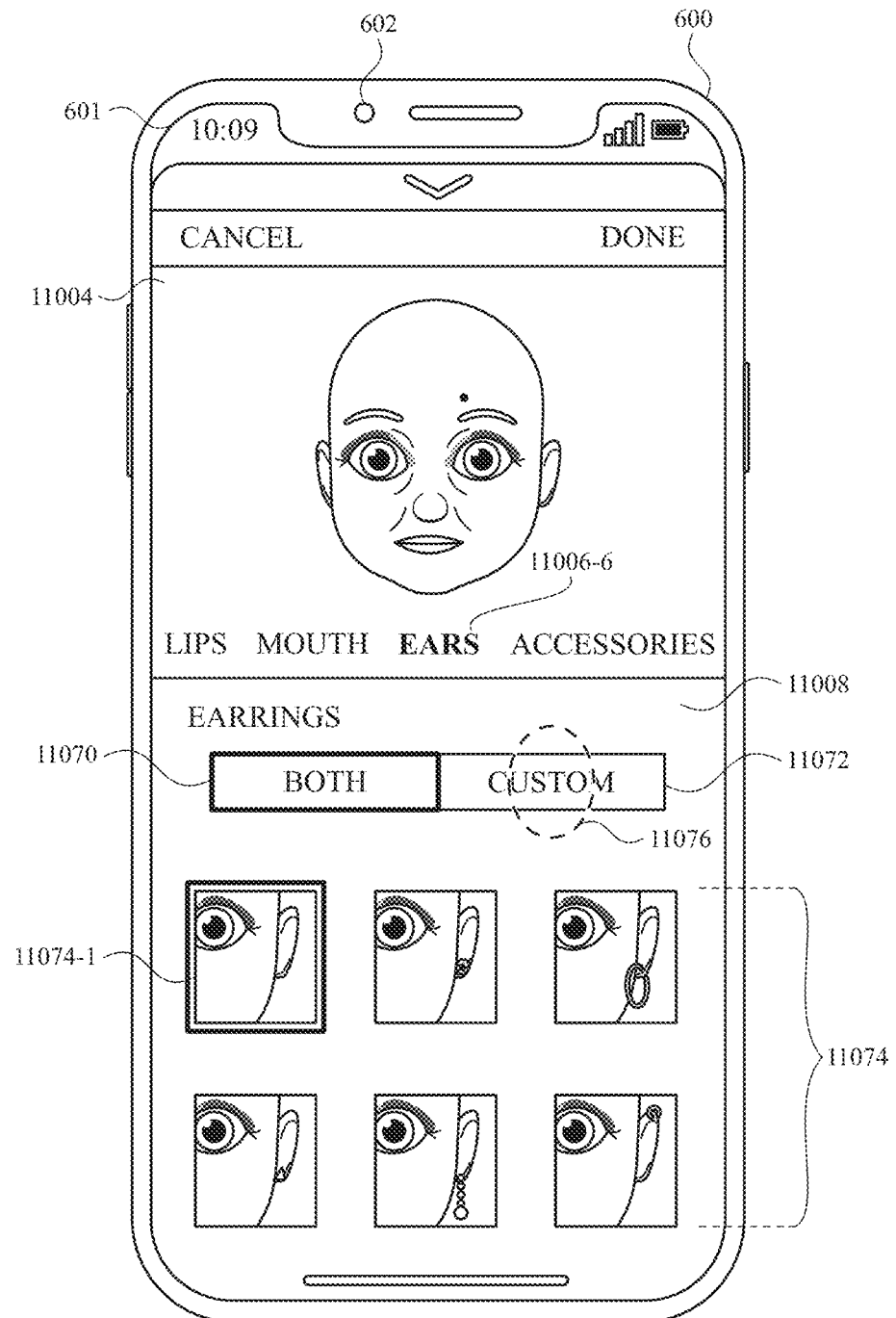

In FIG. 11L, device 600 displays avatar option region 11008 having earring position options that are represented by both affordance 11070 and custom affordance 11072. In FIG. 11L, both affordance 11070 is selected, and avatar option region 11008 displays selectable earring options 11074 (similar to earring options 11058), with no earring option 11074-1 selected. When one of earring options 11074 is selected, the selected earring option is applied to both avatar ears.

Device 600 detects input 11076 on custom affordance 11072 and, in response, selects custom affordance 11072 and replaces selectable earring options 11074 with left earring options 11078 and right earring options 11080. Left earring options 11078 can be selected to apply a selected earring option to the avatar's left ear without applying the selected earring option to the avatar's right ear. Conversely, right earring options 11080 can be selected to apply a selected earring option to the avatar's right ear without applying the selected earring option to the avatar's left ear. Accordingly, the left and right earring options 11078 and 11080 allow a user to mix and match different earrings with different avatar ears, thereby allowing custom earring application to avatar 11005.

Figure 11M:
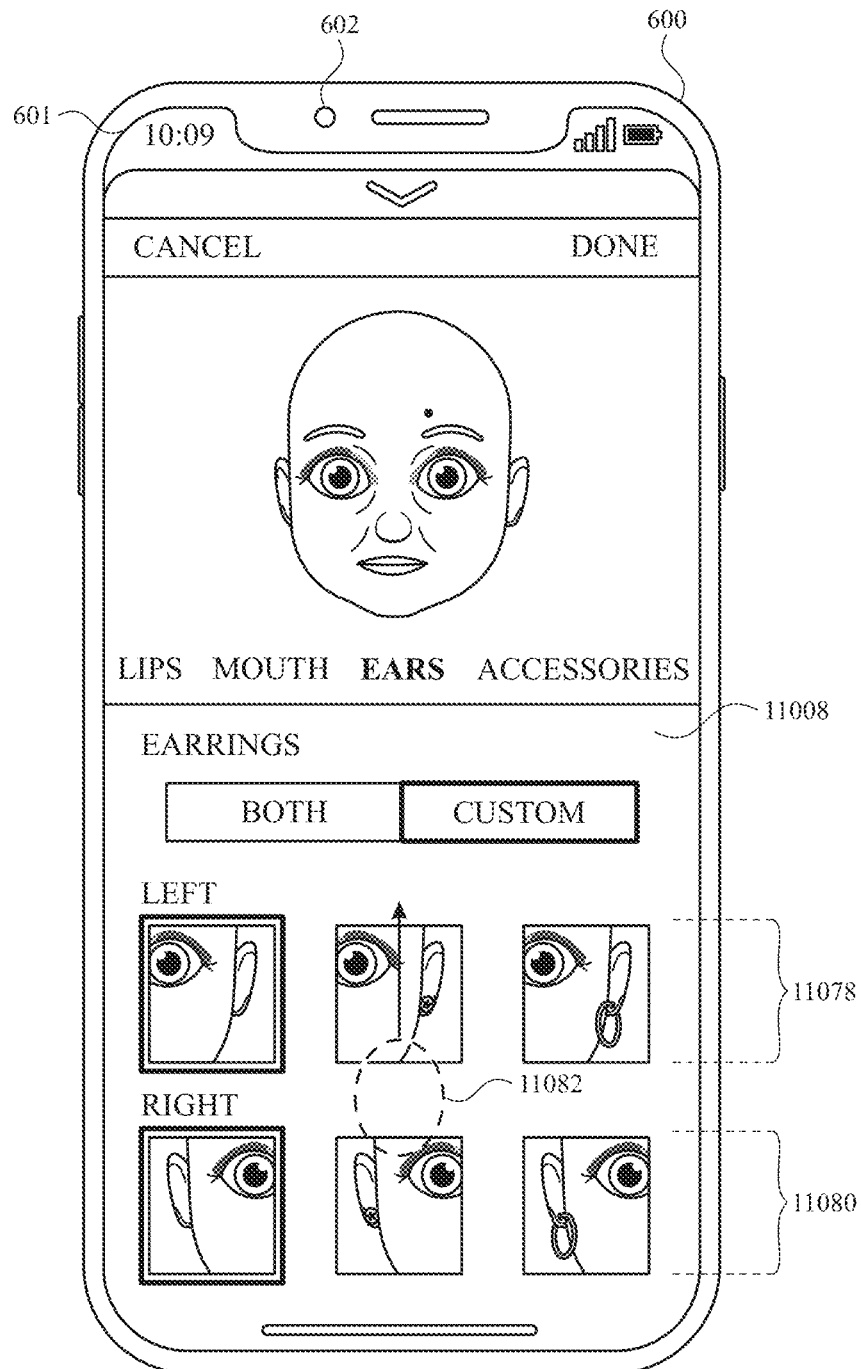
Figure 11N:
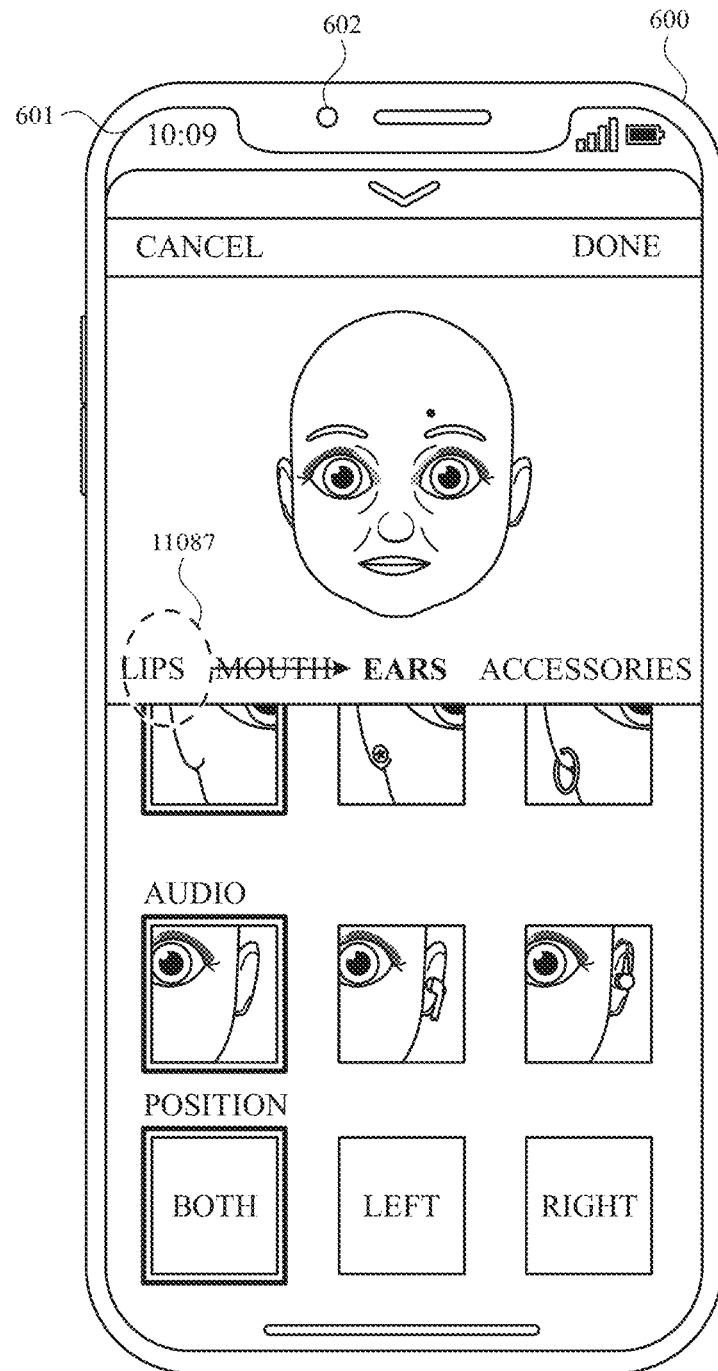
Figure 110:
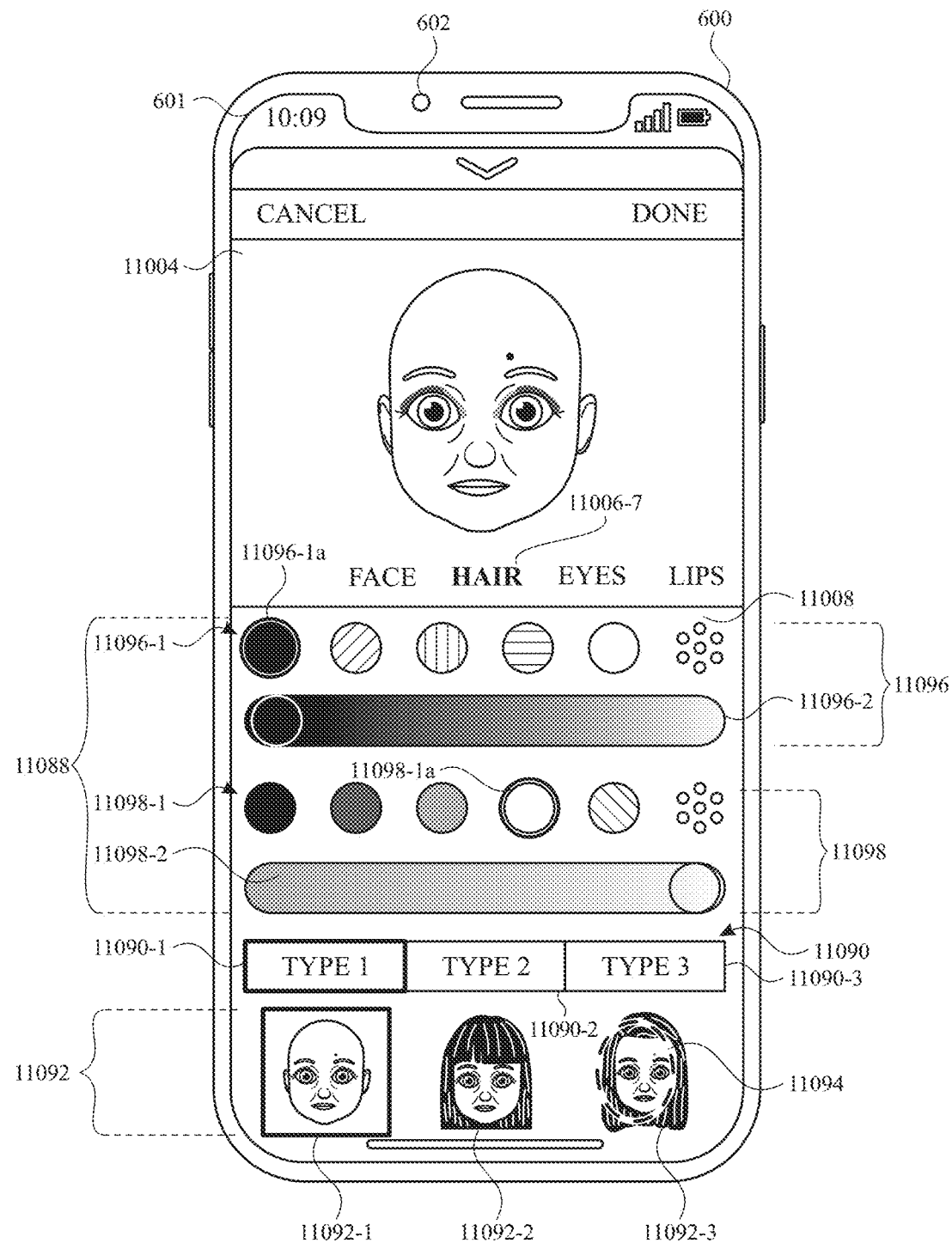

In FIG. 11M, device 600 detects input 11082 (e.g., a drag gesture) and, in response, scrolls avatar option region 11008 to display audio options 11084 and position options 11086, as shown in FIG. 11N. Audio options 11084 can be selected to display different audio devices in the avatar's ears. For example, audio options 11084 include no audio option 11084-1, in-ear audio option 11084-2, and hearing aid option 11084-3. Position options 11086 can be selected to determine an ear position for a selected audio option. Position options 11086 include both ear option 11086-1, left ear option 11086-2, and right ear option 11086-3.

In FIG. 11N, device 600 detects input 11087 to select hair menu option 11006-7, as shown in FIG. 11O.

In FIG. 11O, device 600 displays avatar option region 11008 having color options 11088, highlight type options 11090, and hairstyle options 11092. Color options 11088 can be selected to control color changes avatar hair and to highlights applied to avatar hair. Color options 11088 include hair color controls 11096 for selecting a hair color, and highlight color controls 11098 for selecting a highlight color. Hair color controls 11096 include hair color options 11096-1 for selecting a hair color and hair color slider 11096-2 for adjusting a gradient of the selected hair color. Similarly, highlight color controls 11098 include highlight color options 11098-1 for selecting a highlight color and highlight color slider 11098-2 for adjusting a gradient of the selected highlight color. In the embodiment illustrated in FIGS. 11O-11S, hair color option 11096-*la* is selected for the hair color with hair color slider 11096-2 set to a maximum gradient setting (e.g., dark), and highlight color option 11098-*la* is selected for the highlight color, with highlight color slider 11098-2 set to a minimum gradient setting (e.g., light).

Highlight type options 11090 can be selected to change the types of highlighting applied to avatar hair (e.g., in hairstyle options 11092 and, if a non-bald hairstyle is selected, on avatar 11005). Highlight type options 11090 include first type 11090-1, second type 11090-2, and third type 11090-3. First type 11090-1 is currently selected in FIG. 11O.

Hairstyle options 11092 can be selected to change hairstyles applied to avatar 11005. Hairstyle options 11092 include bald 11092-1, second hairstyle 11092-2, and third hairstyle 11092-3, although others can be displayed. The representation of the avatar shown in second hairstyle option 11092-2 and third hairstyle option 11092-3 show current states of selected color options 11088 and highlight type options 11090. When color options 11088 and highlight type options 11090 are changed, the representations of the avatar hair (with highlights) shown in second hairstyle option 11092-2 and third hairstyle option 11092-3 are updated to reflect the changes.

Figure 11P:
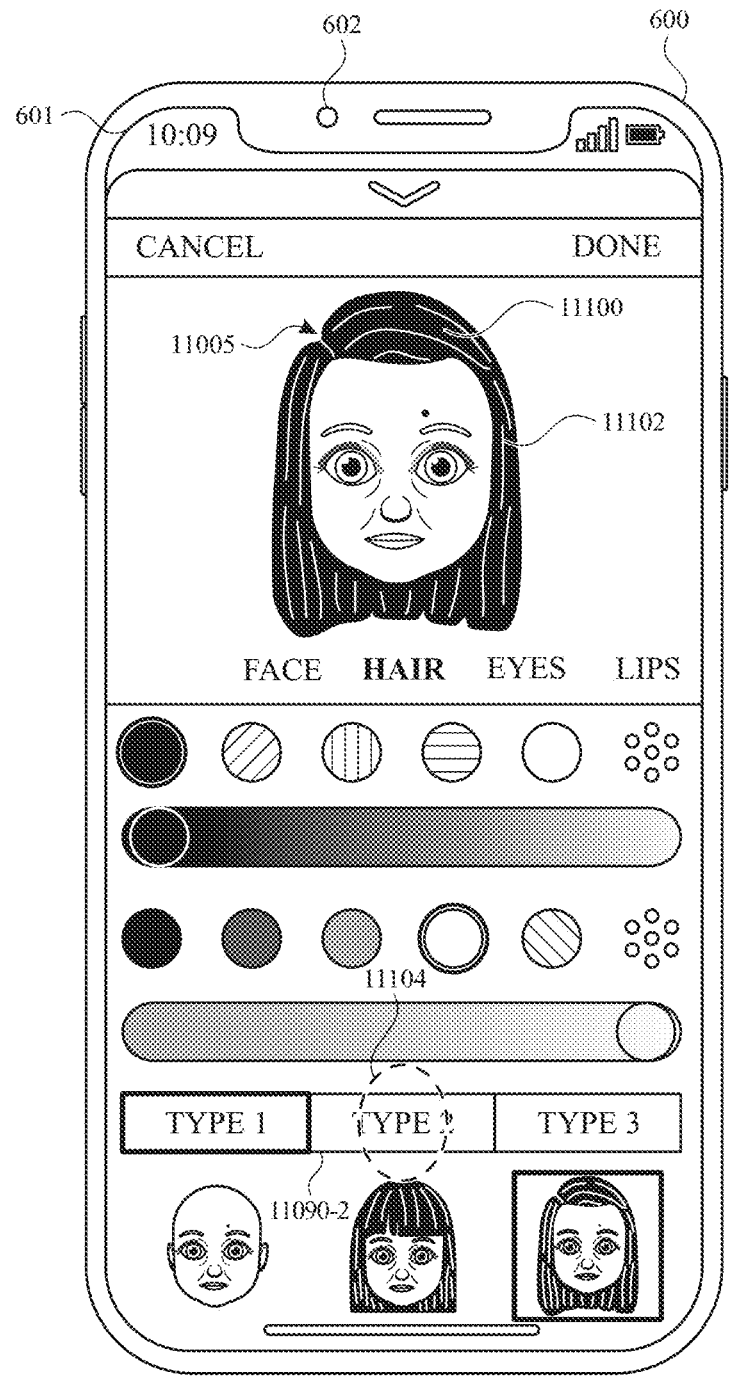

In FIG. 11O, device 600 detects input 11094 selecting third hairstyle 11092-3 and, in response, updates avatar 11005 to display avatar hair 11100 with highlights 11102, as shown in FIG. 11P. Avatar hair 11100 corresponds to the selected third hairstyle option 11092-3. Highlights 11102 correspond to the selected color options 11088 and first highlight type 11090-1.

Figure 11Q:
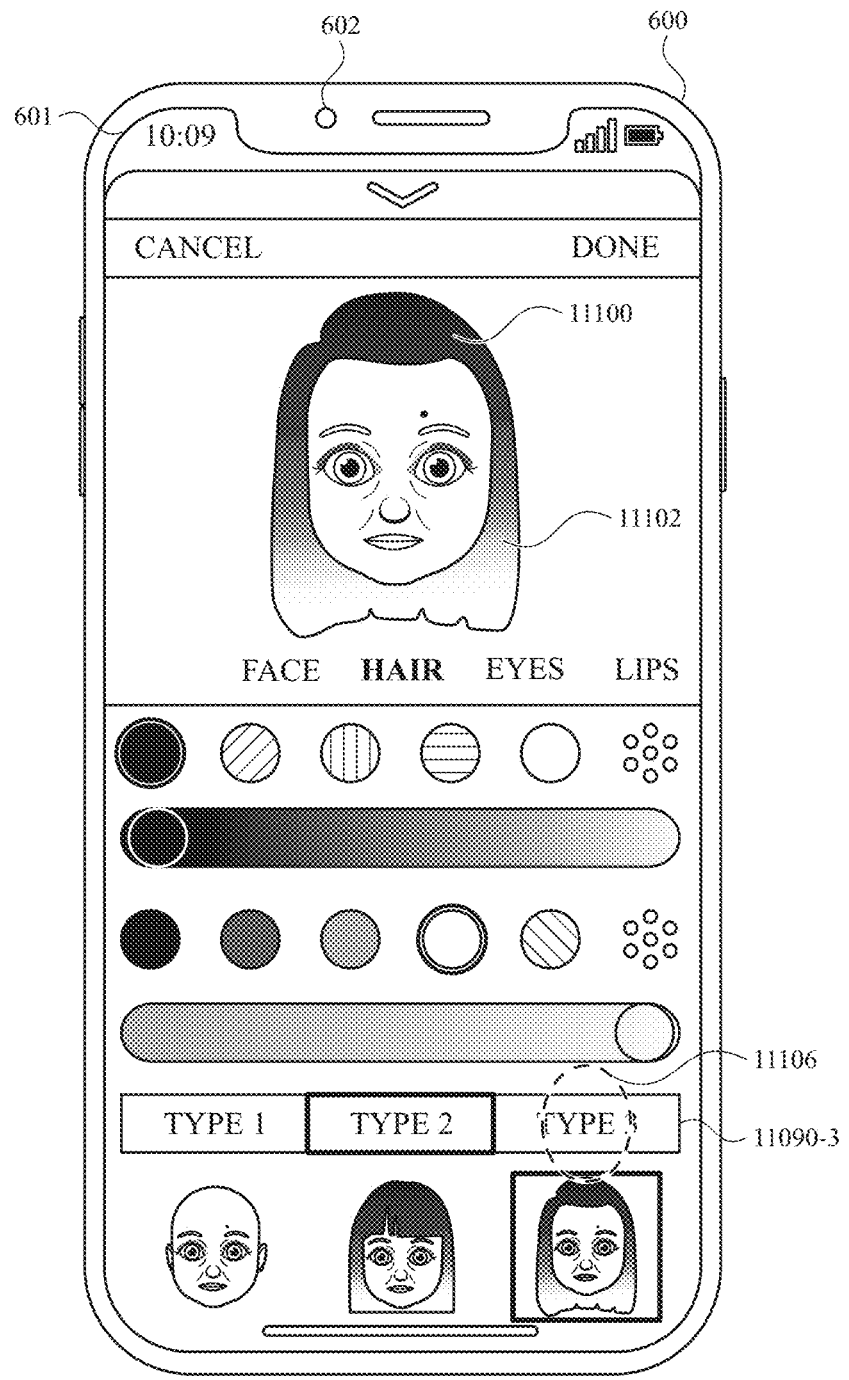

In FIG. 11P, device 600 detects input 11104 on second type 11090-2 and, in response, updates highlights 11102, second hairstyle option 11092-2, and third hairstyle option 11092-3 to have the selected highlight type, which is shown in FIG. 11Q as an ombre highlight type.

Figure 11R:
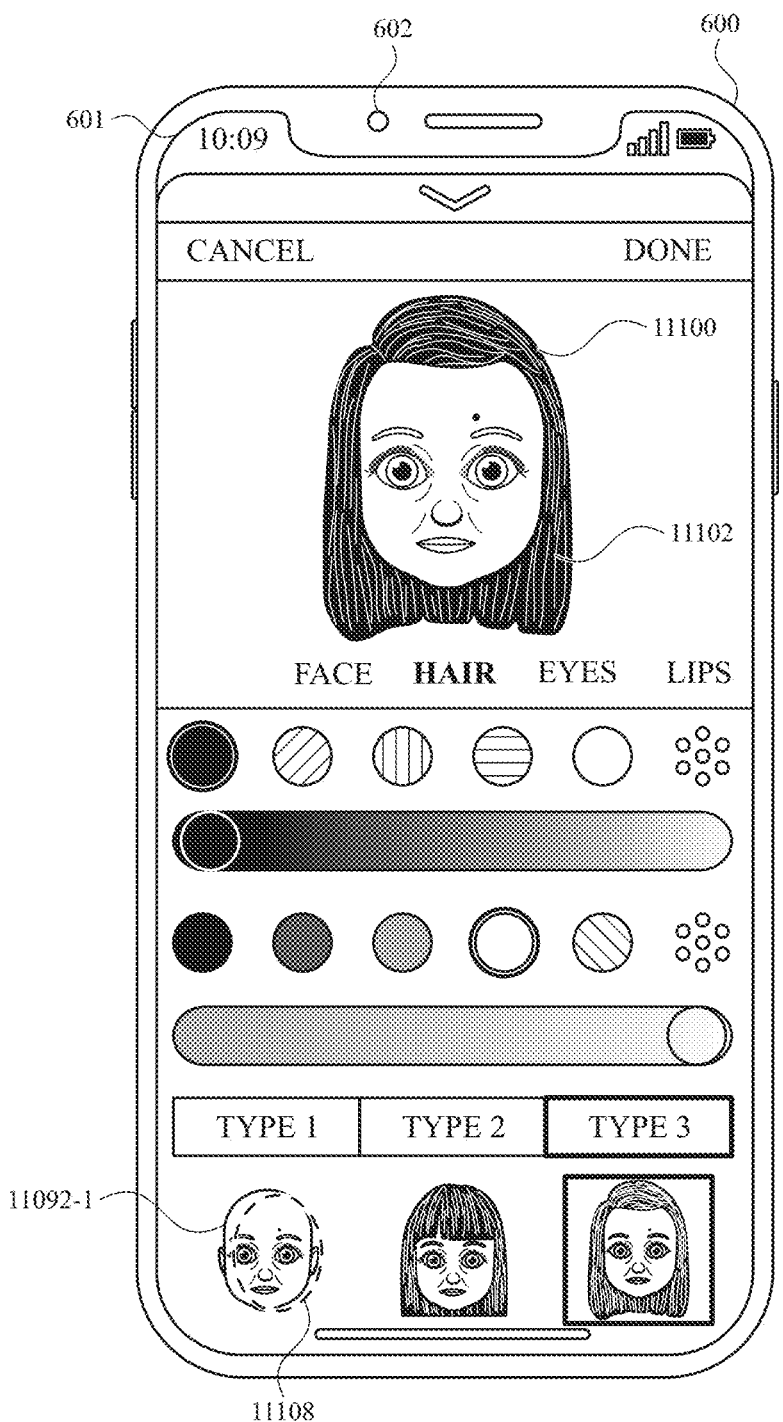

In FIG. 11Q, device 600 detects input 11106 on third type 11090-3 and, in response, updates highlights 11102, second hairstyle option 11092-2, and third hairstyle option 11092-3 to have the selected highlight type, which is shown in FIG. 11R as a heavy highlight type.

Figure 11S:
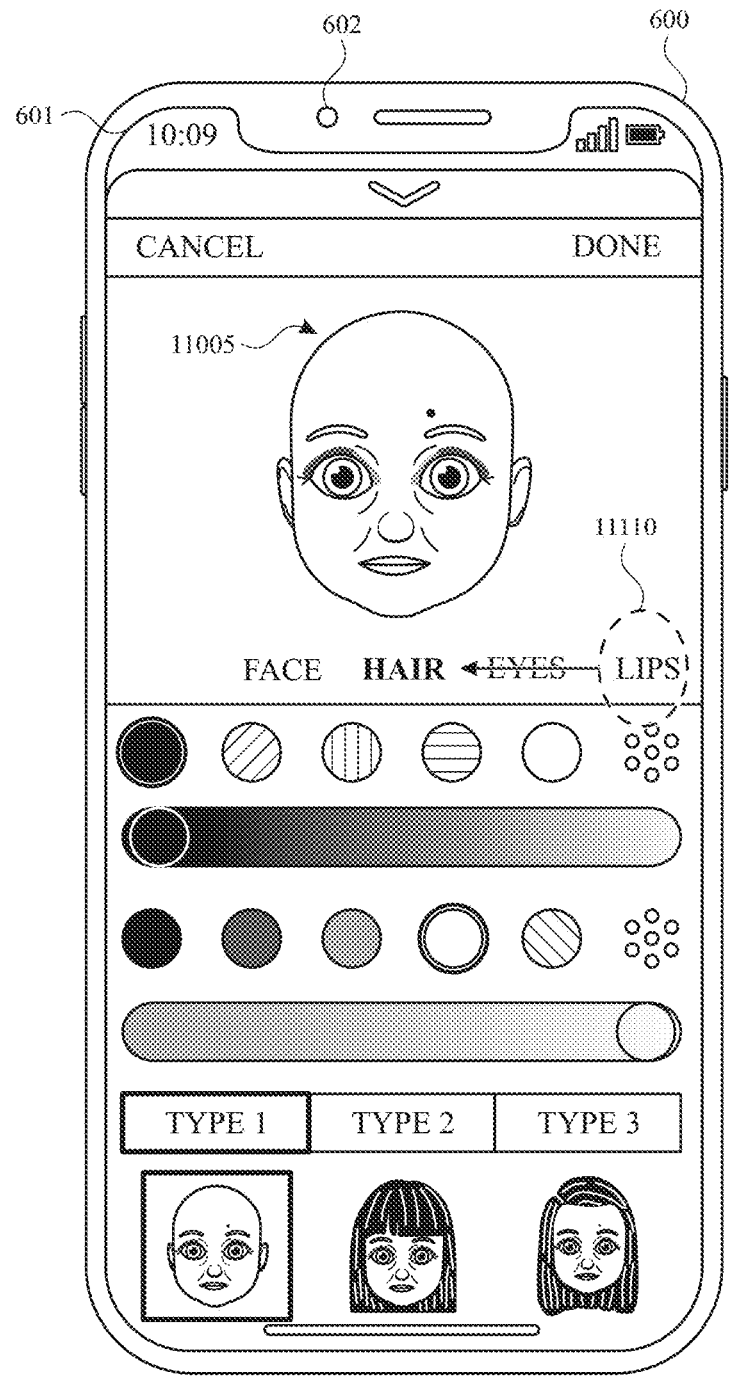

In FIG. 11R, device 600 detects input 11108 on bald hairstyle 11092-1 and, in response, updates avatar 11005 to remove hair 11100, as shown in FIG. 11S.

Figure 11T:
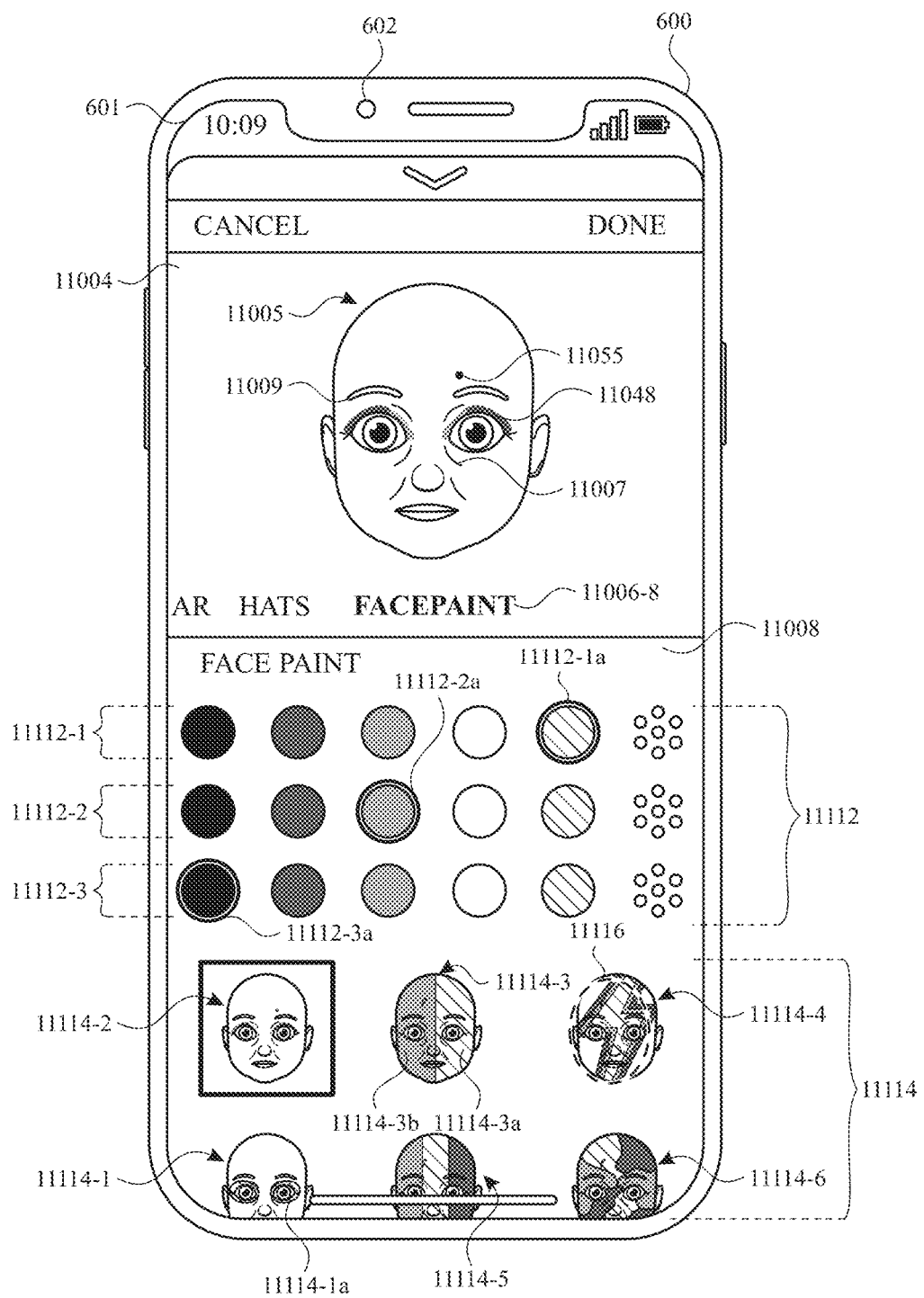

In FIG. 11S, device 600 detects input 11110, which corresponds to a request to select facepaint menu option 11006-8, as shown in FIG. 11T.

In FIG. 11T, device 600 displays avatar display region 11004 showing avatar 11005 having beauty mark 11055, eye makeup 11048, facial wrinkles 11007, and eyebrows 11009. Avatar option region 11008 is displayed with facepaint pattern options 11114, which can be selected to apply a facepaint pattern to avatar 11005, and facepaint color options 11112, which can be selected to change colors of the facepaint patterns. In FIG. 11T, avatar 11005 is displayed with no facepaint, and pattern option 11114-2 (no facepaint) is selected.

Facepaint color options 11112 include sets of color options that can be selected to change a region of a facepaint pattern. Facepaint pattern options 11114 represent various pattern options that can be selected to apply a facepaint pattern to the face of avatar 11005, with the facepaint pattern having one or more of the colors selected in facepaint color options 11112. Some regions of the various facepaint pattern options 11114 correspond to facepaint color options 11112, although, in some instances, some facepaint pattern options 11114 have regions that do not change color in response to selections of facepaint color options 11112. For example, pattern option 11114-1 represents a vampire facepaint pattern having a white base region 11114-*la* that is not changed by the selection of color options 11112.

Figure 11U:
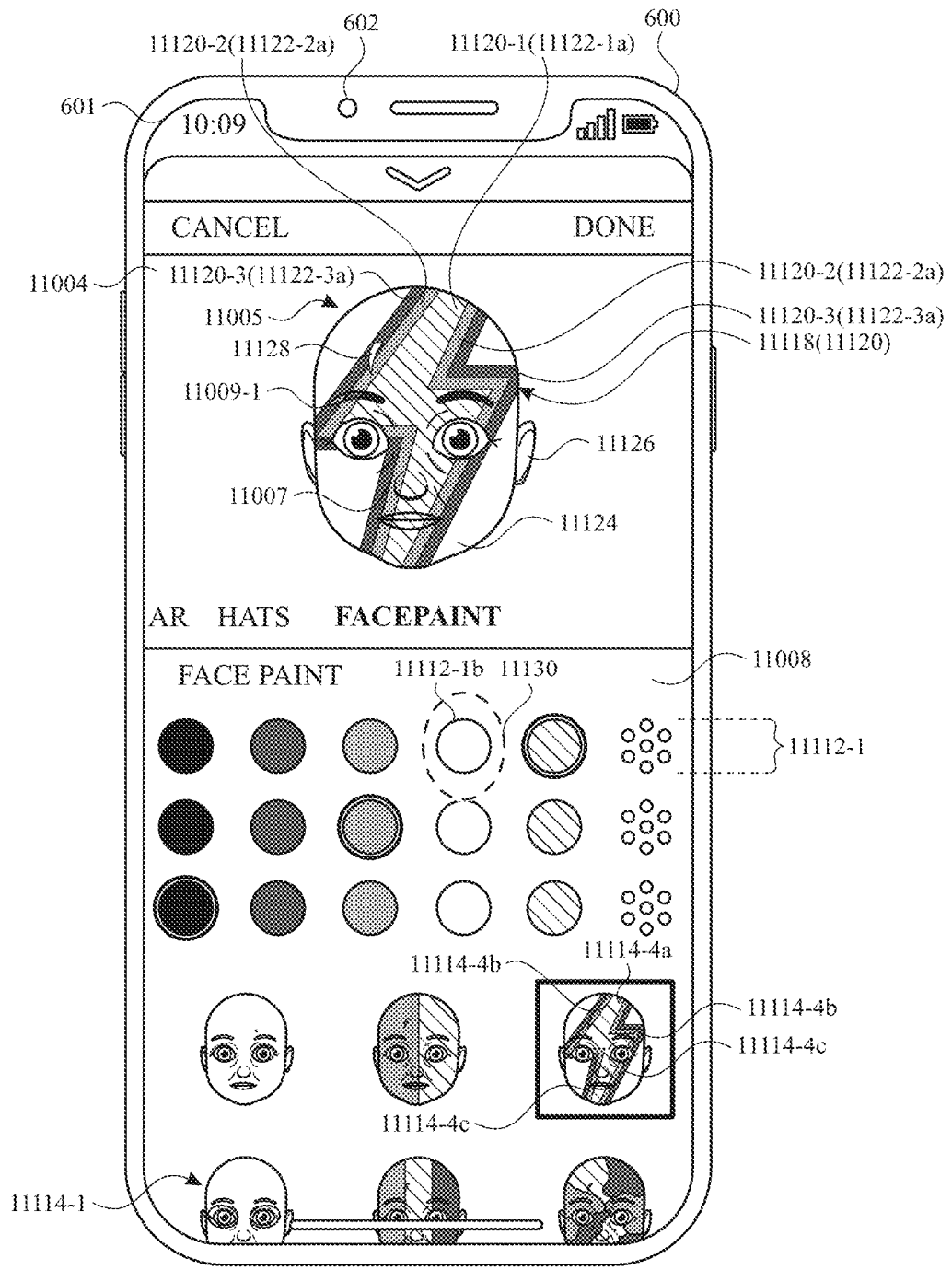

Facepaint pattern options 11114 each include a representation of avatar 11005 having an appearance that represents the appearance of avatar 11005 with the respective facepaint pattern option selected. For example, pattern option 11114-2 is a no-facepaint option that shows a representation of avatar 11005 with no facepaint. Because avatar 11005 includes beauty mark 11055, eye makeup 11048, facial wrinkles 11007, and eyebrows 11009, pattern option 11114-2 (no facepaint) also shows these features on the avatar representation. Pattern option 11114-2 maintains display of these features for as long as they are applied to avatar 11005, even when different facepaint patterns are displayed on avatar 11005, as shown in FIG. 11U, for example. This is because pattern option 11114-2 is a representation of avatar 11005 without facepaint.

Conversely, beauty mark 11055 and eye makeup 11048 are not displayed on representations of avatar 11005 shown in pattern options 11114-1, and 11114-3 through 11114-6, or on avatar 11005 when these pattern options are selected. This is because these pattern options show the representation of avatar 11005 as if facepaint is painted over the face of avatar 11005, covering or obscuring these features. However, other features of avatar 11005 are displayed, even when facepaint is applied. These other features can include facial wrinkles 11007, glasses, hair, and facial hair. Facial wrinkles 11007 remain displayed because facepaint does not cover wrinkles on a painted face. Glasses, hair, and facial hair are displayed on the avatar (without facepaint on these features) because glasses are worn over the face, and facepaint is typically not applied over hair or facial hair. An example of such an embodiment is illustrated in FIG. 11AA. In some instances, however, facepaint is displayed over hair on the avatar. For example, facepaint is applied over eyebrows 11009, and the eyebrows are displayed having an obscured appearance due to the underlying color of the eyebrows, which is mixed with the facepaint applied to avatar 11005. This is shown in pattern options 11114-1, and 11114-3 through 11114-6, and on avatar 11005 in FIG. 11U.

Figure 11V:
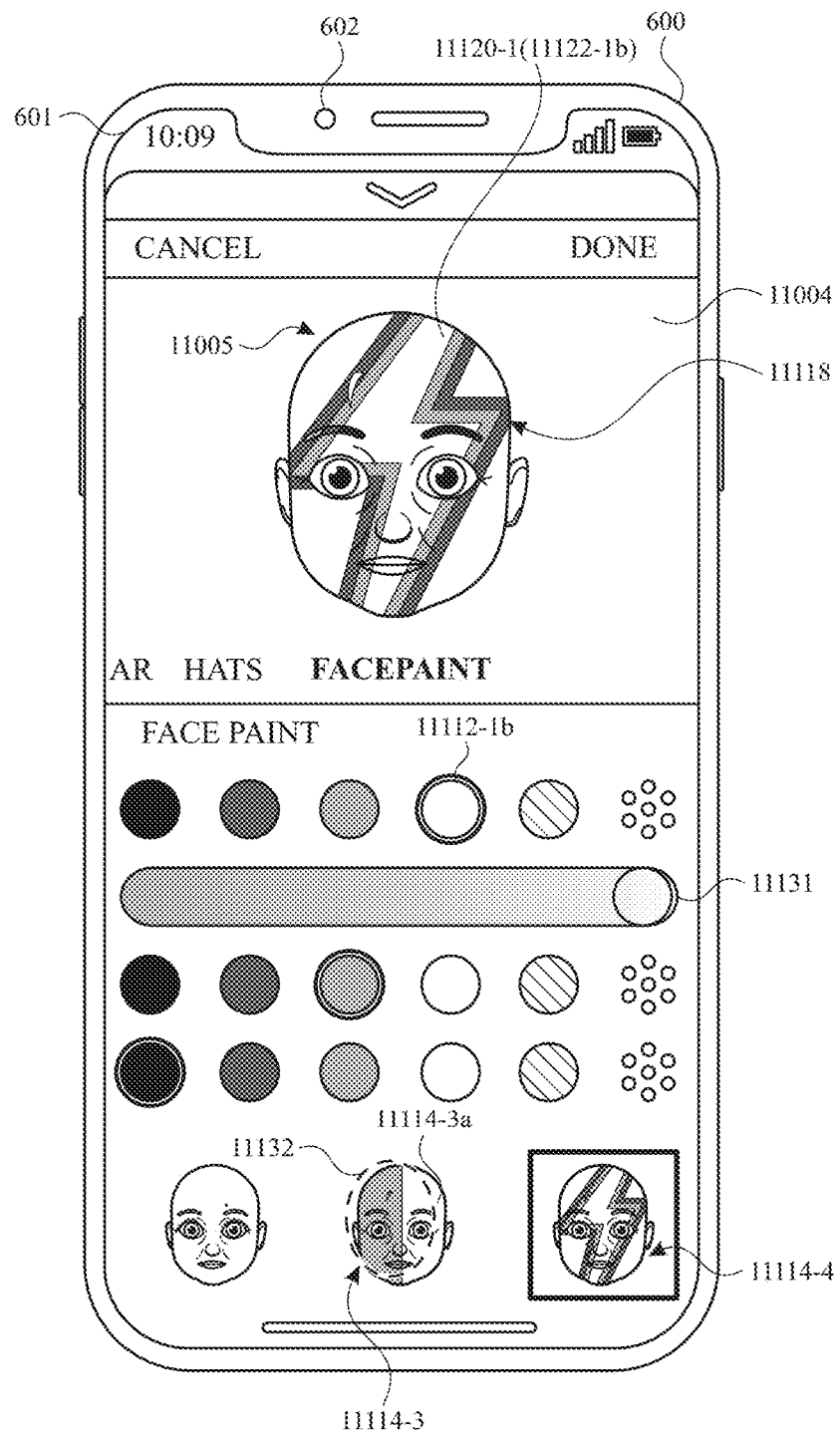

As shown in FIG. 11T, facepaint color options 11112 include first color set 11112-1 having color 11112-*la* selected, second color set 11112-2 having color 11112-2*a* selected, and third color set 11112-3 having color 11112-3*a* selected. The selected colors of each color set are displayed on various regions of the facepaint pattern options 11114 that correspond to the respective color sets. For example, pattern options 11114-1, 11114-3, 11114-4, 11114-5, and 11114-6 each have a respective region corresponding to first color set 11112-1 and, therefore, are displayed with color 11112-*la* in FIG. 11T. If first color set 11112-1 is updated to select a different color (e.g., as shown in FIGS. 11U and 11V), the respective regions in pattern options 11114-1, 11114-3, 11114-4, 11114-5, and 11114-6 having color 11112-1*a*, will be updated to the different color. Facepaint pattern options 11114 having regions corresponding to second color set 11112-2 react in a similar manner to changes in second color set 11112-2. Facepaint pattern options 11114 having regions corresponding to third color set 11112-3 react in a similar manner to changes in third color set 11112-3. Additionally, regions of a facepaint pattern applied to avatar 11005 react in a same manner to changes in corresponding color sets.

In some embodiments, some color sets do not effect a change in all of the pattern options. For example, pattern option 11114-3 includes region 11114-3*a* corresponding to first color set 11112-1 and region 11114-3*b* corresponding to second color set 11112-2, but does not include a region corresponding to third color set 11112-3. Accordingly, changes to color set 11112-3 do not affect the appearance of pattern option 11114-3 (or avatar 11005 if pattern option 11114-3 is selected).

In FIG. 11T, device 600 detects input 11116 on pattern option 11114-4 and, in response, updates avatar 11005 to display facepaint 11118 based on the selected pattern option 11114-4, as shown in FIG. 11U.

In FIG. 11U, facepaint 11118 has pattern 11120 with regions 11120-1, 11120-2, and 11120-3 corresponding to regions 11114-4*a*, 11114-4*b*, and 11114-4*c*, respectively, of selected pattern option 11114-4. Facepaint 11118 also has a set of colors 11122 with color 11122-*la* corresponding to color 11112-*la* of color set 11112-1, color 11122-2*a* corresponding to color 11112-2*a* of color set 11112-2, and color 11122-3*a* corresponding to color 11112-3*a* of color set 11112-3. As shown in FIG. 11U, color 11122-*la* is in region 11120-1, color 11122-2*a* is in region 11120-2, and color 11122-3*a* is in region 11120-3. Facepaint pattern 11120 does not cover the entire face of avatar 11005. Therefore, avatar skin tone 11124 remains displayed for a portion of the avatar's face that does not include facepaint 11118. Additionally, facepaint 11118 is not displayed on avatar ears 11126.

In some embodiments, facepaint 11118 has a different texture than avatar skin tone 11124. For example, in FIG. 11U, facepaint 11118 has a glossy texture, as represented by light effect 11128 (e.g., glare). In some embodiments, different facepaint patterns 11114 have different paint textures. For example, pattern 11114-1 has a flat texture and, therefore, does not include a light effect.

As discussed previously, facepaint 11118 is displayed as applied over the face of avatar 11005. Accordingly, device 600 does not display avatar 11005 with eye makeup 11048 or beauty mark 11055, but does display facial wrinkles 11007. Additionally, device 600 displays eyebrows having a distorted appearance 11009-1 (e.g., a distorted color) caused by the mixing of eyebrow color/texture and facepaint 11118.

In FIG. 11U, device 600 detects input 11130 on color 11112-1*b* of first color set 11112-1 and, in response, updates avatar 11005 and pattern options 11114 based on the new color selection, as shown in FIG. 11V.

In FIG. 11V, facepaint 11118 is updated based on the new color selection. Specifically, region 11120-1 changes from color 11122-*la* to color 11122-1*b*, and pattern option 11114-4 is updated in a similar manner by changing region 11114-4*a* to the selected color. Pattern option 11114-3 is also updated, with region 11114-3*a* changing based on the selected color. Additionally, color slider 11131 is displayed for adjusting a gradient of selected color 11112-1*b*.

Figure 11W:
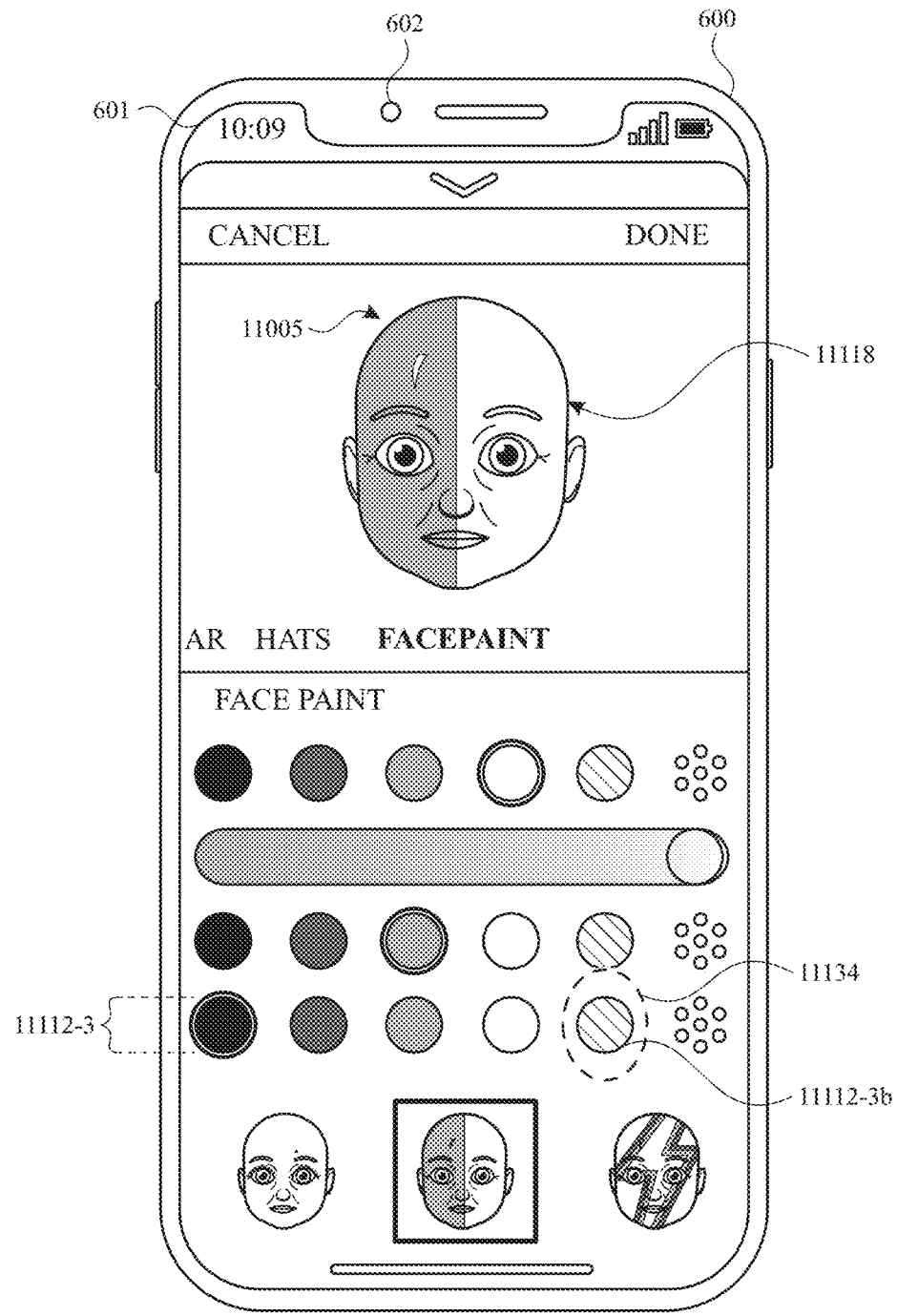

In FIG. 11V, device 600 detects input 11132 on pattern option 11114-3 and, in response, updates avatar 11005 to display facepaint 11118 having the appearance of pattern option 11114-3, as shown in FIG. 11W.

Figure 11X:
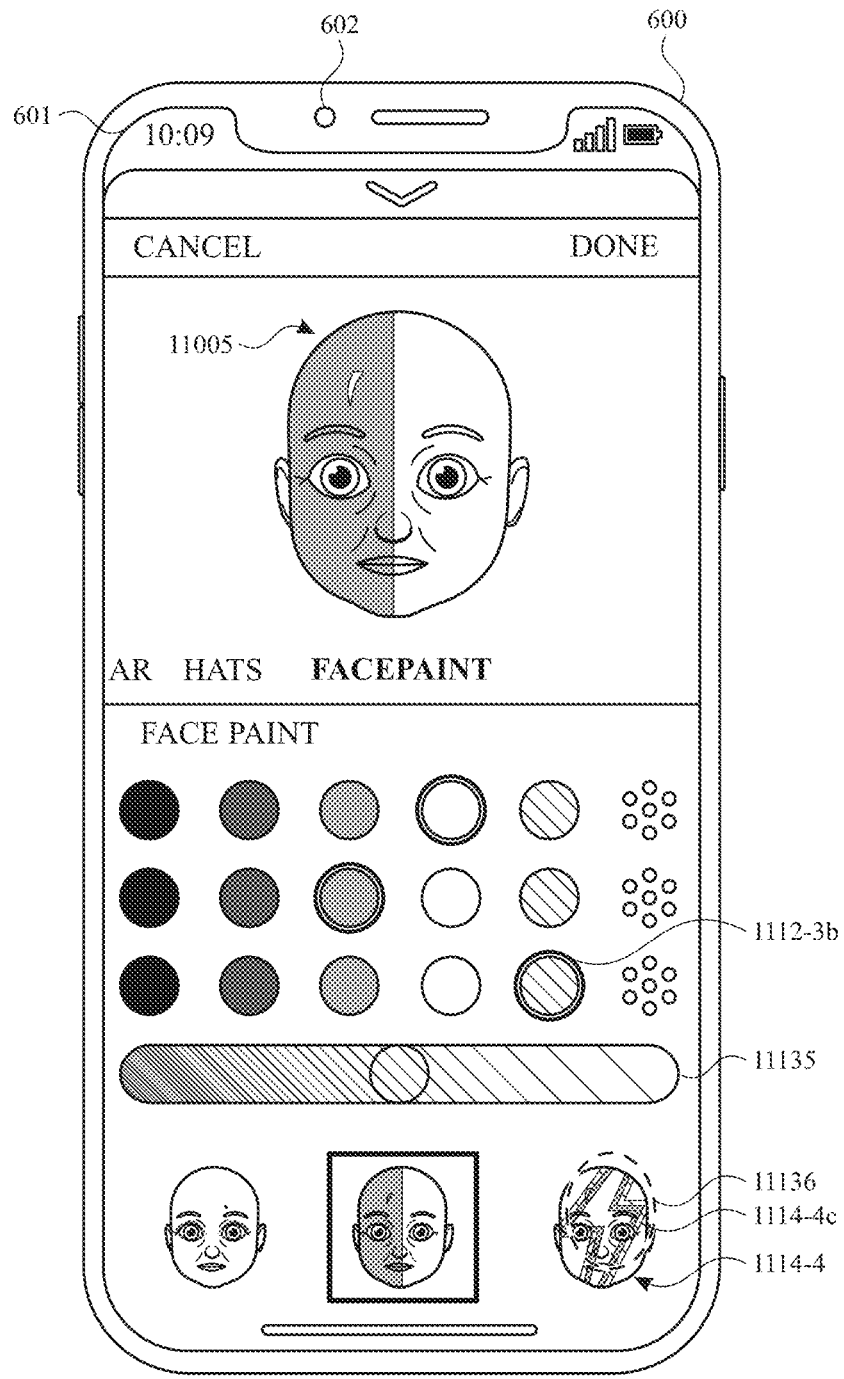
Figure 11Y:
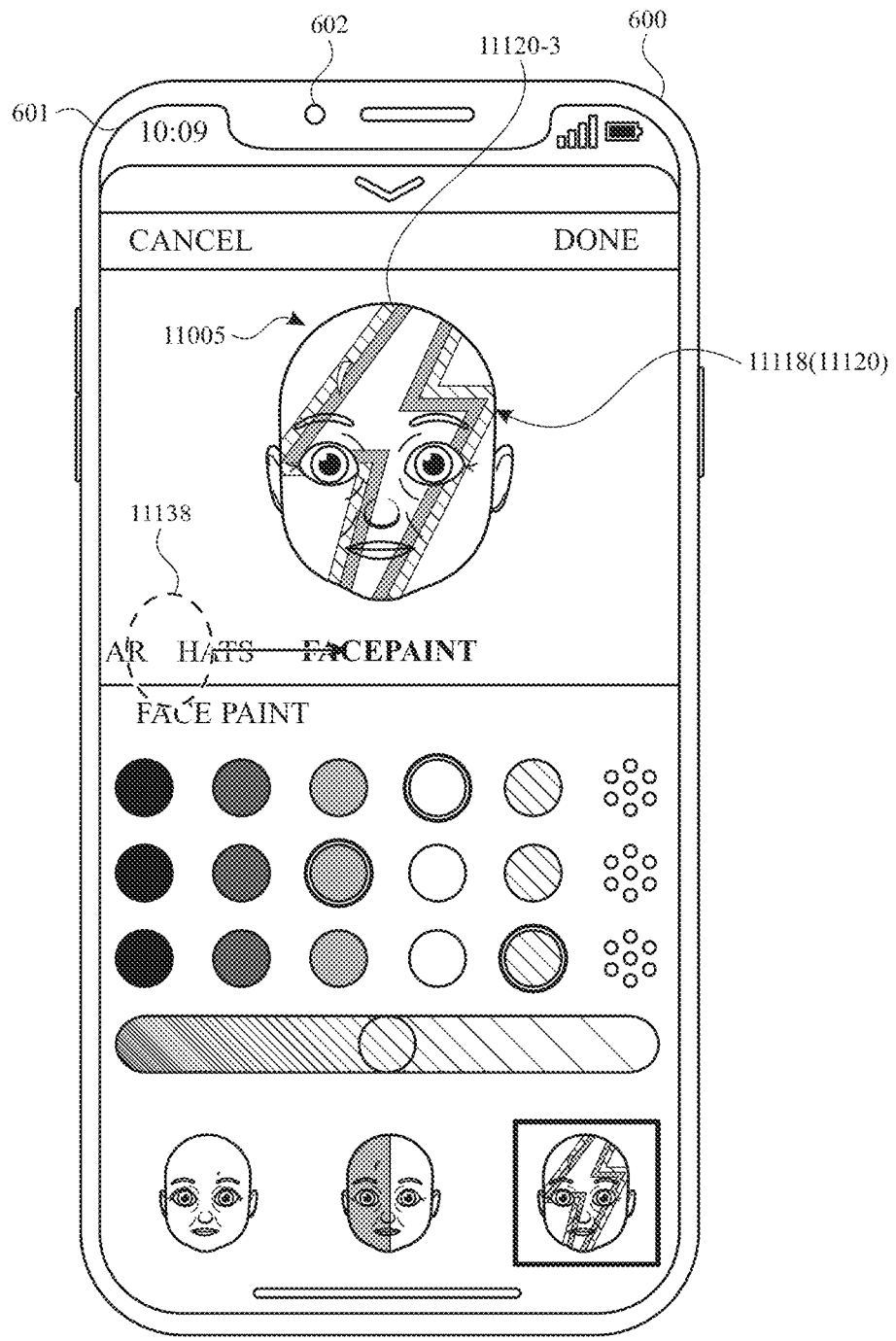

In FIG. 11W, device 600 detects input 11134 on color 11112-3b of third color set 11112-3 and, in response, displays color slider 11135 for adjusting a gradient of color 11112-3b and updates avatar pattern option 11114-4 based on the new color selection, as shown in FIG. 11X.

In FIG. 11X, pattern option 11114-4 is updated by changing region 11114-4c to the selected color (e.g., 11112-3b). It should be noted that facepaint 11118 on avatar 11005 is not updated based on the selection of color 11112-3b, because the applied pattern (e.g., corresponding to pattern option 11114-3) does not include a region that corresponds to third color set 11112, as previously discussed.

In FIG. 11X, device 600 detects input 11136 on pattern option 11114-4 and, in response, displays avatar 11005 having facepaint 11118 with pattern 11120 and region 11120-3 updated based on the selection of color 11112-3b. Device 600 detects input 11138, which corresponds to a selection of eyewear menu option 11006-9, and, in response, updates avatar display region 11004 to show the selection of eyewear menu option 11006-9 avatar option region 11008 to show selectable options for selecting eyewear for avatar 11005. Eyewear options include lenses options 11140 and eyepatch options 11142. Lenses options 11140 show different styles of eyeglasses displayed over a representation of avatar 11005, wherein the different eyeglasses are displayed over the facepaint in the respective lenses option. Similarly, eyepatch options 11142 show different positions of an eyepatch displayed over a representation of avatar 11005, wherein the eyepatch is displayed over the facepaint in the respective eyepatch option.

Figure 11Z:
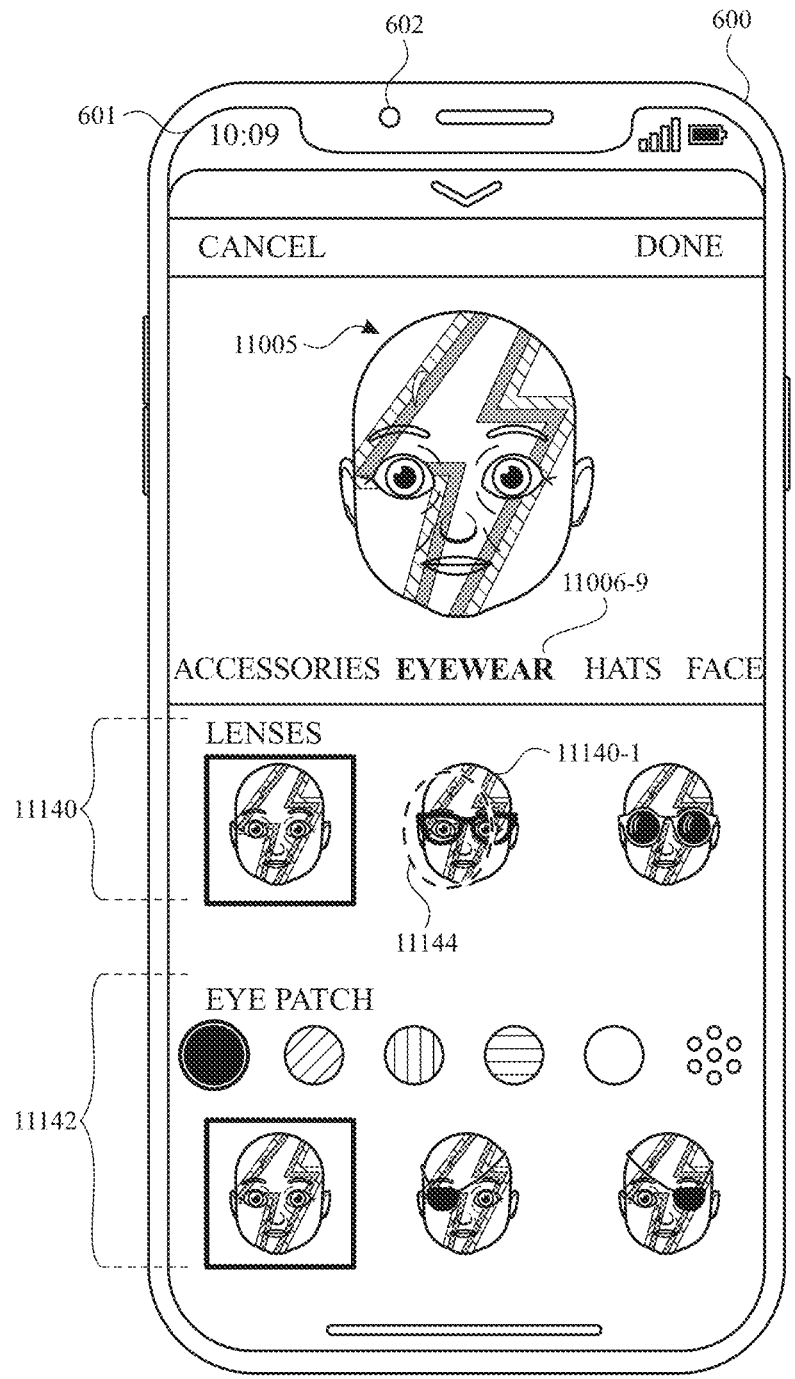
Figure 11A:
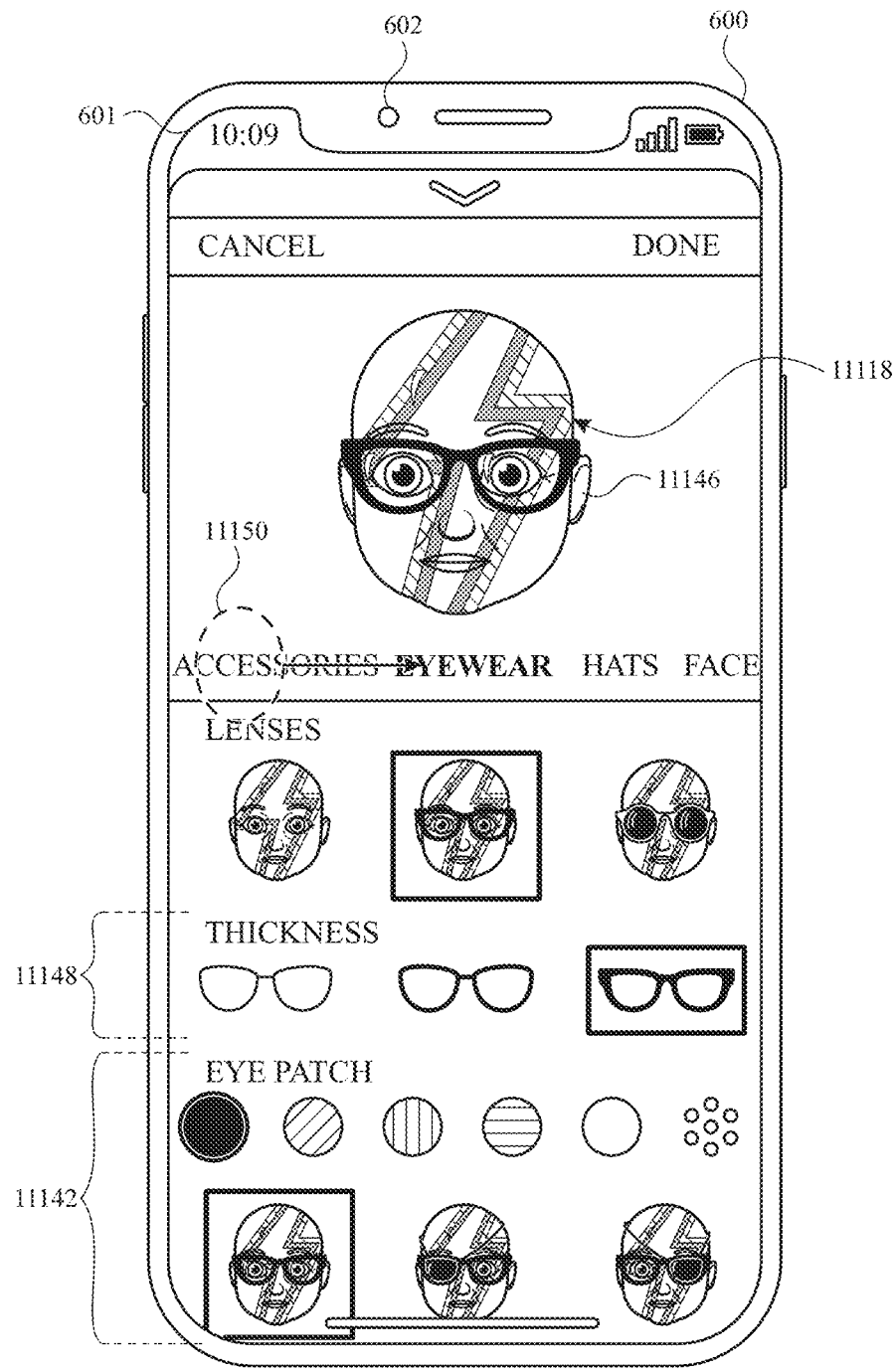
Figure 11A:
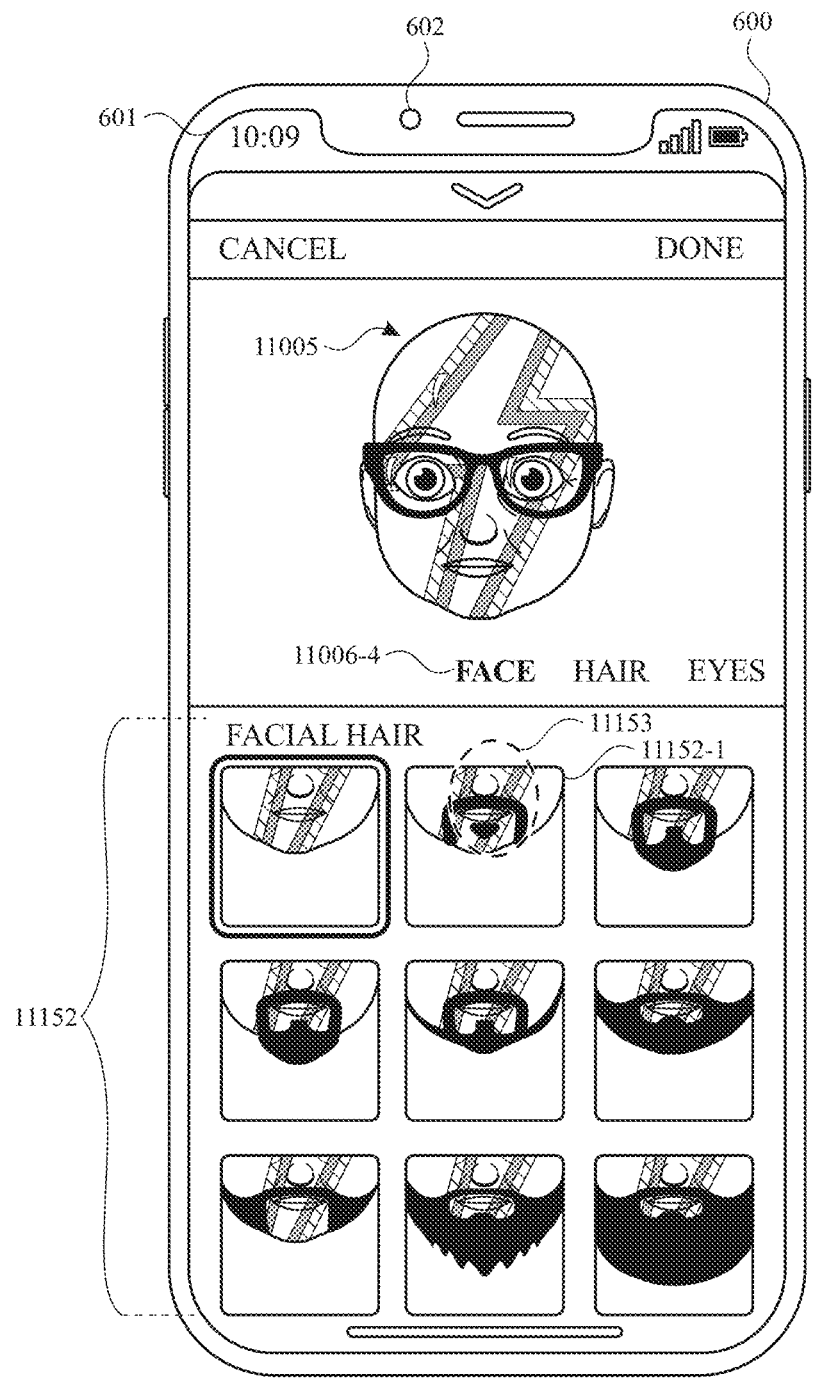
Figure 11A:
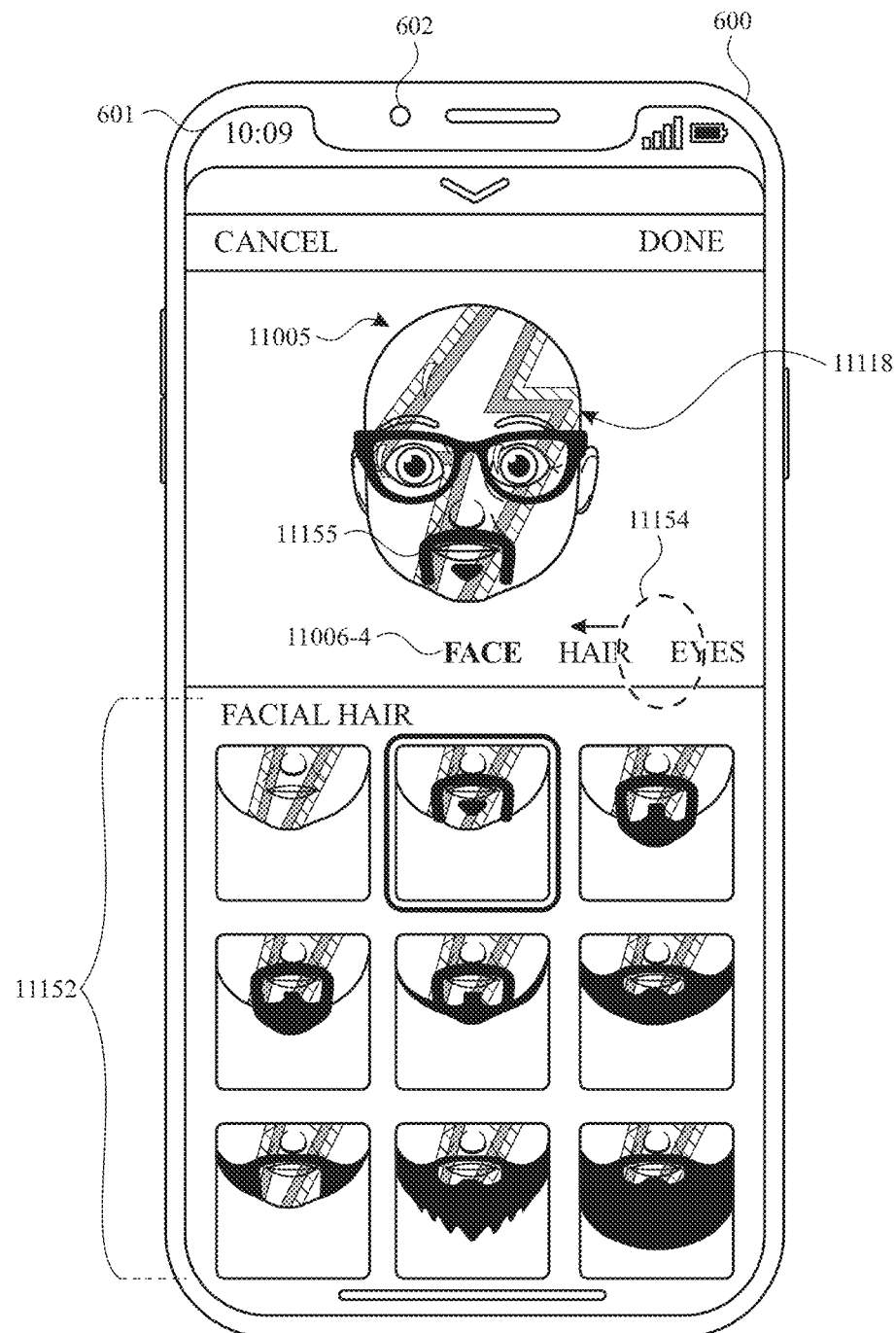
Figure 11A:
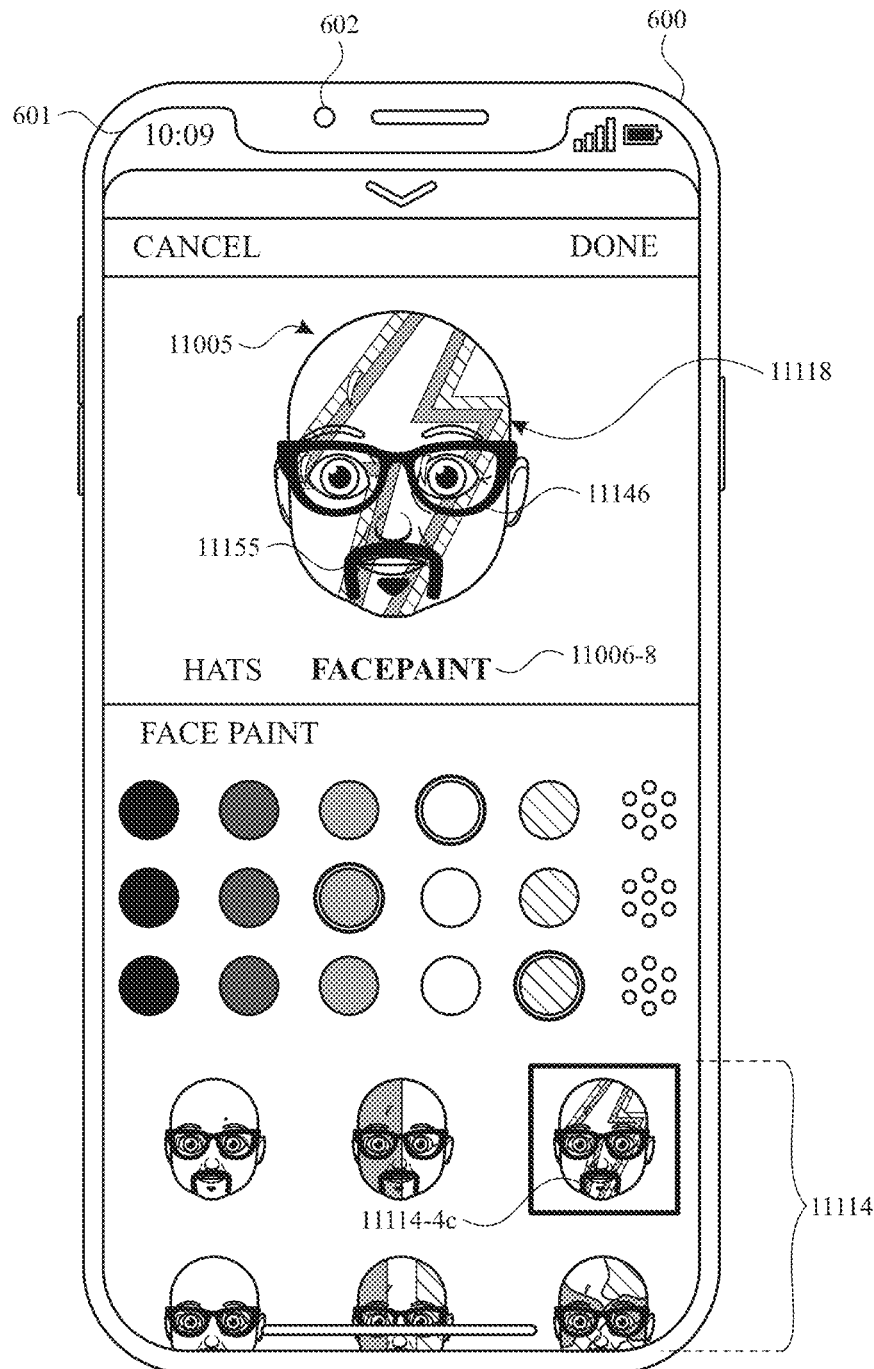

In FIG. 11Z, device 600 detects input 11144 selecting lenses option 11140-1 and, in response, updates avatar 11005 to include glasses 11146 displayed over facepaint 11118. In addition, avatar option region 11008 is updated to include thickness options 11148 for the glasses, and eyepatch options 11142 are updated to include the selected glasses, showing the different eyepatch options positioned over the representation of the avatar's face, but underneath the selected glasses.

In FIG. 11AA, device 600 detects input 11150, which corresponds to a selection of face menu option 11006-4, and, in response, displays avatar display region 11004 with face menu option 11006-4 selected, and displaying facial hair options 11152, as shown in FIG. 11AB.

In FIG. 11AB, facial hair options 11152 illustrate representations of avatar 11005 with different facial hair styles. In the various facial hair options 11152, the facial hair is displayed over the facepaint applied to avatar 11005. Device 600 detects input 11153 corresponding to a selection of facial hair option 11152-1 and, in response, updates avatar 11005 to display facial hair 11155, which is displayed positioned over facepaint 11118, as shown in FIG. 11AC.

In FIG. 11AC, device 600 detects input 11154, which corresponds to a selection of facepaint menu option 11006-8 and, in response, updates avatar display region 11004 to select facepaint menu option 11006-8, as shown in FIG. 11AD.

In FIG. 11AD, device 600 displays avatar 11005 having glasses 11146 and facial hair 11155 displayed over facepaint 11118. Additionally, pattern options 11114 are updated to include the selected glasses and facial hair options, displaying each of these over the respective pattern options 11114.

FIG. 12 is a flow diagram illustrating a method for displaying avatars in an avatar editing application user interface using an electronic device in accordance with some embodiments. Method 1200 is performed at a device (e.g., 100, 300, 500, 600) with a display and an input device. Some operations in method 1200 are, optionally, combined, the orders of some operations are, optionally, changed, and some operations are, optionally, omitted.

As described below, method 1200 provides an intuitive way for displaying avatars in an avatar editing application user interface. The method reduces the cognitive burden on a user for displaying avatars in an avatar editing application user interface, thereby creating a more efficient human-machine interface. For battery-operated computing devices, enabling a user to display avatars in an avatar editing application user interface faster and more efficiently conserves power and increases the time between battery charges.

An electronic device (e.g., 600) displays (1202), via the display device (e.g., 601), an avatar editing user interface (e.g., 11002) (e.g., a single interface screen).

The device displays (1204) the avatar editing user interface (e.g., 11002) including (e.g., includes displayed concurrently) an avatar (e.g., 11005) (e.g., an avatar such as, for example, an avatar modeled to represent a human character, and/or an avatar that can be created and/or customized by the user) including a first feature (e.g., avatar facepaint 11118), the first feature having a first color pattern (e.g., 11120) (e.g., a facepaint template applied to the avatar) (e.g., a color pattern having lightning bolt shapes) generated with a first set of colors (e.g., 11122) (e.g., a default set of colors; e.g., a set of colors corresponding to the facepaint template) including a first color (e.g., 11122-1a) (e.g., red) in a first region (e.g., 11120-1) (e.g., the center lightning bolt shape) of the first color pattern. In some embodiments, avatars modeled to represent a human include customizable (e.g., selectable or configurable) avatar features that generally correspond to physical traits of a human. For example, such an avatar may include a representation of a person having various physical, human features or characteristics (e.g., an older woman with a dark skin tone and having long, straight, brown hair). Such an avatar would also include a representation of a person having various non-human characteristics that are typically associated with an appearance of a human (e.g., cosmetic enhancements, hats, glasses, etc.). In some embodiments, such an avatar would not include an anthropomorphic construct such as a stylized animal, a stylized robot, or a stylization of a normally inanimate or normally inhuman object.

In some embodiments, the first feature includes a first displayed texture (e.g., represented by light effect 11128) (e.g., a paint texture (e.g., glossy, flat, matte, etc.)) that is different from a second displayed texture of a skin feature (e.g., 11124) of the avatar (e.g., the avatar skin has a texture that is different from the texture of the facepaint). Displaying the first feature having a displayed texture that is different from a displayed texture of a skin feature of the avatar provides visual feedback to the user that the facepaint feature is applied to the avatar and where interaction with facepaint controls will affect the avatar, particular in instances where the facepaint has a color that can be confused for a skin tone. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The device displays (1206) the avatar editing user interface (e.g., 11002) including a set of color options (e.g., 11112) (e.g., a plurality of sets of color options) for the first feature. In some embodiments, each set of color options corresponds to various facepaint template options that include a pattern (or portion thereof) that changes color with selection of the color options comprising the respective set of color options.

The device displays (1208) the avatar editing user interface (e.g., 11002) including a plurality of color pattern options (e.g., 11114) (e.g., selectable options that correspond to different avatar facepaint templates) for the first feature (e.g., 11118) including a second color pattern option (e.g., 11114-3) (e.g., a color pattern having vertical stripes) that is different from the first color pattern (e.g., 11120) (e.g., the second color pattern option corresponds to a color pattern that is different from the color pattern applied to the avatar).

In some embodiments, the plurality of color pattern options includes a first color pattern option (e.g., 11114-4) that corresponds to the first color pattern (e.g., 11120) (e.g., a selectable color pattern option that represents the color pattern currently applied to the avatar). In some embodiments, the first color pattern option is shown in a selected state when the first feature of the avatar has the first color pattern.

In some embodiments, the plurality of color pattern options include an option (e.g., 11114-2) that, when selected, causes ceasing to display the first feature (e.g., 11118) (e.g., the avatar is displayed without facepaint when the option for ceasing to display the first feature is selected).

In some embodiments, the electronic device detects selection of the option (e.g., 11114-2) for ceasing to display the first feature. In some embodiments, in response to detecting selection of the option for ceasing to display the first feature, the electronic device ceases to display the first feature (e.g., removing the facepaint from the avatar while still displaying the color pattern options each having a representation of the avatar with a respective color pattern applied). In some embodiments, in response to detecting selection of the option for ceasing to display the first feature, the electronic device displays (e.g., introducing display of, revealing) one or more avatar features (e.g., beauty marks, makeup (e.g., blush, lipstick, eyeshadow, etc.)) that were hidden while the first feature was displayed (e.g., see avatar 11005 in FIG. 11T). Revealing the avatar features that were hidden by the facepaint provide visual feedback to the user that the facepaint feature is no longer displayed on the avatar, and that the user's prior selections and customization of the avatar is preserved. Providing improved visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the avatar (e.g., 11005) includes a third feature displayed over the first feature. In some embodiments, the first feature is an item selected from a group consisting of: an avatar glasses feature (e.g., 11146) (e.g., eyeglasses, sunglasses, monocle, goggles, etc.), an avatar hair feature (e.g., hair on top of the avatar's head), an avatar facial hair feature (e.g., 11155) (e.g., avatar facial hair other than eyebrows (e.g., a beard, goatee, mustache, etc.)), and an avatar skin wrinkle feature (e.g., 11007) (e.g., lines in the avatar's skin that represent wrinkles). In some embodiments, the third feature is displayed over the facepaint and is not responsive to changes made to the facepaint (e.g., while still remaining responsive to other features of the avatar such as, for example, movement of the avatar's head, changes in facial poses of the avatar, and movement of avatar facial features (e.g., nose, eyebrows, mouth, etc.)). Displaying a third feature over the first feature allows for displaying customization and expression (e.g., facial expressions; poses) of the avatar while still respecting the user's choice of facepaint. This provides an improved control scheme for generating an avatar, which can require fewer inputs to generate the avatar than would be necessary if a different control scheme were used (e.g., a control scheme requiring manipulation of individual control points to build the avatar). This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the avatar includes a fourth feature (e.g., an avatar eyebrow 11009). In some embodiments, while displaying the first feature, the electronic device displays the fourth feature having a first appearance (e.g., 11009-1) that is based on the first feature (e.g., the avatar eyebrow has a color that is a combination of the original eyebrow color and the color of the first feature at a location corresponding to the respective eyebrow, or a portion of the face paint corresponding to the eyebrow has a different color or texture at a location and shape of the eyebrow to indicate the presence of the eyebrow under the facepaint). In some embodiments, after ceasing to display the first feature, the electronic device displays the fourth feature having a second appearance (e.g., see eyebrows 11009 in FIG. 11T) that is not based on the first feature (e.g., the avatar eyebrow has a color that is determined based on a selected hair color (e.g., an eyebrow color)). Displaying the fourth feature having the first appearance while the first feature is displayed provides an indication to the user that the fourth feature is present while the facepaint is displayed. Moreover, the presence of the fourth feature allows the avatar to provide different facial expressions using the fourth feature (e.g., eyebrows) while still respecting and preserving the user's choice of facepaint. This provides an improved control scheme for generating an avatar, which can require fewer inputs to generate the avatar than would be necessary if a different control scheme were used (e.g., a control scheme requiring manipulation of individual control points to build the avatar). This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the avatar includes a fifth feature (e.g., avatar ears 11126) displayed concurrently with the first feature, wherein the fifth feature is separate from the first feature and does not change in response to changes to the first feature (e.g., the avatar ears have a skin tone and are not changed when the first feature is modified).

While the first feature (e.g., 11118) is displayed with the first color pattern (e.g., 11120) generated with the first set of colors (e.g., 11122) including the first color (e.g., 11122-_la_) in the first region (e.g., 11120-1) of the first color pattern, the electronic device detects (1210), via the input device (e.g., 601), a selection (e.g., 11130) of a color option in the set of color options that corresponds to a second color (e.g., 11112-1*b*) (e.g., blue).

In response (1212) to detecting the selection (e.g., 11130), the electronic device changes (1214) an appearance of one or more color pattern options (e.g., 11114-3 and 11114-4 in FIG. 11V) in the plurality of color pattern options having a first portion (e.g., 11114-3*a*; 11114-4*a*) (e.g., a portion of a facepaint template that changes with selection of a color option) corresponding to the set of color options (e.g., 11112-1) (e.g., changing an appearance of a representation of the avatar displayed in one or more color pattern options (e.g., without necessarily changing an appearance of the avatar itself)). In some embodiments, changing the appearance includes changing a portion (e.g., 11114-3*a*) of the second color pattern option (e.g., 11114-3) from a respective color (e.g., 11112-1*a*) to the second color (e.g., 11112-1*b*) (e.g., changing a region of the second color pattern to blue). In some embodiments, only a subset of the color pattern options have a region that corresponds to the set of color options. In some embodiments, a color pattern (e.g., a portion of the color pattern template) corresponds to a set of color options if the color pattern changes color in response to selection of color options in the set. In some embodiments, a color pattern forms some, or all, of the facepaint template, depending on the design of the facepaint template. Thus, a facepaint template can have a number of color patterns that form the template. For example, a facepaint template having three color patterns changes color in response to selecting different colors from three sets of color options. In some embodiments, color patterns can have various shapes and designs.

In some embodiments, the plurality of color pattern options include a fifth color pattern option (e.g., 11114-1) having a region (e.g., 11114-1*a*) (e.g., a region having a default color) that is not responsive to selections of the color options (e.g., 11112) (e.g., the default color is not changeable by the set of color options). In some embodiments, one or more of the color patterns include patterns of a type that have one or more default colors that do not change. For example, a camo pattern includes a black color that is not changeable by the set of color options. As another example, a skull pattern has eye sockets and nose regions that are always black. As another example, clown and vampire patterns have a white base color that is not changeable by the set of color options. As yet another example, an ogre pattern has lips and eyes regions that have a black color that is not changeable by the set of color options.

In response (1212) to detecting the selection of the color option (e.g., 11112-1*b*) in the set of color options that corresponds to the second color, the electronic device maintains (1216) display of the avatar (e.g., 11005) including the first feature (e.g., 11118). In some embodiments, the first feature has the first color pattern (e.g., 11120) (e.g., the lightning bolt color pattern) (e.g., the avatar maintains the same color pattern (e.g., the first color pattern), however, any of the regions of the maintained color pattern optionally change color depending on whether the region corresponds to the selected color option. For example, if the first region of the first color pattern corresponds to the selected color option, then the first region changes from the first color to the second color. Otherwise, the first region remains unchanged (e.g., having the first color).).

In some embodiments, maintaining display of the avatar (e.g., 11005) including the first feature (e.g., 11118) includes changing a respective one of the colors (e.g., 11122-1*a*) (e.g., the first color; a color other than the first color) in the first set of colors of the first color pattern to the second color (e.g., 11122-1*b*) (e.g., the color pattern applied to the avatar is maintained while one of the colors in the set of colors is changed to the second color (e.g., blue)). In some embodiments, the color that changes in the first set of colors of the first color pattern applied to the avatar is in a region of the first color pattern that is responsive to the set of color options. Thus, as different color options are selected from the set of color options, the color of the responsive region changes to the selected colors. In some embodiments, the color that changes in the first set of colors is the color (e.g., first color) in the first region of the first color pattern. In some embodiments, the color that changes in the first set of colors is a color in a different region (e.g., not the first region) of the first color pattern. Changing a respective one of the colors in the first set of colors of the first color pattern to the second color reduces the number of inputs to perform the technical task of generating a virtual avatar. Reducing the number of inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting selection of the color option in the set of color options (e.g., 11112-1) that corresponds to the second color (e.g., 11112-1*b*), the electronic device displays a color adjustment control (e.g., 11131) (e.g., a color slider user interface) for the selected color option. In some embodiments, the electronic device detects an input (e.g., a drag gesture or tap gesture) that corresponds to the color adjustment control. In some embodiments, in response to detecting selection of the color option in the set of color options that corresponds to the second color and in response to detecting the input that corresponds to the color adjustment control, the electronic device modifies one or more properties (e.g., hue, saturation, value, lightness, luminance, shading, midtones, highlights, warmth, coolness, etc.) of the second color (e.g., modifying the one or more properties based on a magnitude and direction of the input that corresponds to the color adjustment control). In some embodiments, modifying the one or more properties of the second color includes modifying the one or more properties of the second color at locations where the second color is displayed (e.g., displayed in response to being selected (e.g., in one or more of the color pattern options; in the selected color option; in the first feature)). In some embodiments, each set of color options displays a color slider when one of the color options in the set of color options is selected.

The electronic device detects (1218) a selection (e.g., 11132) of a respective color pattern option (e.g., 11114-3) (e.g., the second color pattern option) of the color pattern options having the changed appearance (e.g., see FIG. 11V) (e.g., selecting one of the facepaint template options that was changed/updated in response to the color selection; e.g., selecting the facepaint template having the blue color and a vertical stripe pattern).

In response to detecting the selection of the respective color pattern option (e.g., 11114-3) and while the second color (e.g., 11112-1*b*) is selected for the set of color options (e.g., 11112-1), the electronic device changes (1220) an appearance of the first feature (e.g., 11118) of the avatar to have an appearance generated based on the respective color pattern option with the second color applied to a portion of the respective color pattern option (e.g., avatar 11005 is updated with facepaint 11118 having a color pattern corresponding to pattern option 11114-3, as shown in FIG. 11W) (e.g., changing an appearance of the avatar to include the selected facepaint template (e.g., having the blue color and vertical stripe pattern)). In some embodiments, changing the appearance of the avatar includes removing a first facepaint template from the avatar and applying the selected facepaint template to the avatar. In some embodiments, changing the appearance of the avatar includes updating a color pattern that is currently applied to the avatar to include the changed color (e.g., switching from red color to blue color) without changing the color pattern (e.g., without changing the design of the facepaint template applied to the avatar). Changing an appearance of the first feature to have an appearance generated based on the color pattern option with the second color applied to a portion of the color pattern option, while the second color is selected for the set of color options, provides visual feedback to the user that selection of colors in the respective set of color options causes a corresponding change in color for the respective color pattern option. This provides an improved control scheme for creating an avatar, which can require fewer inputs to generate custom appearances of the avatar than would be necessary if a different control scheme were used (e.g., a control scheme requiring manipulation of individual control points to build the avatar). Reducing the number of inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, changing an appearance of the first feature (e.g., 11118) of the avatar (e.g., 11005) to have the appearance generated based on the respective color pattern option with the second color applied to a portion of the respective color pattern option includes, in accordance with a determination that the respective color pattern option is the second color pattern option (e.g., 11114-3) (e.g., an option for the pattern with vertical stripes), displaying the first feature of the avatar having a second color pattern (e.g., vertical stripes applied to the face of the avatar) corresponding to the second color pattern option (e.g., avatar 11005 is updated with facepaint 11118 having a color pattern corresponding to pattern option 11114-3, as shown in FIG. 11W) (e.g., the avatar is displayed with a color pattern that matches the selected second color pattern option (e.g., a pattern having vertical stripes)). In some embodiments, changing an appearance of the first feature of the avatar to have the appearance generated based on the respective color pattern option with the second color applied to a portion of the respective color pattern option includes in accordance with a determination that the respective color pattern option is a fourth color pattern option (e.g., a camo pattern option) different from the second color pattern option, displaying the first feature of the avatar having a fourth color pattern (e.g., a camo pattern) corresponding to the fourth color pattern option (e.g., the avatar is displayed with a color pattern that matches the selected fourth color pattern option (e.g., a camo pattern)). Displaying the first feature of the avatar having a fourth color pattern corresponding to the fourth color pattern option allows a user to switch colors of a color pattern, and then apply the changed color pattern to the avatar. This provides an improved control scheme for creating an avatar, which can require fewer inputs to generate custom appearances of the avatar than would be necessary if a different control scheme were used (e.g., a control scheme requiring manipulation of individual control points to build the avatar). Reducing the number of inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the plurality of color pattern options further includes a third color pattern option different from the second color pattern option. In some embodiments, changing a portion of the second color pattern option from a respective color to the second color includes changing a portion of the third color pattern option from a third color to the second color. Changing a portion of the third color pattern option from a third color to the second color when changing a portion of the second color pattern option from a respective color to the second color allows a user to update colors of multiple color pattern options by selecting a single color option from the set of color options. This provides an improved control scheme for creating an avatar, which can require fewer inputs to generate custom appearances of the avatar than would be necessary if a different control scheme were used (e.g., a control scheme requiring manipulation of individual control points to build the avatar). Reducing the number of inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1200 (e.g., FIG. 12) are also applicable in an analogous manner to the methods described below. For example, methods 700, 800, 1000, 1300, 1500, 1700, and 1800 optionally includes one or more of the characteristics of the various methods described above with reference to method 1200. For example, an avatar can be displayed and used in a user interface in a manner similar to that described above. For brevity, these details are not repeated below.

FIG. 13 is a flow diagram illustrating a method for displaying avatars in an avatar editing application user interface using an electronic device in accordance with some embodiments. Method 1300 is performed at a device (e.g., 100, 300, 500, 600) with a display and an input device. Some operations in method 1300 are, optionally, combined, the orders of some operations are, optionally, changed, and some operations are, optionally, omitted.

As described below, method 1300 provides an intuitive way for displaying avatars in an avatar editing application user interface. The method reduces the cognitive burden on a user for displaying avatars in an avatar editing application user interface, thereby creating a more efficient human-machine interface. For battery-operated computing devices, enabling a user to display avatars in an avatar editing application user interface faster and more efficiently conserves power and increases the time between battery charges.

The electronic device (e.g., 600) displays (1302), via the display device (e.g., 601), an avatar editing user interface (e.g., 1102) (e.g., a single interface screen).

The electronic device (e.g., 600) displays (1304) the avatar editing user interface including (e.g., includes displaying concurrently) an avatar (e.g., 11005) (e.g., an avatar such as, for example, an avatar modeled to represent a human character, and/or an avatar that can be created and/or customized by the user) including a respective avatar feature (e.g., 11014) (e.g., mouth, tongue, face), the respective avatar feature having a first pose (e.g., 11014-1) (e.g., a default pose or state of the feature; e.g., mouth closed; e.g., tongue inside avatar mouth; e.g., a facial expression). In some embodiments avatars modeled to represent a human include customizable (e.g., selectable or configurable) avatar features that generally correspond to physical traits of a human. For example, such an avatar may include a representation of a person having various physical, human features or characteristics (e.g., an older woman with a dark skin tone and having long, straight, brown hair). Such an avatar would also include a representation of a person having various non-human characteristics that are typically associated with an appearance of a human (e.g., cosmetic enhancements, hats, glasses, etc.). In some embodiments, such an avatar would not include an anthropomorphic construct such as a stylized animal, a stylized robot, or a stylization of a normally inanimate or normally inhuman object.

The electronic device (e.g., 600) displays (1306) the avatar editing user interface including an avatar option selection region (e.g., 11008) (e.g., a visually distinguished region that includes options selectable for modifying an avatar feature) including a plurality of avatar feature options (e.g., 11016; 11018) (e.g., displayed representations of available modifications of a corresponding avatar feature. In some embodiments, the feature options include graphical depictions of different feature options that may be selected to customize aspects or values of a particular avatar feature.) corresponding to a set of candidate values (e.g., 11016-1 through 11016-6) (e.g., 11018-1 through 11018-3) (e.g., a set of candidates or candidate options) for a characteristic (e.g., teeth style; piercing type) of an avatar feature (e.g., 11020; 11022) (e.g., a selected avatar feature other than the respective avatar feature) and having an appearance based on the avatar.

The electronic device detects (1308), via the input device, a request (e.g., 11012) to display options for editing the respective avatar feature (e.g., a selection of "Mouth" affordance for modifying features of the respective avatar feature and/or scrolling through a set of options for modifying features of the respective avatar feature, such as a mouth of the avatar).

In response to detecting the request, the electronic device updates (1310) the avatar option selection region (e.g., 11008) to display avatar feature options (e.g., 11016; 11018) corresponding to a set of candidate values for a characteristic (e.g., teeth, tongue piercings, etc.) of the respective avatar feature (e.g., avatar mouth 11014). In some embodiments, updating the avatar option selection region to display avatar feature options corresponding to a set of candidate values for a characteristic of the respective avatar feature includes concurrently displaying (1312) a representation of a first option (e.g., 11018-1) (e.g., an avatar tongue piercing option) for the respective avatar feature in which the respective avatar feature (e.g., 11014) has a second pose (e.g., 11014-3) (e.g., avatar mouth is open with the tongue is sticking out) (e.g., a second pose that is different from the first pose) (e.g., a second pose that is the same as the first pose) and displaying (1314) a representation of a second option (e.g., 11016-1) (e.g., an avatar teeth option) for the respective avatar feature in which the respective avatar feature has a third pose (e.g., 11014-2) that is different from the second pose (e.g., the avatar mouth is open (e.g., lips pulled back) in a smiling pose to reveal the avatar teeth). Displaying the respective representations of the first and second options having different poses enhances the displayed options so that a user can more easily see and accurately edit the characteristics of the respective avatar features. This provides an improved control scheme for creating or editing an avatar, which can require fewer inputs to generate custom appearances of the avatar than would be necessary if a different control scheme were used (e.g., a control scheme requiring manipulation of individual control points to build the avatar). Reducing the number of inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments updating the avatar option selection region (e.g., 11008) to display avatar feature options corresponding to a set of candidate values for a characteristic of the respective avatar feature further includes displaying a plurality of representations of alternatives (e.g., 11018-2; 11018-3) for the first option (e.g., different avatar tongue piercing options) for the respective avatar feature in which the respective avatar feature has the second pose (e.g., 11014-3) (e.g., the avatar mouth is open with the tongue sticking out) in each of the plurality of representations of alternatives for the first option. Displaying the plurality of representations of alternatives for the first option for the respective avatar feature in which the respective avatar feature has the second pose in each of the plurality of representations of alternatives for the first option enhances the displayed appearances of the plurality of representations so that a user can more easily see and accurately edit different characteristics of the respective avatar feature based on the plurality of representations of alternatives for the first option. This provides an improved control scheme for creating or editing an avatar, which can require fewer inputs to generate custom appearances of the avatar than would be necessary if a different control scheme were used (e.g., a control scheme requiring manipulation of individual control points to build the avatar). Reducing the number of inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, updating the avatar option selection region to display avatar feature options corresponding to a set of candidate values for a characteristic of the respective avatar feature further includes displaying a plurality of representations of alternatives (e.g., 11016-2 through 11016-6) for the second option (e.g., different avatar teeth options) for the respective avatar feature in which the respective avatar feature has the third pose (e.g., 11014-2) that is different from the second pose (e.g., the avatar mouth is open with the lips pulled back in a smiling pose to reveal the avatar teeth) in each of the plurality of representations of alternatives for the second option. Displaying the plurality of representations of alternatives for the second option for the respective avatar feature in which the respective avatar feature has the third pose in each of the plurality of representations of alternatives for the second option enhances the displayed appearances of the plurality of representations so that a user can more easily see and accurately edit different characteristics of the respective avatar feature based on the plurality of representations of alternatives for the second option. This provides an improved control scheme for creating or editing an avatar, which can require fewer inputs to generate custom appearances of the avatar than would be necessary if a different control scheme were used (e.g., a control scheme requiring manipulation of individual control points to build the avatar). Reducing the number of inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the plurality of representations of alternatives for the first option and the plurality of representations of alternatives for the second option each have an appearance that is based on an appearance of the avatar (e.g., the appearance of the avatar is selected based on avatar editing inputs (e.g., selecting avatar features such as skin color, lipstick color, age, facial hair color and style, etc.) and the representations of alternatives each include an appearance that incorporates the selected appearance of the avatar (e.g., based on the avatar editing inputs for the avatar (e.g., having the same selected avatar features))).

In some embodiments, the first option corresponds to an option for editing a first portion (e.g., 11022) of the respective avatar feature (e.g., 11014) (e.g., a tongue portion of an avatar mouth). In some embodiments, the second pose (e.g., 11014-3) increases a degree of visibility (e.g., prominence; a level of detail) of the first portion of the respective avatar feature. In some embodiments, the second option corresponds to an option for editing a second portion (e.g., 11020) of the respective avatar feature that is different from the first portion (e.g., a tongue portion of an avatar mouth). In some embodiments, the third pose (e.g., 11014-2) increases a degree of visibility of the second portion of the respective avatar feature. In some embodiments, increasing a degree of visibility of a portion of a feature includes enlarging a view of the portion or displaying additional content of the portion so that the portion is easier for a user to see. Increasing the degree of visibility of the first or second portions allows a user to more easily view the respective portion to more accurately edit features of the avatar that correspond to the respective portion.

In some embodiments, the first portion (e.g., 11022) has a first degree of visibility when the respective avatar feature (e.g., 11014) has the first pose (e.g., 11014-1), and the degree of visibility of the first portion is greater in the second pose (e.g., 11014-3) than the first degree of visibility of the first portion in the first pose (e.g., the first portion has an increased degree of visibility in the second pose than it does in the first pose). In some embodiments, the second portion (e.g., 11020) has a second degree of visibility when the respective avatar feature has the first pose, and the degree of visibility of the second portion is greater in the third pose (e.g., 11014-2) than the second degree of visibility of the second portion in the first pose (e.g., the second portion has an increased degree of visibility in the third pose than it does in the first pose). In some embodiments, a pose of the respective avatar feature is not determined based on tracking a face of the user, and the first pose of the respective avatar feature is a neutral pose of the respective avatar feature or a predetermined pose of the respective avatar. In some embodiments, the first pose of the respective avatar feature is determined based on a pose of a face detected within a field of view of a camera of the electronic device.

In some embodiments, the first portion (e.g., 11022) has a third degree of visibility when the respective avatar feature has the third pose (e.g., 11014-2), and the degree of visibility of the first portion is greater in the second pose (e.g., 11014-3) than the third degree of visibility of the first portion in the third pose (e.g., the first portion has an increased degree of visibility in the second pose than it does in the third pose). In some embodiments, the second portion (e.g., 11020) has a fourth degree of visibility when the respective avatar feature has the second pose (e.g., 11014-3), and the degree of visibility of the second portion is greater in the third pose (e.g., 11014-2) than the fourth degree of visibility of the second portion in the second pose (e.g., the second portion has an increased degree of visibility in the third pose than it does in the second pose).

In some embodiments, the respective avatar feature is an avatar mouth (e.g., 11014). In some embodiments, the first option is a piercing option (e.g., tongue piercing option 11018-1) for an avatar tongue (e.g., 11022). In some embodiments, the second pose (e.g., 11014-3) is a pose in which the avatar mouth is displayed with the avatar tongue extending from the avatar mouth (e.g., the avatar mouth is open with the tongue sticking out). In some embodiments, the avatar mouth has a first pose in which the tongue is not extended, and the second pose shows the tongue sticking out. Displaying the avatar mouth having a pose in which the avatar tongue is extended from the avatar mouth enhances the displayed appearance of the avatar tongue so that a user can more easily see and accurately edit different tongue piercing characteristics of the avatar mouth based on the pose having the tongue extended. This provides an improved control scheme for creating or editing an avatar, which can require fewer inputs to generate custom appearances of the avatar than would be necessary if a different control scheme were used (e.g., a control scheme requiring manipulation of individual control points to build the avatar). Reducing the number of inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the respective avatar feature is an avatar mouth (e.g., 11014). In some embodiments, the second option is an avatar teeth option (e.g., 11016-1) (e.g., teeth options such as braces, tooth gaps (e.g., lost tooth, lucky tooth gap), grills, fangs, single gold tooth, etc.). In some embodiments, the third pose (e.g., 11014-2) is a pose in which the avatar mouth is displayed with avatar lips positioned to reveal avatar teeth (e.g., 11020) (e.g., the avatar mouth is open with the lips pulled back (e.g., in a smiling pose) to reveal the avatar teeth). In some embodiments, the avatar mouth has a first pose in which the lips are in a closed position (e.g., a neutral mouth pose or smiling without revealing teeth), and the third pose shows the lips in a different position revealing the avatar teeth. Displaying the avatar mouth having a pose in which the avatar lips are positioned to reveal avatar teeth enhances the displayed appearance of the avatar teeth so that a user can more easily see and accurately edit different teeth characteristics of the avatar mouth based on the pose having the lips positioned to reveal the avatar teeth. This provides an improved control scheme for creating or editing an avatar, which can require fewer inputs to generate custom appearances of the avatar than would be necessary if a different control scheme were used (e.g., a control scheme requiring manipulation of individual control points to build the avatar). Reducing the number of inputs needed to perform a task enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1300 (e.g., FIG. 13) are also applicable in an analogous manner to the methods described above and below. For example, methods 700, 800, 1000, 1200, 1500, 1700, and 1800 optionally includes one or more of the characteristics of the various methods described above with reference to method 1200. For example, an avatar can be displayed and used in a user interface in a manner similar to that described above. For brevity, these details are not repeated below.

FIGS. 14A-14E illustrate exemplary user interfaces for displaying a virtual avatar, in accordance with some embodiments. The user interfaces in these figures are used to illustrate the processes described below, including the processes in FIG. 15.

FIGS. 14A-14E illustrate exemplary user inputs and corresponding changes to an exemplary virtual avatar (e.g., smiley avatar 1405), which can be displayed on an electronic device, such as electronic device 600 shown in FIG. 6A, and having display 601, which in some cases is a touch-sensitive display, and camera 602, which, at a minimum, includes an image sensor that is capable of capturing data representing a portion of the light spectrum (e.g., visible light, infrared light, or ultraviolet light). In some embodiments, camera 602 includes multiple image sensors and/or other types of sensors. In addition to capturing data representing sensed light, in some embodiments, camera 602 is capable of capturing other types of data, such as depth data. For example, in some embodiments, camera 602 also captures depth data using techniques based on speckle, time-of-flight, parallax, or focus. Image data that device 600 captures using camera 602 includes data corresponding to a portion of the light spectrum for a scene within the field of view of the camera. Additionally, in some embodiments, the captured image data also includes depth data for the light data. In some other embodiments, the captured image data contains data sufficient to determine or generate depth data for the data for the portion of the light spectrum. In some embodiments, electronic device 600 includes one or more elements and/or features of devices 100, 300, and 500.

In some examples, electronic device 600 includes a depth camera, such as an infrared camera, a thermographic camera, or a combination thereof. In some examples, the device further includes a light-emitting device (e.g., light projector), such an IR flood light, a structured light projector, or a combination thereof. The light-emitting device is, optionally, used to illuminate the subject during capture of the image by a visible light camera and a depth camera (e.g., an IR camera) and the information from the depth camera and the visible light camera are used to determine a depth map of different portions of subject captured by the visible light camera. In some embodiments, a depth map (e.g., depth map image) contains information (e.g., values) that relates to the distance of objects in a scene from a viewpoint (e.g., a camera). In one embodiment of a depth map, each depth pixel defines the position in the viewpoint's Z-axis where its corresponding two-dimensional pixel is located. In some examples, a depth map is composed of pixels wherein each pixel is defined by a value (e.g., 0-255). For example, the "0" value represents pixels that are located at the most distant place in a "three dimensional" scene, and the "255" value represents pixels that are located closest to a viewpoint (e.g., camera) in the "three dimensional" scene. In other examples, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction. In some embodiments, the lighting effects described herein are displayed using disparity information from two cameras (e.g., two visual light cameras) for rear facing images and using depth information from a depth camera combined with image data from a visual light camera for front facing images (e.g., selfie images). In some embodiments, the same user interface is used when the two visual light cameras are used to determine the depth information and when the depth camera is used to determine the depth information, providing the user with a consistent experience, even when using dramatically different technologies to determine the information that is used when generating the lighting effects. In some embodiments, while displaying the camera user interface with one of the lighting effects applied, the device detects selection of a camera switching affordance and switches from the front facing cameras (e.g., a depth camera and a visible light camera) to the rear-facing cameras (e.g., two visible light cameras that are spaced apart from each other) (or vice versa) while maintaining display of the user interface controls for applying the lighting effect and replacing display of the field of view of the front facing cameras to the field of view of the rear facing cameras (or vice versa).

In some embodiments, a virtual avatar (also referred to as an "avatar") is a representation of the user that can be graphically depicted. In some embodiments, the virtual avatar is non-photorealistic (e.g., cartoonish). In some embodiments, the avatar is an anthropomorphic construct such as an animated emoji (e.g., a smiley face). In some embodiments, the virtual avatar includes an avatar face having one or more avatar features (e.g., avatar facial features). In some embodiments, the avatar features correspond (e.g., are mapped) to one or more physical features of a user's face such that detected movement of the user's physical feature(s) affects the avatar feature (e.g., affects the graphical representation of the features).

In some embodiments, a user is able to manipulate characteristics or features of a virtual avatar using a camera sensor (e.g., camera 602) (e.g., camera module 143, optical sensor 164, depth camera sensor 175). As a user's physical features (such as facial features) and position (such as head position, head rotation, or head tilt) changes, the electronic device detects the changes and, in response, modifies the displayed image of the virtual avatar (e.g., to reflect the changes in the user's physical features and position). In some embodiments, the changes to the user's physical features and position are indicative of various expressions, emotions, context, tone, or other non-verbal communication. In some embodiments, the electronic device modifies the displayed image of the virtual avatar to represent these expressions, emotions, context, tone, or other non-verbal communication.

In some embodiments, a virtual avatar can be displayed in the context of various applications such as, for example, a messaging application (e.g., messaging user interface 603, avatar creation user interface 632, avatar editing user interface 670), a contacts application (e.g., live pose interface 926, contact card 976, etc.), a camera application, a media viewer application (e.g., a photo application or other application for viewing multimedia content such as pictures and videos), and a video communication application. For example, in the context of a messaging application, a virtual avatar can be used to generate visual effects (e.g., multimedia content) including stickers, static virtual avatars, and animated virtual avatars, which can be communicated to users of the messaging application. Examples of such embodiments are described above and illustrated in FIGS. 6A-6V. As another example, in the context of a messaging application, contacts application, camera application, media viewer application, or video communication application, a virtual avatar can be used to display various visual effects when displaying image data (e.g., image data captured by a camera (e.g., 602) of an electronic device (e.g., device 100, 300, 500, 600)). Details for generating and sending visual effects (e.g., including virtual avatars) in a messaging application, and displaying visual effects in a messaging application, camera application, media viewer application, and video communication application, are provided in US Patent Publication No. US 2018/0335927, which is hereby incorporated by reference for all purposes.

FIGS. 14A-14E represent various detected states of user 1401 and corresponding states of smiley avatar 1405. The representations (e.g., user states 1411-1 through 1411-19) on the left side of FIGS. 14A-14E represent a user as detected by the electronic device when the user is within the field of view of one or more cameras (e.g., camera 602) (e.g., camera module 143, optical sensor 164, depth camera sensor 175) and/or other sensors (e.g., infrared sensors). In other words, the representations of the user are from the perspective of the camera (e.g., camera 602) (e.g., camera module 143, optical sensor 164, depth camera sensor 175), which may be positioned on the electronic device (e.g., device 100, 300, 500, 600) in some embodiments and, in other embodiments, may be positioned separate from the electronic device (e.g., an external camera or sensor passing data to the electronic device). In some embodiments, the borders of the representations on the left side of FIGS. 14A-14E represent the boundaries of the field of view of the one or more cameras (e.g., 602) (e.g., camera module 143, optical sensor 164, depth camera sensor 175) and/or other sensors (e.g., infrared sensors). In some embodiments, the representations of the user are displayed on a display (e.g., touch screen 112, display 340, display 450, display 504, display 601) of the electronic device as image data. In some embodiments, the image data is transmitted to an external electronic device for display. In some embodiments, the external electronic device includes one or more elements and/or features of devices 100, 300, 500, and 600. In some embodiments, the image data is collected and processed by the device (e.g., 100, 300, 500, 600), but is not immediately displayed on the device or transmitted to an external electronic device.

Each of the representations (e.g., avatar states 1412-1 through 1412-19) on the right side of FIGS. 14A-14E illustrate a virtual avatar (e.g., smiley avatar 1405) in a state that is presented (e.g., displayed after being modified) based on the corresponding detected state of the user (e.g., user states 1411-1 through 1411-19) located on the left side of the figure. In some embodiments, the virtual avatar is shown from the perspective of a user viewing the virtual avatar. In some embodiments, the virtual avatar is displayed on the display of the electronic device (e.g., touch screen 112, display 340, display 450, display 504, display 601). In some embodiments, the virtual avatar is transmitted to the external electronic device for display (e.g., with or without the image data of the user). In some embodiments, the representations on the right side of FIGS. 14A-14E represent a position of the virtual avatar within a display region of the display of the electronic device (e.g., touch screen 112, display 340, display 450, display 504, display 601), and the borders of the representations on the right side of FIGS. 14A-14E represent the boundaries of the display region that includes the virtual avatar. In some embodiments, the display region represented on the right side corresponds to an avatar display region of an application user interface, such as a virtual avatar interface, message composition area, or message area (or a portion thereof) that may be presented in the context of, for example, a messaging application.

In some embodiments, the magnitude of a reaction of an avatar feature (e.g., a discrete element of the avatar that can be moved or modified discretely with respect to other avatar features) corresponds to a magnitude of a change in a physical feature of the user (e.g., a detected or tracked feature such as a user muscle, muscle group, or anatomical feature such as an eye). For example, the magnitude of the change in the physical feature is, in some embodiments, determined in accordance with a potential range of motion of the physical feature, wherein the magnitude is representative of a relative position of the physical feature within the range of motion (e.g., the predicted or modeled range of motion) of that physical feature. In such embodiments, the magnitude of the reaction (e.g., change in position) of the avatar feature is similarly a relative position of the avatar feature within a range of motion of the avatar feature. In some embodiments, the magnitude of change is determined based on a comparison or measurement (e.g., a distance) of the starting position and ending position of the physical feature, through the change. In such embodiments, the change in the physical feature can be translated to a modification of the first avatar feature by applying the measured change in the physical feature to the avatar feature (e.g., directly or as a scaled or adjusted value).

In some embodiments, modifications to an avatar feature have both a magnitude component and a directional component, with the directional component of the modification in the avatar feature being based on a directional component of a change in one or more of the physical features (e.g., facial features of the user's face) to which the avatar feature reacts. In some embodiments, the direction of a reaction of an avatar feature corresponds (e.g., directly or inversely) to a relative direction of a change in a physical feature of the user, wherein the relative direction of the change in the physical feature is determined based on a direction of movement of the physical feature from an initial position (e.g., a neutral, resting position of the physical feature or, in some embodiments, a position of the physical feature that is initially detected by the device). In some embodiments, the direction of the reaction of the avatar feature corresponds directly (e.g., the physical feature moves up, the avatar feature also moves up) to the relative direction of the change in the physical feature. In other embodiments, the direction of the reaction of the avatar feature corresponds inversely (e.g., the physical feature moves up, the avatar feature moves down) to the relative direction of the change in the physical feature.

In some embodiments, the directional component of the change in the avatar feature is mirrored with respect to the directional component of the change in the physical feature. For example, when the physical feature (e.g., user's mouth)

moves left, the avatar feature (e.g., avatar mouth) moves right. In some embodiments, the directional component of the change in the avatar feature is the same as the directional component of the change in the physical feature for movement along a vertical axis and mirrored for movement along a horizontal axis, similar to the effect seen when looking in a mirror. In some embodiments, a change in relative position of a physical feature (e.g., the user's iris or eyebrow) is in a direction determined from a neutral, resting position of the physical feature. For example, in some embodiments, the neutral, resting position of a user's iris is determined to be a particular position (e.g., centered) relative to the perimeter of the user's eyeball.

FIGS. 14A-14E illustrate an embodiment in which the electronic device displays smiley avatar 1405 having an appearance of an animated emoji that changes poses in response to detected changes in facial features of user 1401. Specifically, smiley avatar 1405 tracks the user's facial features by detecting movement of a user's facial feature within a range of movement for the respective facial feature. The electronic device modifies (e.g., changes poses of) a corresponding avatar feature within a range of movement (e.g., a range of poses) for the respective avatar feature. As the avatar feature moves to a predetermined position within the range, the avatar feature snaps (e.g., via an animated transition) to a predetermined pose, which is maintained for a sub-portion of the range of movement for the corresponding facial feature. Thus, this sub-portion of the range of movement of the facial feature is considered to be mapped to (e.g., corresponding to) the snapped pose of the avatar feature. Additional movement of the facial feature within this sub-portion does not cause a change in the snapped position of the avatar feature (e.g., the electronic device maintains the snapped pose for these positions of the facial feature).

In some embodiments, the snapped pose of the avatar feature can be said to have a greater inertia than other avatar poses, such that a greater degree of facial feature pose change is required to modify away from the snapped pose, once triggered. In some embodiments, there is a degree of hysteresis associated with the snapped pose of the avatar feature such that the feature is maintained (e.g., not modified), once triggered, for a period of time even after a change is detected in the corresponding facial feature (e.g., while the corresponding facial feature is still within the sub-portion of facial poses that correspond to the snapped avatar pose). In some embodiments, when the facial feature reaches a threshold of the sub-portion, changes in the facial feature near the threshold distort the snapped pose of the corresponding avatar feature (e.g., as shown in avatar state 1412-5 of FIG. 14B).

The predefined poses (e.g., snapped poses) can be poses that are associated with an emoji character (e.g., a static/non-animated emoji), or a portion thereof, such as an emoji character that the electronic device is configured to communicate to a user (e.g., via messaging user interface 603 in FIG. 6A). Through the tracking and snapping behavior discussed above, the user can control individual features of smiley avatar 1405 to track the user's corresponding facial feature and to snap to one or more predefined poses that match various emoji characters. In some embodiments, this can be done while one or more additional features of smiley avatar 1405 track the user's facial features. For example, the user can control smiley avatar 1405 to have a mouth pose that matches a predefined emoji smile, while the eyes of smiley avatar 1405 track the user's eyes. These behaviors allow the user to control smiley avatar 1405 to convey expressions using both expressions matching the user's face as well as expressions matching different emoji characters, which can often be more expressive than a person's facial features. In instances in which the changes to smiley avatar 1405 are transmitted to another user, the expressions of smiley avatar 1405 are less likely to be misconstrued by the recipient user because the expressions of smiley avatar 1405 can incorporate recognized facial expressions of various existing and well-recognized emojis.

FIGS. 14A-14E demonstrate the behaviors summarized above by illustrating various examples of the electronic device modifying smiley avatar 1405 in response to detecting changes in facial features of user 1401. User 1401 is shown in user states 1411-1 through 1411-19 and smiley avatar 1405 is shown in avatar states 1412-1 through 1412-19. Smiley avatar 1405 includes various avatar features including avatar eyes 1415, avatar mouth 1425, avatar eyebrows 1435, avatar head 1445, lighting effect 1455, and avatar teeth 1465. User 1401 includes various detected physical features (e.g., facial features) including, for example, eyes 1410, mouth 1420, eyebrows 1430, and head 1440. In some embodiments, tracked physical features may include other facial features such as eyelids, lips, muscles, muscle groups, and so forth. In some embodiments, device 600 ignores changes to particular facial features when movement of such features interfere with the display of snapping poses or result in unnatural behaviors. For example, changes in a user's jaw position are not used for modifying smiley avatar 1405, because jaw movement can cause the mouth of smiley avatar 1405 to snap to different positions in an unnatural manner.

Figure 14A:
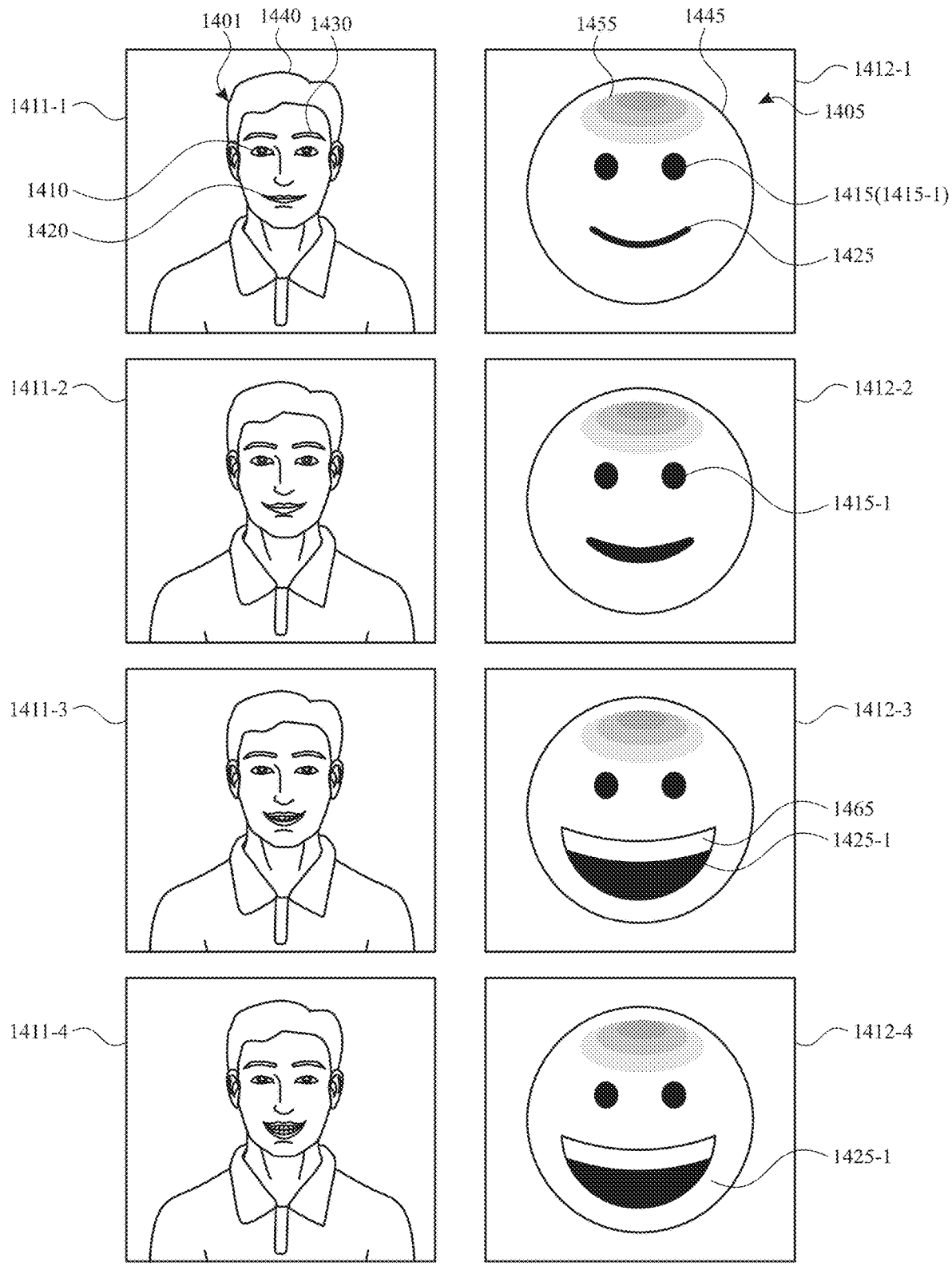
FIGS. 14A-14E illustrate exemplary user interfaces for displaying a virtual avatar in accordance with some embodiments.

FIG. 14A shows smiley avatar 1405 transitioning from a neutral smiley avatar pose to a pose that corresponds to an emoji having a large smile with teeth. Smiley avatar 1405 is shown having four displayed states (1412-1, 1412-2, 1412-3, and 1412-4), with each of the four displayed states of smiley avatar 1405 corresponding, respectively, to four detected states of user 1401 (1411-1, 1411-2, 1411-3, and 1411-4). In user state 1411-1, the electronic device detects user 1401 in a neutral pose in which user head 1440 is facing forward (e.g., not tilted or rotated), user mouth 1420 is in a closed position with a slight smile, user eyes 1410 are in a neutral, front-facing position (e.g., the user's eyes are looking forward and not up, down, or to the side), and user eyebrows 1430 are in a neutral, resting position (e.g., eyebrows are not raised or lowered). Based on the positions of these detected features of user 1401, the electronic device displays, in avatar state 1412-1, smiley avatar 1405 having a neutral pose in which avatar mouth 1425 is closed and slightly smiling, avatar eyes 1415 are in a neutral, front-facing position (e.g., the eyes have a neutral, round shape and are looking forward and not up, down, or to the side), avatar head 1445 is facing forward (e.g., not rotated or tilted), and lighting effect 1455 is centered at the top of avatar head 1445.

In user state 1411-2, the electronic device detects movement of user mouth 1420 to a slightly larger smiling position. The position of user mouth 1420 is not a position that triggers snapping avatar mouth 1425 to a predefined pose. Therefore, the electronic device modifies avatar mouth 1425 to mirror movement of user mouth 1420 by slightly increasing the smile of avatar mouth 1425, as shown in avatar state 1412-2, without snapping to a predefined pose. The electronic device does not detect changes to any other user features in user state 1411-2 and, therefore, does not modify any other avatar features of smiley avatar 1405 in avatar state 1412-2.

In user state 1411-3, the electronic device detects movement of user mouth 1420 to a slightly opened smiling position and movement of user eyes 1410 to a slightly squinting position. The position of user mouth 1420 is a position that triggers snapping avatar mouth 1425 to a predefined pose. Therefore, the electronic device modifies avatar mouth 1425 to snap to the predefined pose, which is a large smile 1425-1 with avatar teeth 1465, as shown in avatar state 1412-3. In some embodiments, this snapping behavior is displayed as an animated change of the avatar mouth 1425 transitioning from the pose in avatar state 1412-2 to the pose in avatar state 1412-3. The snapped pose of the avatar mouth 1425-1 does not mirror the pose of user mouth 1420 in user state 1411-3. For example, avatar mouth 1425-1 is a large, open mouth revealing avatar teeth 1465, whereas user mouth 1420 is a slightly opened position having a smile with little or no teeth shown.

Although the electronic device detects a change in position of user eyes 1410 in user state 1411-3, the eyes are still within a range of positions that correspond to a neutral eye pose 1415-1 of avatar eyes. Therefore, the electronic device does not modify avatar eyes 1415 in avatar state 1412-3.

In user state 1411-4, the electronic device detects continued movement of user mouth 1420 to a wider smile pose, but does not further modify the appearance of smiley avatar 1405 in avatar state 1412-4. This is because the position of user mouth 1420 is still within the range of user mouth positions that triggers display of avatar mouth 1425-1 having a large smile with avatar teeth 1465, without being at an edge of the range that causes distortion of the snapped pose.

Figure 14B:
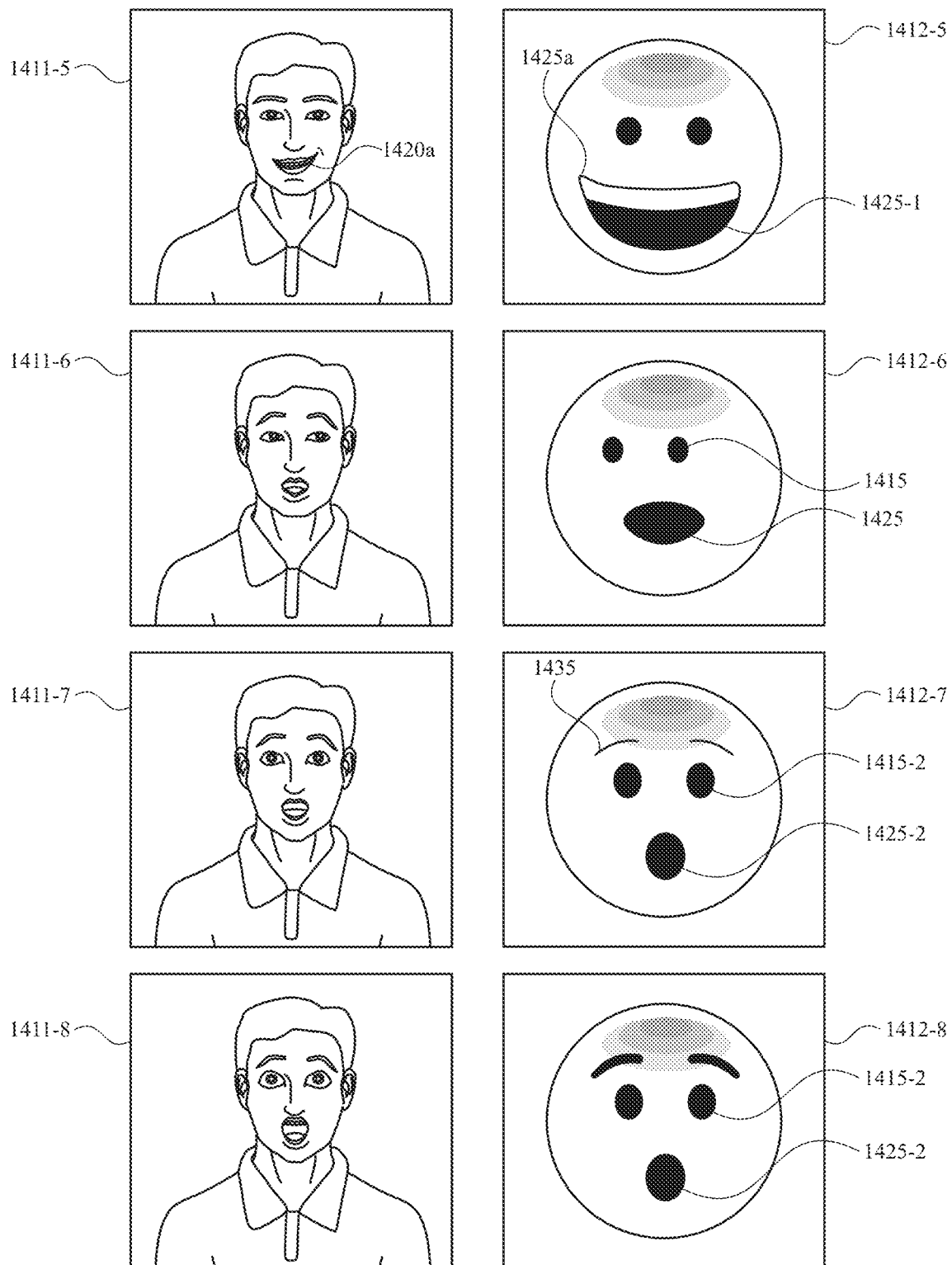

FIG. 14B shows smiley avatar 1405 transitioning from the pose of an emoji having a large smile 1425-1 with teeth 1465 to a pose that corresponds to an emoji having a surprised expression. Smiley avatar 1405 is shown having four displayed states (1412-5, 1412-6, 1412-7, and 1412-8), with each of the four displayed states of smiley avatar 1405 corresponding, respectively, to four detected states of user 1401 (1411-5, 1411-6, 1411-7, and 1411-8). In user state 1411-5, the electronic device detects continued movement of user mouth 1420 to a pose in which corner 1420a of user mouth 1420 is pulled up slightly. In response, the electronic device distorts corner 1425a of avatar mouth 1425-1 while still maintaining the same general appearance of the snapped avatar mouth pose having a large smile with avatar teeth 1465. This is because detected movement of corner 1420a is at the edge of the range of user mouth poses that trigger the avatar mouth pose 1425-1 having a large smile with avatar teeth. Thus, detected movement of user mouth 1420 at the edge of this range causes the electronic device to distort avatar mouth 1425-1 while still maintaining the snapped pose. When user mouth 1420 moves beyond the range, the electronic device transitions the avatar mouth from the snapped pose to a pose that is determined based on the position of user mouth 1420. An example of this transition is described below and shown in avatar state 1412-6.

In user state 1411-6, the electronic device detects movement of user mouth 1420 to an open position, user eyes 1410 shifting sideways, and slight raising of user eyebrows 1430. The detected movement of user mouth 1420 is to a pose that is beyond the sub-portion of poses that correspond to the snapped pose (e.g., 1425-1) and, therefore, causes the electronic device to display avatar mouth 1425 moving from the predefined pose in avatar state 1412-5 to a pose that is determined based on the position of user mouth 1420, as shown in avatar state 1412-6. The electronic device also modifies avatar eyes 1415 to shift sideways to a shifted eye position 1415-3 to mirror movement of user eyes 1410 in user state 1411-6. The electronic device does not modify smiley avatar 1405 in response to the detected slight raising of user eyebrows 1430.

In user state 1411-7, the electronic device detects movement of user eyes 1410 to a widened pose looking forward. The widened pose of user eyes 1410 corresponds to a pose that triggers wide eye pose 1415-2 for avatar eyes 1415. In response, the electronic device modifies avatar eyes 1415 to snap to a wide eye pose 1415-2 as shown in avatar state 1412-7. The electronic device also detects further widening of user mouth 1420 to a pose that triggers display of avatar mouth 1425 snapping to wide mouth pose 1425-2. The electronic device also detects further raising of user eyebrows 1430 to a pose that triggers display of avatar eyebrows 1435 appearing on smiley avatar 1405, as shown in avatar state 1412-7. In some embodiments, display of avatar eyebrows 1435 is triggered by the snapping of avatar eyes 1415 to the wide eye pose 1415-2, and not in response to the detected position of user eyebrows 1430. In some embodiments, display of avatar eyebrows 1435 is triggered by the detected combination of snapping to the wide eye pose 1415-2 and snapping to the wide mouth pose 1425-2, and not in response to the detected position of user eyebrows 1430.

In some embodiments, the electronic device displays avatar eyebrows 1435 appearing in an animation in which the eyebrows appear as holes (starting small and growing to the full size of the eyebrow) that open in head 1445 of smiley avatar 1405 and darken in color. This animation is represented in avatar states 1412-7 and 1412-8. The electronic device displays avatar eyebrows 1435 on smiley avatar 1405 until the pose triggering their display is no longer detected. In some embodiments, if the electronic device does not detect the pose being maintained for at least a predetermined amount of time (e.g., 0.5 seconds), then the eyebrows persist on smiley avatar 1405 for the predetermined amount of time before fading away. In some embodiments, the electronic device displays avatar eyebrows 1435 disappearing in an animation in which the eyebrows shrink in size and dim in color to give the appearance of the eyebrows fading into smiley avatar head 1445.

In user state 1411-8, the electronic device detects continued movement of user eyes 1410 to an even wider pose, and maintains display of avatar eyes having wide eye pose 1415-2 and avatar eyebrows 1435 displayed on avatar head 1445.

In some embodiments, some avatar features appear less responsive than other avatar features to detected changes in a corresponding facial feature. This is a result of the hysteresis effect discussed above. For example, in avatar states 1412-1 through 1412-12, avatar mouth 1425 is responsive to slight changes in user mouth 1420 (e.g., snapping to different poses and mirroring slight movements in the user's mouth), whereas avatar eyes 1415 are not responsive to changes in the widening of user eyes 1410 until they are detected in a wide pose in user state 1411-7. This is because the ranges of user feature poses that trigger avatar features to snap to a predefined pose can be different magnitudes of ranges for different avatar features. Here, the range of user eye poses that trigger the neutral avatar eye pose 1415-1 shown in avatar states 1412-1 through 1412-6 is larger than the individual ranges of user mouth poses that trigger different avatar mouth poses. Accordingly, a greater amount of detected movement of user eyes 1410 is needed to change avatar eyes 1415 from the neutral pose to a different eye pose such as wide eye pose 1415-2 in avatar state 1412-7 (or squinty eye pose 1415-3 described below with respect to avatar state 1412-14), whereas less detected movement of user mouth 1420 is needed to move avatar mouth 1425 to different poses (e.g., snapped poses 1425-1 and 1425-2 and non-snapped poses 1425).

Figure 14C:
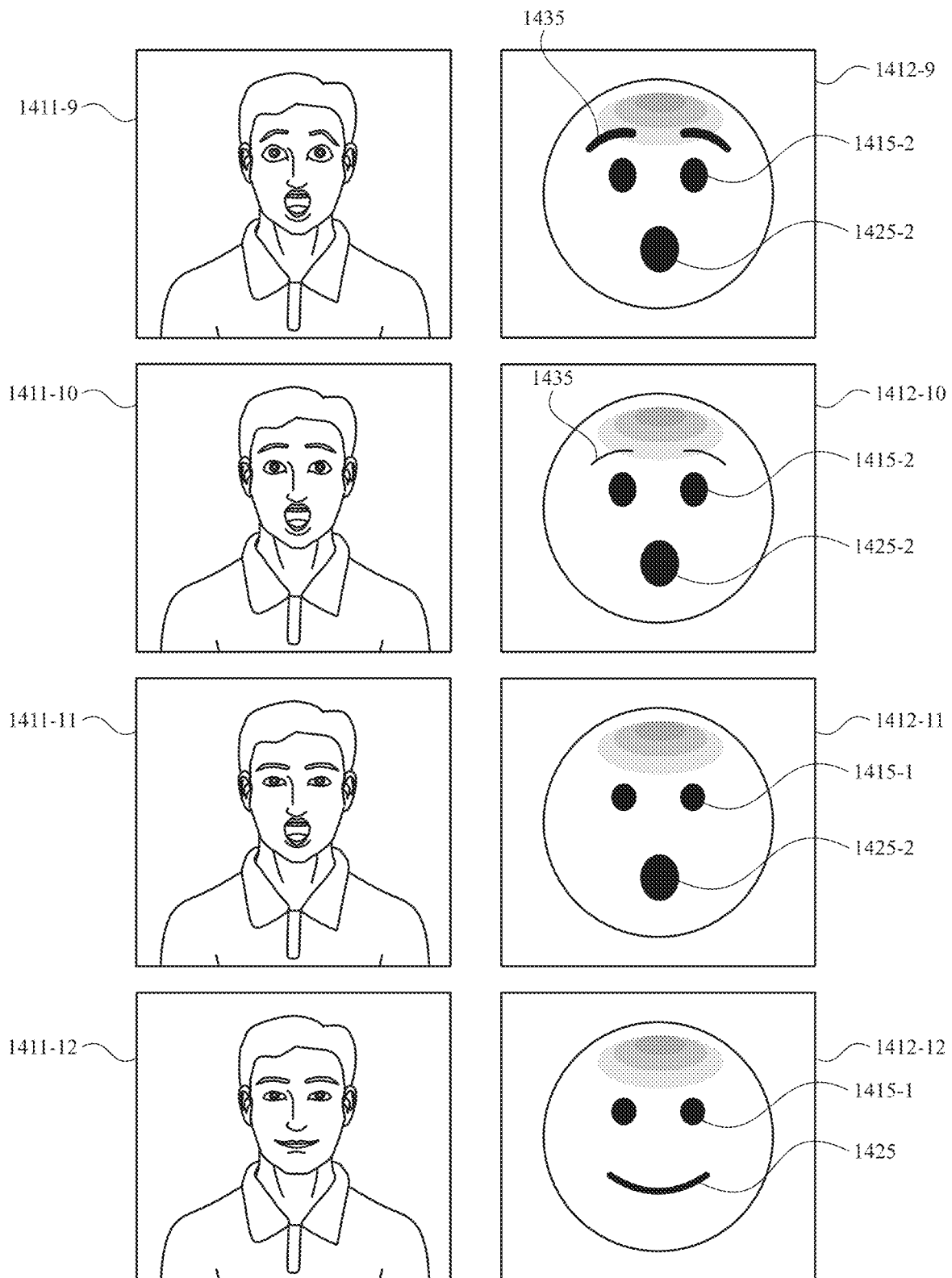

FIG. 14C shows smiley avatar 1405 transitioning from the pose of an emoji having a surprised expression to the neutral pose. Smiley avatar 1405 is shown having four displayed states (1412-9, 1412-10, 1412-11, and 1412-12), with each of the four displayed states of smiley avatar 1405 corresponding, respectively, to four detected states of user 1401 (1411-9, 1411-10, 1411-11, and 1411-12). In user state 1411-9, the electronic device detects user 1401 with the same facial pose as in user state 1411-8. In response, the electronic device maintains, in avatar state 1412-9, display of smiley avatar 1405 having the same appearance as in avatar state 1412-8.

In user state 1411-10, the electronic device detects user eyes 1410 narrow slightly from the wide pose in user state 1411-9 and eyebrows 1430 return to a slightly raised position. The pose of user eyes 1410 still triggers display of the wide eye pose 1425-2, but the slightly raised position of eyebrows 1430 no longer triggers display of avatar eyebrows 1435. Accordingly, the electronic device maintains display of avatar eyes having wide eye pose 1415-2, but ceases displaying avatar eyebrows 1435. As shown in avatar state 1412-10, avatar eyebrows 1435 are displayed fading off smiley avatar 1405 as discussed above. The electronic device continues to detect user mouth 1420 in the wide pose, which is a pose that triggers display of wide mouth pose 1425-2. Accordingly, the electronic device maintains display of wide mouth pose 1425-2 in avatar state 1412-10.

In user state 1411-11, the electronic device detects user eyes 1410 return to the neutral pose, while user mouth 1420 remains in the wide pose. In response, the electronic device modifies avatar eyes 1415 to return to neutral eye pose 1415-1 and maintains display of wide mouth pose 1425-2 in avatar state 1412-11.

In user state 1411-12, the electronic device detects user 1401 return to the neutral pose detected in user state 1411-1. In response, the electronic device modifies, in avatar state 1412-12, smiley avatar 1405 to return to the neutral pose previously discussed with respect to avatar state 1412-1.

Figure 14D:
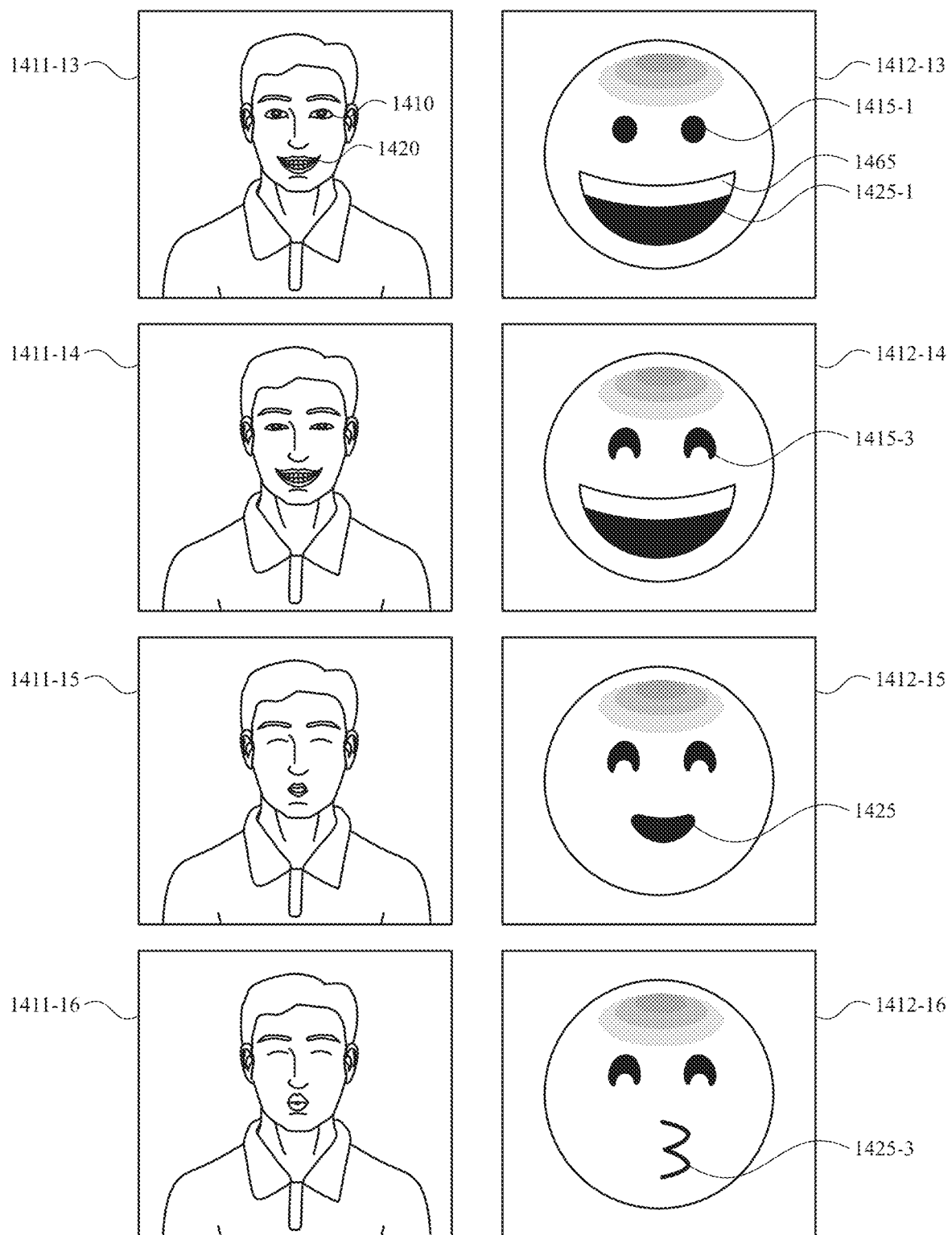

FIG. 14D shows smiley avatar 1405 transitioning from the pose of an emoji having a large smile 1425-1 with teeth 1465 to a pose that corresponds to an emoji having a kissing face (e.g., squinty eyes and puckered lips). Smiley avatar 1405 is shown having four displayed states (1412-13, 1412-14, 1412-15, and 1412-16), with each of the four displayed states of smiley avatar 1405 corresponding, respectively, to four detected states of user 1401 (1411-13, 1411-14, 1411-15, and 1411-16). In user state 1411-13, the electronic device detects user 1401 having the same facial poses as detected in user state 1411-4. In response, the electronic device displays smiley avatar 1405 in avatar state 1412-13 having the same poses as discussed with respect to avatar state 1412-4. Namely, smiley avatar 1405 has neutral eye pose 1415-1 and mouth pose 1425-1, which is a large smile with displayed avatar teeth 1465.

In user state 1411-14, the electronic device detects movement of user mouth 1420 to a slightly bigger smiling pose, and user eyes 1410 moving to a squinted position. The detected movement of user mouth 1420 is still within the range of mouth poses that corresponds to large smile mouth pose 1425-1 with avatar teeth. Therefore, the electronic device continues to display avatar mouth 1425 having large smile mouth pose 1425-1 with avatar teeth 1465. The detected squinted position of user eyes 1410 is within a range of eye poses that triggers snapping avatar eyes 1415 to a predefined squinty eye pose 1415-3. Therefore, the electronic device modifies the avatar eyes to transition from the neutral eye pose to the squinty eye pose 1415-3, as shown in avatar state 1412-14.

In user state 1411-15, the electronic device detects continued movement of user eyes 1410 to a closed position, and movement of user mouth 1420 narrowing as the user is moving their mouth towards a puckered pose. The detected position of the eyes is still within the range of poses that triggers squinty eye pose 1415-3. Accordingly, the electronic device continues to display smiley avatar 1405 having squinty eye pose 1415-3 as shown in avatar state 1412-15. The detected movement of user mouth 1420 is not within a range of mouth positions that correspond to a predefined pose for avatar mouth 1425. Accordingly, the electronic device modifies avatar mouth 1425 to a pose that is determined based on the detected position of user mouth 1420 in user state 1411-15. Avatar mouth 1425 is, therefore, shown having a narrowed smile in avatar state 1412-15.

In user state 1411-16, the electronic device detects continued movement of user mouth 1420 to a puckered pose, and user eyes 1410 remain in the same closed position as in the previous user state. The detected puckered pose of user mouth 1420 corresponds to a predefined puckered pose for avatar mouth 1425. Therefore, the electronic device displays smiley avatar 1405 having puckered mouth pose 1425-3 in avatar state 1412-16. Because the detected position of user eyes 1410 remains in the range of user eye poses that trigger squinty eye pose 1415-3, the electronic device continues to display avatar eyes 1415 having squinty eye pose 1415-3 in avatar state 1412-16.

Figure 14E:
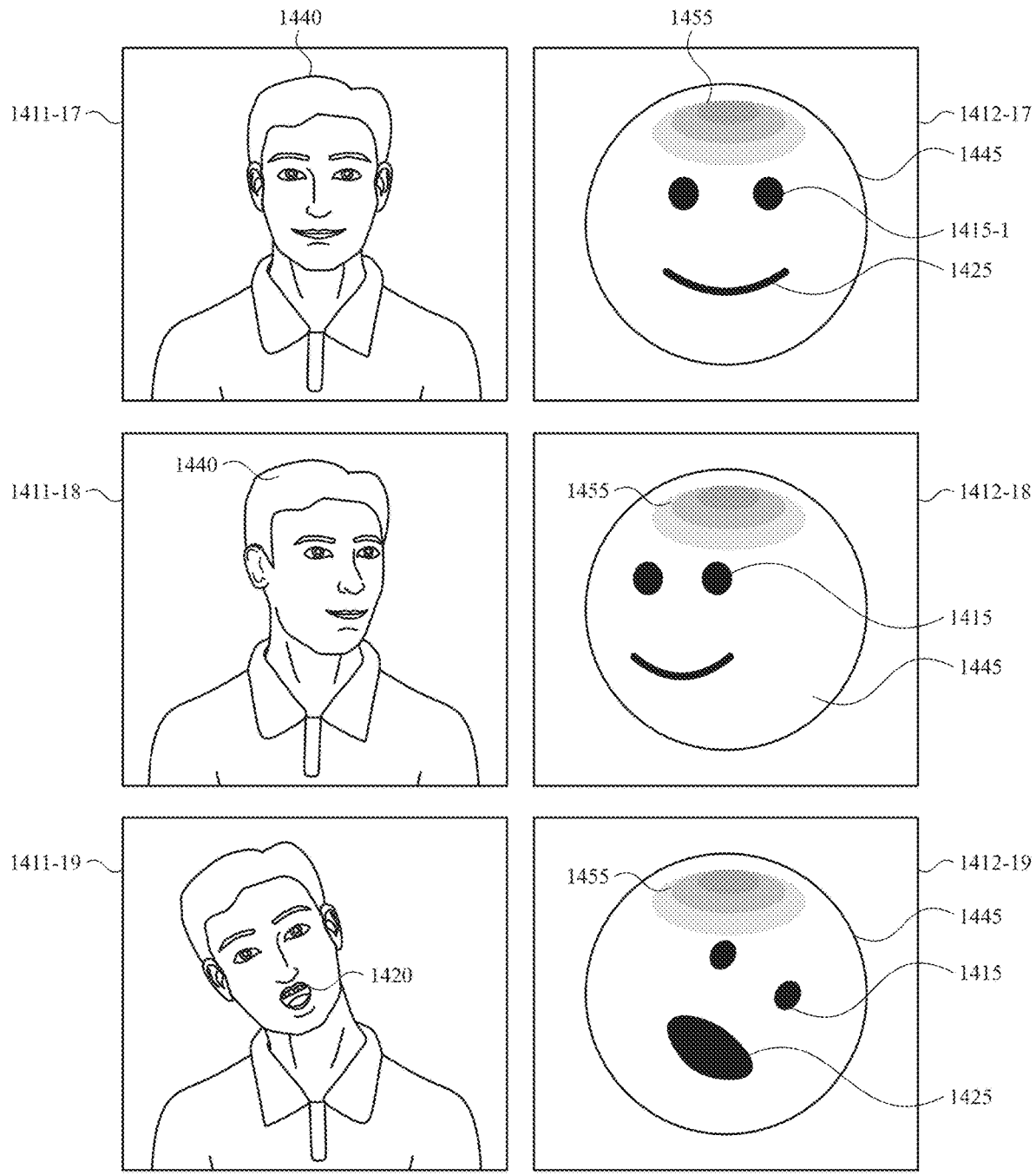

FIG. 14E shows smiley avatar 1405 moving from the neutral pose to different orientations to show movement of smiley avatar head 1445 without moving lighting effect 1455. Lighting effect is a visual effect that gives the appearance that smiley avatar 1405 is a spherical shape. Smiley avatar 1405 is shown having different orientations to demonstrate the position of visual effect 1455 not changing with the movement of smiley avatar 1405. Smiley avatar 1405 is shown having three displayed states (1412-17, 1412-18, and 1412-19), with each of the three displayed states of smiley avatar 1405 corresponding, respectively, to three detected states of user 1401 (1411-17, 1411-18, and 1411-19). In user state 1411-17, the electronic device detects user 1401 in the neutral pose detected in user states 1411-1 and 1411-12. In response, the electronic device displays smiley avatar 1405, in avatar state 1412-17, having the same neutral pose displayed in avatar states 1412-1 and 1412-12. In the neutral pose, lighting effect 1455 is displayed at a centered position at the top of avatar head 1445.

In user state 1411-18, the electronic device detects rotation of user head 1440. In response, the electronic device modifies smiley avatar 1405 to rotate avatar head 1445 to mirror movement of user head 1440. The electronic device displays light effect 1455 having a stationary position while avatar head 1445 rotates, as shown in avatar state 1412-18.

In user state 1411-19, the electronic device detects movement of user mouth 1420 to an open position and tilting of user head 1440. The open position of user mouth 1420 does not trigger a snapped pose of avatar mouth 1425. In response, the electronic device modifies smiley avatar 1405 to have a tilted head position that mirrors titled head movement of user head 1440 and having an open mouth position 1425 that mirrors the open mouth position of user mouth 1420. The electronic device displays light effect 1455 having a stationary position while avatar head 1445 tilts, as shown in avatar state 1412-19.

The foregoing embodiments illustrate a few examples of the snapping behavior that can be displayed using the disclosed techniques. It should be appreciated that the snapping poses are not limited to those discussed above, and modifications to the virtual avatar can include additional poses, different combinations of poses for different avatar features, and other behaviors detailed below. For example, in some embodiments, snapping an avatar feature can include replacing display of the avatar feature with a different version of the avatar feature (e.g., replacing a displayed mouth without lips with a displayed mouth with puckered lips to achieve puckered mouth pose 1425-3 in avatar state 1412-16). In some embodiments, the features can be replaced in an animation in which the first feature fades out while the second feature fades onto the avatar. In some embodiments, changes to avatar features can be driven by detected changes in user features that do not anatomically correspond to the avatar feature. For example, changes to a user's mouth triggers a change in pose of the avatar's eyes.

FIG. 15 is a flow diagram illustrating a method for displaying a virtual avatar using an electronic device in accordance with some embodiments. Method 1500 is performed at a device (e.g., 100, 300, 500, 600) with a display and one or more cameras. Some operations in method 1500 are, optionally, combined, the orders of some operations are, optionally, changed, and some operations are, optionally, omitted.

As described below, method 1500 provides an intuitive way for displaying a virtual avatar. The method reduces the cognitive burden on a user for displaying a virtual avatar, thereby creating a more efficient human-machine interface. For battery-operated computing devices, enabling a user to display a virtual avatar faster and more efficiently conserves power and increases the time between battery charges.

The electronic device (e.g., 600) displays (1502), via the display device (e.g., 601), a virtual avatar (e.g., 1405) (e.g., a representation of the user that can be graphically depicted. In some embodiments, the virtual avatar is non-photorealistic. In some embodiments, the avatar is an anthropomorphic construct such as an animated emoji (e.g., a smiley face)) having one or more avatar features (e.g., avatar eyes 1415, avatar mouth 1425, avatar eyebrows 1435, avatar head 1445) (e.g., facial features (e.g., mouth, eyes); e.g., a macro feature (e.g., head)) that change appearance in response to detected changes in pose (e.g., orientation, translation) (e.g., a change in a facial expression) of a face (e.g., user 1401 including user eyes 1410, user mouth 1420, user eyebrows 1430, and user head 1440) in a field of view of the one or more cameras (e.g., 602). In some embodiments, the one or more avatar features includes a first avatar feature (e.g., an avatar mouth 1425) with a first appearance (e.g., avatar mouth 1425 in avatar states 1412-1, 1412-2, 1412-6, 1412-12, 1412-15, and 1412-15 through 1412-19) (e.g., an appearance that is not snapped to a predefined pose) that is modified in response to detected changes in pose (e.g., orientation, translation) (e.g., a change in a facial expression) of the face in the field of view of the one or more cameras. In some embodiments, the avatar features correspond (e.g., are mapped) to one or more physical features of a user's face such that detected movement of the user's physical feature(s) affects the avatar feature (e.g., affects the graphical representation of the features). In some embodiments, an avatar feature anatomically corresponds to a physical feature (e.g., the avatar feature is modeled based on one or more of the location, movement characteristics, size, color, and/or shape of the physical feature) (e.g., the avatar feature and physical feature are both eyebrows).

While the face is detected in the field of view of the one or more cameras (e.g., 602), the face including one or more detected facial features (e.g., a mouth 1420 of the user) (e.g., one or more of the user's eyes 1410), the electronic device detects (1504) movement of one or more facial features of the face.

In response (1506) to detecting the movement of the one or more facial features, in accordance with a determination that the detected movement of the one or more facial features causes first pose criteria to be met (e.g., detected changes in the face of the user trigger snapping the avatar feature to a first pose (e.g., an open-mouth smile 1425-1)) (e.g., the detected pose of a facial feature is within an acceptable range of poses corresponding to the first pose criteria, thereby triggering snapping of the avatar feature(s) to the first pose), the electronic device modifies (1508) the virtual avatar (e.g., 1405) to display the first avatar feature with a second appearance (e.g., avatar mouth 1425 having large smile pose 1425-1) (e.g., an appearance that is triggered based on the detected changes in the face of the user that satisfy the first pose criteria (e.g., a smile pose of the avatar's opened mouth that corresponds, for example, to a mouth of an emoji having an opened mouth while smiling)), different from the first appearance, that is modified (e.g., distorted within a first range of appearance values) in response to detected changes in pose (e.g., orientation, translation) (e.g., a change in a facial expression) of the face in the field of view of the one or more cameras. In some embodiments, the one or more facial features are moved to a first position that is within a range of positions that satisfy the first pose criteria and, in response, the electronic device modifies the first avatar feature to assume a pose that is associated with the range of positions (e.g., a pose that represents a facial expression associated with the first pose criteria). This is referred to herein as "snapping" to a pose or position. This snapping behavior makes it easier for a user to achieve a particular pose with the virtual avatar (or an avatar feature) because the virtual avatar (or avatar feature) can be biased to achieve the particular pose (e.g., depending on how generous the range of positions is for satisfying the pose criteria. This provides a control scheme for operating and/or composing a virtual avatar on a display of an electronic device, wherein the system detects and processes input in the form of changes to facial features of a user (and the magnitude and/or direction of those changes), and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control and/or compose the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation control can be done in real time during, for example, a conversation such as a text conversation or a video conversation, whereas manual animation control of an avatar would have to be done before the conversation started or after it had ended.

In response (1506) to detecting the movement of the one or more facial features, in accordance with a determination that the detected movement of the one or more facial features causes second pose criteria, that is different from the first pose criteria, to be met (e.g., detected changes in the face of the user trigger snapping the avatar feature to a second pose different from the first pose (e.g., a sad mouth pose)) (e.g., the detected pose of a facial feature is within an acceptable range of poses corresponding to the second pose criteria, thereby triggering snapping of the avatar feature(s) to the second pose), the electronic device modifies (1510) the virtual avatar to display the first avatar feature (e.g., avatar mouth 1425) with a third appearance (e.g., wide mouth pose 1425-2) (e.g., an appearance that is triggered based on the detected changes in the face of the user that satisfy the second pose criteria (e.g., a sad pose of the avatar's mouth that corresponds, for example, to a mouth of an emoji having a sad facial expression)), different from the first appearance and the second appearance, that is modified (e.g., distorted within a first range of appearance values) in response to detected changes in pose (e.g., orientation, translation) (e.g., a change in a facial expression) of the face in the field of view of the one or more cameras. In some embodiments, the one or more facial features are moved to a second position that is within a range of positions that satisfy the second pose criteria and, in response, the electronic device modifies the first avatar feature to assume a pose that is associated with the range of positions (e.g., a pose that represents a facial expression associated with the second pose criteria). In some embodiments, the first avatar feature is anchored to the pose that is associated with the respective first or second pose criteria, but is slightly modified from the pose in response to detected changes in the one or more facial features when the detected changes are within a threshold amount of deviation from the pose of the one or more facial features that satisfies the respective first or second pose criteria. In some embodiments, when the detected changes to the one or more facial features are beyond the threshold amount of deviation, the electronic device transitions the first avatar feature from the pose associated with the first/second pose criteria to a pose that is determined based on the position of the one or more facial features (e.g., based on the magnitude and/or direction of movement of the one or more facial features).

In some embodiments, modifying the virtual avatar to display the first avatar feature with the second appearance includes displaying a third avatar feature (e.g., avatar eyebrows 1435; avatar teeth 1465). In some embodiments, the third avatar feature was not displayed prior to detecting the movement of the one or more facial features (e.g., initially displaying; introducing display of) a third avatar feature (e.g., avatar eyebrows; avatar tongue; avatar teeth; avatar mouth; etc.). Introducing a facial feature when modifying a different avatar feature provides a control scheme for operating and/or composing a virtual avatar on a display of an electronic device, wherein the system detects and processes input in the form of changes to facial features of a user (and the magnitude and/or direction of those changes), and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control and/or compose the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation control can be done in real time during, for example, a conversation such as a text conversation or a video conversation, whereas manual animation control of an avatar would have to be done before the conversation started or after it had ended.

In some embodiments, displaying the third avatar feature includes displaying the third avatar feature fading onto the virtual avatar (e.g., avatar eyebrows 1435 fade onto smiley avatar 1405 in avatar state 1412-7) (e.g., the third avatar feature appears and increases in optical intensity to give the appearance of fading onto the avatar). In some embodiments, the third avatar feature is displayed fading onto the virtual avatar in an animated effect in which the feature appears as a hole that opens in the virtual avatar (e.g., at the location of the third avatar feature), enlarges (e.g., expanding) to the shape of the third avatar feature, and increases in optical intensity (e.g., darkens in appearance). In some embodiments, the optical intensity of an object is the object's degree of visual materialization. The optical intensity may be measured along a scale between a predefined minimum and a predefined maximum. In some embodiments, the optical intensity may be measured along a logarithmic scale. In some embodiments, the optical intensity may be perceived by users as a transparency effect (or lack thereof) applied to the object. In some embodiments, the minimum optical intensity means that the object is not displayed at all (i.e., the object is not perceptible to the user), and the maximum optical intensity means that the object is displayed without any transparency effect (e.g., the object has completely materialized visually and is perceptible to the user). In some embodiments, the optical intensity may be the visual differentiation between the object and an object behind it, based on color, hue, color saturation, brightness, contrast, transparency, and any combination thereof. In some embodiments, the optical intensity of the third avatar feature increases as it fades onto the avatar, and decreases as it fades off the avatar. In some embodiments, the optical intensity increases or decreases smoothly. Displaying the third avatar feature fading onto the virtual avatar provides a control scheme for operating and/or composing a virtual avatar on a display of an electronic device, wherein the system detects and processes input in the form of changes to facial features of a user (and the magnitude and/or direction of those changes), and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control and/or compose the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation control can be done in real time during, for example, a conversation such as a text conversation or a video conversation, whereas manual animation control of an avatar would have to be done before the conversation started or after it had ended.

In some embodiments, while the third avatar feature is displayed, the electronic device detects movement of the one or more facial features. In some embodiments, in response to detecting the movement of the one or more facial features, in accordance with a determination that the detected movement of the one or more facial features causes the first pose criteria to no longer be met, the electronic device ceases to display the third avatar feature by fading out the third avatar feature from the virtual avatar (e.g., avatar eyebrows 1435 fade off smiley avatar 1405 in avatar state 1412-10) (e.g., the third avatar feature decreases in optical intensity and disappears to give the appearance of fading out from the avatar). In some embodiments, the third avatar feature is displayed fading out from virtual avatar in an animated effect in which the feature appears shrinks in size and dims in appearance to give the appearance of the avatar feature fading into the avatar. Displaying the third avatar feature fading off the virtual avatar provides a control scheme for operating and/or composing a virtual avatar on a display of an electronic device, wherein the system detects and processes input in the form of changes to facial features of a user (and the magnitude and/or direction of those changes), and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control and/or compose the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation control can be done in real time during, for example, a conversation such as a text conversation or a video conversation, whereas manual animation control of an avatar would have to be done before the conversation started or after it had ended.

In some embodiments, displaying the third avatar feature includes maintaining display of the third avatar feature (e.g., avatar eyebrows 1435) for at least a predetermined period of time. In some embodiments, the third avatar feature is displayed for a duration of time that is the longer of: a) the predetermined period of time, orb) the duration for which the user maintains the pose that causes the respective first or second pose criteria to be met. For example, if the user does not maintain the pose for at least the predetermined period of time, then the third avatar feature persists for the predetermined period of time (e.g., if the user quickly raises and lowers their eyebrows, the avatar's eyebrows appear on the avatar and persist for the predetermined period of time before disappearing). However, if the user continues to hold their eyebrows in the raised position for a period of time that is longer than the predetermined period of time, the avatar eyebrows persist until the user ceases to maintain the raised-eyebrow pose. Maintaining display of the third avatar feature for at least the predetermined period of time prevents the third avatar feature from having a flickering, jittery appearance when the user fails to maintain the pose triggering display of the third avatar feature for at least the predetermined period of time. The flickering appearance detracts from the visual appearance of the virtual avatar and the expressions intended to be conveyed using the virtual avatar. Therefore, maintaining display of the third avatar feature for at least the predetermined period of time enables the avatar to capture the user's expression in instances in which the duration of the expression is too short for a user to notice on the virtual avatar if the third avatar feature did not persist. This provides a control scheme for operating and/or composing a virtual avatar on a display of an electronic device, wherein the system detects and processes input in the form of changes to facial features of a user (and the magnitude and/or direction of those changes), and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control and/or compose the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation control can be done in real time during, for example, a conversation such as a text conversation or a video conversation, whereas manual animation control of an avatar would have to be done before the conversation started or after it had ended.

In some embodiments, modifying the virtual avatar to display the first avatar feature with the second appearance includes displaying a first animation of the first avatar feature with the first appearance (e.g., avatar mouth having no visually distinguished lips (e.g., avatar mouth 1425 in avatar state 1412-15)) fading out and displaying a second animation of the first avatar feature with the second appearance (e.g., avatar mouth with puckered lips (e.g., avatar mouth 1425 with puckered pose 1425-3 in avatar state 1412-16)) fading in, wherein the second animation is displayed concurrently with at least a portion of the first animation (e.g., cross-fading the first and second appearances). Displaying a first animation of the first avatar feature with the first appearance fading out and displaying a second animation of the first avatar feature with the second appearance fading in, wherein the second animation is displayed concurrently with at least a portion of the first animation, provides a control scheme for operating and/or composing a virtual avatar on a display of an electronic device, wherein the system detects and processes input in the form of changes to facial features of a user (and the magnitude and/or direction of those changes), and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control and/or compose the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation control can be done in real time during, for example, a conversation such as a text conversation or a video conversation, whereas manual animation control of an avatar would have to be done before the conversation started or after it had ended.

In some embodiments, the movement of the one or more facial features includes movement of a fourth facial feature (e.g., user mouth 1420), and the first avatar feature is a representation of a facial feature different from the fourth facial feature (e.g., avatar eyes 1415). In some embodiments, the change in pose of the user's mouth triggers a change in the appearance of the avatar in which the avatar eyes transition from a first set of eyes in the first appearance to a different set of eyes in the second appearance. For example, the avatar eyes are shown in a neutral state when the first avatar feature is shown having the first appearance and the user mouth is in a neutral pose. When the user moves their mouth to a large smile pose, the avatar eyes transition to the second appearance having squinting eyes. Moving a first avatar feature based on detected changes in a feature of a face that is different from the facial feature for which the first avatar feature is a representation allows the device to modify the avatar to achieve different poses while tracking fewer facial features. This is because the device can change the avatar mouth and eyes in response to detecting changes in only the user's mouth. This provides a control scheme for operating and/or composing a virtual avatar on a display of an electronic device, wherein the system detects and processes input in the form of changes to facial features of a user (and the magnitude and/or direction of those changes), and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control and/or compose the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation control can be done in real time during, for example, a conversation such as a text conversation or a video conversation, whereas manual animation control of an avatar would have to be done before the conversation started or after it had ended.

In response (1506) to detecting the movement of the one or more facial features, in accordance with a determination that the detected movement of the one or more facial features meets criteria for maintaining display of the first avatar feature (e.g., avatar mouth 1425) with the first appearance (e.g., detected changes in the face of the user do not trigger snapping the avatar feature(s) to a particular pose), the electronic device modifies (1512) the virtual avatar (e.g., 1405) to display the first avatar feature by modifying the first appearance of the first avatar feature in response to detected changes in pose (e.g., orientation, translation) (e.g., a change in a facial expression) of the face in the field of view of the one or more cameras (e.g., avatar mouth 1425 in avatar states 1412-1, 1412-2, 1412-6, 1412-12, 1412-15, and 1412-17 through 1412-19) (e.g., when the avatar feature is not snapped to a particular pose, the feature is modified in response to detected changes in the face of the user (e.g., modified based on a direction and/or magnitude of movement of the facial feature(s))). In some embodiments, the first avatar feature is an avatar mouth, the second appearance is a smiling pose of the mouth, the third appearance is a sad pose of the mouth, and the first appearance of the mouth includes various positions of the mouth between a smiling pose and a sad pose (e.g., a neutral mouth, a position between opening and closing when talking, etc.).

In some embodiments, detected movement of a physical feature (e.g., a change in pose of a face; movement of a facial feature) has both a directional component and a magnitude component In some embodiments, modifications to an avatar feature have both a magnitude component and a directional component. In some embodiments, the directional component of the modification in the avatar feature is based on a directional component of a change in one or more physical features (e.g., facial features of the user's face) that the avatar feature is reactive to. In some embodiments, the directional component of the change in the avatar feature is the same as the directional component of the change in the physical feature. For example, when the physical feature (e.g., mouth) moves down, the corresponding (e.g., reactive) avatar feature (e.g., avatar mouth) moves down. In some embodiments, the directional component of the change in the avatar feature is mirrored with respect to the directional component of the change in a corresponding physical feature (e.g., the physical feature for which the avatar feature is reactive to detected changes). For example, when the physical feature (e.g., a user's eye (e.g., iris)) moves left, the reactive avatar feature (e.g., avatar eye (e.g., iris)) moves right. In some embodiments, the directional component of the change in the avatar feature is the same as the directional component of the change in the corresponding physical feature for movement along a vertical axis and mirrored for movement along a horizontal axis, similar to the effect seen when looking in a mirror. In some embodiments, a change in relative position of a physical feature (e.g., the user's iris or eyebrow) is in a direction determined from a neutral, resting position of the physical feature. In some embodiments, the neutral, resting position of a user's iris is determined to be a particular position (e.g., centered) relative to the perimeter of the user's eyeball. In some embodiments, the direction of a reaction of an avatar feature corresponds (e.g., directly or inversely) to a relative direction of a change in a physical feature of the user. In some embodiments, the relative direction of the change in the physical feature is determined based on a direction of movement of the physical feature from a neutral, resting position of the physical feature. In some embodiments, the direction of the reaction of the avatar feature corresponds directly (e.g., the physical feature moves up, the avatar feature moves up) to the relative direction of the change in the physical feature. In some embodiments, the direction of the reaction of the avatar feature corresponds inversely (e.g., the physical feature moves up, the avatar feature moves down) to the relative direction of the change in the physical feature.

In some embodiments, the magnitude of a change in an avatar feature corresponds to a magnitude of a change in a physical feature of the user. In some embodiments, the magnitude of the change in the physical feature is determined in accordance with a potential range of motion of the physical feature, wherein the magnitude is representative of a relative position of the physical feature within the range of motion (e.g., the predicted or modeled range of motion) of that physical feature. In such embodiments, the magnitude of the reaction (e.g., change in position) of the avatar feature is similarly a relative position of the avatar feature within a range of motion of the avatar feature. In some embodiments, the magnitude of change is determined based on a comparison or measurement (e.g., a distance) of the starting position and ending position of the physical feature, through the change. In such embodiments, the change in the physical feature is translated to a modification of the corresponding avatar feature by applying the measured change in the physical feature to the avatar feature (e.g., directly or as a scaled or adjusted value.

In some embodiments, the one or more cameras include a depth camera (e.g., having depth camera sensor 175). In some embodiments, the one or more cameras capture image data that corresponds to depth data (e.g., the image data includes data captured by a visible light camera and a depth camera) (e.g., image data that includes a depth aspect (e.g., depth data independent of RGB data) of a captured image or video) that includes depth data for a subject positioned in the field of view of the depth camera (e.g., information about the relative depth positioning of one or more portions of the subject with respect to other portions of the subject and/or to other objects within the field of view of the one or more cameras). In some embodiments, the image data includes at least two components: an RGB component that encodes the visual characteristics of a captured image, and depth data that encodes information about the relative spacing relationship of elements within the captured image (e.g., the depth data encodes that a user is in the foreground, and background elements, such as a tree positioned behind the user, are in the background). In some embodiments, the image data includes depth data without an RGB component. In some embodiments, the depth data is a depth map. In some embodiments, a depth map (e.g., depth map image) contains information (e.g., values) that relates to the distance of objects in a scene from a viewpoint (e.g., a camera). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., camera) in the "three dimensional" scene. In other examples, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction. In some embodiments, the depth data has a first depth component (e.g., a first portion of depth data that encodes a spatial position of the subject in the camera display region; a plurality of depth pixels that form a discrete portion of the depth map, such as a foreground or a specific object) that includes the representation of the subject in the camera display region. In some embodiments, the depth data has a second depth component (e.g., a second portion of depth data that encodes a spatial position of the background in the camera display region; a plurality of depth pixels that form a discrete portion of the depth map, such as a background), separate from the first depth component, the second depth aspect including the representation of the background in the camera display region. In some embodiments, the first depth aspect and second depth aspect are used to determine a spatial relationship between the subject in the camera display region and the background in the camera display region. This spatial relationship can be used to distinguish the subject from the background. This distinction can be exploited to, for example, apply different visual effects (e.g., visual effects having a depth component) to the subject and background. In some embodiments, all areas of the image data that do not correspond to the first depth component (e.g., areas of the image data that are out of range of the depth camera) are segmented out (e.g., excluded) from the depth map. In some embodiments, the depth data is in the form of a depth map or depth mask.

In some embodiments, the detected movement of the one or more facial features includes movement of a first facial feature (e.g., user mouth 1420). In some embodiments, the detected movement of the one or more facial features meets the criteria for maintaining display of the first avatar feature with the first appearance (e.g., avatar mouth 1425 having a position that tracks movement of user mouth 1420 (e.g., a non-snapped pose)) when the movement of the first facial feature is within a first range of possible first facial feature values (e.g., pose values for user mouth 1420 that do not cause avatar mouth 1425 to snap to a pose) based on a predetermined range of motion of the first facial feature (e.g., a range of motion expressed as magnitude values with respect to an initial (e.g., resting) value). In some embodiments, the detected movement of the one or more facial features causes the first pose criteria to be met when the movement of the first facial feature is within a second range of possible first facial feature values (e.g., a range of values for user mouth 1420 that cause avatar mouth 1425 to snap to a predefined pose) different from the first range of possible first facial feature values. In some embodiments, modifying the first appearance of the first avatar feature (e.g., avatar mouth 1425) in response to detected changes in pose of the face in the field of view of the one or more cameras includes modifying the first appearance of the first avatar feature within a first range of appearance values (e.g., a range of positions for the first avatar feature) corresponding to the first range of possible first facial feature values (e.g., moving avatar mouth 1425 along non-snapping poses). In some embodiments, modifying the virtual avatar to display the first avatar feature with the second appearance includes displaying the first avatar feature having a second appearance value (e.g., a value corresponding to a predefined, snapped pose (e.g., large smile pose 1425-1) of avatar mouth 1425) within a second range of appearance values different from the first range of appearance values and corresponding to the second range of possible first facial feature values. In some embodiments, the second range of appearance values for the second appearance is a range of values that is limited so as to still associate the pose of the first avatar feature with the second appearance (e.g., so that distortions to the second appearance (e.g., in response to detected changes in pose of the face in the field of view of the camera) are still associated with the second appearance). In other words, the second range is limited to a range of positions that a user would still identify or recognize as having the second appearance. For example, when the first avatar feature is an avatar mouth (e.g., 1425), and the second appearance is a smiling pose (e.g., large smile pose 1425-1), the second range of appearance values are a range of smiling poses of the mouth that resemble an initial smiling pose of the second appearance (e.g., the smiling pose that the mouth is snapped to when the first pose criteria are met). For example, in avatar state 1412-5, avatar mouth 1425 is distorted at corner 1425*a*, but avatar mouth 1425 still maintains the snapped large smile pose 1425-1. This serves to anchor the avatar feature to the second appearance so that the user can more easily maintain the second appearance of the first avatar feature, which provides a control scheme for operating and/or composing a virtual avatar on a display of an electronic device, wherein the system detects and processes input in the form of changes to facial features of a user (and the magnitude and/or direction of those changes), and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control and/or compose the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation control can be done in real time during, for example, a conversation such as a text conversation or a video conversation, whereas manual animation control of an avatar would have to be done before the conversation started or after it had ended.

In some embodiments, the detected movement of the one or more facial features causes the second pose criteria to be met when the movement of the first facial feature (e.g., user mouth 1420) is within a third range of possible first facial feature values (e.g., a range of user mouth poses that cause avatar mouth 1425 to snap to a different predefined pose (e.g., wide mouth pose 1425-2)) different from the first range of possible first facial feature values and the second range of possible first facial feature values. In some embodiments, the electronic device modifies the virtual avatar to display the first avatar feature (e.g., avatar mouth 1425) with the third appearance includes displaying the first avatar feature having a third appearance value within a third range of appearance values (e.g., a value of avatar mouth 1425 corresponding to the snapped mouth pose (e.g., wide mouth pose 1425-2)) different from the first range of appearance values and the second range of appearance values and corresponding to the third range of possible first facial feature values. In some embodiments, modifications to the third appearance are similarly limited to a range of appearance values for the third appearance so that distortions to the third appearance (e.g., in response to detected changes in pose of the face in the field of view of the camera) are still associated with the third appearance. In some embodiments, the range of appearance values for the third appearance (e.g., a range of sad mouth positions) are different from the range of appearance values for the second appearance and the range of appearance values for the first appearance. This provides a control scheme for operating and/or composing a virtual avatar on a display of an electronic device, wherein the system detects and processes input in the form of changes to facial features of a user (and the magnitude and/or direction of those changes), and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control and/or compose the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation control can be done in real time during, for example, a conversation such as a text conversation or a video conversation, whereas manual animation control of an avatar would have to be done before the conversation started or after it had ended.

In some embodiments, the electronic device is configured to transmit (e.g., transmit in a messaging application) a first predefined emoji (e.g., a smiling emoji) and a second predefined emoji (e.g., a sad emoji). In some embodiments, the second appearance of the first avatar feature corresponds to (e.g., has the appearance of) an appearance of the first predefined emoji (e.g., an emoji having an opened-mouth smiling expression) (e.g., the avatar mouth responds to changes in the user's face with a slight animation to assume the position of the mouth of an emoji having an opened mouth smile) (e.g., the entire virtual avatar responds to changes in the user's face with slight animations of the avatar mouth, avatar eyes, and rotation of the avatar head to assume the appearance of an emoji having an opened mouth smile). In some embodiments, the third appearance of the first avatar feature corresponds to (e.g., has the appearance of) an appearance of the second predefined emoji (e.g., an emoji having a sad expression) (e.g., the avatar mouth responds to changes in the user's face with a slight animation to assume the position of the mouth of an emoji having a sad expression) (e.g., the entire virtual avatar responds to changes in the user's face with slight animations of the avatar mouth, avatar eyes, and rotation of the avatar head to assume the appearance of a sad emoji). Displaying the first and second features of the avatar having appearances that correspond to features of different predefined emoji characters allows the avatar to achieve more easily recognized facial expressions, because the features correspond to well-known emoji characters. This provides a control scheme for operating and/or composing a virtual avatar on a display of an electronic device, wherein the system detects and processes input in the form of changes to facial features of a user (and the magnitude and/or direction of those changes), and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control and/or compose the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation control can be done in real time during, for example, a conversation such as a text conversation or a video conversation, whereas manual animation control of an avatar would have to be done before the conversation started or after it had ended.

In some embodiments, while the first avatar feature (e.g., avatar mouth 1425) is displayed with the second appearance (e.g., large smile pose 1425-2), the electronic device detects a change in pose of the face in the field of view of the one or more cameras. In some embodiments, in response to detecting the change in pose of the face in the field of view of the one or more cameras, in accordance with a determination that the detected change in pose of the face in the field of view of the one or more cameras includes movement of a second facial feature (e.g., user mouth 1420) to a pose that is outside a first range of poses (e.g., a range of poses that trigger the large smile pose 1425-2) (e.g., a range of second facial feature values) for the second facial feature (e.g., the second facial feature has a pose that is outside a range of poses associated with the second appearance), the electronic device modifies the first avatar feature to have the first appearance (e.g., avatar mouth 1425 has a non-snapped pose such as in avatar state 1412-6). In some embodiments, in response to detecting the change in pose of the face in the field of view of the one or more cameras, in accordance with a determination that the detected change in pose of the face in the field of view of the one or more cameras includes movement of the second facial feature to a pose that is within the first range of poses for the second facial feature (e.g., the second facial feature has a pose that is within the range of poses associated with the second appearance), the electronic device maintains display of the first avatar feature having the second appearance (e.g., despite being distorted at corner 1425*a*, avatar mouth 1425 has large smile pose 1425-1 in avatar state 1412-5) (e.g., slightly modifying the first avatar feature based on the movement of the second facial feature) (e.g., foregoing modifying the first avatar feature based on the movement of the second facial feature) (e.g., the first avatar feature maintains the second appearance (e.g., the snapped pose) when the detected movement of the second facial feature causes the pose of the second facial feature to be within the range of poses associated with the second appearance, and transitions to the first appearance (e.g., the non-snapped pose) when the detected movement of the second facial feature causes the pose of the second facial feature to be outside the range of poses associated with the second appearance). In some embodiments, requiring movement of a facial feature (e.g., the facial feature corresponding to the avatar feature) to a pose outside a range of poses in order to modify the avatar feature to something other than the second appearance works as a hysteresis to anchor the avatar feature to the second appearance so that the user can more easily maintain the second appearance of the first avatar feature. Accordingly, minor detected changes to the facial feature of the user (e.g., achieving poses of the facial feature that are within the range of poses associated with the second appearance) do not change the avatar feature, or do not change the position of the avatar feature to a position that is not recognized as the second appearance (e.g., the avatar feature is slightly distorted but still recognized as having the second appearance). This behavior serves to bias the respective avatar features to various poses making it easier for a user to achieve (e.g., via the snapping behavior) and maintain (e.g., via the hysteresis) avatar poses such as, for example, poses that are common for communicating with other users (e.g., poses corresponding to different emoji expressions). The snapping/hysteresis of the poses can be applied at an individual avatar feature basis (e.g., affecting avatar features individually such as by snapping a single avatar feature (e.g., mouth) to different feature poses (e.g., different emoji mouth poses) without snapping different avatar features (e.g., eyes)) or to the entirety of the virtual avatar (e.g., affecting the entire virtual avatar (e.g., multiple avatar features) such as by simultaneously snapping multiple avatar features to different emoji facial expressions).

In some embodiments, the one or more avatar features further includes a second avatar feature (e.g., avatar eyes 1415) with a fourth appearance (e.g., a non-snapped pose (e.g., side-glancing eyes 1415 in avatar state 1412-6)) that is modified in response to detected changes in pose of the face in the field of view of the one or more cameras.

In some embodiments, further in response to detecting the change in pose of the face in the field of view of the one or more cameras, in accordance with a determination that the detected movement of the one or more facial features causes third pose criteria to be met, the electronic device modifies the virtual avatar to display the second avatar feature (e.g., avatar eyes 1415) with a fifth appearance (e.g., a snapped pose (e.g., squinty eye pose 1415-3)), different from the fourth appearance (e.g., a non-snapped pose), that is modified in response to detected changes in pose of the face in the field of view of the one or more cameras. In some embodiments, further in response to detecting the change in pose of the face in the field of view of the one or more cameras, in accordance with a determination that the detected movement of the one or more facial features meets criteria for maintaining display of the second avatar feature with the fourth appearance, the electronic device modifies the virtual avatar to display the second avatar feature by modifying the fourth appearance of the second avatar feature in response to detected changes in pose of the face in the field of view of the one or more cameras (e.g., avatar eyes 1415 are modified based on movement of user eyes 1410 in avatar state 1412-6).

In some embodiments, while the second avatar feature is displayed with the fifth appearance (e.g., the snapped pose (e.g., squinty eye pose 1415-3)), the electronic device detects a second change in pose of the face in the field of view of the one or more cameras. In some embodiments, in response to detecting the second change in pose of the face in the field of view of the one or more cameras, in accordance with a determination that the detected change in pose of the face in the field of view of the one or more cameras includes movement of a third facial feature (e.g., user mouth 1425) to a pose that is outside a second range of poses (e.g., a range of user mouth poses that trigger a snapping pose of avatar mouth 1425) (e.g., a range of third facial feature values) for the third facial feature that is different from (e.g., having a greater or lesser range of poses for the third facial feature than the first range of poses for the second facial feature) the first range of poses for the second facial feature (e.g., the third facial feature has a pose that is outside a range of poses associated with the fifth appearance), the electronic device modifies the second avatar feature to have the fourth appearance (e.g., the avatar eyes 1415 return to a non-snapped pose). In some embodiments, in response to detecting the second change in pose of the face in the field of view of the one or more cameras, in accordance with a determination that the detected change in pose of the face in the field of view of the one or more cameras includes movement of the third facial feature to a pose that is within the second range of poses for the third facial feature (e.g., the third facial feature has a pose that is within the range of poses associated with the fifth appearance), the electronic device maintains display of the second avatar feature having the fifth appearance (e.g., the avatar eyes 1415 remain in the snapped pose. For example, user eyes 1410 squint slightly in user states 1411-3 and 1411-4, but the avatar eyes 1415 remain in the neutral avatar eye pose 1415-1 in avatar states 1412-3 and 1412-4) (e.g., slightly modifying the second avatar feature based on the movement of the third facial feature) (e.g., foregoing modifying the second avatar feature based on the movement of the third facial feature) (e.g., the second avatar feature maintains the fifth appearance (e.g., the snapped pose) when the detected movement of the third facial feature causes the pose of the third facial feature to be within the range of poses associated with the fifth appearance, and transitions to the fourth appearance (e.g., the non-snapped pose) when the detected movement of the third facial feature causes the pose of the third facial feature to be outside the range of poses associated with the fifth appearance. In some embodiments, the ranges of poses of the second and third facial features have different ranges of values (e.g., the first range is shorter than the second range) to achieve a different hysteresis for each respective avatar feature. Applying different ranges for the different features allows for the different avatar features to have different ranges of hysteresis. This allows for some features to be more biased to a particular pose, and others to track more easily with the user's facial poses. This provides a control scheme for operating and/or composing a virtual avatar on a display of an electronic device, wherein the system detects and processes input in the form of changes to facial features of a user (and the magnitude and/or direction of those changes), and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control and/or compose the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation control can be done in real time during, for example, a conversation such as a text conversation or a video conversation, whereas manual animation control of an avatar would have to be done before the conversation started or after it had ended.

In some embodiments, the first avatar feature is an avatar mouth (e.g., 1425). In some embodiments, the second avatar feature is one or more avatar eyes (e.g., 1415). In some embodiments, the second range of poses is greater than the first range of poses. In some embodiments, the avatar eyes tend to be a rounded shape except for a few limited poses in which the eyes have a squinting shape, and the avatar mouth tends to snap to a larger range of poses (e.g., sad, neutral, little smile, big smile, big smile with teeth, etc.). Thus, for such embodiments, the hysteresis for the avatar eyes is greater than the hysteresis for the avatar mouth so that the avatar mouth can more easily transition to different poses (including both predefined poses (e.g., snapped poses) and poses based on the position of the user's mouth) while the avatar eyes tend to bias towards either a rounded shape or a squinted shape (e.g., when movement of the user's eyes is a substantial degree of movement such as when squinting). This provides a control scheme for operating and/or composing a virtual avatar on a display of an electronic device, wherein the system detects and processes input in the form of changes to facial features of a user (and the magnitude and/or direction of those changes), and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control and/or compose the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation control can be done in real time during, for example, a conversation such as a text conversation or a video conversation, whereas manual animation control of an avatar would have to be done before the conversation started or after it had ended.

In some embodiments, while the virtual avatar is displayed having a first orientation (e.g., avatar state 1412-17) (e.g., relative to a fixed virtual point positioned relative to the virtual avatar) (e.g., the fixed virtual point is a pivot point located at a center location of the virtual avatar), the electronic device displays a three-dimensional effect (e.g., light effect 1455) (e.g., a light effect such as a glare that gives an impression of the virtual avatar having a shape of a three-dimensional object such as a sphere) at a first location on the virtual avatar (e.g., on a forehead region of the virtual avatar) (e.g., the first location on the virtual avatar has a first relationship to the fixed virtual point). In some embodiments, the electronic device detects a change in orientation of the face in the field of view of the one or more cameras (e.g., user state 1411-18 or 1411-19) (e.g., a rotational movement of the face). In some embodiments, in response to detecting the change in orientation of the face, the electronic device modifies the virtual avatar based on the detected change in orientation of the face (e.g., avatar state 1412-18 or 1412-19) (e.g., rotating the virtual avatar based on the rotation of the face). In some embodiments, the virtual avatar is a spherical shape (e.g., a smiley face) and modifying the virtual avatar based on the change in orientation of the face includes rotating the face of the avatar about a pivot point located at a center location of the virtual avatar (as opposed to a pivot point located at a base of the virtual avatar such as a neck region).). In some embodiments, modifying the virtual avatar based on the detected change in orientation of the face includes changing an orientation of one or more features (e.g., facial features such as eyes 1415, eyebrows, and/or a mouth 1425) of the avatar by a respective amount that is determined based on a magnitude of the detected change in orientation of the face (e.g., the avatar's head is rotated based on the rotation of the face) (e.g., the avatar's head is rotated 5, 10, 15, 25, or 40 degrees (e.g., avatar is looking to the left), in response to a 5, 10, 15, 25, or 40-degree-rotation of the user's face) while changing an orientation of the three-dimensional effect by less than the respective amount (e.g., forgoing rotation of the three-dimensional effect). In some embodiments, changing an orientation of the three-dimensional effect by less than the respective amount includes displaying the three-dimensional effect at the first location (e.g. on the side of the avatar's head) on the virtual avatar that has the first relationship to the fixed virtual point (e.g., the first location no longer has the first relationship to the fixed virtual point) (e.g., the position of the three-dimensional effect remains fixed with respect to the fixed virtual point, while the face of the avatar rotates (e.g., the three-dimensional effect does not rotate with the face of the avatar)). Displaying the orientation of the one or more avatar features while changing the orientation of the three-dimensional effect by a lesser amount give the appearance of the virtual avatar having a three-dimensional shape that changes dynamically within an environment (e.g., turning and rotating, while still retaining a three-dimensional shape such as a sphere). This provides a control scheme for operating and/or composing a virtual avatar on a display of an electronic device, wherein the system detects and processes input in the form of changes to facial features of a user (and the magnitude and/or direction of those changes), and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control and/or compose the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation control can be done in real time during, for example, a conversation such as a text conversation or a video conversation, whereas manual animation control of an avatar would have to be done before the conversation started or after it had ended.

In some embodiments, the one or more avatar features further includes a fourth avatar feature (e.g., an avatar feature different from the first avatar feature) (e.g., avatar eyes 1415) with a sixth appearance (e.g., a non-snapped pose) that is modified in response to detected changes in pose of the face in the field of view of the one or more cameras. In some embodiments, further in response to detecting the movement of the one or more facial features, in accordance with the determination that the detected movement of the one or more facial features causes the first pose criteria to be met, the electronic device modifies the virtual avatar to display the fourth avatar feature having a seventh appearance different from the sixth appearance (e.g., the first avatar feature (e.g., avatar mouth 1425) is snapped to the second appearance (e.g., 1425-1) and the avatar eyes (e.g., 1415) are snapped to the seventh appearance (e.g., a squinty eye pose 1415-3)), that is modified in response to detected changes in pose of the face in the field of view of the one or more cameras. In some embodiments, further in response to detecting the movement of the one or more facial features, in accordance with the determination that the detected movement of the one or more facial features causes the second pose criteria to be met, the electronic device modifies the virtual avatar to display the fourth avatar feature having an eighth appearance, different from the sixth appearance and the seventh appearance (e.g., the first avatar feature (e.g., avatar mouth 1425) is snapped to the third appearance (e.g., 1425-2) and the avatar eyes are snapped to the eighth appearance (e.g., a surprised eye pose 1415-2)), that is modified in response to detected changes in pose in the face in the field of view of the one or more cameras. In some embodiments, further in response to detecting the movement of the one or more facial features, in accordance with a determination that the detected movement of the one or more facial features meets criteria for maintaining display of the fourth avatar feature with the sixth appearance (e.g., detected changes in the face of the user do not trigger snapping the first avatar feature or the fourth avatar feature to a particular pose), the electronic device modifies the virtual avatar to display the fourth avatar feature by modifying the sixth appearance of the fourth avatar feature in response to detected changes in pose of the face in the field of view of the one or more cameras. A second avatar feature can be snapped to different poses independently from the first avatar feature. This provides a control scheme for operating and/or composing a virtual avatar on a display of an electronic device, wherein the system detects and processes input in the form of changes to facial features of a user (and the magnitude and/or direction of those changes), and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control and/or compose the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation control can be done in real time during, for example, a conversation such as a text conversation or a video conversation, whereas manual animation control of an avatar would have to be done before the conversation started or after it had ended.

In some embodiments, the first avatar feature (e.g., avatar mouth 1425) includes a first state (e.g., 1425-2) (e.g., a state in which the avatar mouth is snapped to a sad pose) and a second state (e.g., 1425-1) (e.g., a state in which the avatar mouth is snapped to a big smile pose). In some embodiments, the states of an avatar feature correspond to appearances of the respective avatar feature (e.g., corresponding to the first, second, and third appearances of the first avatar feature). In some embodiments, the one or more avatar features further includes a fifth avatar feature (e.g., avatar eyes 1415) that is modified in response to detected changes in pose of the face in the field of view of the one or more cameras, the fifth avatar feature including a third state (e.g., a state in which the avatar eyes are snapped to a surprised pose (e.g., 1415-2)) and a fourth state (e.g., a state in which the avatar eyes are snapped to a squinty pose (e.g., 1415-3)).

In some embodiments, further in response to detecting the movement of the one or more facial feature, in accordance with a determination that a first set of criteria are met, the electronic device displays the first avatar feature having the first state (e.g., 1425-2) (e.g., the avatar mouth is snapped to the sad pose) and displays the fifth avatar feature having the third state (e.g., the avatar eyes are snapped to the surprised pose (e.g., 1415-2)). In some embodiments, further in response to detecting the movement of the one or more facial feature, in accordance with a determination that a second set of criteria are met, the electronic device displays the first avatar feature having the second state (e.g., 1425-1) (e.g., the avatar mouth is snapped to the big smile pose) and displays the fifth avatar feature having the third state (e.g., the avatar eyes are snapped to the surprised pose (e.g., 1415-2)). In some embodiments, further in response to detecting the movement of the one or more facial feature, in accordance with a determination that a third set of criteria are met, the electronic device displays the first avatar feature having the first state (e.g., 1425-2) (e.g., the avatar mouth is snapped to the sad pose) and displays the fifth avatar feature having the fourth state (e.g., the avatar eyes are snapped to the squinty pose (e.g., 1415-3)). In some embodiments, further in response to detecting the movement of the one or more facial features, in accordance with a determination that a fourth set of criteria are met, the electronic device displays the first avatar feature having the second state (e.g., 1425-1) (e.g., the avatar mouth is snapped to the big smile pose) and displays the fifth avatar feature having the fourth state (e.g., the avatar eyes are snapped to the squinty pose (e.g., 1415-3)). Different avatar features can be snapped or modified in accordance with the magnitude and direction of movement of the facial feature (e.g., a non-snapped appearance) to achieve different poses independently of each other. This provides a control scheme for operating and/or composing a virtual avatar on a display of an electronic device, wherein the system detects and processes input in the form of changes to facial features of a user (and the magnitude and/or direction of those changes), and through an iterative feedback loop provides the desired output in the form of the appearance of the virtual avatar, while eliminating the need for manual handling of the user interface (e.g., providing touch inputs on the display). This provides improved visual feedback to the user regarding how to manipulate the display to control and/or compose the virtual avatar using facial movements. This enhances operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, this control scheme can require fewer inputs to generate or control animations of the virtual avatar than would be necessary if a different animation control scheme were used (e.g., a control scheme requiring manipulation of individual control points for each frame of an animation sequence). Moreover, this type of animation control can be done in real time during, for example, a conversation such as a text conversation or a video conversation, whereas manual animation control of an avatar would have to be done before the conversation started or after it had ended.

In some embodiments, the first avatar feature is one or more avatar eyes (e.g., 1415). In some embodiments, the first state is a state in which the one or more avatar eyes have a round eye appearance (e.g., 1415-2) (e.g., eyes wide open; a surprised pose). In some embodiments, the second state is a state in which the one or more avatar eyes have a squinting appearance (e.g., 1415-3) (e.g., eyes are squinted such as when laughing; a squinty pose).

In some embodiments, the first avatar feature is an avatar mouth (e.g., 1425). In some embodiments, the first state is a state in which the avatar mouth has a first expression (e.g., 1425-1) (e.g., frowning, indifference (e.g., "meh"), smiling, smiling wide, smiling wide and showing teeth). In some embodiments, the second state is a state in which the avatar mouth has a second expression different from the first expression (e.g., 1425-2) (e.g., the avatar mouth is a frown in the first state, and is a smile in the second state) (e.g., the avatar mouth is a "meh" pose (a pose of the avatar mouth when the avatar face is an expression of indifference) in the first state, and is a frown in the second state) (e.g., the avatar mouth is a smiling wide and showing teeth pose in the first state, and a smiling wide pose in the second state). In some embodiments, the mouth transitions between different poses (e.g., transitioning to the different states) as the user moves their mouth. For example, as the user moves their mouth from a frown to a large smile, the avatar mouth transitions between different mouth poses. For example, the avatar mouth starts in a frowning pose, then transitions to a meh pose, then to a smiling pose, then to a smiling wide pose, and then finally to a smiling wide and showing teeth pose. In some embodiments, the avatar mouth mirrors the user's mouth when moving between the different mouth poses, and then snaps to the mouth pose when the user's mouth moves to a range of mouth positions that cause the avatar to snap to the mouth pose.

In some embodiments, the first avatar feature is a set of avatar eyebrows (e.g., 1435). In some embodiments, the first state is a state in which the set of avatar eyebrows are displayed (e.g., avatar state 1412-8). In some embodiments, the second state is a state in which the set of avatar eyebrows are not displayed (e.g., avatar state 1412-6).

Note that details of the processes described above with respect to method 1500 (e.g., FIG. 15) are also applicable in an analogous manner to the methods described above. For example, methods 700, 800, 1000, 1200, 1300, 1700, and 1800 optionally includes one or more of the characteristics of the various methods described above with reference to method 1500. For example, an avatar can be displayed and used in a user interface in a manner similar to that described above. For brevity, these details are not repeated below.

FIGS. 16A-16X illustrate exemplary devices and user interfaces for sharing contact information, in accordance with some embodiments. The user interfaces in these figures are used to illustrate the processes described below, including the processes in FIGS. 17 and 18.

FIGS. 16A-16X illustrate three different devices, each of which belongs to a respective user. Electronic device 600 is Johnny Appleseed's phone 600, which is configured to receive communications at 415-555-1234. Electronic device 1602 is Jack Smith's phone 1602, which is configured to receive communications. Electronic device 1604 is Jane Smith's phone 1604, which is configured to receive communications at 415-555-5555.

At FIG. 16A, Johnny's phone 600 is displaying Johnny's address book 1610, as part of the address book application. Address book 1610 includes a contact entry 1610a for Jack, including Jack's name ("JACK SMITH") and phone number. However, as shown in FIG. 16A on Johnny's phone 600, Johnny's address book 1610 does not include Jane's contact information (e.g., name, phone number, email).

At FIG. 16A, Jack's phone 1602 is displaying details 1612 of a contact entry for Johnny. The details 1612 of the contact entry include representation 1632c for Johnny, name 1612b ("JONATHAN APPLESEED") for Johnny, and phone number 1612c for Johnny. Representation 1632c is a monogram representation (e.g., that Jack selected to represent Johnny using, for example, the technique described with respect to FIGS. 9A-9AG).

At FIG. 16A, Jane's phone 1604 is displaying Jane's address book 1614, as part of the address book application. Address book 1614 includes a contact entry 1614a for Jack, including Jack's name ("JACK SMITH") and phone number. However, as shown in FIG. 16A on Jane's phone 1604, Jane's address book 1614 does not include Johnny's contact information (e.g., name, phone number).

Figure 16B:
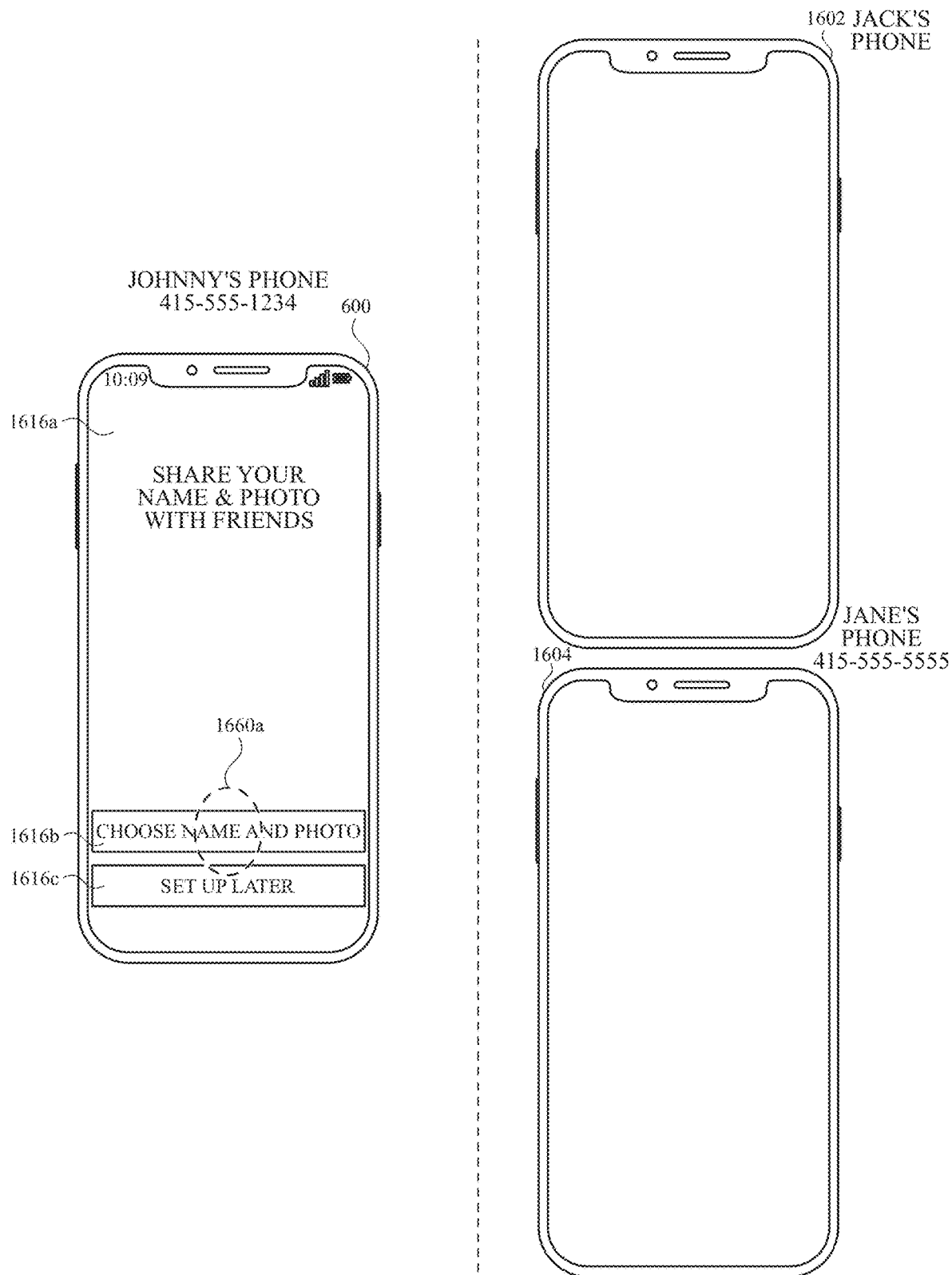
Figure 16C:
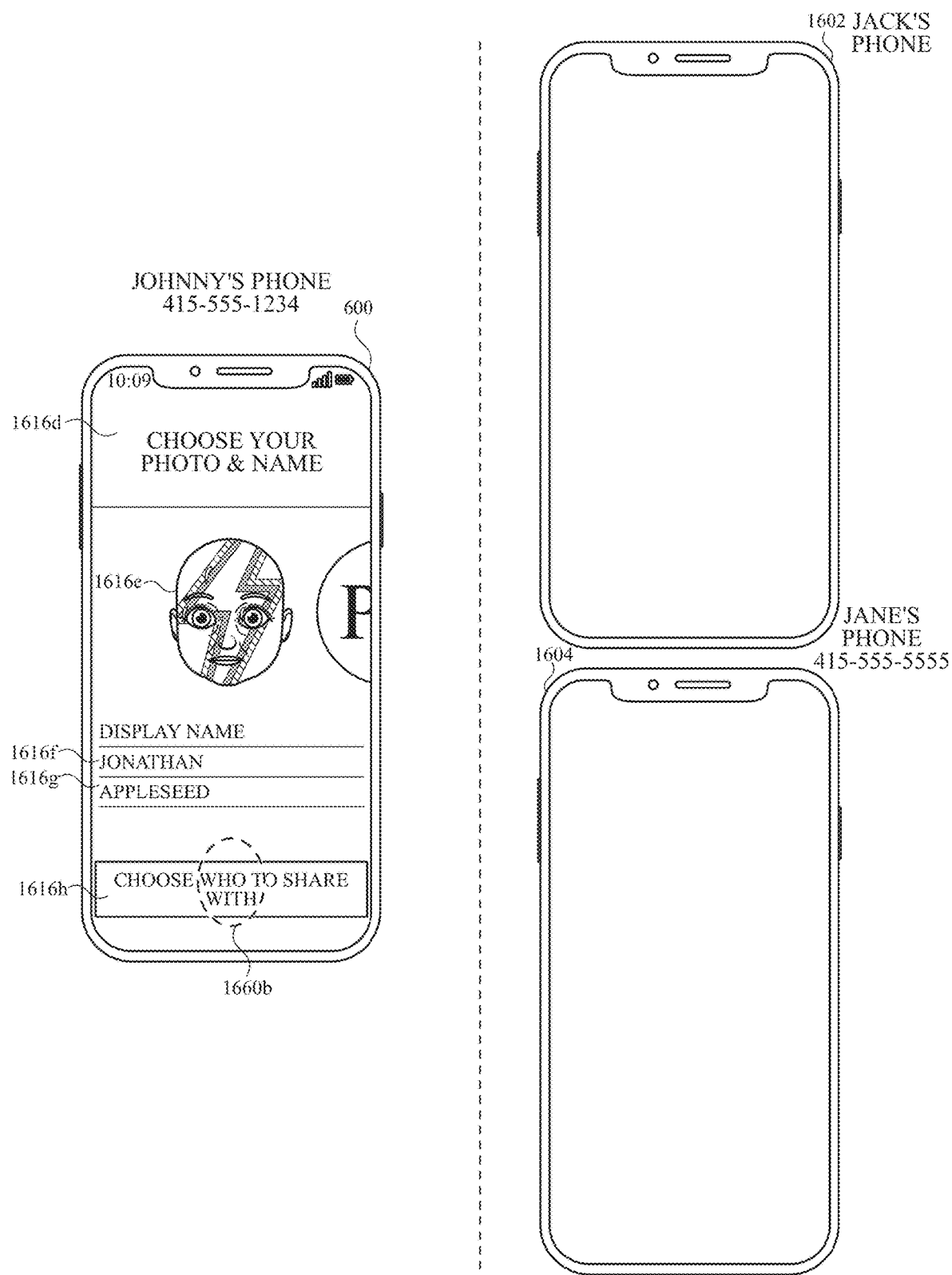
Figure 16D:
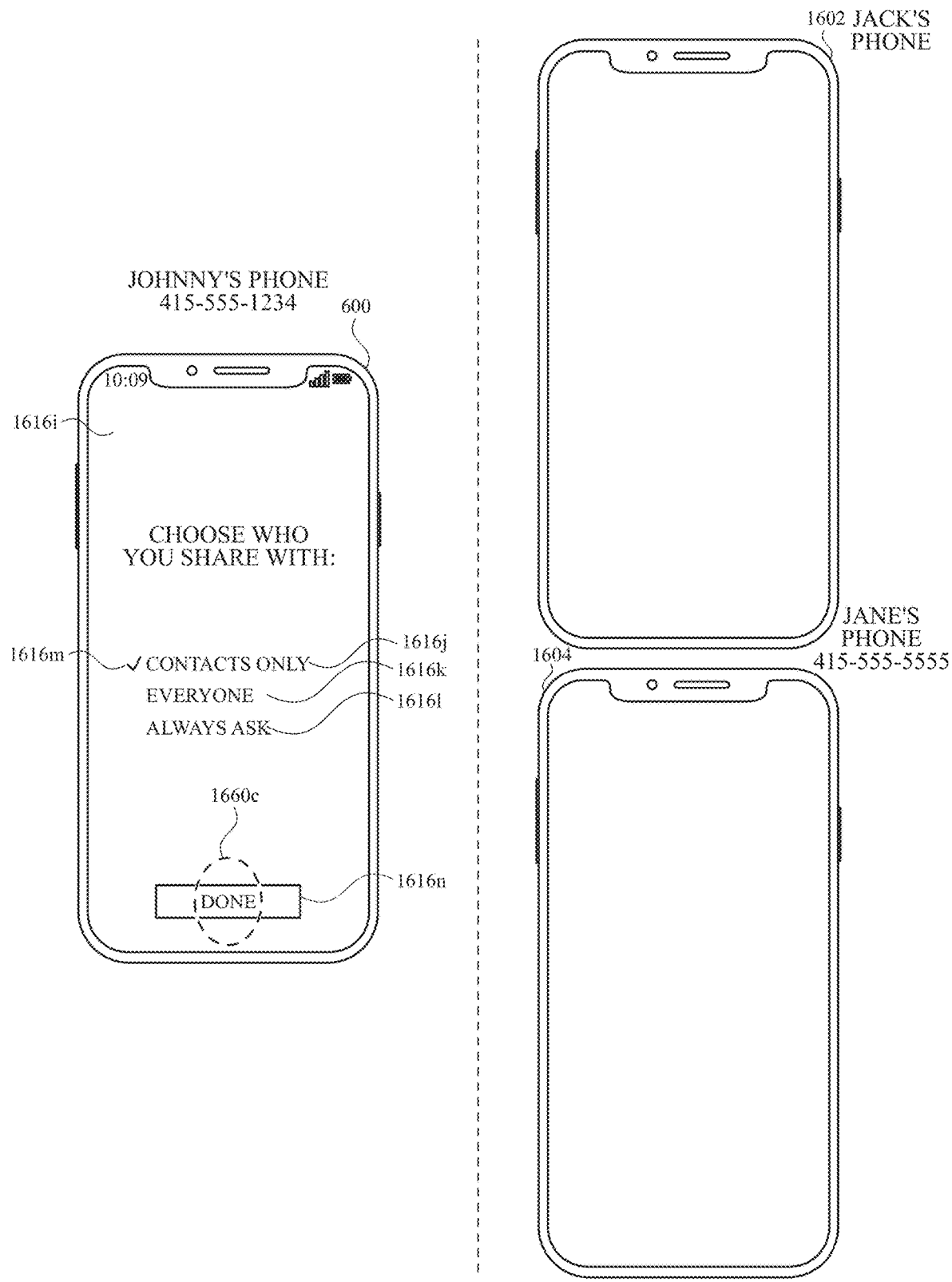

At FIGS. 16B-16D, Johnny uses his phone 600 to configure name and photo sharing (of his own contact information) during a setup process. At FIG. 16B, Johnny's phone 600 displays setup user interface 1616a that includes an option 1616b for Johnny to choose a name and photo for himself and an option 1616c to set up name and photo sharing at a later time. The device detects a tap 1660a on option 1616b to choose a name and photo. As a result, Johnny's phone 600 displays the choose photo and name user interface 1616d of FIG. 16C.

At FIG. 16C, Johnny's phone 600 has received user inputs from Johnny (e.g., via a virtual keyboard at phone 600) to create an avatar 1616e that represents Johnny, such as by using the techniques and user interfaces described above with respect to FIGS. 11A-11AD. At FIG. 16C, Johnny has also updated his name such that his first name 1616f is "JONATHAN" (e.g., rather than Johnny, John, Jon, etc). In some embodiments, the device provides the user with several options for names from among which the user should selected (e.g., "J. Appleseed", "Jonathan A."). Johnny has not changed his last name 1616g, and it remains "APPLESEED." At FIG. 16C, Johnny's phone 600 detects tap 1660b on affordance 1616h for selecting users with which Johnny's new contact information should be shared.

At FIG. 16D, Johnny's phone 600 displays sharing user interface 1616i, which includes a plurality of sharing options 1616j-1616l. Contacts only option 1616j is an option which enables Johnny's phone 600 to automatically share Johnny's updated contact information with individuals that have a contact entry in Johnny's address book 1610 (e.g., Jack, but not Jane). Everyone option 1616k is an option which enables Johnny's phone 600 to share Johnny's updated contact information with all individuals, regardless of whether they have an entry in Johnny's address book 1610 (e.g., Jack and Jane). Always ask option 1616l is an option which enables Johnny's phone 600 to prompt whether Johnny's updated contact information should be shared with each individual, regardless of whether they have an entry in Johnny's address book 1610 (e.g., Jack and Jane).

At FIG. 16D, Johnny's phone 600 has received a tap at contacts only option 1616j, as indicated by checkmark 1616m. At FIG. 16D, Johnny's phone 600 detects a tap 1660c on done affordance 1616n to select contacts only option 1616j and finish the name and photo sharing setup process. After detecting tap 1660c, Johnny's phone 600 is configured to share Johnny's contact information (e.g., avatar 1616e, name 1616f-1616g) with individuals with whom Johnny communicates.

Figure 16E:
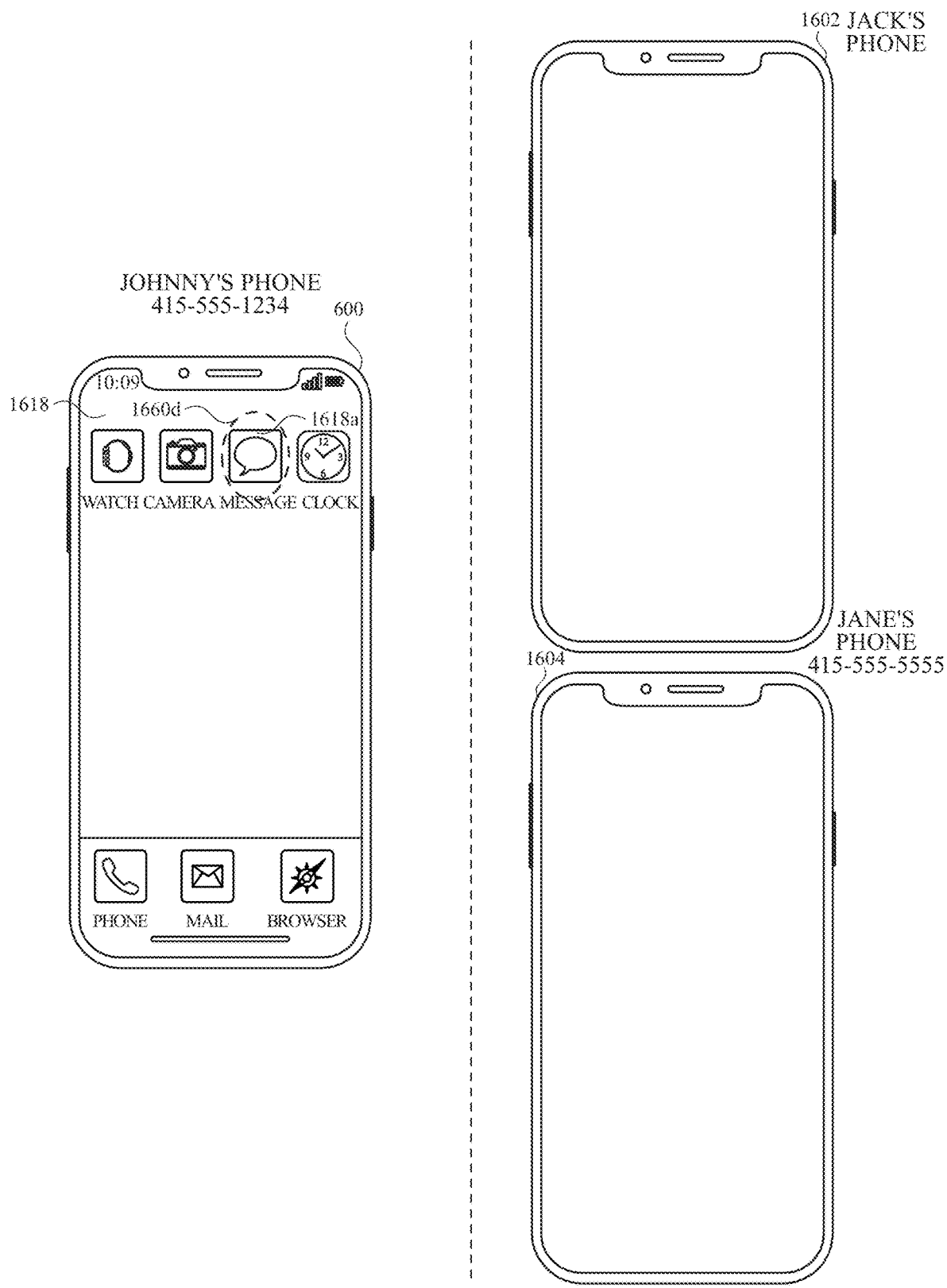
Figure 16F:
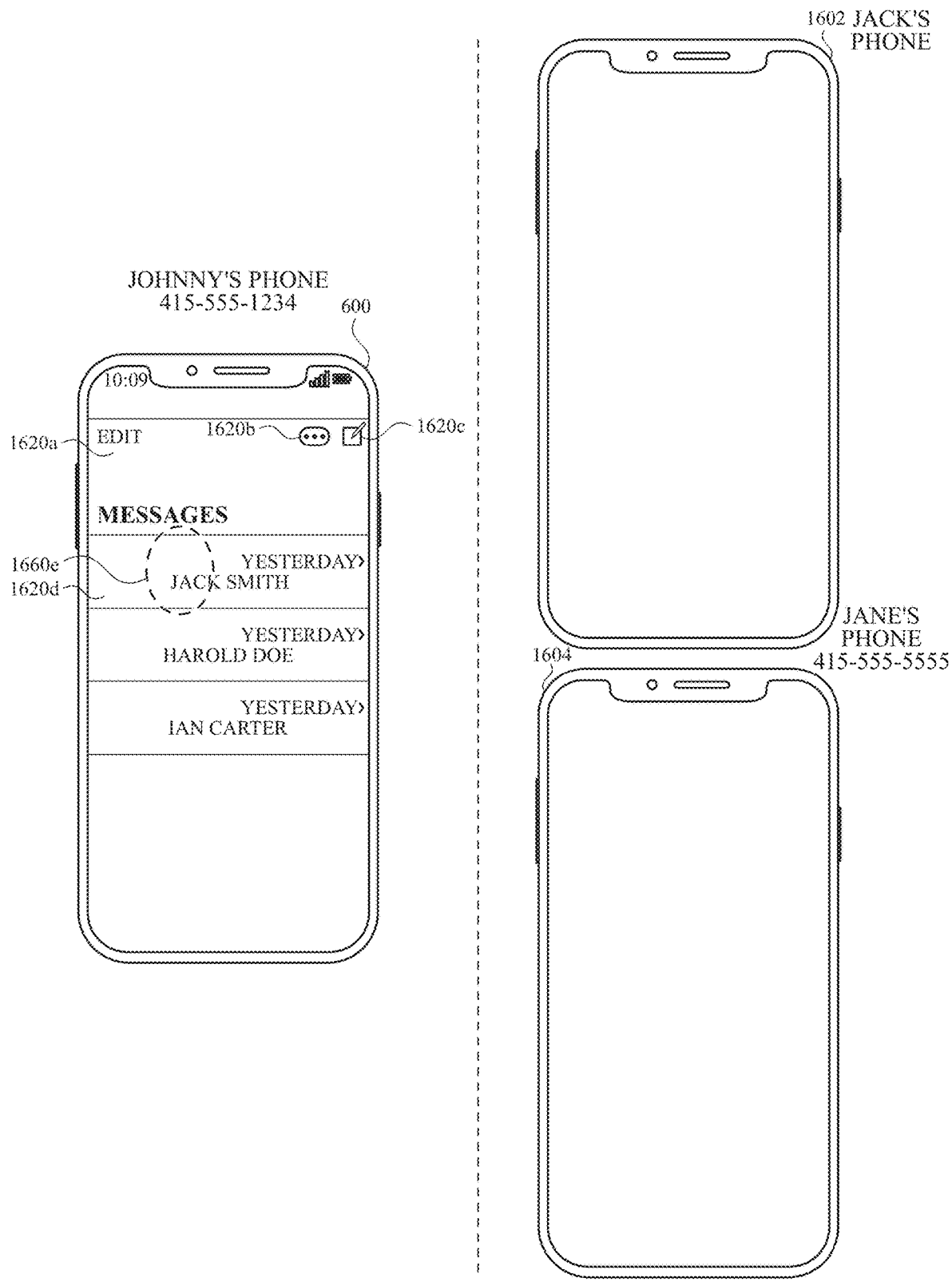

At FIG. 16E, Johnny's phone 600 displays home screen 1618, including application icons for some of the applications on Johnny's phone 600. Johnny's phone 600 detects tap 1660d on messages icon 1618a. In response to detecting tap 1660d on messages icon 1618a, Johnny's phone 600 displays, at FIG. 16F, a list of messaging conversations as part of conversations list user interface 1620a. Conversations list user interface 1620a includes settings affordance 1620b, new message affordance 1620c (for starting a new message conversation), and multiple representations of messaging threads, including representation 1620d for a messaging thread that includes an instant messaging conversation between Jack and Johnny. At FIG. 16F, Johnny's phone 600 detects tap 1660e on representation 1620d for the messaging thread between Jack and Johnny.

Figure 16G:
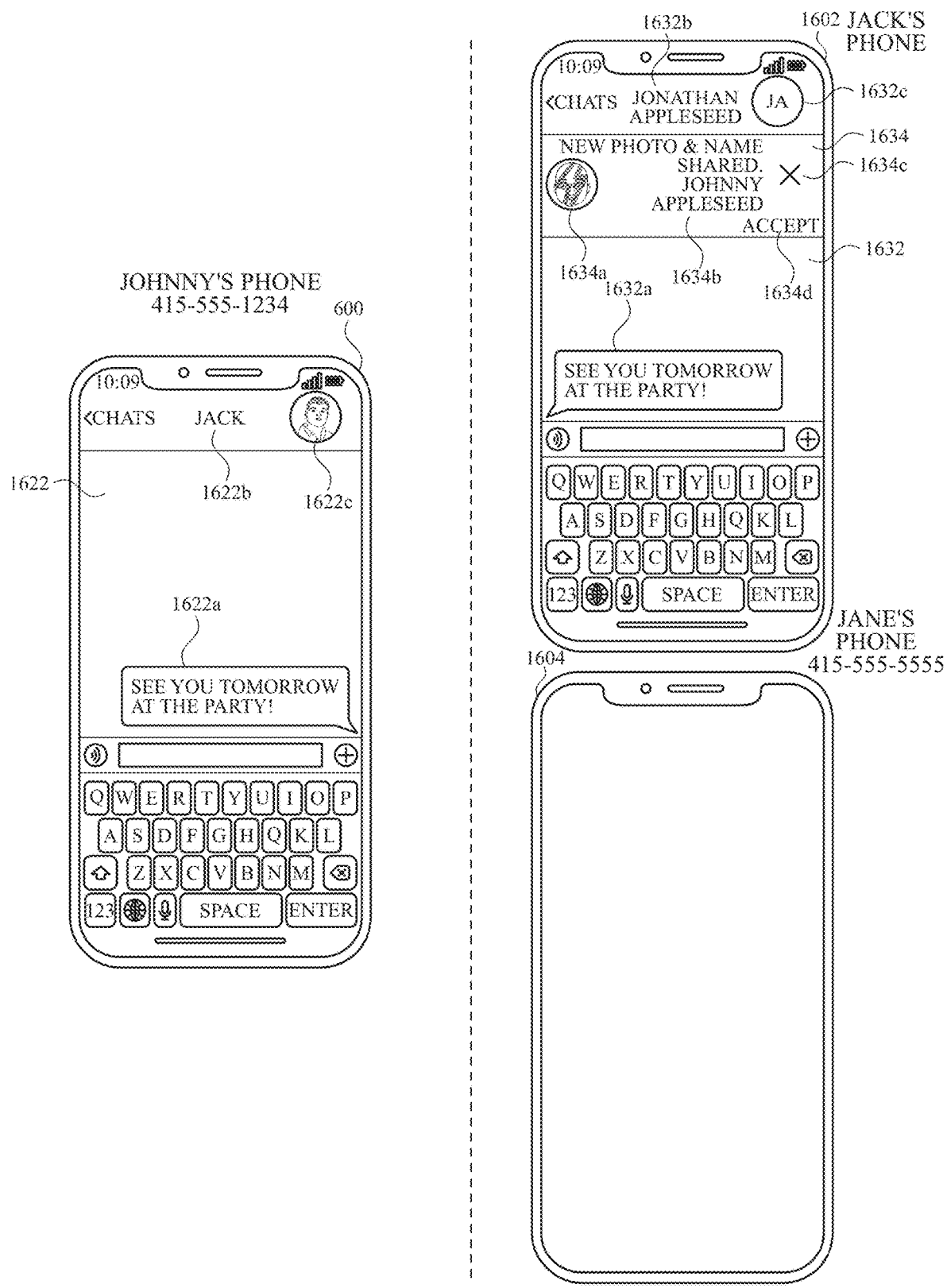

At FIG. 16G, in response to detecting tap 1660e on representation 1620d, Johnny's phone 600 displays conversation user interface 1622. Conversation user interface 1622 includes Jack's name 1622b (e.g., as entered by Johnny and stored in Johnny's address book) and representation 1622c of Jack (e.g., an image, as selected by Johnny). As illustrated in FIG. 16G, Johnny has just sent (e.g., after setting up name and photo sharing) Jack a message 1622a. Because Johnny has recently updated his contact information (his name and his photo) and because Jack has an entry in Johnny's address book (since Johnny selected to share his contact information with "contacts only"), Johnny's phone 600 transmits Johnny's updated contact information to Jack's phone 1602. In some embodiments, the updated contact information is transmitted in conjunction with message 1622a. In some embodiments, the updated contact information is transmitted a predetermined time after transmitting message 1622a. In contrast, because Johnny has not sent Jane a message (and also because Jane is not in Johnny's address book), Johnny's phone 600 does not transmit Johnny's updated contact information to Jane's phone 1604. In this example, because Johnny has updated both his name and his photo, Johnny's phone 600 transmits both the new name and the new photo to Jack's phone 1604.

At FIG. 16G, Jack's phone 1602 displays conversation user interface 1632 (e.g., in response to receiving a request from Jack to display the messaging conversation). Conversation user interface 1632 includes Johnny's name 1632b

(e.g., as entered by Jack) and representation 1632c of Johnny (e.g., a monogram "JA", as selected by Jack), both of which are retrieved from Jack's address book entry 1612 for Johnny. As illustrated in FIG. 16G, Jack's phone 1602 has received Johnny's message 1632a and updated contact information. Jack's phone 1602 displays message 1632a (corresponding to message 1622a) concurrently with notification 1634. Notification 1634 includes Johnny's new photo 1634a (an avatar) and Johnny's new name 1634b ("JOHNNY APPLESEED"). Although Jack's phone 1602 has received this information, Jack's address book has not automatically been updated to include this information.

Figure 16H:
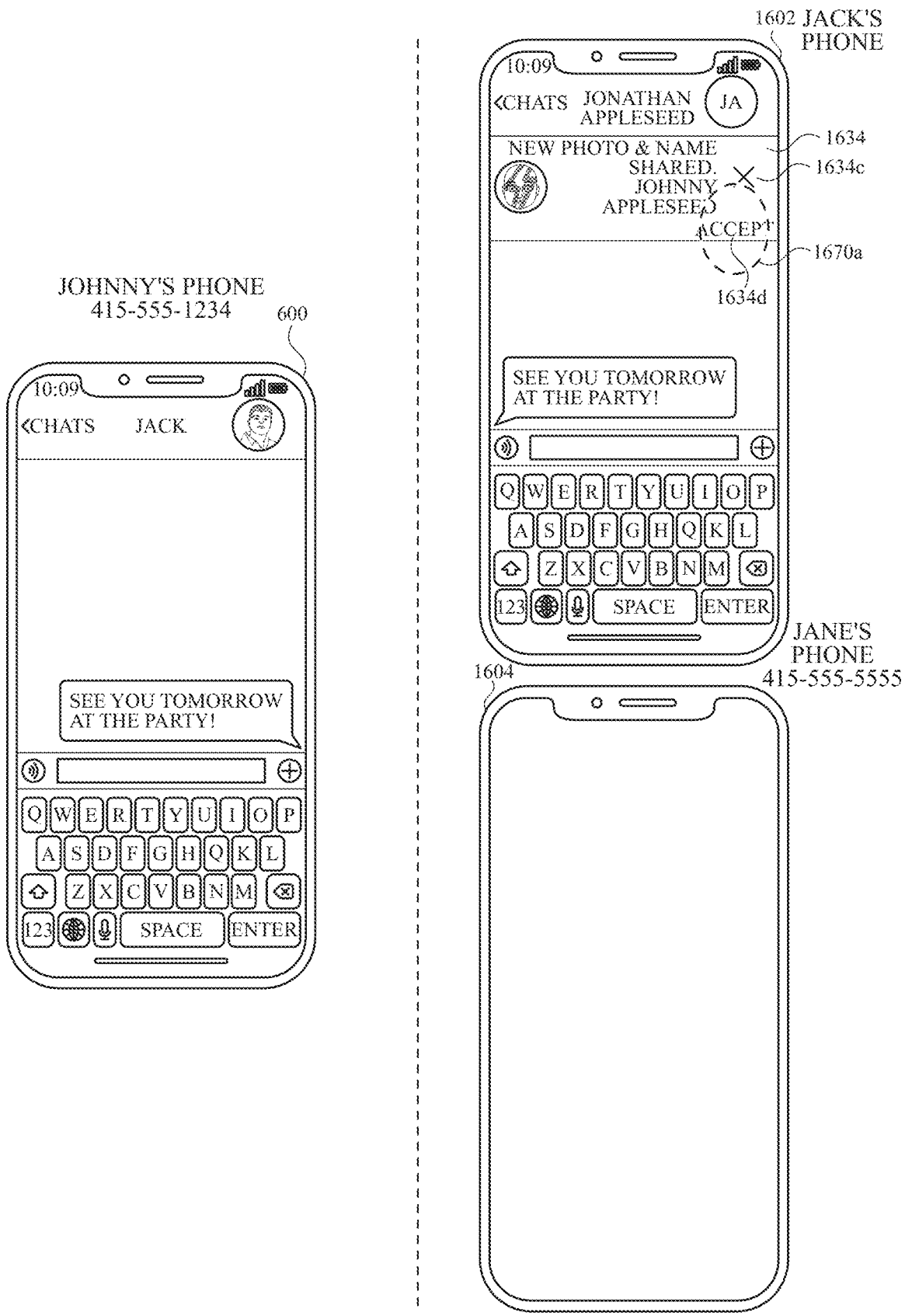

At FIG. 16H, Jack's phone 1602 detects tap 1670a on accept affordance 1634d to initiate a process for updating Jack's address book with Johnny's updated contact information. In contrast, dismiss affordance 1634c, when activated, causes notification 1634 to be dismissed without updating Jack's address book with Johnny's updated contact information.

Figure 16I:
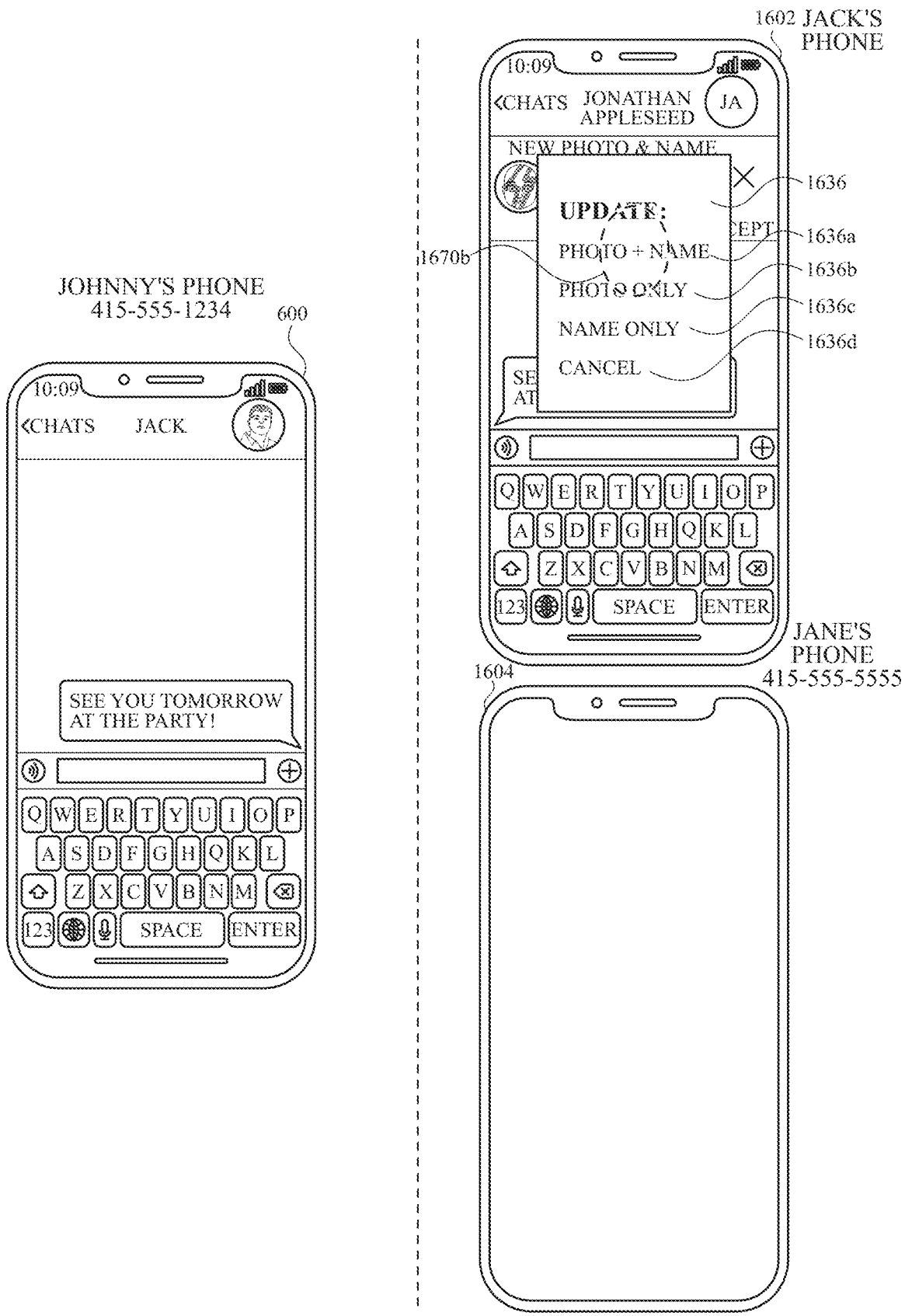

At FIG. 16I, in response to detecting tap 1670a on accept affordance 1634d, Jack's phone 1602 displays menu 1636. Menu 1636 includes a first option 1636a to update Jack's address book entry 1612 for Johnny using both the updated photo and name received from Johnny, a second option 1636b to update Jack's address book entry 1612 for Johnny using the updated photo only and not the name received from Johnny, a third option 1636c to update Jack's address book entry 1612 for Johnny using the updated name only and not the photo received from Johnny, and a fourth option 1636d to not update Jack's address book entry 1612 for Johnny using the name or photo. At FIG. 16I, Jack's phone 1602 detects tap 1670b on first option 1636a to update Jack's address book entry 1612 for Johnny using both the photo and the name received from Johnny.

Figure 16J:
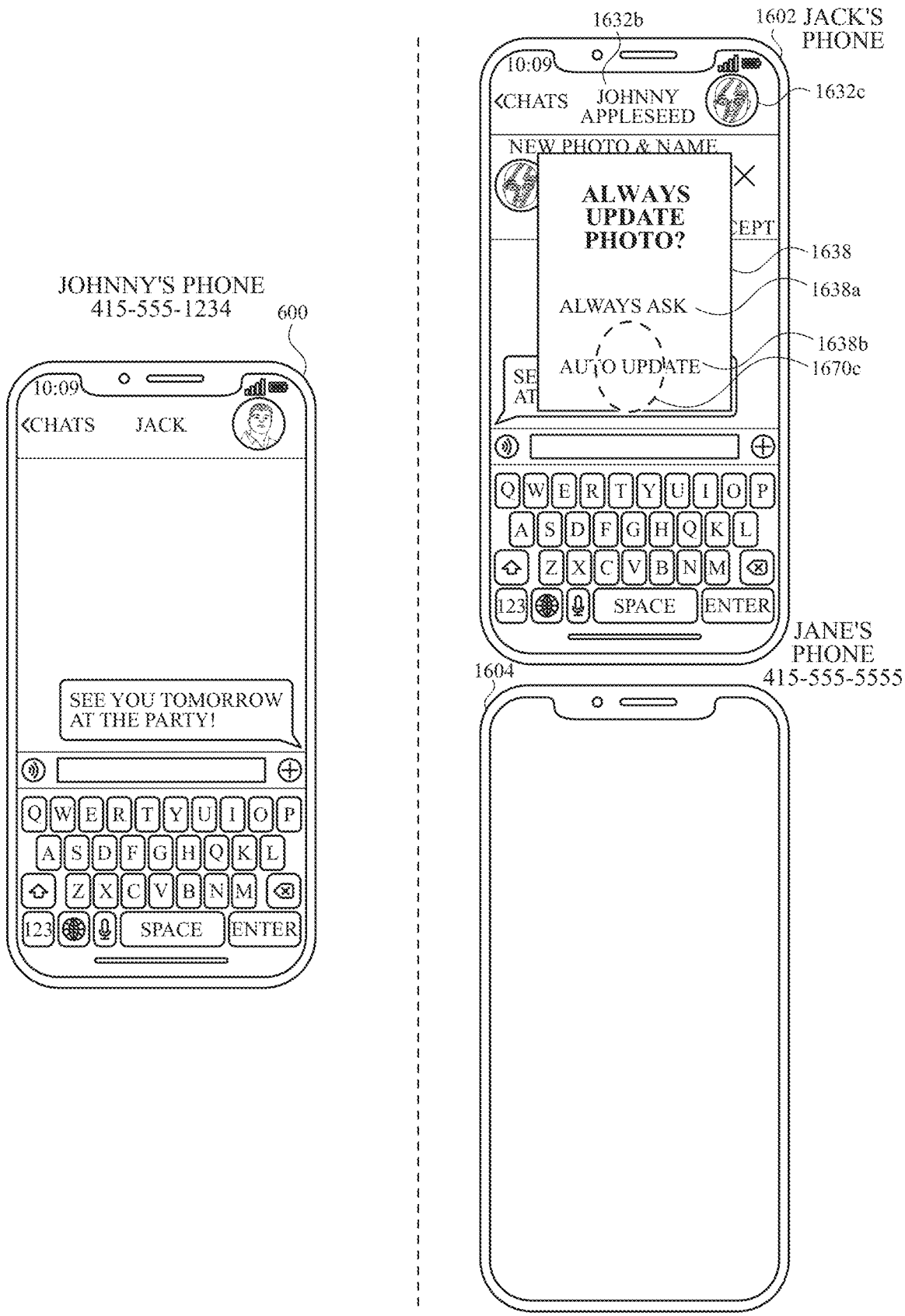

At FIG. 16J, in response to detecting tap 1670b on first option 1636a to update Jack's address book entry 1612 for Johnny using both the photo and the name, Jack's phone 1602 updates Jack's address book entry 1612 for Johnny using both the photo and the name received from Johnny. This updated is reflected in FIG. 16J, as representation 1632c for Johnny now reflects the updated photo received from Johnny and the name 1632b ("JOHNNY APPLESEED") reflects the updated name received from Johnny.

At FIG. 16J, in response to detecting tap 1670b on first option 1636a, Jack's phone 1602 displays auto update menu 1638. Auto update menu 1638 includes a first update option 1638a to configure Jack's phone 1602 to prompt Jack to approve future photo updates received from Johnny (e.g., do not automatically update Jack's address book entry 1612 for Johnny using future photos received from Johnny) and a second update option 1638b to configure device 1602 to automatically update Jack's address book entry 1612 for Johnny using future photos received from Johnny. In some embodiments, Jack's phone 1602 also provides a corresponding option to configure device 1602 to automatically update Jack's address book entry 1612 for Johnny using future names received from Johnny. At FIG. 16J, Jack's phone 1602 detects tap 1670c on second update option 1638b and, in response, configures device 1602 to automatically update Jack's address book entry 1612 for Johnny using future photos received from Johnny (e.g., received as part of updated contact information in conjunction with receiving a message).

Figure 16K:
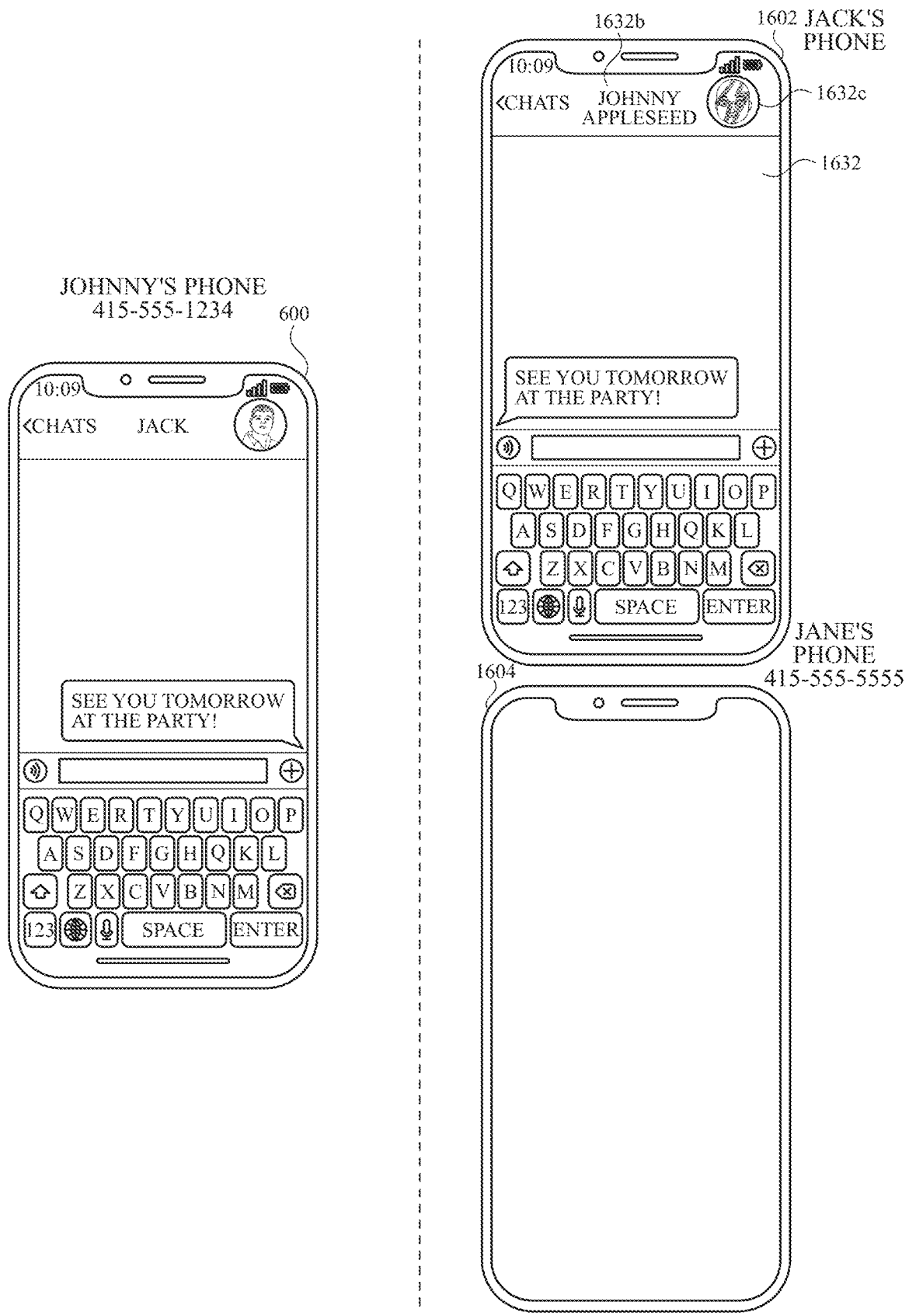

As illustrated in FIG. 16K, Jack's phone 1602 has updated Jack's address book using the updated contact information received from Johnny. Thus, Jack's phone displays conversation user interface 1632 including the updated name "JOHNNY APPLESEED" 1632b (e.g., as received from Johnny) and updated representation 1632c of Johnny (e.g., an avatar, as received from Johnny).

Figure 16L:
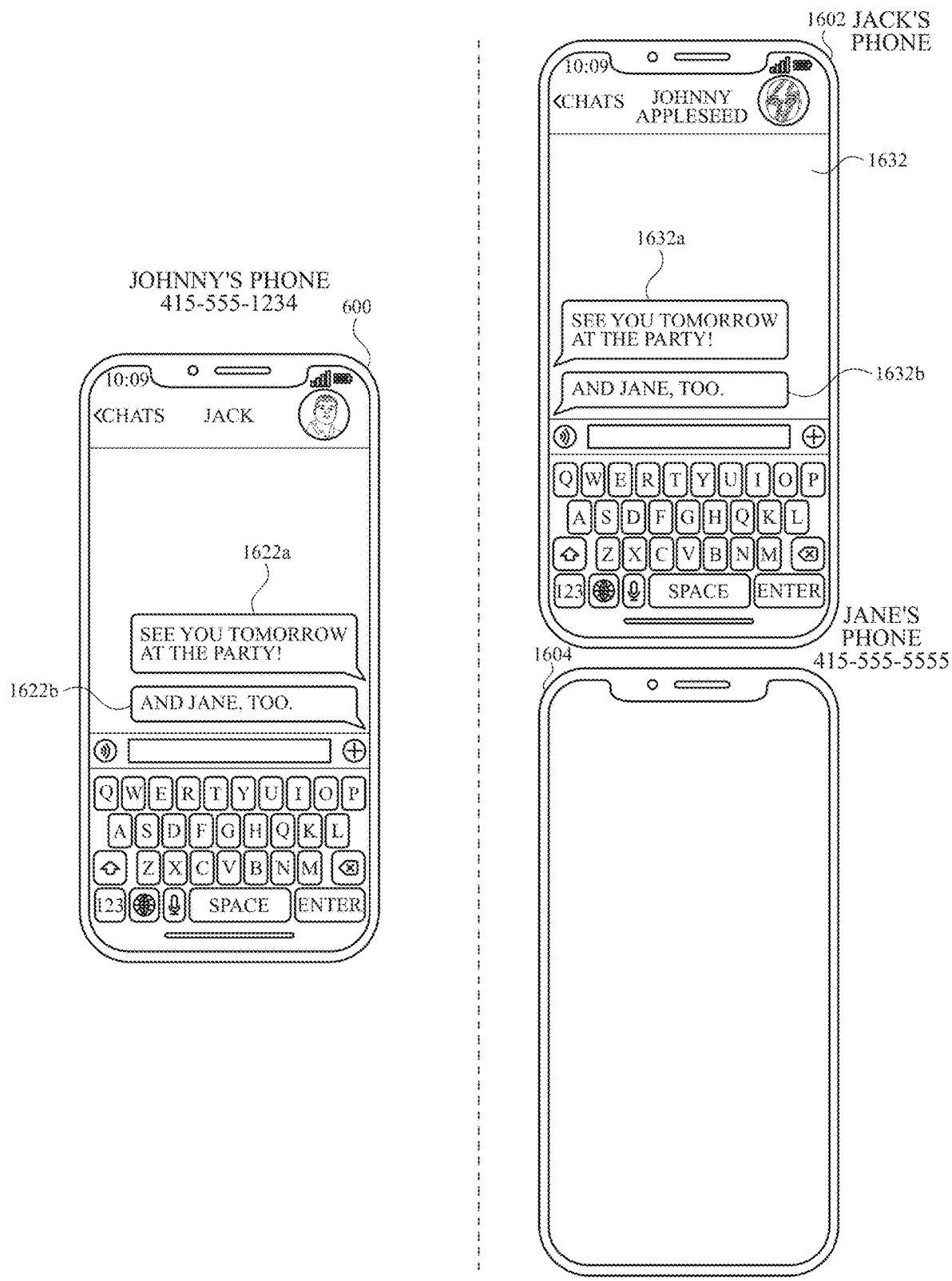

At FIG. 16L, Johnny has transmitted a second message 1622b to Jack. However, because Johnny's phone 600 has not received updates to Johnny's contact information (e.g., Johnny hasn't changed has photo or name) since the last time Johnny's phone 600 transmitted updated contact information to Jack, Johnny's phone 600 transmits the second message 1622b to Jack without transmitting updates to Johnny's contact information. Thus, in some embodiments, updates to contact information are transmitted to recipients of a message, in conjunction with the message, when the contact information has been updated since the last transmission of contact information to those recipients (and not when the contact information has not been updated since the last transmission of contact information to those recipients). Accordingly, at FIG. 16L, Jack's phone 1602 displays the second message 1632b without displaying a notification of updated contact information (e.g., in contrast to FIG. 16G).

Figure 16M:
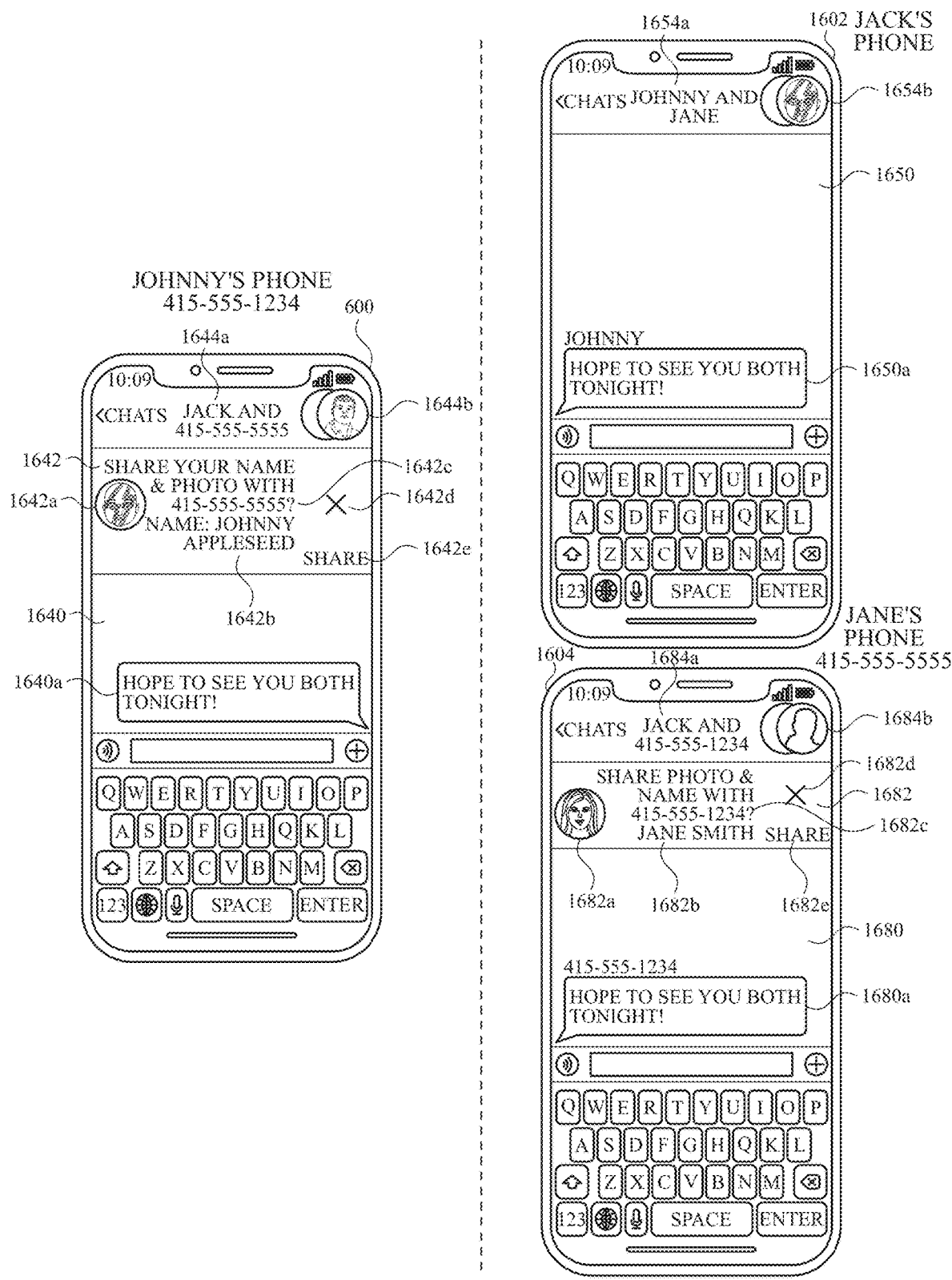

At FIG. 16M, Johnny's phone 600 receives user input (e.g., via the displayed keyboard) and, in response, transmits message 1640a to both Jack and Jane via group message conversation 1640. Jack is an approved recipient for Johnny's contact information because Jack is in Johnny's address book. However, Johnny's phone 600 does not transmit updated contact information to Jack's phone 1602 because, as before, Johnny has not updated his contact information since the last time Johnny's phone 600 transmitted updated contact information to Jack. In contrast, in view of Johnny's selection of contacts only option 1616j, Jane is not an approved recipient for Johnny's contact information because Johnny's address book does not have an entry for Jane. Thus, although Johnny has updated his contact information, Johnny's phone 600 does not transmit the updated contact information to Jane's phone 1604.

As shown in FIG. 16M, Johnny's phone 600 displays that message 1640a has been transmitted to Jack and 415-555-1234 (which is Jane's phone number), as indicated by name and number 1644a for group message conversation 1640 and photos 1644b representing Jack and Jane. In addition, in accordance with a determination that updated contact information for Johnny is available to be sent to Jane and that Jane is not an approved recipient for Johnny's contact information, Johnny's phone 600 displays notification 1642 for transmitting Johnny's updated contact information to Jane. Notification 1642 includes an indication 1642c ("415-555-5555") of the proposed recipient of the contact information, and the contact information 1642a-1642b (Johnny's photo and name) proposed to be shared. Dismiss affordance 1642d, when activated, dismisses notification 1642 without transmitting Johnny's updated contact information to Jane. Share affordance 1642e, when activated, transmits Johnny's updated contact information to Jane.

At FIG. 16M, Jack's phone 1602 displays (as part of group message conversation 1650) message 1650a, which was received from Johnny, but does not display any notification for updated contact information (because no updated contact information has been received). Group message conversation 1650 includes name indications 1654a and photos 1654b of the other conversation participants.

At FIG. 16M, Jane's phone 1604 displays (as part of group message conversation 1680) message 1680a, which was received from Johnny. Group message conversation 1680 also includes name/number indications 1684a and photos 1684b of the other conversation participants. Because Jane has received a message from Johnny and because Jane has updated contact information to share with Johnny, Jane's phone 1604 displays notification 1682 for transmitting Jane's updated contact information to Johnny. Notification 1682 includes an indication 1682*c* ("415-555-1234") of the proposed recipient of the contact information, and the contact information 1682*a*-1682*b* (Jane's photo and name) proposed to be shared. Dismiss affordance 1682*d*, when activated, dismisses notification 1682 without transmitting Jane's contact information to Johnny. Share affordance 1682*e*, when activated, transmits Jane's contact information to Johnny.

Figure 16N:
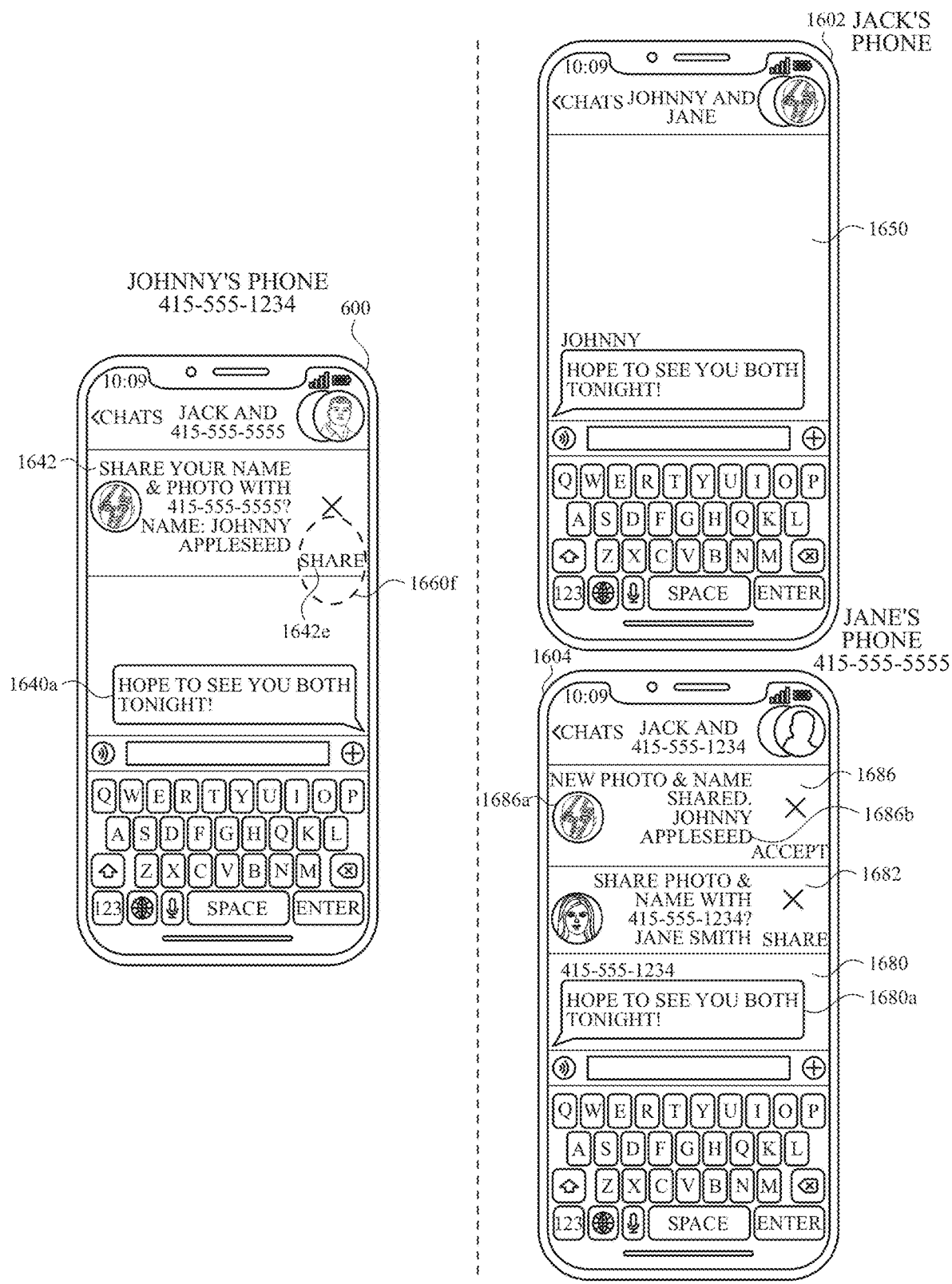

At FIG. 16N, Johnny's phone 600 detects tap 1660*f* on share affordance 1642*e*. In response to detecting tap 1660*f* on share affordance 1642*e*, Johnny's phone 600 transmits Johnny's contact information to Jane. As illustrated in FIG. 16N, in response to receiving Johnny's contact information, Jane's phone 1604 displays a second notification 1686 concurrently with notification 1682 and message 1680*a* (corresponding to message 1640*a*).

Notification 1686 includes Johnny's new photo 1686*a* (an avatar corresponding to 1616*e* of FIG. 16C) and Johnny's name 1686*b* (corresponding to 1616*f*-1616*g* of FIG. 16C), as received from Johnny. Although Jane's phone 1604 has received this new contact information, Jane's address book has not automatically been updated to include this information.

Figure 16O:
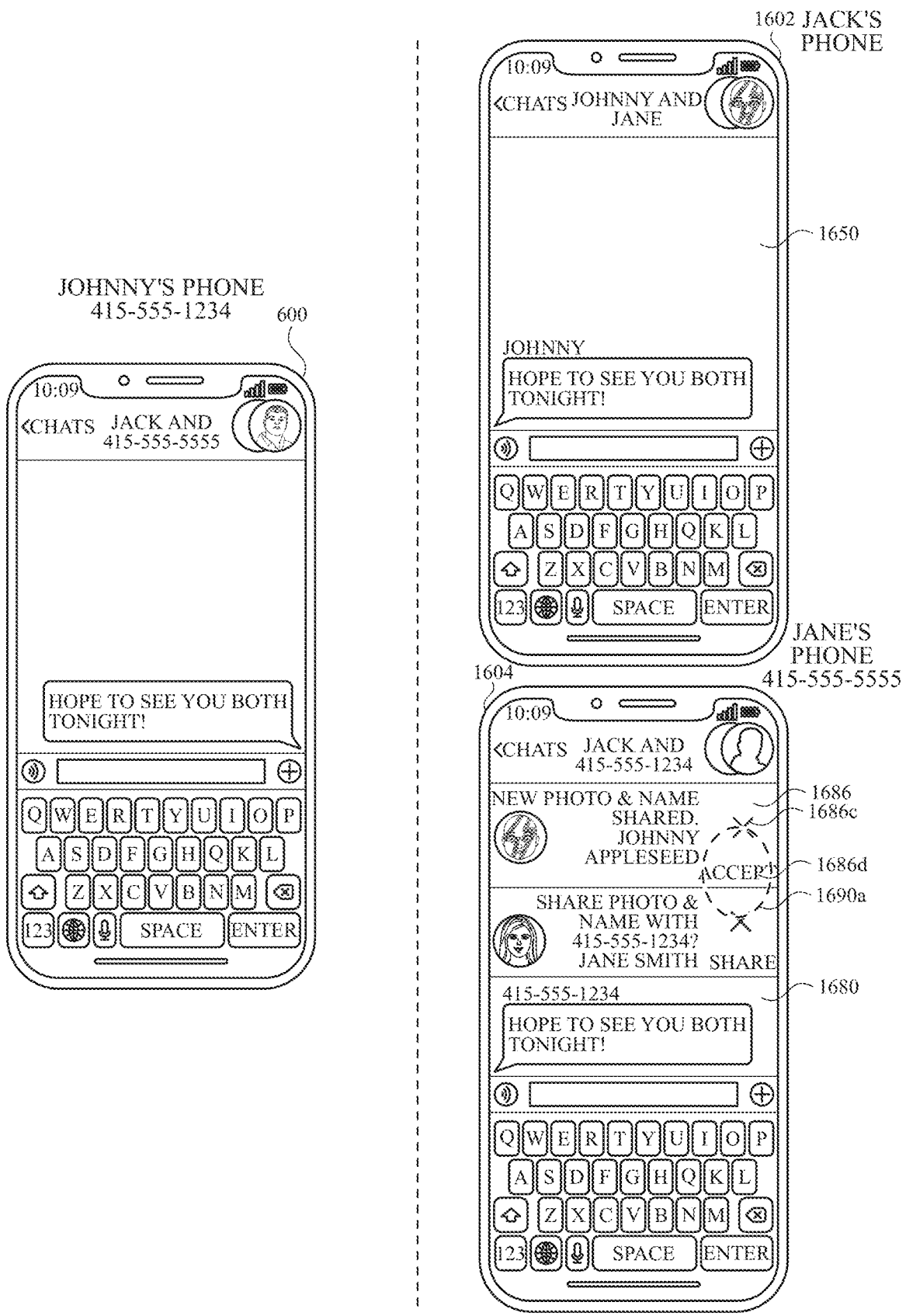

At FIG. 16O, Johnny's phone 600 ceases to display notification 1642 because Johnny's contact information has been transmitted to Jane. At FIG. 16O, Jane's phone 1604 detects tap 1690*a* on accept affordance 1686*d* to initiate a process for updating Jane's address book to include Johnny's contact information. In contrast, dismiss affordance 1686*c*, when activated, causes notification 1686 to be dismissed without initiating the process for updating Jane's address book to include Johnny's contact information.

Figure 16P:
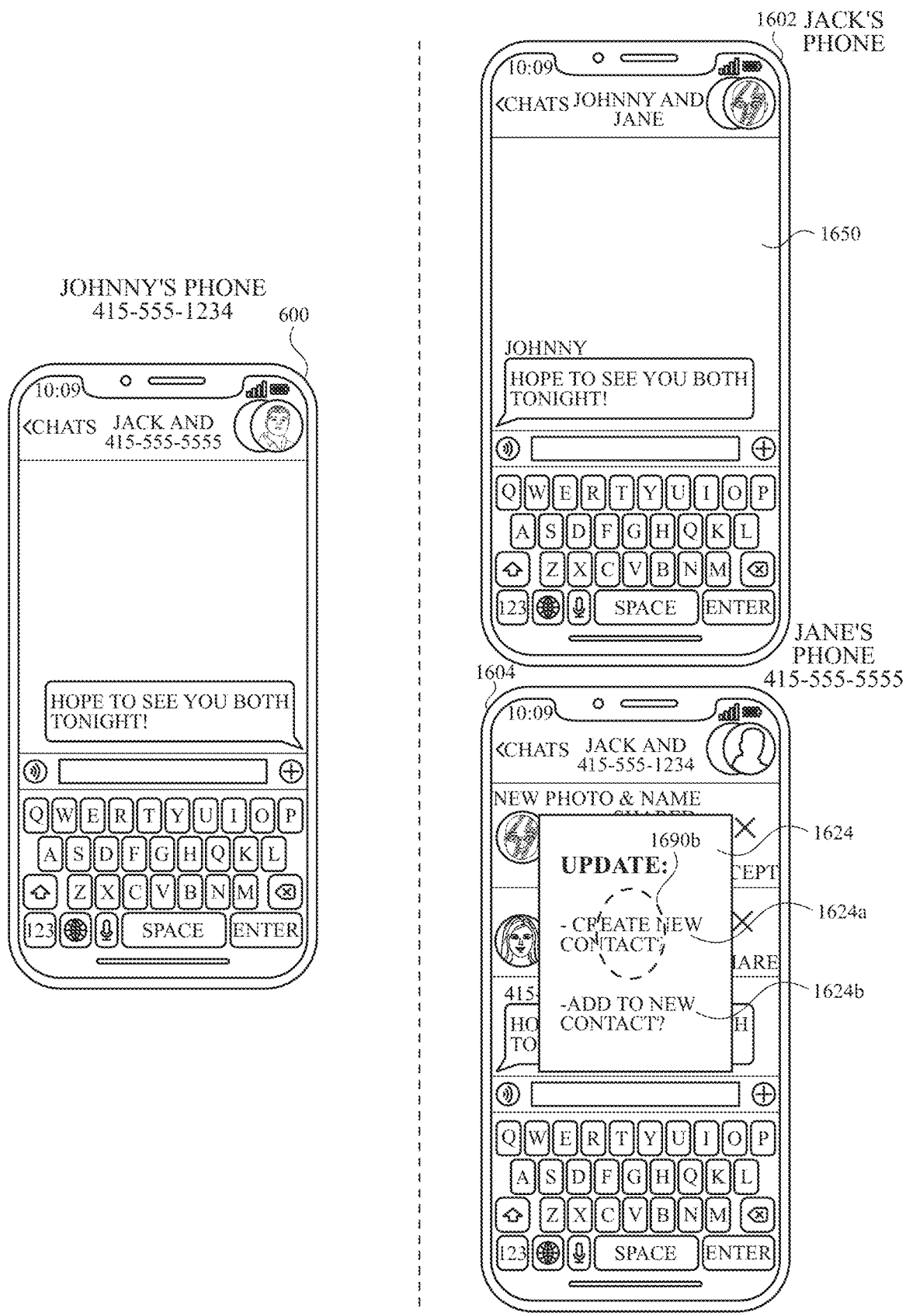

At FIG. 16P, in response to detecting tap 1690*a* on accept affordance 1686*d*, Jane's phone 1604 displays menu 1624. Menu 1624 includes a first option 1624*a* to update Jane's address book to add a new entry for Johnny (e.g., using the photo and/or the name received from Johnny) and a second option 1624*b* to update an existing entry in Jane's address book using the photo and/or name received from Johnny (without adding a new entry in the address book). At FIG. 16P, Jane's phone 1604 detects tap 1690*b* on first option 1624*a* to update Jane's address book to add a new entry for Johnny using the contact information received from Johnny.

Figure 16Q:
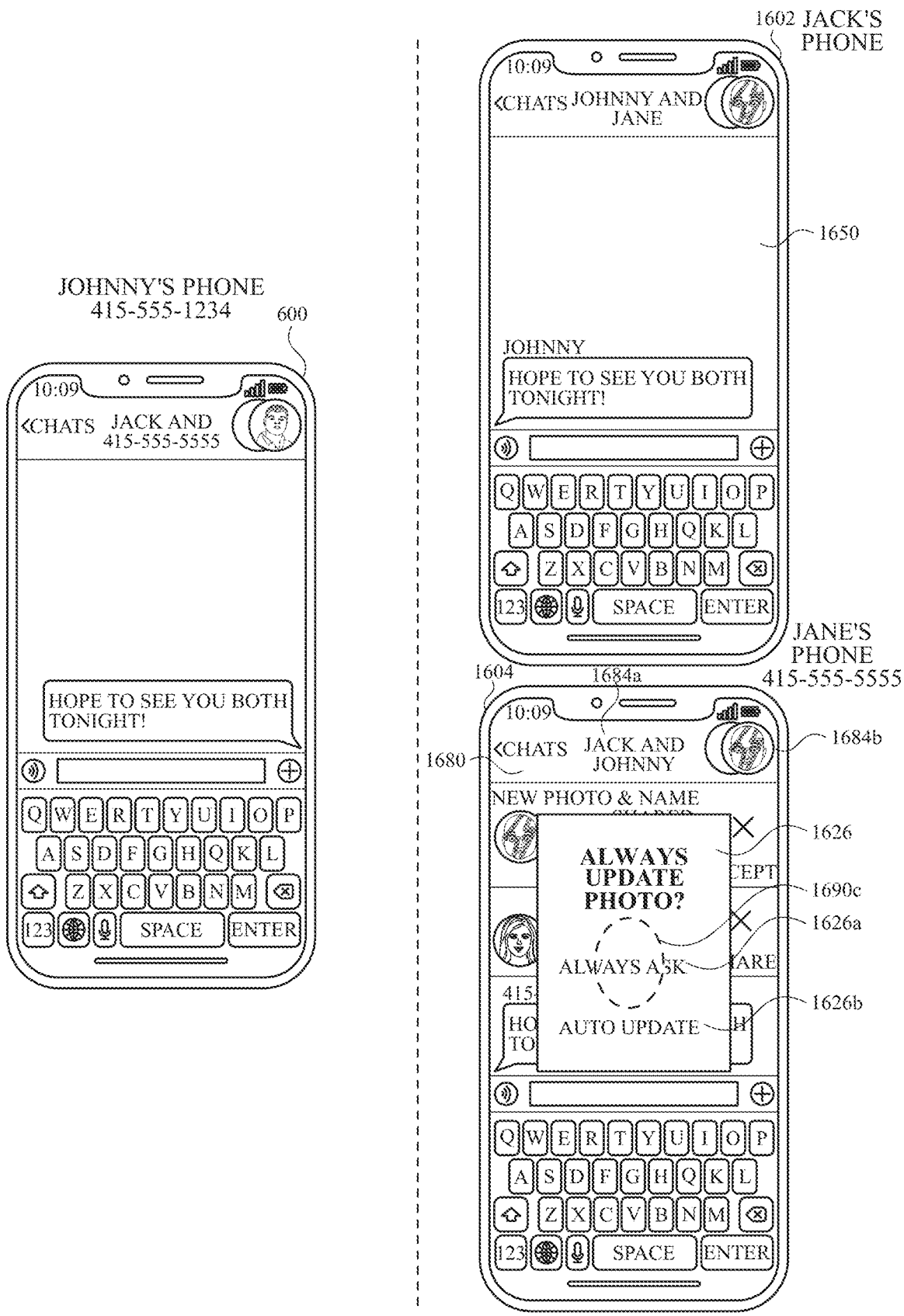

At FIG. 16Q, in response to detecting tap 1690*b* on first option 1624*a*, Jane's phone 1604 displays auto update menu 1626. Auto update menu 1626 includes a first update option 1626*a* to configure Jane's phone 1604 to prompt Jane to approve future photo updates received from Johnny (e.g., do not automatically update Jane's address book entry for Johnny using future photos received from Johnny) and a second update option 1626*b* to configure device 1604 to automatically update Jane's address book entry for Johnny using future photos received from Johnny. In some embodiments, Jane's phone 1604 also provides a corresponding option to configure Jane's phone 1604 to automatically update Jane's address book entry for Johnny using future names received from Johnny. At FIG. 16Q, Jane's phone 1604 has added a new entry for Johnny in Jane's address book by using the photo and the name received from Johnny, as evidenced by group message conversation 1680 being updated to include Johnny's name ("JOHNNY") in indication 1684*a* and Johnny's photo as part of photos 1684*b*.

In some embodiments, Jane's phone 1604 also provides (e.g., prior to displaying auto update menu 1626) a first option to update Jane's address book entry for Johnny using both the photo and the name received from Johnny, a second option to update Jane's address book entry for Johnny using the photo only and not the name received from Johnny, and a third option to update Jane's address book entry for Johnny using the name only and not the photo received from Johnny.

At FIG. 16Q, Jane's phone 1604 detects tap 1690*c* on first update option 1626*a*, and in response, configures device 1604 to prompt Jane to approve future photo updates received from Johnny before updating Jane's address book entry for Johnny with the updated photo (e.g., do not automatically update Jane's address book entry for Johnny using future photos received from Johnny). At FIG. 16R, Jane's phone 1604 ceases to display notification 1686, but continues to display notification 1682 because Jane's phone 1604 has not received a tap on dismiss affordance 1682*d* (which, when activated, dismisses notification 1682 without transmitting Jane's contact information to Johnny) or share affordance 1682*e* (which, when activated, transmits Jane's contact information to Johnny).

Figure 16R:
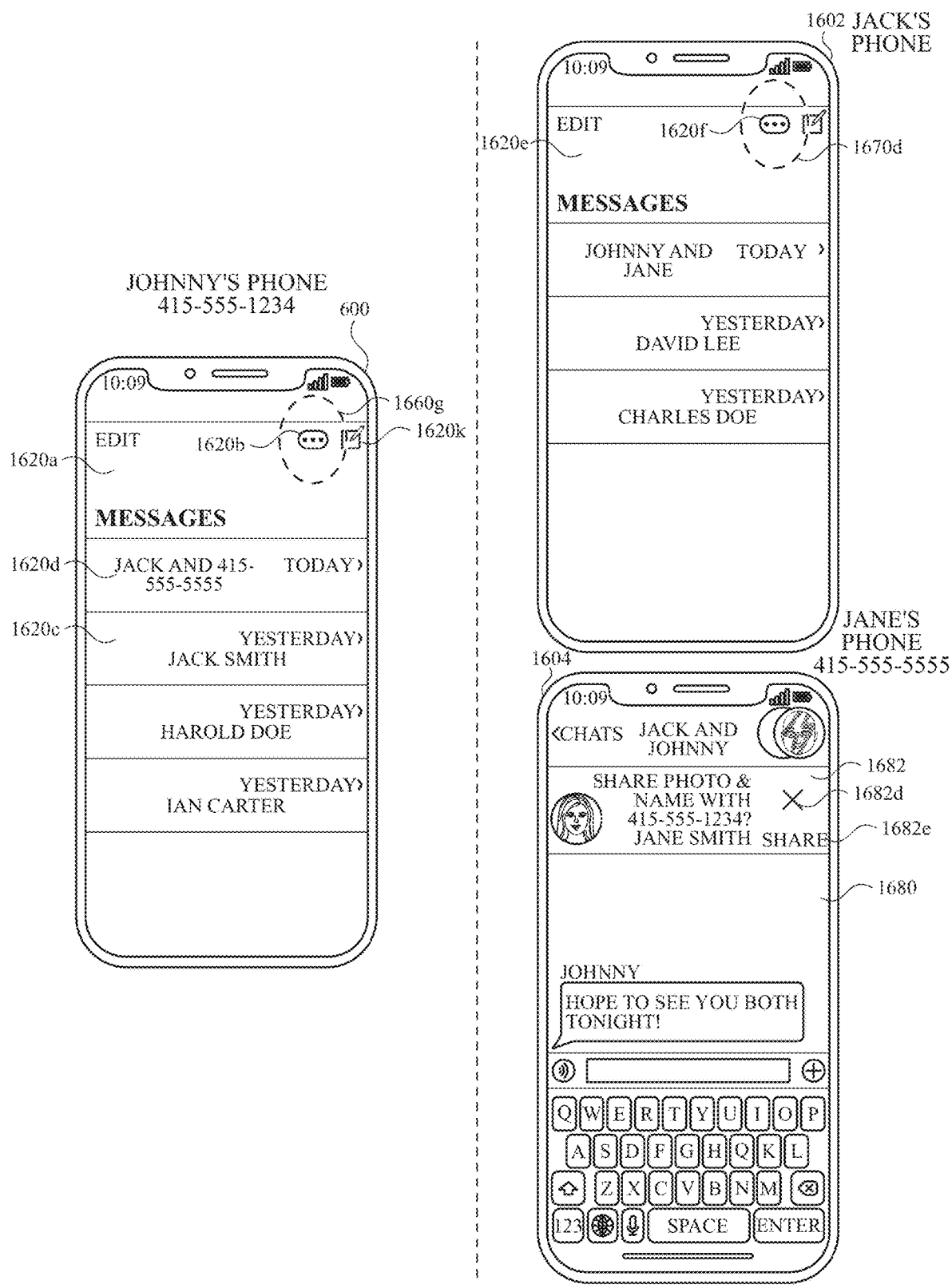

At FIG. 16R, both Johnny and Jack start a process to change their names and/or photos. Johnny's phone 600 displays, at FIG. 16R, a list of messaging conversations as part of conversations list user interface 1620*a*, including settings affordance 1620*b*. Johnny's phone 600 detects tap 1660*g* on settings affordance 1620*b*. Similarly, Jack's phone 1602 displays, at FIG. 16R, a list of messaging conversations as part of conversations list user interface 1620*e*, including settings affordance 1620*f*. Jack's phone 1602 detects tap 1670*d* on settings affordance 1620*f*.

Figure 16S:
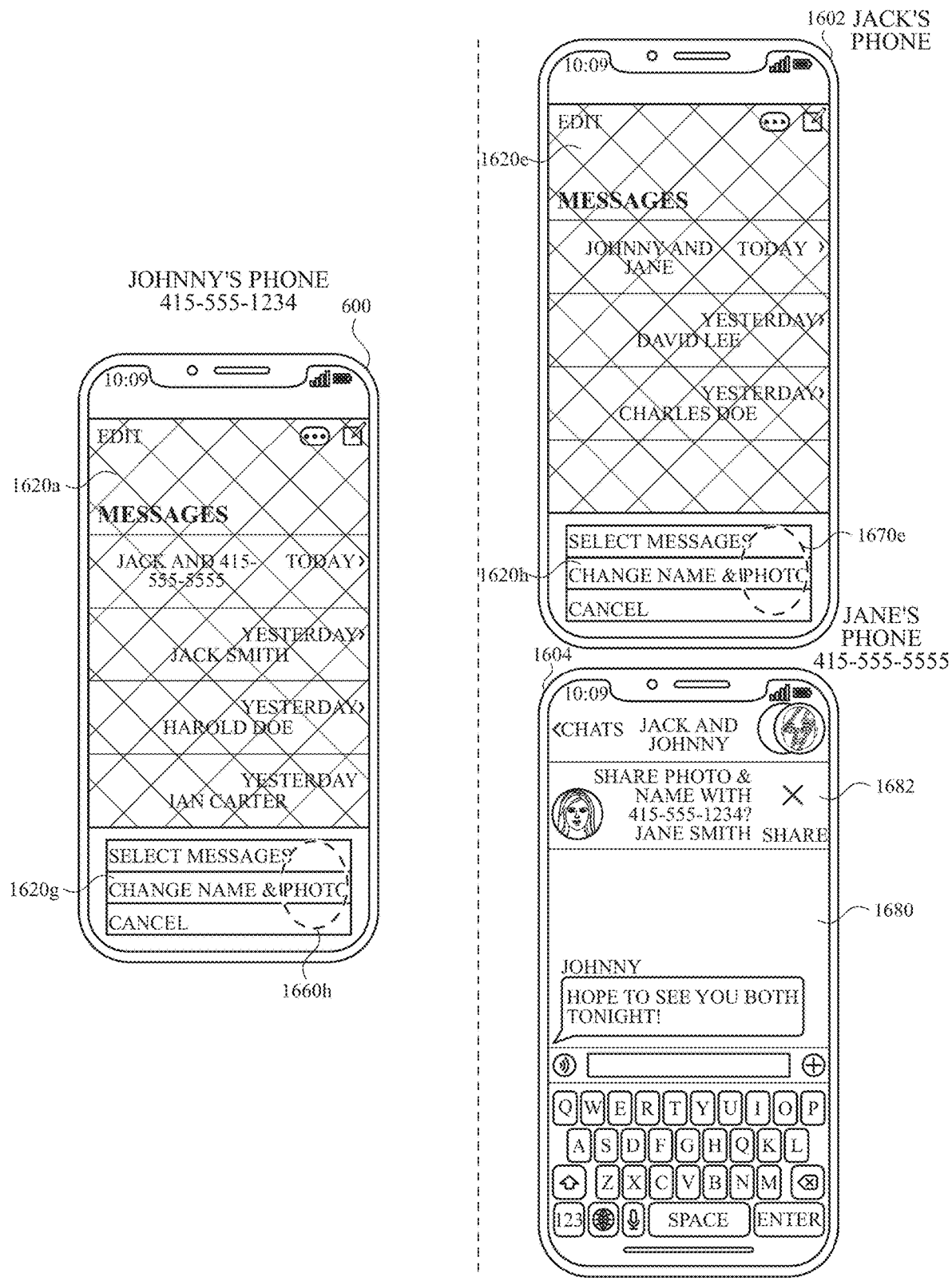

At FIG. 16S, in response to tap 1660*g* on settings affordance 1620*b*, Johnny's phone 600 blurs out conversations list user interface 1620*a* and displays a menu with option 1620*g* to change Johnny's name and/or photo. Similarly, at FIG. 16S, in response to tap 1670*d* on settings affordance 1620*f*, Jack's phone 1602 blurs out conversations list user interface 1620*e* and displays a menu with option 1620*h* to change Jack's name and/or photo.

At FIG. 16S, Johnny's phone 600 detects tap 1660*h* on option 1620*g* to change Johnny's name and/or photo and Jack's phone 1602 detects tap 1670*e* on option 1620*h* to change Jack's name and/or photo.

Figure 16T:
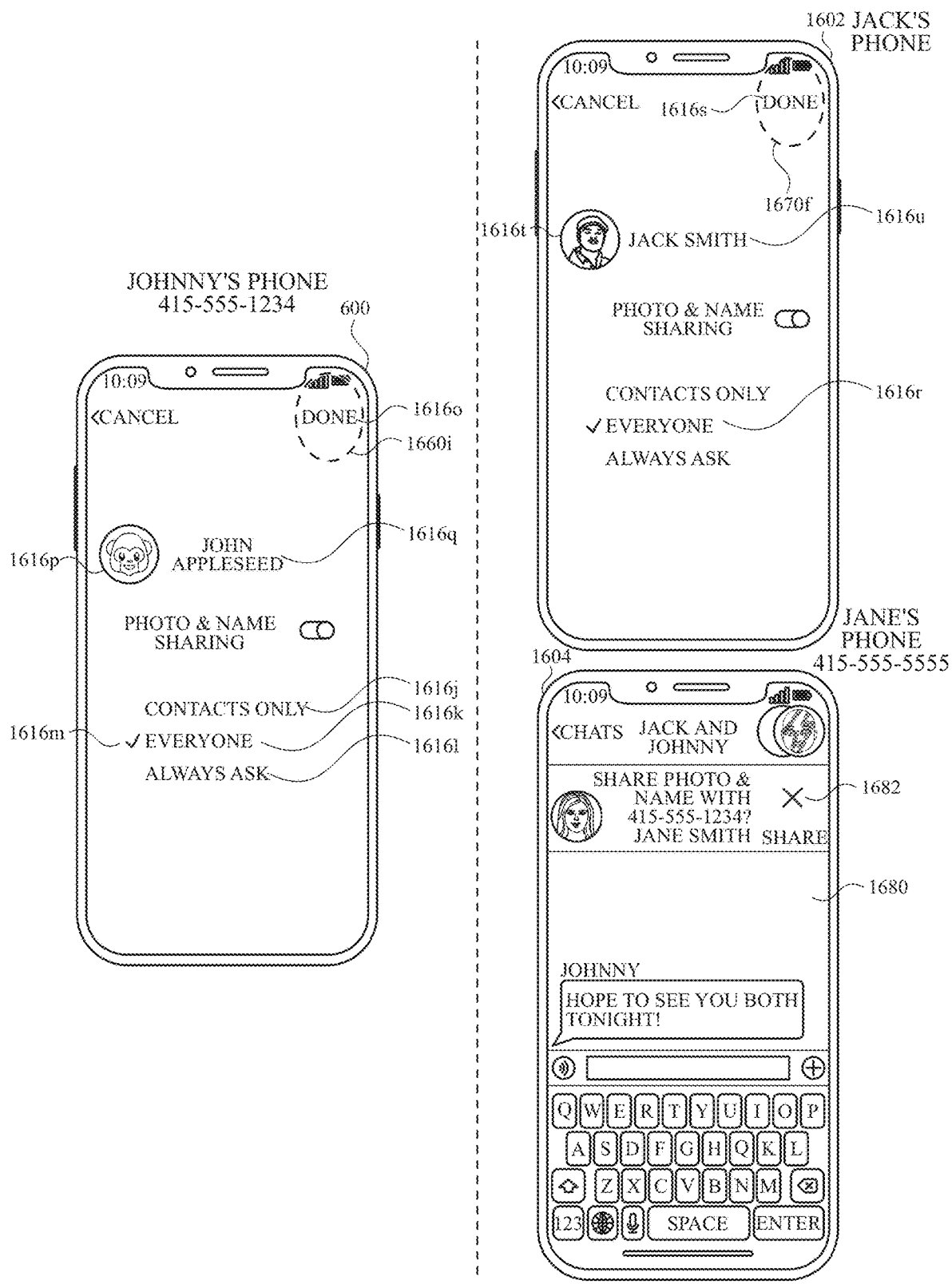

At FIG. 16T, Johnny's phone 600 displays a name/photo change user interface and detects a set of inputs to: (1) change Johnny's name from "JOHNNY APPLESEED" to "JOHN APPLESEED" 1616*q*, (2) change Johnny's photo to monkey photo 928 (e.g., corresponding to 928 of FIG. 9F, using the technique described above with respect to FIGS. 9E-9AG), and (3) select everyone option 1616*k* (as compared to contacts only option 1616*j*). Everyone option 1616*k* is an option which enables Johnny's phone 600 to share Johnny's updated contact information (e.g., name, photo) with all individuals, regardless of whether they have an entry in Johnny's address book 1610 (e.g., Jack and Jane). At FIG. 16T, Johnny's phone 600 detects a tap 1660*i* on done affordance 1616*o*.

At FIG. 16T, Jack's phone 1602 similarly detects a set of inputs to: (1) change Jack's photo to a new photo 1616*t* (e.g., using the technique described above with respect to FIGS. 9E-9AG) and (2) select everyone option 1616*r*. Jack does not change his name 1616*u*. Everyone option 1616*r* is an option which enables Jack's phone 1602 to share Jack's updated contact information (e.g., name, photo) with all individuals, regardless of whether they have an entry in Jack's address book. At FIG. 16T, Jack's phone 1602 detects tap 1670*f* on done affordance 1616*s*.

Figure 16U:
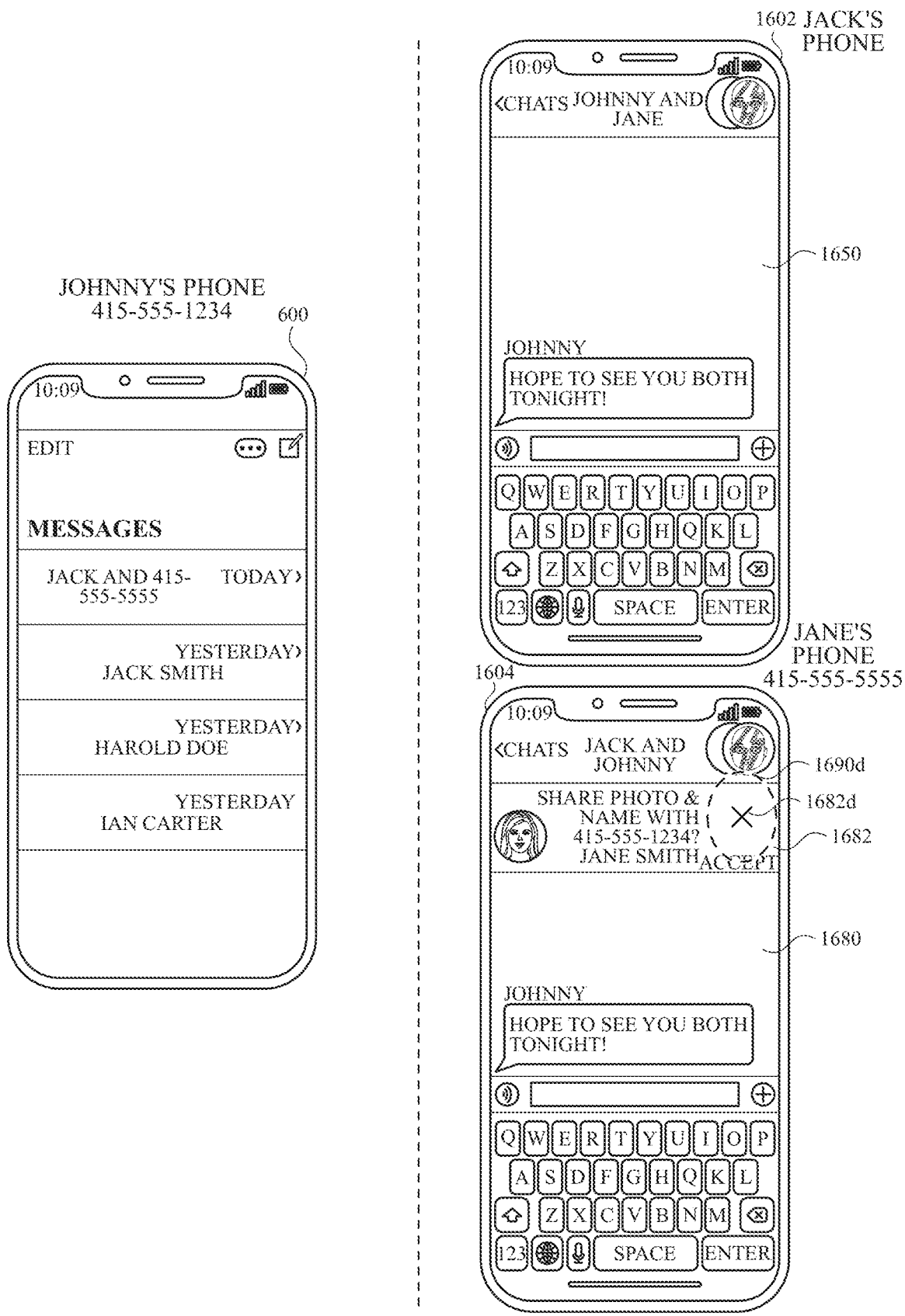

As illustrated in FIGS. 16T-16U, Johnny's phone 600 does not transmit updated contact information to Jane or Jack (because Johnny has not sent a message to Jane or Jack after Johnny updated his contact information), and Jack's phone 1602 does not transmit updated contact information to Jane or Johnny (because Jack has not sent a message to Jane or Johnny after Jack updated his contact information).

Figure 16V:
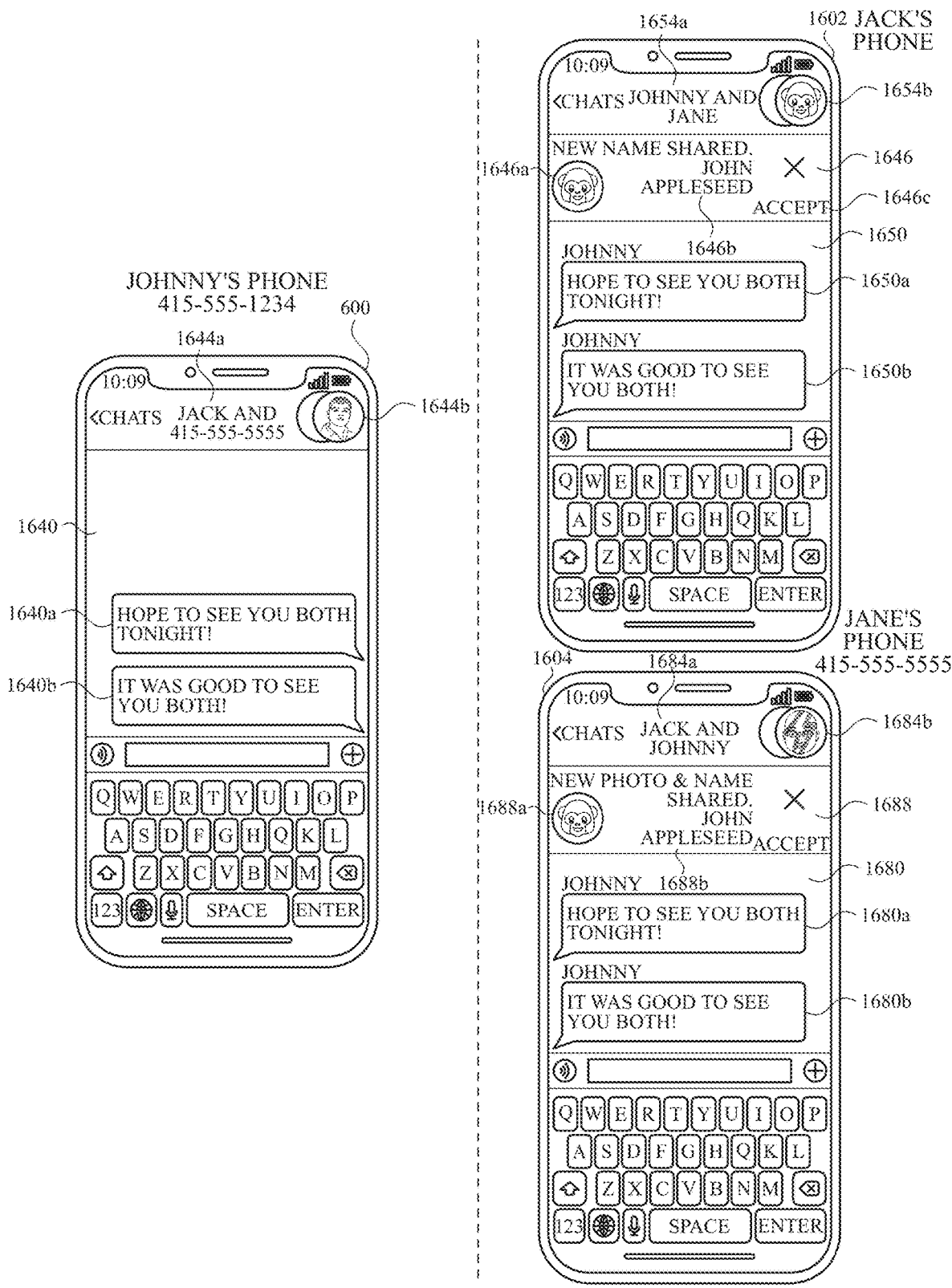

At FIG. 16U, Jane's phone 1604 detects tap 1690d on dismiss affordance 1682d and, in response, Jane's phone 1604 dismisses (e.g., stop displaying) notification 1682, as shown in FIG. 16V.

At FIG. 16V, Johnny's phone 600 receives user input (e.g., via the displayed keyboard) and, in response, transmits message 1640b to both Jack and Jane via group message conversation 1640. Jack is an approved recipient for Johnny's contact information because Johnny has selected to share his contact information with everyone, regardless of whether they are in Johnny's address book (and in this example, Jack is in Johnny's address book). Jane is also an approved recipient for Johnny's contact information because Johnny has selected to share his contact information with everyone, regardless of whether they are in Johnny's address book (and in this example, Jane is not in Johnny's address book). Johnny's phone 600 transmits Johnny's updated contact information to Jack's phone 1602 and Jane's phone 1604 because Johnny has updated his contact information since the last time Johnny's phone 600 transmitted contact information to Jack and Jane. Johnny's phone 600 transmits Johnny's updated contact information to Jack's phone 1602 and Jane's phone 1604 in conjunction with transmitting message 1640b.

As shown in FIG. 16V, Johnny's phone 600 displays that message 1640b has been transmitted to Jack and 415-555-1234 (which is Jane's phone number), as indicated by name and number 1644a for group message conversation 1640 and photos 1644b representing Jack and Jane.

At FIG. 16V, Jack's phone 1602 displays (as part of group message conversation 1650) message 1650b (corresponding to message 1640b), which was received from Johnny, and concurrently displays notification 1646 for Johnny's updated name as part of Johnny's updated contact information. Jack's phone 1602 has received both Johnny's updated photo (monkey photo) and updated name ("JOHN APPLESEED"). Because Jack's phone 1602 is configured to automatically update Jack's address book entry 1612 for Johnny using photos received from Johnny (e.g., based on tap 1670c in FIG. 16J), Jack's address book entry 1612 for Johnny has been automatically updated (e.g., without requiring additional user input at Jack's phone 1602 after receiving the updated photo) using Johnny's new photo, as reflected by monkey photo 1654b in FIG. 16V. Because Jack's phone 1602 is not configured to automatically update Jack's address book entry 1612 for Johnny using updated names received from Johnny, Jack's address book entry 1612 for Johnny has not been automatically updated to reflect Johnny's new name ("JOHN APPLESEED"), as evidenced by name indications 1654a (still including "JOHNNY"). Instead of automatically updating Johnny's name in Jack's address book, at FIG. 16V, Jack's phone 1602 displays notification 1646. Notification 1646 includes Johnny's new photo 1646a and Johnny's new name ("JOHN APPLESEED") 1646b.

At FIG. 16V, Jane's phone 1604 displays (as part of group message conversation 1680) message 1680b (corresponding to message 1640b), which was received from Johnny, and concurrently displays notification 1688 for Johnny's updated contact information (name and photo). Jane's phone 1604 has received both Johnny's updated photo (monkey photo) and updated name ("JOHN APPLESEED"). Because Jane's phone 1604 is not configured to automatically update Jane's address book entry for Johnny using names or photos received from Johnny (e.g., based on tap 1690c in FIG. 16Q), Jane's address book entry for Johnny has not been automatically updated using Johnny's new name or photo, as reflected by Johnny's old photo 1684b in FIG. 16V (as compared to Johnny's new photo 1688a in notification 1688) and by Johnny's old name ("JOHNNY") in name indications 1684a (as compared to Johnny's new name 1688b ("JOHN APPLESEED") in notification 1688). Instead of automatically updating Johnny's name and photo in Jane's address book, at FIG. 16V, Jane's phone 1604 displays notification 1688. Notification 1688 includes Johnny's new photo 1688a and Johnny's new name ("JOHN APPLESEED") 1688b.

Figure 16W:
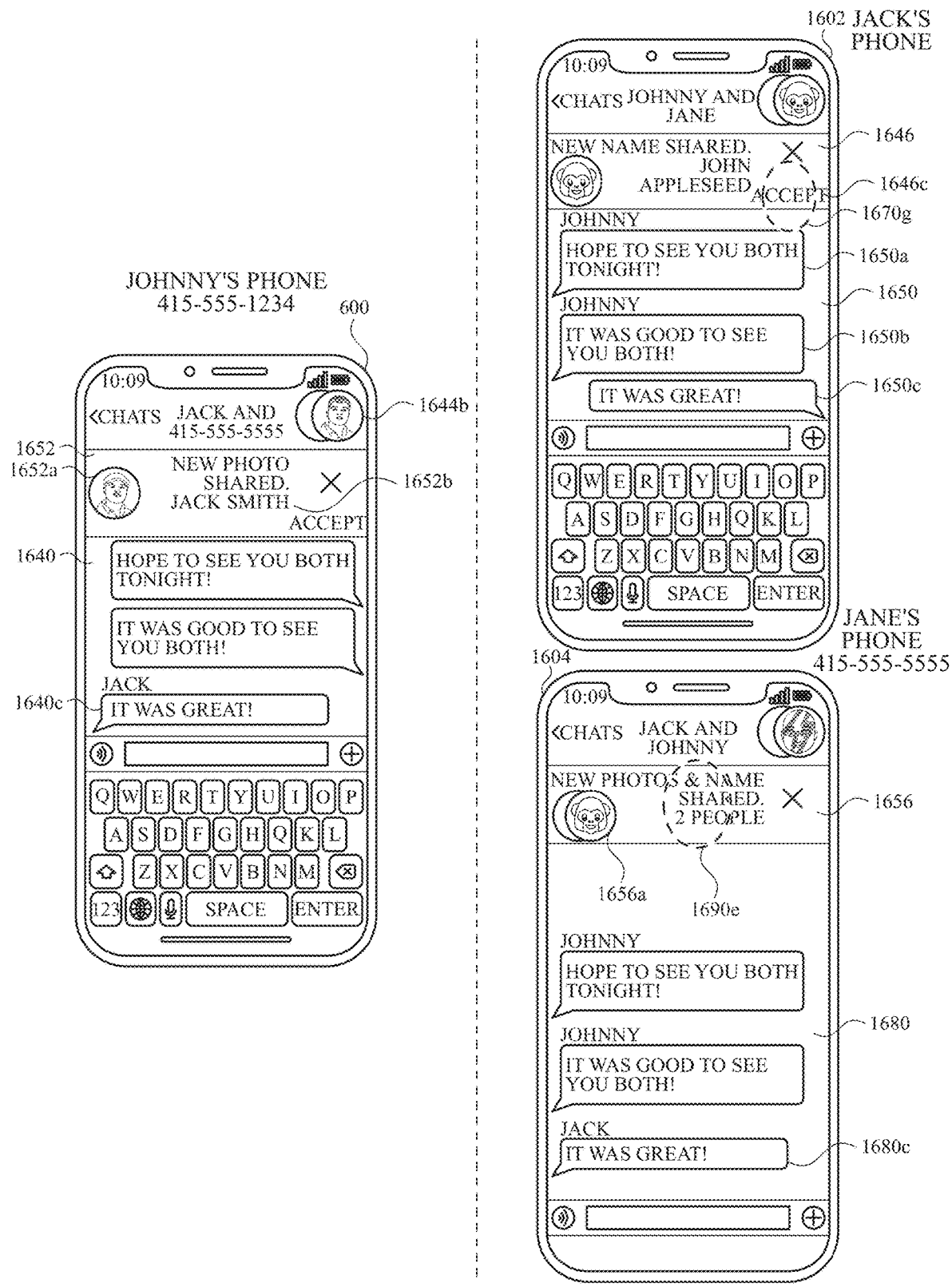
Figure 16X:
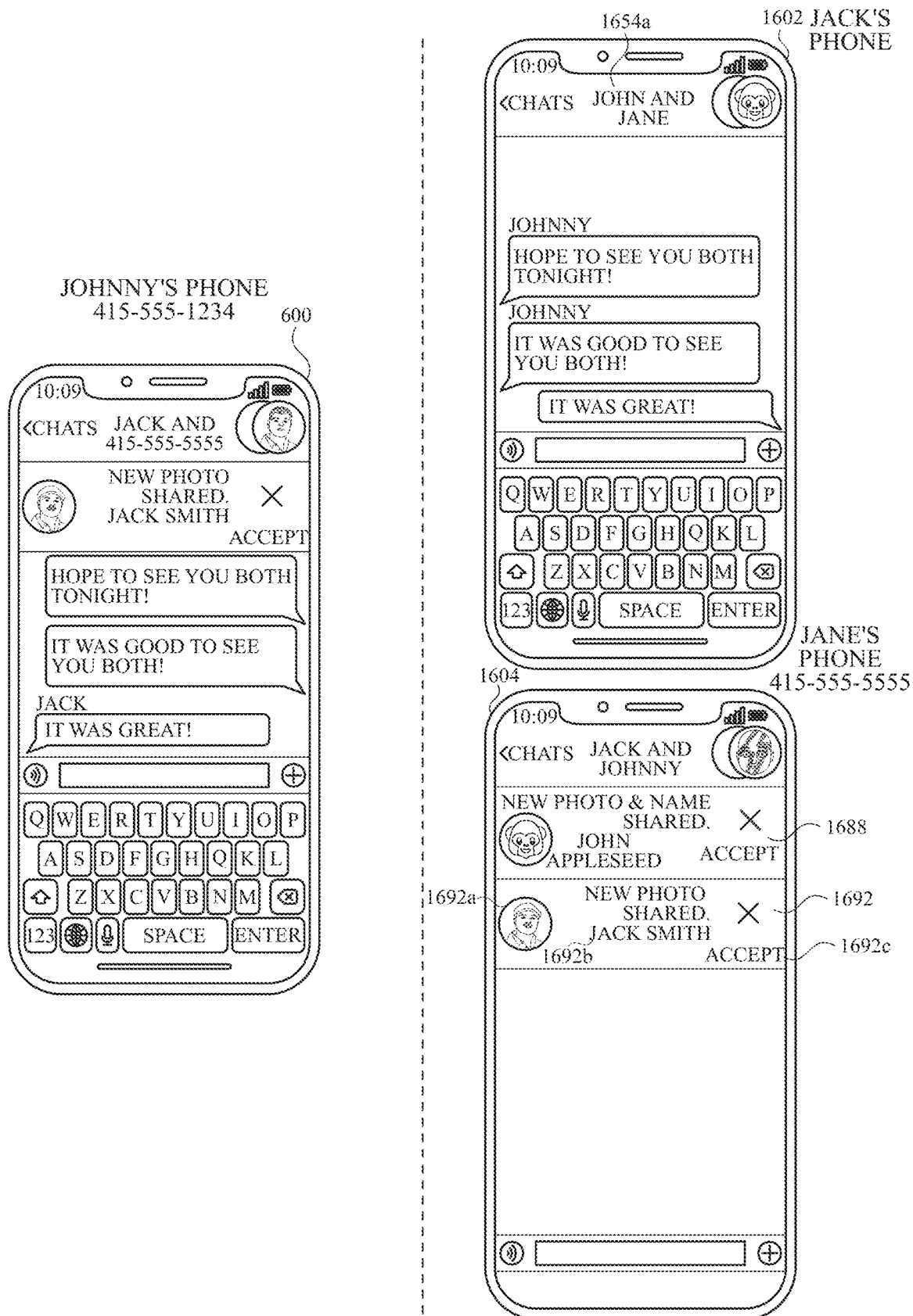

At FIG. 16W, Jack's phone 1602 receives user input (e.g., via the displayed keyboard) and, in response, transmits message 1650c to both Johnny and Jane via group message conversation 1650. Johnny is an approved recipient for Jack's contact information because Jack has selected to share his contact information with everyone, regardless of whether they are in Jack's address book (and in this example, Johnny is in Jack's address book). Jane is also an approved recipient for Jack's contact information because Jack has selected to share his contact information with everyone, regardless of whether they are in Jack's address book (and in this example, Jane is in Jack's address book). Jack's phone 1602 transmits Jack's updated photo as part of updated contact information to Johnny's phone 600 and Jane's phone 1604 because Jack is transmitting a message and has updated his photo (though not his name) since the last time Jack's phone 1602 transmitted contact information to Johnny and Jane. Jack's phone 1602 transmits Jack's updated contact information (the new photo) to Johnny's phone 600 and Jane's phone 1604 in conjunction with transmitting message 1650c.

At FIG. 16W, Johnny's phone 600 displays (as part of group message conversation 1640) message 1640c (corresponding to message 1650c), which was received from Jack, and concurrently displays notification 1652 for Jack's updated photo as part of Jack's contact information. Johnny's phone 600 has received Jack's updated photo (photo 1652a), but Johnny's phone 600 has not received an updated name for Jack because Jack did not update his name since the last time Jack sent Johnny his contact information. Because Johnny's phone 600 has not been configured to automatically update Johnny's address book entry for Jack using updated photos received from Jack, Johnny's address book entry for Jack has not been automatically updated using Jack's new photo, as reflected by Jack's old photo 1644b (with no hat) in FIG. 16W (as compared to Jack's new photo 1652a with a hat). Instead of automatically updating Jack's photo in Johnny's address book, at FIG. 16W, Johnny's phone 600 displays notification 1652. Notification 1652 includes Jack's new photo 1652a and identifies Jack by name 1652b.

At FIG. 16W, Jack's phone 1602 detects tap 1670g on accept affordance 1646c and, in response, updates Jack's address book entry for Johnny to include Johnny's updated name ("JOHN APPLESEED"), as reflected in name indications 1654a of group message conversation 1650 in FIG. 16X.

At FIG. 16W, Jane's phone 1604 displays (as part of group message conversation 1640) message 1680c (corresponding to message 1650c), which was received from Jack, and concurrently displays group update notification 1656, which replaces notification 1688. Group update notification 1656 indicates that updated contact information has been received from multiple individuals (e.g., "2 PEOPLE", in this case from both Johnny and Jack). For example, Jane's phone 1604 received Jack's updated contact information (Jack's updated photo 1656*a*) in conjunction with receiving message 1680*c*.

At FIG. 16W, Jane's phone 1604 detects tap 1690*e* on group update notification 1656. At FIG. 16X, in response to detecting tap 1690*e* on group update notification 1656, Jane's phone 1604 replaces display of group update notification 1656 and, optionally, messages 1680*a*-1680*b*, with display of a plurality of notifications 1688 and 1692. Notification 1692 includes Jack's updated contact information (new photo with hat), which was received in conjunction with Jack's message 1680*c* (corresponding to 1650*c*). Notification 1692 includes Jack's updated photo 1692*a*, an indication of Jack 1692*b*, and accept affordance 1692*c*, which, when activated, initiates a process for updating Jane's address book with Jack's updated contact information.

FIG. 17 is a flow diagram illustrating a method for providing contact information using an electronic device in accordance with some embodiments. Method 1700 is performed at a device (e.g., 100, 300, 500, 600, 1602, and 1604) with one or more communication devices (e.g., wireless communication devices, such as cellular antenna, wifi antenna). In some examples, a user is associated with the electronic device. For example, the electronic device can store contact information of a user of the electronic device in a contact card identified as being of the user of the device. Some operations in method 1700 are, optionally, combined, the orders of some operations are, optionally, changed, and some operations are, optionally, omitted.

As described below, method 1700 provides an intuitive way for providing contact information. The method reduces the cognitive burden on a user for providing contact information, thereby creating a more efficient human-machine interface. For battery-operated computing devices, enabling a user to provide contact information faster and more efficiently conserves power and increases the time between battery charges.

In some embodiments, an electronic device receives (1702) a request (e.g., a tap input on a "send" affordance in a messaging user interface) to transmit a first message (e.g., that does not include the contact information of the user associated with the electronic device, an instant message, an electronic mail) to a set of contactable users (e.g., a set including only a first contactable user and no other users, a set including a first contactable user and a second contactable user). In some embodiments, the set of contactable users includes a first contactable user (that is different from the user of the electronic device).

In some embodiments, in response (1704) to receiving the request to transmit the first message, in accordance with a determination (1706) that a set of sharing criteria is satisfied for the first contactable user, the set of sharing criteria including a first sharing criterion that is satisfied when the first contactable user corresponds to an approved recipient (and not satisfied when does not correspond to an approved recipient): the electronic device transmits (1708), via the one or more communication devices, to the first contactable user: the first message (e.g., 1622*a*, 1622*b*, 1640*a*), and contact information of the user associated with the electronic device (e.g., graphical representation such as an avatar, photo, and/or monogram representing the user of the electronic device and/or a name of the user of the electronic device). For example, the contact information is the contact information of a user of the electronic device accessed from a contact card (in an address database or application) identified as being of the user of the device.

In some embodiments, the contact information includes information corresponding to an avatar (e.g., a simulated three-dimensional avatar). In some embodiments, the information corresponding to the avatar includes pose information that identifies a pose of the avatar (e.g., from a plurality of different poses). User interfaces for initiating a process for selecting an avatar to use as a representation are described in greater detail above, such as with respect to FIGS. 9A-9AG.

In some embodiments, in response (1704) to receiving the request to transmit the first message, in accordance (1710) with a determination that the set of sharing criteria is not satisfied for the first contactable user: the electronic device transmits (1712), to the first contactable user, via the one or more communication devices, the first message (e.g., 1622*b*) without transmitting the contact information of the user associated with the electronic device.

In some embodiments, determining whether the first contactable user should receive the contact information enables the device to selectively share the contact information to only approved recipients, thereby improving security. Selecting transmitting the contact information to approve recipients increases the security of the device by preventing the sharing of the contact information with unintended recipients. Further, selectively transmitting the contact information to approved recipients while transmitting the first message to all recipients alleviates the need for the user to provide different sets of inputs for transmitting the message and for transmitting the contact information, thereby reducing the number of inputs required to perform the operations. Reducing the number of inputs required enhances the operability of the device and makes the user-device interface more efficient (e.g., by reducing user mistakes when operating/interacting with the device, by reducing false negatives of authentication) which, additionally, reduces power usage and improves battery life of the device by enabling the user to use the device more quickly and efficiently.

In some embodiments, the request to transmit is a request to transmit using a primary source identifier (e.g., a unique identifier that is associated with a communication protocol or application used to transmit the communication such as an email address, phone number, account name) that serves to identify the source of the message (e.g., for that particular communication). For example, in a traditional SMS, the primary source identifier may be the phone number of the sending device. In some embodiments, the user may configure their device to have the primary source identifier be their email address for instant messaging techniques, and thus instant messages sent using that device will include the user's email address as the source of the message (e.g., in a "From" field). In contrast, the contact information is information other than that primary source identifier that serves to identify the user associated with the electronic device to the contactable user without regard to whether the contact information is a unique identifier (e.g., the first and/or last name of the user, a set of initials for the user, a picture of the user, and/or a virtual avatar created or selected by the user). In some embodiments, the receiving device associates the contact information with the primary source identifier after the contact information is received. For example, the receiving device associates a name and a graphical representation received as part of contact information with the primary source identifier (e.g., the primary source identifier of the message in which the contact information was received).

In some embodiments, in response to receiving the request to transmit the first message, in accordance with the determination that the set of sharing criteria is not satisfied for the first contactable user, the electronic device concurrently displays the first message (e.g., 1640*a*, a speech balloon in a messaging application that shows the content of the first message) and an indication (e.g., 1642) that the contact information was not transmitted to the first contactable user. In some embodiments, the indication that the contact information was not transmitted includes an affordance, which when activated, initiates a process for transmitting, to the first contactable user, the contact information of the user associated with the electronic device. Initiating a process for transmitting, to the first contactable user, the updated contact information when the user activates the indication that the contact information was not transmitted enables the user to transmit any new/updated contact information to the contactable user without needing to access an unnecessary number of user interfaces and providing an unnecessary number of using inputs. Reducing the number of user inputs to perform the function enhances the operability of the device and makes the user-device interface more efficient (e.g., by helping the user to provide proper inputs when operating/interacting with the device) which, additionally, reduces power usage and improves battery life of the device by enabling the user to use the device more quickly and efficiently.

Providing the user with a visual indication that the device user's contact information has not been transmitted to the first contactable user provides the user with feedback that the set of sharing criteria is not satisfied for the first contactable user (e.g., that the first contactable user does not correspond to an approved recipient) and that the first contactable user has not yet received the updated contact information (e.g., the name and/or graphical representation). Providing improved feedback to the user enhances the operability of the device and makes the user-device interface more efficient (e.g., by helping the user to provide proper inputs when operating/interacting with the device) which, additionally, reduces power usage and improves battery life of the device by enabling the user to use the device more quickly and efficiently.

In some embodiments, the set of contactable users includes a second contactable user. In some embodiments, in response to receiving the request to transmit the first message, in accordance with a determination that the set of sharing criteria is satisfied for the second contactable user, the set of sharing criteria including the first sharing criterion that is satisfied when the second contactable user corresponds to an approved recipient (and not satisfied when does not correspond to an approved recipient), the electronic device transmits, via the one or more communication devices, to the second contactable user: the first message and contact information of the user associated with the electronic device (e.g., graphical representation such as an avatar, photo, and/or monogram representing the user of the electronic device and/or a name of the user of the electronic device). For example, the contact information is the contact information of a user of the electronic device accessed from a contact card (in an address database or application) identified as being of the user of the device. In some examples, the device sends different contact information to the first contactable user as compared to the second contactable user. For example, if the first contactable user has recently received an update of a name but not an update of the graphical representation of the device user, the device transmits (to the first contactable user) the updated graphical representation without retransmitting the updated name and, if the second contactable user has not received an update of the name nor the graphical representation of the device user, the device transmits (to the second contactable user) both the updated name and the updated graphical representation. In some embodiments, in response to receiving the request to transmit the first message, in accordance with a determination that the set of sharing criteria is not satisfied for the second contactable user, the electronic device transmits, to the first contactable user, via the one or more communication devices, the first message (e.g., 1640*a*) without transmitting the contact information of the user associated with the electronic device. In some embodiments, set of sharing criteria includes a recipient sharing criterion that is satisfied when a respective contactable user is a recipient of a message. Thus, updated contact information is not transmitted to contacts that are not in the set of contactable users that the message is bring transmitted to.

Determining which ones of the plurality of contactable users identified as recipients of the message should receive the contact information enables the device to selectively share a single message with the plurality of contactable users while potentially limiting transmission of the contact information to only approved recipients. Selectively transmitting the contact information to approved recipients while transmitting the first message to all recipients alleviates the need for the user to provide different sets of inputs for transmitting the message and for transmitting the contact information, thereby reducing the number of inputs required to perform the operations. Reducing the number of inputs required enhances the operability of the device and makes the user-device interface more efficient (e.g., by reducing user mistakes when operating/interacting with the device, by reducing false negatives of authentication) which, additionally, reduces power usage and improves battery life of the device by enabling the user to use the device more quickly and efficiently.

In some embodiments, subsequent to receiving the request to transmit the first message to the set of contactable users (and, optionally, subsequent to transmitting to the first contactable user: the first message and contact information of the user associated with the electronic device), the electronic device receives a second request to transmit a second message (e.g., 1640*a*) to a second set of one or more contactable users, wherein the second set of one or more contactable users includes the first contactable user. In some embodiments, the set of contactable users is different from the second set of contactable users. In some embodiments, in response to receiving the second request to transmit the second message, in accordance with a determination that the set of sharing criteria is satisfied for the first contactable user, the set of sharing criteria including a second sharing criterion that is satisfied when the contact information has been updated (revised) since the contact information was most recently transmitted to the first contactable user (and is not satisfied when the contact information has not been revised since the contact information was most recently transmitted to the first contactable user), the electronic device transmits, via the one or more communication devices, to the first contactable user, the second message and contact information of the user associated with the electronic device (e.g., graphical representation such as an avatar, photo, and/or monogram representing the user of the electronic device and/or a name of the user of the electronic device). For example, the contact information is the contact information of a user of the electronic device accessed from a contact card (in an address database or application) identified as being of the user of the device. In some embodiments, in response to receiving the second request to transmit the second message, in accordance with a determination that the set of sharing criteria is not satisfied for the first contactable user: the electronic device transmits, to the first contactable user, via the one or more communication devices, the second message without transmitting the contact information of the user associated with the electronic device.

In some embodiments, prior to receiving the request to transmit the first message to the set of contactable users: the electronic device receives user input to update the contact information (e.g., graphical representation such as an avatar, photo, and/or monogram representing the user of the electronic device and/or a name of the first contactable user) of the user (also referred to as the device user) associated with the electronic device. In some embodiments, in response to receiving the user input to update the contact information of the user associated with the electronic device, the electronic device updates the contact information (e.g., storing at the electronic device updates to the contact information, transmitting updates to the contact information to a remote server to store) of the user associated with the electronic device without transmitting to the first contactable user (or to any contactable users) the contact information (e.g., the updated portions of the contact information) of the user associated with the electronic device in response to the user input to update the contact information. Thus, the electronic device receives the device user's input to update the device user's contact information, but does not transmit the updated contact information to any contactable users. Instead, the device maintains a record of the updated contact information and whether the updated contact information has been send to particular contactable users (e.g., to the first contactable user). The updated contact information is held and transmitted (e.g., to the first contactable user) when the device user sends a message to the first contactable user. In some embodiments, to receive the user input to update the contact information, the device displays a user editing user interface (e.g., an interface for editing information at the electronic device for the user associated with the electronic device (e.g., for others to contact via telephone, email, messaging, etc.); a single interface screen), as described above as a contactable user editing user interface with respect to FIGS. 9A-9AG, but for the user associated with the electronic device, rather than a contactable user.

In some embodiments, updating the contact information of the device user without transmitting the contact information enables storage of the updates without requiring usage of communication bandwidth (e.g., cellular bandwidth) and processing power to transmit the update. This is particularly helpful when the device maintains a large list of contactable users, as the device is able to avoid sending the updated contact information to contactable users that the device user no longer communicates with. Avoiding sending the updated contact information reduces bandwidth usage and processor usage, thereby reducing power usage and improving battery life of the device.

In some embodiments, prior to receiving the request to transmit the first message to the set of contactable users (and, optionally, prior to receiving the user input to update the contact information of the user associated with the electronic device): the electronic device provides a plurality of predetermined options (e.g., by displaying one or more user interfaces including affordances for selecting from the predetermined options) to identify whether a respective contactable user corresponds to an approved recipient. In some embodiments, the plurality of predetermination options includes one or more of: a first recipient option that contactable users in a set of contactable users associated with the user of the electronic device (e.g., a list of contacts, such as a virtual address book including an entry for the first contactable user that includes a contact name and a communication method (e.g., phone number, email address) for the first contactable user) correspond to (e.g., are identified as, are set as) approved recipients and that contactable users not in the set of contactable users associated with the user of the electronic device do not correspond to approved recipients (e.g., an option that, when selected, configures the device using the selected relationships/correspondence), a second recipient option that all contactable users (regardless of whether they are listed in the address book) correspond to approved recipients, and a third recipient option that no contactable users (regardless of whether they are listed in the address book) correspond to approved recipients. Thus, the device user can specify in advance which contactable users should automatically receive updates to the device user's contact information when the device users sends the contactable user a message.

Providing the user with the ability to select which contactable users are automatically provided with the user's private contact information enables the user to securely control the propagation of the private contact information. Providing features to securely control the propagation of the private contact information enhances the security of the device by preventing private information from being transmitted to an unintended contactable user.

In some embodiments, prior to receiving the request to transmit the first message to the set of contactable users (and, optionally, prior to receiving the user input to update the contact information of the user associated with the electronic device), the electronic device receives a set of one or more inputs that includes input selecting a graphical object (e.g., during a setup process, as described above as a contactable user editing user interface with respect to FIGS. 9A-9AG, but for the user associated with the electronic device, rather than contactable users) to select a graphical representation (such as an avatar, photo, and/or monogram representing the user of the electronic device) of the user associated with the electronic device (e.g., 1660a-1660c). In some embodiments, prior to receiving the request to transmit the first message to the set of contactable users, in response to receiving the user input to select the graphical representation: the electronic device updates the contact information (e.g., storing at the electronic device updates to the contact information, transmitting updates to the contact information to a remote server to store) of the user associated with the electronic device to include the selected graphical representation (e.g., replacing a previous graphical representation of the device user with the selected graphical representation of the device user) without transmitting (e.g., to the first contactable user, to any contactable users) the contact information (e.g., the updated portions of the contact information) of the user associated with the electronic device.

In some embodiments, to receive the user input to update the contact information, the device displays a user editing user interface (e.g., an interface for editing information at the electronic device for the user associated with the electronic device (e.g., for others to contact via telephone, email, messaging, etc.); a single interface screen), as described above as a contactable user editing user interface with respect to FIGS. 9A-9AG, but for the user associated with the electronic device, rather than contactable users.

In some embodiments, prior to receiving the request to transmit the first message to the set of contactable users (and, optionally, prior to receiving the user input to update the contact information of the user associated with the electronic device), the electronic device accesses, from a set of contactable users associated with the user of the electronic device (e.g., an entry in the address book corresponding to the user of the device), a name of the user associated with the electronic device. In some embodiments, prior to receiving the request to transmit the first message to the set of contactable users, the electronic device displays the name of the user in an editable format (e.g., in an editable text field). In some embodiments, prior to receiving the request to transmit the first message to the set of contactable users, the electronic device receives user input (e.g., during a setup process, modification of the name and confirmation input (such as "save" or "ok")) to edit (or confirm) the name of the user associated with the electronic device. In some embodiments, rather than (or in addition to) an editable pre-populated name, the device provides the user with options for selecting from among a plurality of predefined proposed names that are concurrently displayed). In some embodiments, prior to receiving the request to transmit the first message to the set of contactable users, in response to receiving the user input to edit the name: the electronic device updates the contact information (e.g., storing at the electronic device updates to the contact information, transmitting updates to the contact information to a remote server to store) of the user associated with the electronic device to include the selected name (e.g., replacing a previous name of the device user with the selected name) without transmitting (e.g., to the first contactable user, to any contactable users) the contact information (e.g., the updated portions of the contact information) of the user associated with the electronic device. In some embodiments, prior to receiving the request to transmit the first message to the set of contactable users, in response to receiving the user input to edit the name: the electronic device provides (or otherwise making available) the contact information, including the selected name, to a plurality of applications (e.g., a phone application, an email application, an instant messaging application, a maps application, first-part applications provided by the manufacturer of the electronic device) of the electronic device.

In some embodiments, prior to receiving the request to transmit the first message to the set of contactable users, the electronic device concurrently displays the first message (e.g., the first message as received from the user prior to being sent, in a draft email, in an input field of an instant messaging conversation) and an affordance that, when selected, causes the device to display a user interface that includes one or more options for configuring whether the first contactable user corresponds to an approved recipient. In some embodiments, the electronic device provides the affordance such that the device user to configure whether the recipient(s) of the message will automatically be sent updated contact information of the device user. In some embodiments, the affordance includes an indication of whether the set of contactable users are approved recipients.

In some embodiments, the set of sharing criteria includes a second sharing criterion that is satisfied when the contact information has been updated (e.g., revised, changed) since the contact information was most recently transmitted to the first contactable user (and is not satisfied when the contact information has not been revised since the contact information was most recently transmitted to the first contactable user). Thus, the electronic device transmits new updates to contactable users, rather than sending the device user's contact information to the approved contactable users every time the device user sends an approved contactable user a message. In some embodiments, only the portion of the contact information that has been updated (revised) is transmitted, rather than the device user's full contact information. In some embodiments, the device determines which parts of the contact information (or the full contact information) to transmit to a particular contactable user based on which parts have previously been transmitted to that particular contactable user.

In some embodiments, the electronic device provides (or otherwise makes available) the contact information, including the selected graphical representation, to a plurality of applications (e.g., a phone application, an email application, an instant messaging application, a maps application, first-part applications provided by the manufacturer of the electronic device) of the electronic device.

Note that details of the processes described above with respect to method 1700 (e.g., FIG. 17) are also applicable in an analogous manner to the methods described below and above. For example, methods 700, 800, 1000, 1200, 1300, 1500, and 1800 optionally includes one or more of the characteristics of the various methods described above with reference to method 1700. For brevity, these details are not repeated below.

FIG. 18 is a flow diagram illustrating a method for receiving contact information using an electronic device in accordance with some embodiments. Method 1800 is performed at a device (e.g., 100, 300, 500, 600, 1602, and 1604) with a display device and one or more communication devices (e.g., wireless communication devices, such as cellular antenna, wifi antenna). Some operations in method 1800 are, optionally, combined, the orders of some operations are, optionally, changed, and some operations are, optionally, omitted.

As described below, method 1800 provides an intuitive way for receiving contact information. The method reduces the cognitive burden on a user for receiving contact information, thereby creating a more efficient human-machine interface. For battery-operated computing devices, enabling a user to receive contact information faster and more efficiently conserves power and increases the time between battery charges.

An electronic device receives (1802) (e.g., from a first contactable user), via the one or more communication devices, a first message (e.g., 1632a, an instant message, an electronic mail) (e.g., the first message is received as part of a messaging conversation that includes a first contactable user).

Subsequent to receiving the first message, the electronic device receives (1804) a request (e.g., tap input on a displayed identifier of the first message) to display the first message.

In response (1806) to receiving the request to display the first message, in accordance with (1808) a determination that a set of prompting criteria is satisfied for a first contactable user, wherein the set of prompting criteria includes a first prompting criterion that is satisfied when updated (e.g., different from contact information stored at the electronic device in a contact card of the first contactable user (in a contact list or address book)) contact information (e.g., graphical representation such as an avatar, photo, and/or monogram representing the user of the electronic device and/or a name of the first contactable user) corresponding to the first contactable user has been received (e.g., from the first contactable user), the electronic device concurrently displays (1810), on the display device, the first message (e.g., 1632a) and a visual indication (e.g., 1634) that updated contact information is available for the first contactable user. In some embodiments, the visual indication that updated contact information is available for the first contactable user includes at least a portion (e.g., the update name and/or the updated graphical representation of the first contactable user) of the received updated contact information.

In some embodiments, the electronic device is associated with a user. In response to receiving the request to display the first message, in accordance with a determination that a set of sharing criteria is not satisfied for the first contactable user, the set of sharing criteria including a first sharing criterion that is satisfied when the first contactable user corresponds to an approved recipient (and not satisfied when does not correspond to an approved recipient), the electronic device concurrently display, with the first message (and, optionally, concurrent with the visual indication that updated contact information is available for the first contactable user), an indication (e.g., 1682) that updated contact information of the user of the electronic device is available to be transmitted to the first contactable user. In some embodiments, the indication that updated contact information is available to be transmitted includes an affordance, which when activated, initiates a process for transmitting, to the first contactable user, the contact information of the user associated with the electronic device.

Providing the user with a visual indication that the device user's contact information has not been transmitted to the first contactable user (but is available to be transmitted) provides the user with feedback about the status of contact information sharing. Providing improved feedback to the user enhances the operability of the device and makes the user-device interface more efficient (e.g., by helping the user to provide proper inputs when operating/interacting with the device) which, additionally, reduces power usage and improves battery life of the device by enabling the user to use the device more quickly and efficiently.

In some embodiments, the set of prompting criteria includes a second prompting criterion that is satisfied when the first message is a part of a messaging conversation in which the first contactable user is a participant (and is not satisfied when the first message is not part of a messaging conversation in which the first contactable user is a participant). For example, the second prompting criteria is satisfied when the received first messaged is part of an instant messaging thread that includes the first contactable user and the user of the electronic device (and, optionally, other contactable users). For another example, the second prompting criteria is met when the first message is an email message that includes the first contactable user in the "from," "to," or "cc" fields, the user of the electronic device in the "to" or "cc" fields, and optionally other contactable users in the "from," "to," or "cc" fields).

In some embodiments, the electronic device detects activation of (e.g., tap on) the visual indication that updated contact information is available for the first contactable user. In some embodiments, in response to detecting activation of the visual indication that updated contact information is available for the first contactable user, in accordance with a determination that the first contactable user does not correspond to an existing entry in a set of contactable users associated with the user of the electronic device, the electronic device displays a selectable option (e.g., 1624a) to create a new entry in the set of contactable users associated with the user of the electronic device for the first contactable user using the contact information (e.g., using the received graphical representation such as an avatar, photo, and/or monogram representing the user of the electronic device and/or using the name of the contactable user). In some embodiments, in accordance with the determination that the first contactable user does not correspond to an existing entry in an address book of the electronic device, the device displays (alternative to the first selectable option or in addition to the first selectable option) a selectable option to add the received contact information to an existing entry of the address book. For example, activation of the option to add to an existing entry enables the user of the electronic device to select an existing entry to which the received name, the received graphical representation, and/or the communication method (e.g., phone number, email address) of the message is added.

In some embodiments, the electronic device detects activation of (e.g., tap on) the visual indication that updated contact information is available for the first contactable user. In some embodiments, in response to detecting activation of the visual indication that updated contact information is available for the first contactable user, in accordance with a determination that the first contactable user corresponds to an existing entry in the set of contactable users associated with the user of the electronic device and that the received contact information includes a revised graphical representation of the first contactable user and a revised name for the contactable user, the electronic device displays a plurality of selectable options that include two or more of: a selectable option to update the existing entry in the set of contactable users associated with the user of the electronic device with the revised graphical representation of the first contactable user and the revised name of the contactable user, a selectable option to update the existing entry in the set of contactable users associated with the user of the electronic device with the revised graphical representation of the first contactable user without updating the existing entry with the revised name of the contactable user, and a selectable option to update the existing entry in the set of contactable users associated with the user of the electronic device with the revised name of the first contactable user without updating the existing entry with the revised graphical representation of the contactable user.

In some embodiments, the electronic device detects activation of (e.g., tap on) the visual indication that updated contact information is available for the first contactable user. In some embodiments, in response to detecting activation of the visual indication that updated contact information is available for the first contactable user, in accordance with a determination that the first contactable user corresponds to an existing entry in the set of contactable users associated with the user of the electronic device and that the received contact information includes a revised graphical representation of the first contactable user without including a revised name for the contactable user, the electronic device updates the existing entry with the revised graphical representation of the contactable user (e.g., updating automatically, updating without requiring any further user inputs). In some embodiments, in response to detecting activation of the visual indication that updated contact information is available for the first contactable user, and in accordance with a determination that the first contactable user corresponds to an existing entry in the set of contactable users associated with the user of the electronic device and that the received contact information includes a revised graphical representation of the first contactable user without including a revised name for the contactable user, the device prompts the user asking for confirmation to update the existing entry with the revised graphical representation of the contactable user.

In some embodiments, the electronic device detects activation of (e.g., tap on) the visual indication that updated contact information is available for the first contactable user. In some embodiments, in response to detecting activation of the visual indication that updated contact information is available for the first contactable user, in accordance with a determination that the first contactable user corresponds to an existing entry in the set of contactable users associated with the user of the electronic device and that the received contact information includes a revised name for the first contactable user without including a revised graphical representation of the contactable user, the electronic device updates the existing entry with the revised name of the contactable user (e.g., updating automatically, updating without requiring any further user inputs).

In some embodiments, the first message is received in a conversation that includes the first contactable user and a second contactable user. In some embodiments, the electronic device has received updated contact information for the first contactable user and updated contact information for the second contactable user (without having updated an entry in an address book of the electronic device using the updated contact information of the first and second contactable users). In some embodiments, the electronic device detects activation of the visual indication that updated contact information is available for the first contactable user. In some embodiments, in response to detecting activation of the visual indication that updated contact information is available for the first contactable user, the electronic device displays (e.g., by replacing display of the conversation) a second visual indication that updated contact information is available for the first contactable user, wherein the second visual indication includes a visual representation of at least a portion of the received updated contact information for the first contactable user and a third visual indication that updated contact information is available for the second contactable user, wherein the third visual indication includes a visual representation of at least a portion of the received updated contact information for the second contactable user.

In some embodiments, the visual indication that updated contact information is available for the first contactable user is displayed concurrently with a visual representation of at least a portion of a messaging conversation that includes a plurality of messages, the plurality of messages including a second message transmitted (e.g., from the electronic device) to the first contactable user and a third message received from the first contactable user.

In some embodiments, in response (1806) to receiving the request to display the first message, in accordance with (1812) a determination that the set of prompting criteria is not satisfied for the first contactable user, the electronic device displays (1814), on the display device, the first message without displaying the visual indication that updated contact information is available for the first contactable user. In some embodiments, the electronic device does not display the visual indication if user of the device has previously selected to ignore the updated contact information for the first contactable user. Thus, the set of prompting criteria optionally includes a prompting criterion that is satisfied when the device has not received a request to ignore the updated contact information for the first contactable user.

In some embodiments, the received message includes a primary source identifier (e.g., a unique identifier that is associated with a communication protocol or application used to transmit the communication such as an email address, phone number, account name) that serves to identify the source of the message (e.g., for that particular communication). For example, in a traditional SMS, the primary source identifier may be the phone number of the sending device. In some embodiments, the sending user may configure their device to have the primary source identifier be their email address for instant messaging techniques, and thus instant messages received from that device will include the sending user's email address as the source of the message (e.g., in a "From" field). In contrast, the contact information is information other than that primary source identifier that serves to identify the user not associated with the electronic device (e.g., the first contactable user) to the user associated with the electronic device without regard to whether the contact information is a unique identifier (e.g., the first and/or last name of the user, a set of initials for the user, a picture of the user, and/or a virtual avatar created or selected by the contactable user). In some embodiments, the receiving device associates the contact information with the primary source identifier after the contact information is received. For example, the receiving device associates a name and a graphical representation received as part of contact information with the primary source identifier (e.g., the primary source identifier of the message in which the contact information was received).

In some embodiments, the received contact information includes a revised graphical representation of the first contactable user (and the received contact information optionally includes a revised name for the first contactable user). In some embodiments, the first contactable user corresponds to an existing entry in a set of contactable users associated with the user of the electronic device. In some embodiments, the electronic device receives user input to update the existing entry using the revised graphical representation of the first contactable user (and optionally the revised name). In some embodiments, in response to receiving the user input to update the existing entry using the revised graphical representation of the first contactable user (and optionally the revised name), the electronic device updates the existing entry in the set of contactable users associated with the user of the electronic device using (optionally, the revised name, and) the revised graphical representation of the first contactable user (e.g., by replacing a previous graphical representation of the contactable user). In some embodiments, in response to receiving the user input to update the existing entry using the revised graphical representation of the first contactable user (and optionally the revised name), the electronic device displays a selectable affordance that, if selected, enables (e.g., displaying a prompt for) the electronic device to automatically (e.g., without requiring additional user input/authorization) update the graphical representation for the first contactable user in the future (e.g., for subsequently received revisions of the graphical representation of the first contactable user) (and, optionally, without prompting for approval to automatically update the name of the contactable user).

The electronic device prompts the user to approve automatic updates for graphical representations of the first contactable user, thereby providing the user with an option to eliminate the need to provide user inputs at the electronic device to update the graphical representation of the first contactable user in the future. Reducing the number of inputs required enhances the operability of the device and makes the user-device interface more efficient (e.g., by reducing user mistakes when operating/interacting with the device, by reducing false negatives of authentication) which, additionally, reduces power usage and improves battery life of the device by enabling the user to use the device more quickly and efficiently. Further, the device optionally does not enable the user to approve updates for a name of the first contactable user to avoid potential security issues, such as someone portraying themselves as somebody they are not.

In some embodiments, the contact information includes a name of the first contactable user or a graphical representation of the first contactable user. In some embodiments, the electronic device updates the set of contactable users associated with the user of the electronic device (e.g., in response to user input requesting the updating) with a revised name of the first contactable user or a revised graphical representation of the contactable user. In some embodiments, the contact information in the set of contactable users associated with the user of the electronic device, including the revised name or the revised graphical representation, is available to a plurality of applications (e.g., a phone application, an email application, an instant messaging application, a maps application, first-part applications provided by the manufacturer of the electronic device) of the electronic device.

In some embodiments, the contact information of the first contactable user includes information corresponding to an avatar (e.g., a simulated three-dimensional avatar). In some embodiments, the information corresponding to the avatar includes pose information that identifies a post of the avatar (e.g., from a plurality of different poses). User interfaces for initiating a process for selecting an avatar to use as a representation are described in greater detail above, such as with respect to FIGS. 9A-9AG.

Note that details of the processes described above with respect to method 1800 (e.g., FIG. 18) are also applicable in an analogous manner to the methods described above. For example, methods 700, 800, 1000, 1200, 1300, 1500, and 1700 optionally includes one or more of the characteristics of the various methods described above with reference to method 1800. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to display and use an avatar. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to present recommended images for contact representations. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be recommended to users by inferring preferences based on non-personal information data or a bare minimum amount of personal information, such as the content being requested by the device associated with a user, other non-personal information available, or publicly available information.

What is claimed is:

1. An electronic device, comprising:
one or more communication devices;
one or more processors; and
memory storing one or more programs configured to be executed by the one or more processors, wherein a user is associated with the electronic device and the one or more programs include instructions for:
receiving a set of one or more inputs that includes input selecting a graphical object to select a graphical representation of a user associated with the electronic device;
in response to receiving the input to select the graphical representation:
updating contact information of the user associated with the electronic device to include the selected graphical representation without transmitting the contact information of the user associated with the electronic device to a set of contactable users;
after updating the contact information of the user associated with the electronic device to include the selected graphical representation, receiving a request to transmit a first message to a set of contactable users, the set of contactable users including a first contactable user; and
in response to receiving the request to transmit the first message:
in accordance with a determination that a set of sharing criteria is satisfied for the first contactable user, the set of sharing criteria including a first sharing criterion that is satisfied when the first contactable user corresponds to an approved recipient:
transmitting, via the one or more communication devices, to the first contactable user:
the first message, and
the contact information of the user associated with the electronic device; and
in accordance with a determination that the set of sharing criteria is not satisfied for the first contactable user:
transmitting, to the first contactable user, via the one or more communication devices, the first message without transmitting the contact information of the user associated with the electronic device.

2. The electronic device of claim 1, the one or more programs further including instructions for:

prior to receiving the request to transmit the first message to the set of contactable users:
receiving user input to update the contact information of the user associated with the electronic device; and
in response to receiving the user input to update the contact information of the user associated with the electronic device, updating the contact information of the user associated with the electronic device without transmitting to the first contactable user the contact information of the user associated with the electronic device in response to the user input to update the contact information.

3. The electronic device of claim 1, wherein the set of sharing criteria includes a second sharing criterion that is satisfied when the contact information has been updated since the contact information was most recently transmitted to the first contactable user.

4. The electronic device of claim 1, the one or more programs further including instructions for:
in response to receiving the request to transmit the first message:
in accordance with the determination that the set of sharing criteria is not satisfied for the first contactable user, concurrently displaying:
the first message, and
an indication that the contact information was not transmitted to the first contactable user.

5. The electronic device of claim 1, the one or more programs further including instructions for:
prior to receiving the request to transmit the first message to the set of contactable users:
providing a plurality of predetermined options to identify whether a respective contactable user corresponds to an approved recipient, the plurality of predetermination options including one or more of:
a first recipient option that contactable users in a set of contactable users associated with the user of the electronic device correspond to approved recipients and that contactable users not in the set of contactable users associated with the user of the electronic device do not correspond to approved recipients,
a second recipient option that all contactable users correspond to approved recipients, and
a third recipient option that no contactable users correspond to approved recipients.

6. The electronic device of claim 1, the one or more programs further including instructions for:
providing the contact information, including the selected graphical representation, to a plurality of applications of the electronic device.

7. The electronic device of claim 1, the one or more programs further including instructions for:
prior to receiving the request to transmit the first message to the set of contactable users:
accessing, from a set of contactable users associated with the user of the electronic device, a name of the user associated with the electronic device;
displaying the name of the user in an editable format;
receiving user input to edit the name of the user associated with the electronic device; and
in response to receiving the user input to edit the name:
updating the contact information of the user associated with the electronic device to include the selected name without transmitting the contact information of the user associated with the electronic device; and providing the contact information, including the selected name, to a plurality of applications of the electronic device.

8. The electronic device of claim 1, the one or more programs further including instructions for:
subsequent to receiving the request to transmit the first message to the set of contactable users, receiving a second request to transmit a second message to a second set of one or more contactable users, wherein the second set of one or more contactable users includes the first contactable user; and
in response to receiving the second request to transmit the second message:
in accordance with a determination that the set of sharing criteria is satisfied for the first contactable user, the set of sharing criteria including a second sharing criterion that is satisfied when the contact information has been updated since the contact information was most recently transmitted to the first contactable user:
transmitting, via the one or more communication devices, to the first contactable user:
the second message, and
the contact information of the user associated with the electronic device; and
in accordance with a determination that the set of sharing criteria is not satisfied for the first contactable user:
transmitting, to the first contactable user, via the one or more communication devices, the second message without transmitting the contact information of the user associated with the electronic device.

9. The electronic device of claim 1, wherein the set of contactable users includes a second contactable user, the one or more programs further including instructions for:
in response to receiving the request to transmit the first message:
in accordance with a determination that the set of sharing criteria is satisfied for the second contactable user, the set of sharing criteria including the first sharing criterion that is satisfied when the second contactable user corresponds to an approved recipient:
transmitting, via the one or more communication devices, to the second contactable user:
the first message, and
the contact information of the user associated with the electronic device; and
in accordance with a determination that the set of sharing criteria is not satisfied for the second contactable user:
transmitting, to the first contactable user, via the one or more communication devices, the first message without transmitting the contact information of the user associated with the electronic device.

10. The electronic device of claim 1, wherein the contact information includes information corresponding to an avatar.

11. The electronic device of claim 1, the one or more programs further including instructions for:
prior to receiving the request to transmit the first message to the set of contactable users, concurrently displaying:
the first message, and
an affordance that, when selected, causes the device to display a user interface that includes one or more options for configuring whether the first contactable user corresponds to an approved recipient.

12. A non-transitory computer-readable storage medium storing one or more programs configured to be executed by one or more processors of an electronic device with one or more communication devices, wherein a user is associated with the electronic device and the one or more programs include instructions for:
receiving a set of one or more inputs that includes input selecting a graphical object to select a graphical representation of a user associated with the electronic device;
in response to receiving the input to select the graphical representation:
updating contact information of the user associated with the electronic device to include the selected graphical representation without transmitting the contact information of the user associated with the electronic device to a set of contactable users;
after updating the contact information of the user associated with the electronic device to include the selected graphical representation, receiving a request to transmit a first message to a set of contactable users, the set of contactable users including a first contactable user; and
in response to receiving the request to transmit the first message:
in accordance with a determination that a set of sharing criteria is satisfied for the first contactable user, the set of sharing criteria including a first sharing criterion that is satisfied when the first contactable user corresponds to an approved recipient:
transmitting, via the one or more communication devices, to the first contactable user:
the first message, and
the contact information of the user associated with the electronic device; and
in accordance with a determination that the set of sharing criteria is not satisfied for the first contactable user:
transmitting, to the first contactable user, via the one or more communication devices, the first message without transmitting the contact information of the user associated with the electronic device.

13. The non-transitory computer-readable storage medium of claim 12, the one or more programs further including instructions for:
prior to receiving the request to transmit the first message to the set of contactable users:
receiving user input to update the contact information of the user associated with the electronic device; and
in response to receiving the user input to update the contact information of the user associated with the electronic device, updating the contact information of the user associated with the electronic device without transmitting to the first contactable user the contact information of the user associated with the electronic device in response to the user input to update the contact information.

14. The non-transitory computer-readable storage medium of claim 12, wherein the set of sharing criteria includes a second sharing criterion that is satisfied when the contact information has been updated since the contact information was most recently transmitted to the first contactable user.

15. The non-transitory computer-readable storage medium of claim 12, the one or more programs further including instructions for:
in response to receiving the request to transmit the first message:

in accordance with the determination that the set of sharing criteria is not satisfied for the first contactable user, concurrently displaying:
the first message, and
an indication that the contact information was not transmitted to the first contactable user.

16. The non-transitory computer-readable storage medium of claim 12, the one or more programs further including instructions for:
prior to receiving the request to transmit the first message to the set of contactable users:
providing a plurality of predetermined options to identify whether a respective contactable user corresponds to an approved recipient, the plurality of predetermination options including one or more of:
a first recipient option that contactable users in a set of contactable users associated with the user of the electronic device correspond to approved recipients and that contactable users not in the set of contactable users associated with the user of the electronic device do not correspond to approved recipients,
a second recipient option that all contactable users correspond to approved recipients, and
a third recipient option that no contactable users correspond to approved recipients.

17. The non-transitory computer-readable storage medium of claim 12, the one or more programs further including instructions for:
providing the contact information, including the selected graphical representation, to a plurality of applications of the electronic device.

18. The non-transitory computer-readable storage medium of claim 12, the one or more programs further including instructions for:
prior to receiving the request to transmit the first message to the set of contactable users:
accessing, from a set of contactable users associated with the user of the electronic device, a name of the user associated with the electronic device;
displaying the name of the user in an editable format;
receiving user input to edit the name of the user associated with the electronic device; and
in response to receiving the user input to edit the name:
updating the contact information of the user associated with the electronic device to include the selected name without transmitting the contact information of the user associated with the electronic device; and
providing the contact information, including the selected name, to a plurality of applications of the electronic device.

19. The non-transitory computer-readable storage medium of claim 12, the one or more programs further including instructions for:
subsequent to receiving the request to transmit the first message to the set of contactable users, receiving a second request to transmit a second message to a second set of one or more contactable users, wherein the second set of one or more contactable users includes the first contactable user; and
in response to receiving the second request to transmit the second message:
in accordance with a determination that the set of sharing criteria is satisfied for the first contactable user, the set of sharing criteria including a second sharing criterion that is satisfied when the contact information has been updated since the contact information was most recently transmitted to the first contactable user:
transmitting, via the one or more communication devices, to the first contactable user:
the second message, and
the contact information of the user associated with the electronic device; and
in accordance with a determination that the set of sharing criteria is not satisfied for the first contactable user:
transmitting, to the first contactable user, via the one or more communication devices, the second message without transmitting the contact information of the user associated with the electronic device.

20. The non-transitory computer-readable storage medium of claim 12, wherein the set of contactable users includes a second contactable user, the one or more programs further including instructions for:
in response to receiving the request to transmit the first message:
in accordance with a determination that the set of sharing criteria is satisfied for the second contactable user, the set of sharing criteria including the first sharing criterion that is satisfied when the second contactable user corresponds to an approved recipient:
transmitting, via the one or more communication devices, to the second contactable user:
the first message, and
the contact information of the user associated with the electronic device; and
in accordance with a determination that the set of sharing criteria is not satisfied for the second contactable user:
transmitting, to the first contactable user, via the one or more communication devices, the first message without transmitting the contact information of the user associated with the electronic device.

21. The non-transitory computer-readable storage medium of claim 12, wherein the contact information includes information corresponding to an avatar.

22. The non-transitory computer-readable storage medium of claim 12, the one or more programs further including instructions for:
prior to receiving the request to transmit the first message to the set of contactable users, concurrently displaying:
the first message, and
an affordance that, when selected, causes the device to display a user interface that includes one or more options for configuring whether the first contactable user corresponds to an approved recipient.

23. A method, comprising:
at an electronic device with one or more communication devices, wherein a user is associated with the electronic device:
receiving a set of one or more inputs that includes input selecting a graphical object to select a graphical representation of a user associated with the electronic device;
in response to receiving the input to select the graphical representation:
updating contact information of the user associated with the electronic device to include the selected graphical representation without transmitting the contact information of the user associated with the electronic device to a set of contactable users;

after updating the contact information of the user associated with the electronic device to include the selected graphical representation, receiving a request to transmit a first message to a set of contactable users, the set of contactable users including a first contactable user; and in response to receiving the request to transmit the first message:
  in accordance with a determination that a set of sharing criteria is satisfied for the first contactable user, the set of sharing criteria including a first sharing criterion that is satisfied when the first contactable user corresponds to an approved recipient:
    transmitting, via the one or more communication devices, to the first contactable user:
      the first message, and
      the contact information of the user associated with the electronic device; and
  in accordance with a determination that the set of sharing criteria is not satisfied for the first contactable user:
    transmitting, to the first contactable user, via the one or more communication devices, the first message without transmitting the contact information of the user associated with the electronic device.

24. The method of claim 23, further comprising:
prior to receiving the request to transmit the first message to the set of contactable users:
  receiving user input to update the contact information of the user associated with the electronic device; and
  in response to receiving the user input to update the contact information of the user associated with the electronic device, updating the contact information of the user associated with the electronic device without transmitting to the first contactable user the contact information of the user associated with the electronic device in response to the user input to update the contact information.

25. The method of claim 23, wherein the set of sharing criteria includes a second sharing criterion that is satisfied when the contact information has been updated since the contact information was most recently transmitted to the first contactable user.

26. The method of claim 23, further comprising:
in response to receiving the request to transmit the first message:
  in accordance with the determination that the set of sharing criteria is not satisfied for the first contactable user, concurrently displaying:
    the first message, and
    an indication that the contact information was not transmitted to the first contactable user.

27. The method of claim 23, further comprising:
prior to receiving the request to transmit the first message to the set of contactable users:
  providing a plurality of predetermined options to identify whether a respective contactable user corresponds to an approved recipient, the plurality of predetermination options including one or more of:
    a first recipient option that contactable users in a set of contactable users associated with the user of the electronic device correspond to approved recipients and that contactable users not in the set of contactable users associated with the user of the electronic device do not correspond to approved recipients,
    a second recipient option that all contactable users correspond to approved recipients, and
    a third recipient option that no contactable users correspond to approved recipients.

28. The method of claim 23, further comprising:
providing the contact information, including the selected graphical representation, to a plurality of applications of the electronic device.

29. The method of claim 23, further comprising:
prior to receiving the request to transmit the first message to the set of contactable users:
  accessing, from a set of contactable users associated with the user of the electronic device, a name of the user associated with the electronic device;
  displaying the name of the user in an editable format;
  receiving user input to edit the name of the user associated with the electronic device; and
  in response to receiving the user input to edit the name:
    updating the contact information of the user associated with the electronic device to include the selected name without transmitting the contact information of the user associated with the electronic device; and
    providing the contact information, including the selected name, to a plurality of applications of the electronic device.

30. The method of claim 23, further comprising:
subsequent to receiving the request to transmit the first message to the set of contactable users, receiving a second request to transmit a second message to a second set of one or more contactable users, wherein the second set of one or more contactable users includes the first contactable user; and
in response to receiving the second request to transmit the second message:
  in accordance with a determination that the set of sharing criteria is satisfied for the first contactable user, the set of sharing criteria including a second sharing criterion that is satisfied when the contact information has been updated since the contact information was most recently transmitted to the first contactable user:
    transmitting, via the one or more communication devices, to the first contactable user:
      the second message, and
      the contact information of the user associated with the electronic device; and
  in accordance with a determination that the set of sharing criteria is not satisfied for the first contactable user:
    transmitting, to the first contactable user, via the one or more communication devices, the second message without transmitting the contact information of the user associated with the electronic device.

31. The method of claim 23, wherein the set of contactable users includes a second contactable user, the method further comprising:
in response to receiving the request to transmit the first message:
  in accordance with a determination that the set of sharing criteria is satisfied for the second contactable user, the set of sharing criteria including the first sharing criterion that is satisfied when the second contactable user corresponds to an approved recipient:
    transmitting, via the one or more communication devices, to the second contactable user:
      the first message, and the contact information of the user associated with the electronic device; and in accordance with a determination that the set of sharing criteria is not satisfied for the second contactable user:

transmitting, to the first contactable user, via the one or more communication devices, the first message without transmitting the contact information of the user associated with the electronic device.

32. The method of claim 23, wherein the contact information includes information corresponding to an avatar.

33. The method of claim 23, further comprising:

prior to receiving the request to transmit the first message to the set of contactable users, concurrently displaying:

the first message, and an affordance that, when selected, causes the device to display a user interface that includes one or more options for configuring whether the first contactable user corresponds to an approved recipient.

* * * * *